US008452517B2

(12) United States Patent
Sawada et al.

(10) Patent No.: US 8,452,517 B2
(45) Date of Patent: May 28, 2013

(54) AIR-FUEL RATIO IMBALANCE AMONG CYLINDERS DETERMINING APPARATUS FOR AN INTERNAL COMBUSTION ENGINE

(75) Inventors: Hiroshi Sawada, Gotenba (JP); Fumihiko Nakamura, Susono (JP); Hiroshi Miyamoto, Susono (JP); Yasushi Iwazaki, Ebina (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/382,079

(22) PCT Filed: Jul. 2, 2009

(86) PCT No.: PCT/JP2009/062494
§ 371 (c)(1),
(2), (4) Date: Jan. 3, 2012

(87) PCT Pub. No.: WO2011/001539
PCT Pub. Date: Jan. 6, 2011

(65) Prior Publication Data
US 2012/0173115 A1 Jul. 5, 2012

(51) Int. Cl.
*G01M 15/10* (2006.01)
*F02D 41/00* (2006.01)
*F02D 41/14* (2006.01)

(52) U.S. Cl.
USPC ............................ 701/101; 701/109; 123/692

(58) Field of Classification Search
USPC .................. 701/101, 102, 109; 123/690, 692, 123/703; 60/276
See application file for complete search history.

(56) References Cited

U.S. PATENT DOCUMENTS 6,314,952 B1 11/2001 Turin et al.
6,666,198 B2 12/2003 Mitsutani
7,027,910 B1 4/2006 Javaherian et al.

(Continued)

FOREIGN PATENT DOCUMENTS

JP 2002 317667 10/2002
JP 2007 154840 6/2007

(Continued)

OTHER PUBLICATIONS

International Search Report Issued Oct. 13, 2009 in PCT/JP09/62494 Filed Jul. 2, 2009.

*Primary Examiner* — Hieu T Vo
(74) *Attorney, Agent, or Firm* — Oblon, Spivak, McClelland, Maier & Neustadt, L.L.P.

(57) ABSTRACT

An air-fuel ratio imbalance among cylinders determining apparatus according to the present invention comprises an air-fuel ratio sensor having a protective cover and an air-fuel ratio detection element accommodated in the protective cover, and imbalance determining means. The imbalance determining means obtains a detected air-fuel ratio abyfs based on an output Vabyfs of the air-fuel ratio sensor every elapse of a constant sampling time ts, and obtains, as an indicating amount of air-fuel ratio change rate, a difference (detected air-fuel ratio change rate ΔAF) between a present detected air-fuel ratio abyfs which is newly detected and a previous air-fuel ratio abyfsold which was detected the sampling time ts ago, an average of the detected air-fuel ratio change rate ΔAF, and the like. The imbalance determining means determines that the air-fuel ratio imbalance among cylinders state is occurring, when a magnitude of the indicating amount of air-fuel ratio change rate is larger than an imbalance determination threshold.

26 Claims, 39 Drawing Sheets

U.S. PATENT DOCUMENTS

| | | | | |
|---|---|---|---|---|
| 7,152,594 | B2 | 12/2006 | Anilovich et al. | |
| 7,802,563 | B2 * | 9/2010 | Behr et al. | 123/692 |
| 2007/0240695 | A1 | 10/2007 | Mitsuda et al. | |
| 2008/0087260 | A1 | 4/2008 | Yamada | |
| 2008/0110239 | A1 | 5/2008 | Maegawa | |
| 2008/0243362 | A1 | 10/2008 | Mitsuda et al. | |
| 2009/0037079 | A1 | 2/2009 | Suzuki et al. | |
| 2011/0308506 | A1 * | 12/2011 | Hayashita et al. | 123/703 |
| 2012/0160022 | A1 * | 6/2012 | Kimura et al. | 73/114.72 |

FOREIGN PATENT DOCUMENTS

| | | |
|---|---|---|
| JP | 2007 315193 | 12/2007 |
| JP | 2008 95626 | 4/2008 |
| JP | 2008 121534 | 5/2008 |
| JP | 2009 13967 | 1/2009 |

* cited by examiner

AIR-FUEL RATIO IMBALANCE AMONG CYLINDERS DETERMINING APPARATUS FOR AN INTERNAL COMBUSTION ENGINE

DESCRIPTION

An air-fuel ratio imbalance among cylinders determining apparatus for an internal combustion engine.

TECHNICAL FIELD

The present invention relates to an "air-fuel ratio imbalance among cylinders determining apparatus for an internal combustion engine", which is applied to a multi-cylinder internal combustion engine, and which can determine (or monitor, detect) whether or not an imbalance among air-fuel ratios (individual-cylinder-air-fuel-ratios) of air-fuel mixtures, each supplied to each of cylinders, is occurring (i.e., whether or not an air-fuel ratio imbalance among the cylinders state is occurring).

BACKGROUND ART

Conventionally, an air-fuel ratio control apparatus has been widely known, which comprises a three-way catalytic converter disposed in an exhaust gas passage of an internal combustion engine, and an upstream air-fuel ratio sensor and a downstream air-fuel ratio sensor, disposed upstream and downstream of the three-way catalytic converter, respectively. The air-fuel ratio control apparatus calculates an air-fuel ratio feedback amount based on an output of the upstream air-fuel ratio sensor and an output of the downstream air-fuel ratio sensor, and performs a feedback control on an air-fuel ratio of a mixture supplied to the engine (an air-fuel ratio of the engine) with the air-fuel ratio feedback amount, so that the air-fuel ratio of the engine coincides with the stoichiometric air-fuel ratio. Further, an air-fuel ratio control apparatus has also been proposed, which calculates an air-fuel ratio feedback amount based solely on either the output of the upstream air-fuel ratio sensor or the output of the downstream air-fuel ratio sensor, and performs a feedback control on the air-fuel ratio of the engine with the air-fuel ratio feedback amount. The air-fuel ratio feedback amount used in those air-fuel ratio control apparatuses is a control amount commonly used for all of the cylinders.

Meanwhile, an electronic control fuel injection type internal combustion engine, typically, comprises at least one fuel injector in each of the cylinders or in each of the intake ports, each communicating with each of the cylinders. Accordingly, when a characteristic (or property) of the injector for a specific cylinder becomes a "characteristic that the injector injects a fuel by (or of) an amount larger (more excessive) than an instructed fuel injection amount", only an air-fuel ratio of a mixture supplied to the specific cylinder (air-fuel-ratio-of-the-specific-cylinder) changes toward extremely richer side. That is, a non-uniformity among air-fuel ratios of the cylinders (a variation in air-fuel ratios among the cylinders, an air-fuel ratio imbalance among the cylinders) becomes large. In other words, there arises an imbalance (a non-uniformity) among the individual-cylinder-air-fuel-ratios.

In this case, an average of the air-fuel ratios of the mixtures supplied to the entire engine becomes an air-fuel ratio richer (smaller) than a stoichiometric air-fuel ratio. Accordingly, the air-fuel ratio feedback amount common to all of the cylinders causes the air-fuel ratio of the specific cylinder to change to a leaner (larger) air-fuel ratio so that the air-fuel ratio of the specific cylinder is made closer to the stoichiometric air-fuel ratio, and at the same time, the air-fuel ratio feedback amount causes each of the air-fuel ratios of the other cylinders to change to a leaner (larger) air-fuel ratios so that each of the air-fuel ratios of the other cylinders is made deviate more from the stoichiometric air-fuel ratio. As a result, the average of the air-fuel ratios of the mixtures supplied to the entire engine is made roughly equal to the stoichiometric air-fuel ratio.

However, the air-fuel ratio of the specific cylinder is still richer (smaller) than the stoichiometric air-fuel ratio, and the air-fuel ratios of the other cylinders are leaner (larger) than the stoichiometric air-fuel ratio, and therefore, a combustion condition of the mixture in each of the cylinders is different from a perfect combustion. As a result, an amount of emissions (an amount of an unburnt substances and an amount of nitrogen oxides) discharged from each of the cylinders increases. Accordingly, although the average of the air-fuel ratios of the mixtures supplied to the engine coincides with the stoichiometric air-fuel ratio, the three-way catalytic converter can not purify the increased emission, and thus, there is a possibility that the emission becomes worse. It is therefore important to detect whether or not the air-fuel ratio non-uniformity among cylinders is excessively large (the air-fuel ratio imbalance among cylinders state is occurring) so that an appropriate measure can be taken, in order not to worsen the emissions. It should be noted that the air-fuel ratio imbalance among cylinders occurs due to various reasons, such as when a characteristic of an injector of a specific cylinder becomes a "characteristic that the injector injects the fuel by (or of) an amount which is excessively smaller than the instructed fuel injection amount", or when distribution ratio of an EGR gas and an evaporated fuel gas to each of the cylinders becomes non-uniform.

One of such conventional apparatuses that determine whether or not the air-fuel ratio imbalance among cylinders state is occurring obtains a trajectory length of an output (output signal) of an air-fuel ratio sensor (the above mentioned upstream air-fuel ratio sensor) disposed at an exhaust-gas-aggregated-portion onto which exhaust gases from a plurality of cylinders merge, compares the trajectory length with an "reference value varying in accordance with an engine rotational speed and an intake air amount", and the determines whether or not the air-fuel ratio imbalance among cylinders state is occurring based on the comparison result (refer to, for example, U.S. Pat. No. 7,152,594). It should be noted that, in the present specification, determining (judging) whether or not the air-fuel ratio imbalance among cylinders state is occurring can be simply referred to as a "determination of an air-fuel ratio imbalance among cylinders, or an imbalance determination".

SUMMARY OF THE INVENTION

When the air-fuel ratio imbalance among cylinders state is occurring, the output of the air-fuel ratio sensor greatly differs between when the exhaust gas from the cylinder whose individual air-fuel ratio does not deviate from the stoichiometric air-fuel ratio reaches the air-fuel ratio sensor and when the exhaust gas from the cylinder whose individual air-fuel ratio deviates from the stoichiometric air-fuel ratio toward a richer side or a leaner side reaches the air-fuel ratio sensor. Accordingly, the trajectory length of the output of the air-fuel ratio sensor increases when the air-fuel ratio imbalance among cylinders state is occurring. However, the exhaust gas from any of the cylinders reaches the air-fuel ratio sensor with an interval equal to an "interval of a combustion of the mixture in the multi-cylinder internal combustion engine". Accordingly, except when the individual-cylinder-air-fuel-ratios are perfectly/completely equal to each other among cylinders so that the air-fuel ratio of the gas reaching the air-fuel ratio sensor is always uniform, the trajectory length of the output of the air-fuel ratio sensor is strongly affected by the engine rotational speed. Therefore, the above described conventional apparatus can not perform the determination of an air-fuel ratio imbalance among cylinders with high precision, or alternatively, the reference value must be determined with high precision for each of the engine rotational speeds, which causes a development time to become extremely long.

In view of the above, one of the objects of the present invention is to provide a "highly practical air-fuel ratio imbalance among cylinders determining apparatus", which can determine whether or not the air-fuel ratio non-uniformity among cylinders is excessively large (whether or not the air-fuel ratio imbalance among cylinders is/has been occurring) with high precision, without setting the reference value with high precision for each of the engine rotational speeds.

(Basis of the Determination of an Air-Fuel Ratio Imbalance Among Cylinders According to the Present Invention)

The inventors of the present invention have found that a "change amount per unit time" of an "air-fuel ratio (i.e., a detected air-fuel ratio) represented by an output of an air-fuel ratio sensor having a protective cover" (that is, a temporal differentiation (or time derivative) value of the detected air-fuel ratio, which is also referred to as a "detected air-fuel ratio change rate") greatly differs (changes) depending on whether or not the air-fuel ratio imbalance among cylinders state has been occurring. Further, the inventors have found that the detected air-fuel ratio change rate is unlikely to be affected by the engine rotational speed. Accordingly, the inventors have come to the conclusion that the determination of an air-fuel ratio imbalance among cylinders can be made with high precision, by using (or based on) an "indicating amount of air-fuel ratio change rate varying depending on the detected air-fuel ratio change rate (e.g., an average of the detected air-fuel ratio change rate, a maximum value of the detected air-fuel ratio change rate, and the like). The reason why the determination of an air-fuel ratio imbalance among cylinders can be made, with high precision, according to the indicating amount of air-fuel ratio change rate will next be described.

The exhaust gas from each of the cylinders reaches the air-fuel ratio sensor in order of ignition. When the air-fuel ratio imbalance among cylinders is not occurring, each of the air-fuel ratios of the exhaust gases discharged from the cylinders is substantially equal to each other. Accordingly, when the air-fuel ratio imbalance among cylinders is not occurring, the output of the air-fuel ratio sensor changes as shown in (A) of FIG. 1, for example. That is, when the air-fuel ratio imbalance among cylinders is not occurring, the wave shape of the output of the air-fuel ratio sensor is substantially flat.

Meanwhile, when the "air-fuel ratio imbalance among cylinders (i.e., a specific cylinder rich-side deviation imbalance state)" is occurring, in which only an air-fuel ratio of the specific cylinder (e.g., the first cylinder) deviates toward richer side than the stoichiometric air-fuel ratio, there is a great difference between the air-fuel ratio of the exhaust gas from the specific cylinder and the air-fuel ratio of the exhaust gas from any one of cylinders (the other cylinder) other than the specific cylinder. Accordingly, for example, as shown in (B) of FIG. 1, when the rich-side deviation imbalance state is occurring, the output of the air-fuel ratio sensor varies greatly every 720° crank angle in a case of the 4-cylinder and 4-cycle engine (i.e., every crank angle which is necessary for each of the cylinders to complete one combustion stroke, each and every one of the cylinders discharging an exhaust gas which reaches the single air-fuel ratio sensor). It should be noted that, "a time period for which the crank angle passes, the crank angle being necessary for each and every one of the cylinders to complete one combustion stroke, each of the cylinders discharging the exhaust gas which reaches the single air-fuel ratio sensor" is referred to as a "unit combustion cycle period", in the present specification.

More specifically, in the example shown in (B) of FIG. 1, the output of the air-fuel ratio sensor indicates a value richer than the stoichiometric air-fuel ratio when the exhaust gas from the first cylinder reaches an air-fuel ratio detection element of the air-fuel ratio sensor, and the output of the air-fuel ratio sensor continuously changes when the exhaust gas from the other cylinders reaches the air-fuel ratio detection element in such a manner that it converges on the stoichiometric air-fuel ratio or an air-fuel ratio slightly leaner than the stoichiometric air-fuel ratio. The reason why the output of the air-fuel ratio sensor converges on the air-fuel ratio slightly leaner than the stoichiometric air-fuel ratio when the exhaust gas from the other cylinders reaches the air-fuel ratio detection element is owing to the air-fuel ratio feedback control described above.

Similarly, when the "air-fuel ratio imbalance among cylinders (i.e., a specific cylinder lean-side deviation imbalance state)" is occurring, in which only the air-fuel ratio of the specific cylinder (e.g., the first cylinder) deviates toward leaner side than the stoichiometric air-fuel ratio, the output of the air-fuel ratio sensor varies greatly every 720° crank angle, as shown in (C) of FIG. 1, for example.

More specifically, in the example shown in (C) of FIG. 1, the output of the air-fuel ratio sensor indicates a value leaner than the stoichiometric air-fuel ratio when the exhaust gas from the first cylinder reaches the air-fuel ratio detection element of the air-fuel ratio sensor, and the output of the air-fuel ratio sensor continuously changes when the exhaust gas from the other cylinders reaches the air-fuel ratio detection element in such a manner that it converges on the stoichiometric air-fuel ratio or an air-fuel ratio slightly richer than the stoichiometric air-fuel ratio. The reason why the output of the air-fuel ratio sensor converges on the air-fuel ratio slightly richer than the stoichiometric air-fuel ratio when the exhaust gas from the other cylinders reaches the air-fuel ratio detection element is owing to the air-fuel ratio feedback control described above.

As is clear from FIG. 1, a magnitude of the "detected air-fuel ratio change rate" which is the temporal differentiation value of the output of the air-fuel ratio sensor when the air-fuel ratio imbalance among cylinders state has been occurring (i.e., each of the magnitudes of angles $\alpha\mathbf{2}$-$\alpha\mathbf{5}$) becomes prominently large as compared to the magnitude of the detected air-fuel ratio change rate (the magnitude of the angle $\alpha\mathbf{1}$) obtained when the air-fuel ratio imbalance among cylinders state has not been occurring. Thus, the determination of the air-fuel ratio imbalance among cylinders can be performed by obtaining the indicating amount of air-fuel ratio change rate varying depending on the detected air-fuel ratio change rate (e.g., as described later, the detected air-fuel ratio change rate itself which is obtained every minute predetermined time, an average of a plurality of the detected air-fuel ratio change rates that are obtained in a predetermined period, a maximum value of a plurality of the detected air-fuel ratio change rates that are obtained in a predetermined period, and the like) based on the output value of the air-fuel ratio sensor, and by, for example, comparing a magnitude of the obtained indicating amount of air-fuel ratio change rate with a predetermined imbalance determination threshold.

The reason why the detected air-fuel ratio change rate is unlikely to be affected by the engine rotational speed will next be described.

As shown in FIGS. 2 and 3, the air-fuel ratio sensor (55) typically includes the air-fuel ratio detection element (55*a*) and the protective covers (55*b*, 55*c*) for the air-fuel ratio detection element. The protective covers (55*b*, 55*c*) accommodates the air-fuel ratio detection element (55*a*) in its inside so as to cover the air-fuel ratio detection element (55*a*). Further, the protective covers (55*b*, 55*c*) have inflow holes (55*b*1, 55*c*1) which allows the exhaust gas EX flowing in the exhaust gas passage to flow into the inside of the protective covers (55*b*, 55*c*) so that the exhaust EX can reach the air-fuel ratio detection element (55*a*), and outflow holes (55*b*2, 55*c*2) which allow the exhaust gas which has flowed inside of the protective covers to flow out to the exhaust gas passage.

The air-fuel ratio sensor (55) is disposed in such a manner that the protective cover (55*b*) is exposed either in the exhaust-gas-aggregated-portion or in the exhaust gas passage at a position downstream of the exhaust-gas-aggregated-portion (and a position upstream of an upstream-side catalyst). Accordingly, the exhaust gas EX flowing through the exhaust gas passage flows into a space between the outer protective cover (55*b*) and the inner protective cover (55*c*) via inflow holes (55*b*1) of the outer protective cover (55*b*), as shown by an arrow Ar1. Subsequently, the exhaust gas, as shown by an arrow Ar2, flows into an inside of the inner protective cover (55*c*) via the inflow holes (55*c*1) of the inner protective cover (55*c*), and thereafter, reaches the air-fuel ratio detection element (55*a*). Then, the exhaust gas, as shown by an arrow Ar3, flows out to the exhaust gas passage via the outflow holes (55*c*2) of the inner protective cover (55*c*) and the outflow holes (55*b*2) of the outer protective cover (55*b*). That is, the exhaust gas EX, which has reached the outflow holes (55*b*1) of the outer protective cover (55*b*) in the exhaust gas passage is introduced into the inside of the protective covers (55*b*, 55*c*) owing to a flow (stream) of the exhaust gas EX flowing in the vicinity of the outflow holes (55*b*2) of the outer protective cover (55*b*).

Thus, a flow rate of the exhaust gas in the protective covers (55*b*, 55*c*) changes depending on a flow rate of the exhaust gas EX flowing in the vicinity of the outflow holes (55*b*2) of the outer protective cover (55*b*) through the exhaust gas passage (and accordingly, depending on an intake air-flow rate Ga which is an intake air amount per unit time). In other words, a time duration from a "time at which an exhaust gas having a specific air-fuel ratio (first exhaust gas) reaches the inflow holes (55*b*1)" to a "time at which the first exhaust gas reaches the air-fuel ratio detection element (55*a*)" depends on the intake air-flow rate Ga, but does not depend on the engine rotational speed NE. This can be true even if the air-fuel ratio sensor has the inner protective cover only.

FIG. 4 schematically shows a temporal change (change in time) of the air-fuel ratio of the exhaust gas when the specific cylinder rich-side deviation imbalance state is occurring. In FIG. 4, a line L1 shows the air-fuel ratio of the exhaust gas which has reached the outflow holes (55*b*1) of the outer protective cover (55*b*). Lines L2, L3 and L4 show the air-fuel ratio of the exhaust gas which has reached the air-fuel ratio detection element (55*a*). Note that, the line L2 corresponds to a case in which the intake air-flow rate is relatively large, the line L3 corresponds to a case in which the intake air-flow rate is in the middle magnitude, and the line L3 corresponds to a case in which the intake air-flow rate is relatively small.

As shown by the line L1, when the exhaust gas from the specific cylinder in the rich-side deviation imbalance state reaches the inflow holes (55*b*1) at a point in time t1, the gas passes through the inflow holes (55*b*1, 55*c*1) and begins to reach the air-fuel ratio detection element 55*a* at a point in time (t2) which is slightly after the point in time t1. At this time, as described before, the flow rate of the exhaust gas flowing inside of the protective covers (55*b*, 55*c*) is subject to the flow rate of the exhaust gas flowing through the exhaust gas passage.

Accordingly, the air-fuel ratio of the exhaust gas contacting with the air-fuel detection element starts to change from a point in time which is closer to the point in time t1 as the intake air flow rate Ga is larger. Further, the air-fuel ratio of the exhaust gas contacting with the air-fuel ratio element is an air-fuel ratio of an exhaust gas formed by being mixed the "exhaust gas which has newly reached the air-fuel ratio detection element" with the "exhaust gas existing in the vicinity of the air-fuel ratio detection element". Therefore, an air-fuel ratio change rate of the exhaust gas contacting with (arriving at) the air-fuel ratio detection element (i.e., a changing rate which is a temporal differentiation value of the air-fuel ratio, that is, magnitudes of inclination of the lines L2-L4 shown in FIG. 4) becomes larger as the intake air flow rate Ga is larger.

Thereafter, when the exhaust gas from the cylinder which is not in the rich-side deviation imbalance state reaches the inflow holes (55*b*1) at a point in time t3, the gas begins to reach the air-fuel ratio detection element 55*a* at a point in time (in the vicinity of a point in time t4) which is slightly after the point in time t4. The "flow rate of the exhaust gas flowing inside of the protective covers (55*b*, 55*c*), the exhaust gas discharged from the cylinder which is not in the rich-side deviation imbalance state" is also subject to the flow rate of the exhaust gas EX flowing through the exhaust gas passage (and thus, is subject to the intake air-flow rate Ga). Accordingly, the air-fuel ratio of the exhaust gas contacting with (arriving at) the air-fuel ratio detection element increases more rapidly as the intake air flow rate Ga is larger.

It should be noted that, as shown by the lines L3 and L4, when the intake air-flow rate Ga is relatively small, the exhaust gas from the "cylinder which is not in the rich-side deviation imbalance state, and whose exhaust order is next to the specific cylinder" reaches the air-fuel ratio detection element at a point in time before a time point at which the air-fuel ratio of the exhaust gas contacting with the air-fuel ratio detection element coincides with the "air-fuel ration ARi of the exhaust gas from the specific cylinder which is in the rich-side deviation imbalance state". Therefore, the air-fuel ratio contacting with the air-fuel ratio detection element starts to change toward the leaner side before the it coincides with the air-fuel ration ARi of the exhaust gas from the specific cylinder.

On the other hand, the output of the air-fuel ratio sensor (in actuality, the output of the air-fuel ratio detection element) changes in such a manner that it follows with a slight delay the change in the air-fuel ratio of the exhaust gas reaching the air-fuel ratio detection element. Accordingly, as shown in FIG. 5, when the air-fuel ratio of the exhaust gas reaching the air-fuel ratio detection element changes as shown by the line L3, the output of the air-fuel ratio sensor changes as shown by the line S1.

FIG. 6 is a chart for describing the output of the air-fuel ratio sensor when the intake air-flow rate Ga is constant but the engine rotational speed NE changes, in a case where the specific cylinder rich-side deviation imbalance state is occurring. (A) of FIG. 6 shows the "air-fuel ratio of the gas reaching the inflow holes (55*b*1) of the outer protective cover (line L1)", the "air-fuel ratio of the gas reaching the air-fuel ratio detection element (line L3)", and the "output of the air-fuel ratio sensor (line S1)", when the engine rotational speed NE is equal to a predetermined value NE1, and the intake air-flow rate Ga is equal to a predetermine value Ga1. (B) of FIG. 6 shows the "air-fuel ratio of the gas reaching the inflow holes (55*b*1) of the outer protective cover (line L5)", the "air-fuel ratio of the gas reaching the air-fuel ratio detection element (line L6)", and the "output of the air-fuel ratio sensor (line S2)", when the engine rotational speed NE is equal to a value (2·NE1) twice as much as the predetermined value NE1, and the intake air-flow rate Ga is equal to the predetermine value Ga1.

As described before, the flow rate of the exhaust gas flowing inside of the protective covers (55*b*, 55*c*) is subject to the intake air-flow rate Ga. Therefore, even when the engine rotational speed NE changes, as long as the intake air-flow rate Ga does not change, the detected air-fuel ratio change rate (inclination) does not change. Further, a time from a point in time (time t1) at which the exhaust gas from the specific cylinder which is in the specific cylinder rich-side deviation imbalance state reaches the inflow holes (55*b*1) to a point in time (time t2) at which the gas begins to reach the air-fuel ratio detection element 55*a* is a constant time Td, even when the engine rotational speed NE changes. Furthermore, a time from a point in time (time t3) at which the exhaust gas from the cylinder which is not in the specific cylinder rich-side deviation imbalance state reaches the inflow holes (55*b*1) to a point in time (time t4) at which the gas begins to reach the air-fuel ratio detection element 55*a* is also the constant time Td. Consequently, the output of the air-fuel ratio sensor changes as shown in (A) and (B) of FIG. 6.

As is understood from (A) and (B) of FIG. 6, a change width (W) becomes smaller as the engine rotational speed NE becomes larger. That is, the trajectory length of the air-fuel ratio sensor greatly changes depending on the engine rotational speed. Therefore, as described before, when the determination of an air-fuel ratio imbalance among cylinders is performed based on the trajectory length of the air-fuel ratio sensor, the reference value which is to be compared with the trajectory length must be determined with high precision in accordance with the engine rotational speed. In contrast, the detected air-fuel ratio change rate is hardly affected by the engine rotational speed NE, and therefore, the value (i.e., indicating amount of air-fuel ratio change rate) varying in accordance with the detected air-fuel ratio change rate is also hardly affected by the engine rotational speed NE. Accordingly, by using the indicating amount of air-fuel ratio change rate, the determination of an air-fuel ratio imbalance among cylinders with higher accuracy can be made.

An air-fuel ratio imbalance among cylinders determining apparatus for an internal combustion engine according to the present invention (hereinafter, also referred to as a "present invention apparatus") is an apparatus, which is made in view of the above, which is applied to a multi-cylinder internal combustion engine having a plurality of cylinders, and which comprises an air-fuel ratio sensor and imbalance determining means.

The air-fuel ratio sensor, as described above with referring to FIGS. 2 and 3,

- is disposed either at an exhaust-gas-aggregated-portion onto which exhaust gases discharged from "at least two or more of cylinders among a plurality of the cylinders" merge in the exhaust gas passage of the engine or at a position downstream of the exhaust-gas-aggregated-portion in the exhaust gas passage, and
- includes an air-fuel ratio detection element and a protective cover.

The air-fuel ratio detection element generates, as an "output of the air-fuel ratio sensor", an output in accordance with (varying depending on) an air-fuel ratio of an "exhaust gas which has reached (i.e. which contacts with) the air-fuel ratio detection element". In a well-known wide range air-fuel ratio sensor of a limiting current type, the output of the air-fuel ratio sensor becomes larger as an air-fuel ratio of a gas which has reached the air-fuel ratio detection element becomes larger.

The protective cover accommodates the air-fuel ratio detection element in its inside so as to cover the air-fuel ratio detection element. Further, the protective cover has "inflow holes which allow the exhaust gas flowing in the exhaust gas passage to flow into the inside", and "outflow holes which allow the exhaust gas which has flowed into the inside to flow out to the exhaust gas passage". That is, the protective cover has such a structure that makes a flow rate of the exhaust gas in the protective cover substantially depend on (be substantially subject to) a flow rate of the exhaust gas outside of the protective cover (i.e., depend on the intake air-flow rate Ga). The protective cover may or may not be a "double structure including the outer and inner protective covers" as described above, but may be a single structure or a triplex structure.

The imbalance determining means is configured in such a manner that, (1) it obtains an indicating amount of air-fuel ratio change rate based on the output of the air-fuel ratio sensor, and (2) it performs a determination, based on the obtained indicating amount of air-fuel ratio change rate, as to whether or not a state (i.e., air-fuel ratio imbalance state among cylinders) in which an imbalance among "individual-cylinder-air-fuel-ratios", each being an air-fuel ratio of a "mixture supplied to each of at least the two or more of the cylinders" is occurring.

The "indicating amount of air-fuel ratio change rate" is a value varying depending on a "detected air-fuel ratio change rate (a value corresponding to a temporal differentiation value of an air-fuel ratio represented by the output of the air-fuel ratio sensor)" which is a change amount per unit time of the "air-fuel ratio represented by the output of the air-fuel ratio sensor". As described later, the indicating amount of air-fuel ratio change rate may be a change rate of the output of the air-fuel ratio sensor itself (the value corresponding to the temporal differentiation value), a change rate of a value into which the output of the air-fuel ratio sensor is converted, an average of those values in a certain period, a maximum value of these values in a certain period, and the like. The indicating amount of air-fuel ratio change rate is obtained in such a manner that the indicating amount of air-fuel ratio change rate is typically a value which becomes larger as a magnitude of the detected air-fuel ratio change rate ΔAF becomes larger.

For example, "performing the determination of an air-fuel ratio imbalance among cylinders based on the indicating amount of air-fuel ratio change rate" may include, as described later,

- determining whether or not a magnitude of the indicating amount of air-fuel ratio change rate is larger than a "predetermined imbalance determination threshold", and adopting the comparison result as a result of the imbalance determination;
- obtaining, among a plurality of the indicating amount of air-fuel ratio change rates obtained in a certain period, the number of data indicating that a magnitude of the indicating amount of air-fuel ratio change rate is larger than a "predetermined effective change rate threshold" and the number of data indicating that the magnitude of the indicating amount of air-fuel ratio change rate is equal to or smaller than the "predetermined effective change rate threshold", and adopting a comparison result between these numbers of data as a result of the imbalance determination; and detecting, using a change in sign (plus or minus) of the indicating amount of air-fuel ratio change rate, a rich peak (a local minimal value of the indicating amount of air-fuel ratio change rate) and/or a lean peak (a local maximum value of the indicating amount of air-fuel ratio change rate), and performing the determination of an air-fuel ratio imbalance among cylinders based on whether or not a time period between the successive two rich peaks is longer than a predetermined time, or based on whether or not a time period between the successive two lean peaks is longer than a predetermined time.

As described above, the detected air-fuel ratio change rate is hardly affected by the engine rotational speed, and thus, the indicating amount of air-fuel ratio change rate is also hardly affected by the engine rotational speed. Accordingly, by using the indicating amount of air-fuel ratio change rate, the determination of an air-fuel ratio imbalance among cylinders with higher accuracy can be performed. Further, it is not necessary for the various thresholds used for the imbalance determination (e.g., the imbalance determination threshold) to be matched/adjusted for each of the engine rotational speeds NE, the present invention apparatus can be developed with "much shorter developing time".

As described before, the imbalance determining means may be configured in such a manner that it compares the magnitude of the indicating amount of air-fuel ratio change rate and the predetermined imbalance determination threshold, and determines whether or not the air-fuel ratio imbalance among cylinders state has been occurring based on the comparison result.

More specifically, the imbalance determining means may be configured so as to determine that the air-fuel ratio imbalance among cylinders state is occurring when the comparison result indicates that a magnitude of the obtained indicating amount of air-fuel ratio change rate is larger than the imbalance determination threshold.

Further, one of embodiments of the imbalance determining means may be configured so as to obtain the output of the air-fuel ratio sensor every time a constant sampling period elapses, and to obtain, as the indicating amount of air-fuel ratio change rate, a difference (i.e., the detected air-fuel ratio change rate) between air-fuel ratios, each being represented by each of the outputs of the air-fuel ratio sensor that are obtained consecutively before and after the sampling period.

According to the above embodiment, the determination of an air-fuel ratio imbalance among cylinders can be performed without carrying out a complicated data process.

Another of the embodiments of the imbalance determining means may be configured so as to obtain the output of the air-fuel ratio sensor every time a constant sampling period elapses, to obtain, as the detected air-fuel ratio change rate, a difference between air-fuel ratios, each being represented by each of the outputs of the air-fuel ratio sensor that are obtained consecutively before and after the sampling period so that the imbalance determining means obtains a plurality of the detected air-fuel ratio change rates in a data obtaining period longer than the sampling period, and to obtain, as the "indicating amount of air-fuel ratio change rate", an average of magnitudes of the "obtained detected air-fuel ratio change rates".

According to the above embodiment, the average of the magnitudes of a plurality of the detected air-fuel ratio change rates in the predetermined data obtaining period is adopted as the indicating amount of air-fuel ratio change rate, and the indicating amount of air-fuel ratio change rate is compared with the imbalance determination threshold. Accordingly, even when a noise is superimposing on the output of the air-fuel ratio sensor, it is unlikely that the indicating amount of air-fuel ratio change rate is affected by the noise. Consequently, the determination of an air-fuel ratio imbalance among cylinders can be made with higher accuracy. It should be noted that, when the data obtaining period is set in such a manner that the obtained detected air-fuel ratio change rates are always positive in the data obtaining period, the "average of the magnitudes of a plurality of the detected air-fuel ratio change rates" means an "average of a plurality of the detected air-fuel ratio change rates". Further, when the data obtaining period is set in such a manner that the obtained detected air-fuel ratio change rates are always negative in the data obtaining period, the "average of the magnitudes of a plurality of the detected air-fuel ratio change rates" means an "absolute value of an average of a plurality of the detected air-fuel ratio change rates", or an "average of absolute values of a plurality of the detected air-fuel ratio change rates".

Further, another of the embodiments of the imbalance determining means may be configured so as to obtain the output of the air-fuel ratio sensor every time a constant sampling period elapses, to obtain, as the detected air-fuel ratio change rate, a difference between air-fuel ratios, each being represented by each of the outputs of the air-fuel ratio sensor that are obtained consecutively before and after the sampling period so that the imbalance determining means obtains a plurality of the detected air-fuel ratio change rates in a data obtaining period longer than the sampling period, and to obtain, as the "indicating amount of air-fuel ratio change rate", the detected air-fuel ratio change rate which has the largest magnitude among the "obtained detected air-fuel ratio change rates".

Even when a noise is superimposing on the output of the air-fuel ratio sensor, there is a great difference between the maximum value among (magnitudes of) a plurality of the detected air-fuel ratio change rates obtained when the air-fuel ratio imbalance among cylinders state is occurring and the maximum value among (magnitudes of) a plurality of the detected air-fuel ratio change rates obtained when the air-fuel ratio imbalance among cylinders state is not occurring. Consequently, the determination of an air-fuel ratio imbalance among cylinders can be made with higher accuracy.

In such an embodiment which adopts, as the indicating amount of air-fuel ratio change rate, the average of a plurality of the detected air-fuel ratio change rates or the maximum value of the magnitudes of a plurality of the detected air-fuel ratio change rates, it is preferable that the data obtaining period be set at a period which is a natural number times longer than the "unit combustion cycle period", the unit combustion cycle period being a "period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke".

In this manner, by setting the data obtaining period in which the average of or the maximum value of a plurality of the detected air-fuel ratio change rates at the "period which is a natural number times longer than the unit combustion cycle period", the indicating amount of air-fuel ratio change rate when the air-fuel ratio imbalance among cylinders state is occurring is certainly larger than the indicating amount of air-fuel ratio change rate when the air-fuel ratio imbalance among cylinders state is not occurring. Consequently, the embodiment can perform the determination of an air-fuel ratio imbalance among cylinders with higher accuracy.

Further, in the embodiment which adopts, as the indicating amount of air-fuel ratio change rate, the maximum value of the magnitudes of a plurality of the detected air-fuel ratio change rates, it is preferable that the data obtaining period be set at a period which is longer than the “unit combustion cycle period”, the unit combustion cycle period being a “period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke”.

The exhaust gas from each of the “at least two or more of the cylinders” inevitably contact with the air-fuel ratio detection element within the unit combustion cycle period. Therefore, the maximum value of the magnitudes of the detected air-fuel ratio change rates when the air-fuel ratio imbalance among cylinders state is occurring inevitably appears within the unit combustion cycle period. Accordingly, by setting the data obtaining period as in the embodiment described above, the indicating amount of air-fuel ratio change rate when the air-fuel ratio imbalance among cylinders state is occurring is certainly larger than the indicating amount of air-fuel ratio change rate when the air-fuel ratio imbalance among cylinders state is not occurring. Consequently, the embodiment can perform the determination of an air-fuel ratio imbalance among cylinders with higher accuracy.

Further, still another of the embodiments of the imbalance determining means may be configured;

so as to obtain the output of the air-fuel ratio sensor every time a “constant sampling period” elapses, the constant sampling period being shorter than the “unit combustion cycle period”, the unit combustion cycle period being a “period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke”;

so as to obtain, as the detected air-fuel ratio change rate, a difference between air-fuel ratios, each being represented by each of the outputs of the air-fuel ratio sensor that are obtained consecutively before and after the sampling period;

so as to select, as a maximum change rate, the detected air-fuel ratio change rate having the maximum magnitude among a plurality of the detected air-fuel ratio change rates obtained in the unit combustion cycle period;

so as to obtain an average of the maximum change rates, each being selected for each of a plurality of the unit combustion cycle periods; and so as to obtain/adopt the average as the indicating amount of air-fuel ratio change rate.

As described above, the maximum value of the magnitudes of the detected air-fuel ratio change rates when the air-fuel ratio imbalance among cylinders state is occurring inevitably appears within the unit combustion cycle period. Therefore, according to the above embodiment, the maximum change rate when the air-fuel ratio imbalance among cylinders state is occurring is certainly larger than the maximum change rate when the air-fuel ratio imbalance among cylinders state is not occurring. Further, according to the above embodiment, the average of a plurality of the maximum change rates, each of which is selected (obtained) for each of a plurality of the unit combustion cycle period, is adopted as the indicating amount of air-fuel ratio change rate. Therefore, even when the magnitude of the detected air-fuel ratio change rate becomes unexpectedly large due to a noise or the like when the air-fuel ratio imbalance among cylinders state is not occurring, the thus obtained indicating amount of air-fuel ratio change rate does not become so large. That is, it is unlikely that the thus obtained indicating amount of air-fuel ratio change rate is affected by the noise which superimposes on the output of the air-fuel ratio sensor. Consequently, the determination of an air-fuel ratio imbalance among cylinders can be performed with higher accuracy.

In the present invention apparatus, it is preferable that the imbalance determining means be configured;

so as to perform the “determination as to whether or not the air-fuel ratio imbalance among cylinders state is occurring” when an “intake air-flow rate” which is an “amount of air introduced into the engine per unit time” is larger than a “predetermined first air-flow rate threshold”, and so as not to perform the “determination as to whether or not the air-fuel ratio imbalance among cylinders state is occurring” when the intake air-flow rate is smaller than the first air-flow rate threshold.

As is understood from the descriptions made with referring to FIGS. 4 and 5, even when the air-fuel ratio imbalance among cylinders state is occurring, the magnitude of the detected air-fuel ratio change rate becomes smaller as the intake air-flow rate becomes smaller. Accordingly, there is a possibility that the erroneous determination is made by performing the determination of an air-fuel ratio imbalance among cylinders based on the indicating amount of air-fuel ratio change rate varying depending on the detected air-fuel ratio change rate, when the intake air-flow rate is smaller than the first air-flow rate threshold. Consequently, by configuring the imbalance determining means as in the embodiment described above, the determination of an air-fuel ratio imbalance among cylinders can be performed with higher accuracy.

Further, the imbalance determining means which performs the determination of an air-fuel ratio imbalance among cylinders by comparing the magnitude of the indicating amount of air-fuel ratio change rate with the predetermined imbalance determination threshold may preferably be configured so as to increase the imbalance determination threshold as the intake air-flow rate which is an air amount introduced into the engine per unit time is larger.

As is understood from the descriptions made with referring to FIGS. 4 and 5, when the air-fuel ratio imbalance among cylinders state is occurring, the magnitude of the detected air-fuel ratio change rate (and thus, the indicating amount of air-fuel ratio change rate) becomes larger as the intake air-flow rate becomes larger. Accordingly, as the embodiment described above, by increasing the imbalance determination threshold as the intake air-flow rate is larger, the determination of an air-fuel ratio imbalance among cylinders can be performed with higher accuracy.

Further, the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the indicating amount of air-fuel ratio change rate, discriminating between an increasing indicating amount of change rate when the detected air-fuel ratio change rate is positive and a decreasing indicating amount of change rate when the detected air-fuel ratio change rate is negative;

so as to compare a magnitude of the increasing indicating amount of change rate with an increasing change rate threshold serving as the imbalance determination threshold when the magnitude of the increasing indicating amount of change rate is larger than a magnitude of the decreasing indicating amount of change rate, and determine that the air-fuel ratio imbalance among cylinders state is occurring in which an air-fuel ratio of one of the at least two or more of the cylinders deviates toward leaner side with respect to the stoichiometric air-fuel ratio when the magnitude of the increasing indicating amount of change rate is larger than the increasing change rate threshold; and so as to compare the magnitude of the decreasing indicating amount of change rate with a decreasing change rate threshold serving as the imbalance determination threshold when the magnitude of the decreasing indicating amount of change rate is larger than the magnitude of the increasing indicating amount of change rate, and determine that the air-fuel ratio imbalance among cylinders state is occurring in which an air-fuel ratio of one of the at least two or more of the cylinders deviates toward richer side with respect to the stoichiometric air-fuel ratio when the magnitude of the decreasing indicating amount of change rate is larger than the decreasing change rate threshold.

According to experiments, as shown in (B) of FIG. 1, when the specific cylinder rich-side deviation imbalance state is occurring, the magnitude of the decreasing indicating amount of change rate (the magnitude of the inclination α2) is larger than the magnitude of the increasing indicating amount of change rate (the magnitude of the inclination α3). In contrast, as shown in (C) of FIG. 1, when the specific cylinder lean-side deviation imbalance state is occurring, the magnitude of the increasing indicating amount of change rate (the magnitude of the inclination α4) is larger than the magnitude of the decreasing indicating amount of change rate (the magnitude of the inclination α5). Therefore, according to the embodiment described above, it is possible to determine that the specific cylinder rich-side deviation imbalance state is occurring, the specific cylinder lean-side deviation imbalance state is occurring, or none of these is occurring, while discriminating these states.

Alternatively, the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the indicating amount of air-fuel ratio change rate, discriminating between an increasing indicating amount of change rate when the detected air-fuel ratio change rate is positive and a decreasing indicating amount of change rate when the detected air-fuel ratio change rate is negative;

so as to compare a magnitude of the increasing indicating amount of change rate with an increasing change rate threshold serving as the imbalance determination threshold and compare the magnitude of the decreasing indicating amount of change rate with a decreasing change rate threshold serving as the imbalance determination threshold; and so as to determine that the air-fuel ratio imbalance among cylinders state is occurring, when the magnitude of the increasing indicating amount of change rate is larger than the increasing change rate threshold and the magnitude of the decreasing indicating amount of change rate is larger than the decreasing change rate threshold.

According to the embodiment described above, the increasing change rate threshold can be set to be different from the decreasing change rate threshold, and therefore, the determination of an air-fuel ratio imbalance among cylinders can be performed with higher accuracy. For example, when the specific cylinder rich-side deviation imbalance state needs to be detected more accurately, the decreasing change rate threshold may be set at a value larger than the increasing change rate threshold. When the specific cylinder lean-side deviation imbalance state needs to be detected more accurately, the increasing change rate threshold may be set at a value larger than the decreasing change rate threshold. Note that the increasing change rate threshold and the decreasing change rate threshold can be set at the same value as each other.

Further, the imbalance determining means may be configured, when the magnitude of the increasing indicating amount of change rate is larger than the increasing change rate threshold and the magnitude of the decreasing indicating amount of change rate is larger than the decreasing change rate threshold (i.e., when it is determined that the air-fuel ratio imbalance among cylinders state is occurring);

so as to determine that the air-fuel ratio imbalance among cylinders state is occurring in which an air-fuel ratio of one of the at least two or more of the cylinders deviates toward leaner side with respect to the stoichiometric air-fuel ratio when the magnitude of the increasing indicating amount of change rate is larger than the magnitude of the decreasing indicating amount of change rate; and so as to determine that the air-fuel ratio imbalance among cylinders state is occurring in which an air-fuel ratio of one of the at least two or more of the cylinders deviates toward richer side with respect to the stoichiometric air-fuel ratio when the magnitude of the decreasing indicating amount of change rate is larger than the magnitude of the increasing indicating amount of change rate.

According to the embodiment described above as well, it is possible to determine that the specific cylinder rich-side deviation imbalance state is occurring, the specific cylinder lean-side deviation imbalance state is occurring, or none of these is occurring, while discriminating these states.

In addition, the imbalance determining means which obtains the decreasing indicating amount of change rate and the increasing indicating amount of change rate may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period;

so as to obtain, as the increasing indicating amount of change rate, an average of magnitudes of change rates, each having a positive value, among a plurality of the detected air-fuel ratio change rates obtained in a data obtaining period longer than the sampling period; and so as to obtain, as the decreasing indicating amount of change rate, an average of magnitudes of change rates, each having a negative value, among a plurality of the detected air-fuel ratio change rates.

According to the configuration above, an adverse affect due to a noise superimposing on the output of the air-fuel ratio sensor on the indicating amount of air-fuel ratio change rate (increasing indicating amount of change rate and decreasing indicating amount of change rate) can be reduced. Therefore, the determination of an air-fuel ratio imbalance among cylinders can be performed with higher accuracy.

Alternatively, the imbalance determining means which obtains the decreasing indicating amount of change rate and the increasing indicating amount of change rate may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period; and so as to obtain, as the increasing indicating amount of change rate, the detected air-fuel ratio change rate whose magnitude is the largest among a plurality of the detected air-fuel ratio change rates, having positive values, obtained in a data obtaining period longer than the sampling period; and to obtain, as the decreasing indicating amount of change rate, the detected air-fuel ratio change rate whose magnitude is the largest among a plurality of the detected air-fuel ratio change rates, having negative values.

According to the configuration above, it is more likely to obtain the increasing indicating amount of change rate and the decreasing indicating amount of change rate, in such a manner that the magnitudes of "the increasing indicating amount of change rate and the decreasing indicating amount of change rate" that are obtained when the air-fuel ratio imbalance among cylinders state is occurring are larger than the magnitudes of "the increasing indicating amount of change rate and the decreasing indicating amount of change rate", respectively, that are obtained when the air-fuel ratio imbalance among cylinders is not occurring. Therefore, the determination of an air-fuel ratio imbalance among cylinders can be performed with high accuracy.

In these cases, it is preferable that the data obtaining period be set at a period which is a natural number times longer than the "unit combustion cycle period", the unit combustion cycle period being a "period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke".

In this manner, by setting the "period in which the average of or the maximum value of a plurality of the detected air-fuel ratio change rates, each having a positive value, is obtained" and the "period in which the average of or the maximum value of a plurality of the detected air-fuel ratio change rates, each having a negative value, is obtained" at the "period which is a natural number times longer than the unit combustion cycle period", the indicating amount of air-fuel ratio change rate (the increasing indicating amount of change rate and the decreasing indicating amount of change rate) when the air-fuel ratio imbalance among cylinders state is occurring is certainly larger than the indicating amount of air-fuel ratio change rate when the air-fuel ratio imbalance among cylinders is not occurring. Consequently, the embodiment can perform the determination of an air-fuel ratio imbalance among cylinders with higher accuracy.

Further, the imbalance determining means which obtains the increasing indicating amount of change rate and the decreasing indicating amount of change rate may be configured;

so as to select, as a maximum value of increasing change rate, the detected air-fuel ratio change rate whose magnitude is the largest among change rates, each having a positive value, in a plurality of the detected air-fuel ratio change rates obtained in the unit combustion cycle period, to obtain an average of (a plurality of) the maximum value of increasing change rates, each being selected for each of a plurality of the unit combustion cycle periods, and to obtain the average as the increasing indicating amount of change rate; and so as to select, as a maximum value of decreasing change rate, the detected air-fuel ratio change rate whose magnitude is the largest among change rates, each having a negative value, in a plurality of the detected air-fuel ratio change rates obtained in the unit combustion cycle period, to obtain an average of (a plurality of) the maximum value of decreasing change rates, each being selected for each of a plurality of the unit combustion cycle periods, and to obtain the average as the decreasing indicating amount of change rate.

According to the above configuration, the average of the maximum value of increasing change rates, each corresponding to each of a plurality of the unit combustion cycle periods, is obtained as the increasing indicating amount of change rate, and the average of the maximum value of decreasing change rates, each corresponding to each of a plurality of the unit combustion cycle periods, is obtained as the decreasing indicating amount of change rate. Accordingly, an adverse affect due to a noise superimposing on the output of the air-fuel ratio sensor on the indicating amount of air-fuel ratio change rate (increasing indicating amount of change rate and decreasing indicating amount of change rate) can be reduced. Therefore, the determination of an air-fuel ratio imbalance among cylinders can be performed with higher accuracy.

Alternatively, the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain, as the indicating amount of air-fuel ratio change rate, an increasing indicating amount of change rate which corresponds to a magnitude of the detected air-fuel ratio change rate when the detected air-fuel ratio change rate is positive;

so as to obtain, as the imbalance determination threshold, a decreasing indicating amount of change rate which corresponds to a magnitude of the detected air-fuel ratio change rate when the detected air-fuel ratio change rate is negative; and so as to make a comparison between the magnitude of the indicating amount of air-fuel ratio change rate and the imbalance determination threshold by determining whether or not an absolute value of a difference between the increasing indicating amount of change rate and the decreasing indicating amount of change rate is larger than a predetermined threshold.

As described above, in both cases, one in which the rich-side deviation imbalance state is occurring, the other one in which the lean-side deviation imbalance state is occurring, the magnitude of the difference between the increasing indicating amount of change rate obtained as described above and the decreasing indicating amount of change rate obtained as described above (that is, the magnitude of the difference between the indicating amount of air-fuel ratio change rate and the imbalance determination threshold) becomes prominently larger than one when the air-fuel ratio imbalance among cylinders state is not occurring.

Meanwhile, there may be a case where a noise (disturbance) superimposes on the output of the air-fuel ratio sensor, due to an introduction of an evaporated fuel gas into the combustion chambers, an introduction of an EGR gas into the combustion chambers, an introduction of a blow-by gas into the combustion chambers, or the like. In such a case, the noise superimposes evenly between when the detected air-fuel ratio change rate is positive and when the detected air-fuel ratio change rate is negative. Thus, the magnitude (absolute value) of the difference between the increasing indicating amount of change rate and the decreasing indicating amount of change rate is a value obtained by eliminating the affect caused by the noise.

Accordingly, as the configuration described above, by obtaining, as the indicating amount of air-fuel ratio change rate, the increasing indicating amount of change rate which corresponds to the magnitude of the detected air-fuel ratio change rate when the detected air-fuel ratio change rate is positive; obtaining, as the imbalance determination threshold, the decreasing indicating amount of change rate which corresponds to the magnitude of the detected air-fuel ratio change rate when the detected air-fuel ratio change rate is negative; and performing the determination of an air-fuel ratio imbalance among cylinders based on an evaluation (or the comparison result) of the difference between those values, the adverse affect caused by the noise superimposing on the output of the air-fuel ratio sensor on the determination of an air-fuel ratio imbalance among cylinders can be reduced.

Similarly, the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain, as the indicating amount of air-fuel ratio change rate, a decreasing indicating amount of change rate which corresponds to a magnitude of the detected air-fuel ratio change rate when the detected air-fuel ratio change rate is negative;

so as to obtain, as the imbalance determination threshold, an increasing indicating amount of change rate which corresponds to a magnitude of the detected air-fuel ratio change rate when the detected air-fuel ratio change rate is positive; and so as to make a comparison between the magnitude of the indicating amount of air-fuel ratio change rate and the imbalance determination threshold by determining whether or not an absolute value of a difference between the decreasing indicating amount of change rate and the increasing indicating amount of change rate is larger than a predetermined threshold.

According to the configuration described above, as well, the determination of an air-fuel ratio imbalance among cylinders is performed based on the magnitude (an absolute value) of the difference between the increasing indicating amount of change rate and the decreasing indicating amount of change rate. Consequently, the adverse affect caused by the noise superimposing on the output of the air-fuel ratio sensor on the determination of an air-fuel ratio imbalance among cylinders can be reduced.

In these configurations (in which the determination of an air-fuel ratio imbalance among cylinders is performed based on the magnitude of the difference between the increasing indicating amount of change rate and the decreasing indicating amount of change rate), the imbalance determining means may be configured;

so as to determine that the air-fuel ratio imbalance among cylinders state is occurring in which an air-fuel ratio of one of the at least two or more of the cylinders deviates toward richer side with respect to the stoichiometric air-fuel ratio when the decreasing indicating amount of change rate is larger than the increasing indicating amount of change rate; and so as to determine that the air-fuel ratio imbalance among cylinders state is occurring in which an air-fuel ratio of one of the at least two or more of the cylinders deviates toward leaner side with respect to the stoichiometric air-fuel ratio when the increasing indicating amount of change rate is larger than the decreasing indicating amount of change rate.

As described above, magnitude relation between the magnitude of the increasing indicating amount of change rate and the magnitude of the decreasing indicating amount of change rate is different between when the specific cylinder rich-side deviation imbalance state is occurring and when specific cylinder lean-side deviation imbalance state is occurring. Therefore, according to the above configuration, it is possible to determine that the rich-side deviation imbalance state is occurring, or the lean-side deviation imbalance state is occurring, while discriminating these states.

The imbalance determining means which obtains the increasing indicating amount of change rate and the decreasing indicating amount of change rate may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period;

so as to obtain, as the increasing indicating amount of change rate, an average of magnitudes of detected air-fuel ratio change rates, each having a positive value, among a plurality of the detected air-fuel ratio change rates obtained in a data obtaining period longer than the sampling period; and so as to obtain, as the decreasing indicating amount of change rate, an average of magnitudes of detected air-fuel ratio change rates, each having a negative value, among a plurality of the detected air-fuel ratio change rates.

Alternatively, the imbalance determining means which obtains the increasing indicating amount of change rate and the decreasing indicating amount of change rate may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period;

so as to obtain, as the increasing indicating amount of change rate, a value corresponding to the detected air-fuel ratio change rate whose magnitude is the largest among the change rates, each having a positive value, in a plurality of the detected air-fuel ratio change rates obtained in a unit combustion cycle period (e.g., the value being a magnitude of that detected air-fuel ratio change rate, an average of those detected air-fuel ratio change rates for a plurality of the unit combustion cycles, and the like); and so as to obtain, as the decreasing indicating amount of change rate, a value corresponding to the detected air-fuel ratio change rate whose magnitude is the largest among the change rates, each having a negative value, in a plurality of the detected air-fuel ratio change rates (e.g., the value being a magnitude of that detected air-fuel ratio change rate, an average of magnitudes of those detected air-fuel ratio change rates for a plurality of the unit combustion cycles, and the like).

Further, another of the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period; and so as to use, as data for obtaining the indicating amount of air-fuel ratio change rate, the detected air-fuel ratio change rate whose magnitude is larger than or equal to a predetermined effective determination threshold; and so as not to use (so as to discard), as data for obtaining the indicating amount of air-fuel ratio change rate, the detected air-fuel ratio change rate whose magnitude is smaller than the predetermined effective determination threshold.

According to the configuration described above, only the detected air-fuel ratio change rates, each having a magnitude larger than or equal to the predetermined effective determination threshold, are used as data for obtaining the indicating amount of air-fuel ratio change rate. In other words, the detected air-fuel ratio change rate which varies due to a noise superimposing on the output of the air-fuel ratio sensor only (i.e., without owing to a difference in individual-cylinder-air-fuel-ratios) can be eliminated from data for calculation of the indicating amount of air-fuel ratio change rate used for the determination of an air-fuel ratio imbalance among cylinders. Therefore, the indicating amount of air-fuel ratio change rate can be obtained which varies depending on a degree of the non-uniformity of the individual-cylinder-air-fuel-ratios with high precision. Consequently, the determination of an air-fuel ratio imbalance among cylinders can be performed with high accuracy, without performing a special filtering on the detected air-fuel ratio change rate.

Further, another of the imbalance determining means may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period;

so as to obtain, as one of the indicating amount of air-fuel ratio change rates, the number of effective data representing the number of data of the detected air-fuel ratio change rate whose magnitude is equal to or larger than a predetermined effective determination threshold among a plurality of the detected air-fuel ratio change rates obtained in a data obtaining period longer than the sampling period;

so as to obtain, as another of the indicating amount of air-fuel ratio change rates, the number of ineffective data representing the number of data of the detected air-fuel ratio change rate whose magnitude is smaller than the effective determination threshold among a plurality of the detected air-fuel ratio change rates obtained in the data obtaining period; and so as to determine whether or not the air-fuel ratio imbalance among cylinders state is occurring based on the number of effective data and the number of ineffective data.

As described above, when the air-fuel ratio imbalance among cylinders state is occurring (i.e., when the non-uniformity of the air-fuel ratios among the cylinders is large enough to be detected), the magnitude of the detected air-fuel ratio change rate becomes large. Therefore, when the air-fuel ratio imbalance among cylinders state is occurring, the number of effective data relatively increases and the number of ineffective data relatively decreases. Consequently, by the above configuration, the determination of an air-fuel ratio imbalance among cylinders can be made using simple determination which includes comparing the number of effective data and the number of ineffective data, and the like.

In this case, the imbalance determining means may be configured so as to determine that the air-fuel ratio imbalance among cylinders state is occurring, when the number of effective data is larger than a threshold of the number of data which varies based on the "number of total data which is a sum of the number of effective data and the number of ineffective data". For example, the threshold of the number of data may be set at a predetermined fraction of the number of total data. This allows the determination of an air-fuel ratio imbalance among cylinders to be performed with a simple configuration.

Further, another of the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period;

so as to detect, as a lean peak time point, a time point at which the detected air-fuel ratio change rate changes from a positive value to a negative value; and so as not to use, as data for obtaining the indicating amount of air-fuel ratio change rate, the detected air-fuel ratio change rate which is obtained within a predetermined time period before or after the lean peak time point.

Similarly, another of the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period;

so as to detect, as a rich peak time point, a time point at which the detected air-fuel ratio change rate changes from a negative value to a positive value; and so as not to use, as data for obtaining the indicating amount of air-fuel ratio change rate, the detected air-fuel ratio change rate which is obtained within a predetermined time period before or after the rich peak time point.

As shown in FIGS. 32 and 33 described later, the magnitude of the detected air-fuel ratio change rate in the vicinity of the lean peak time point at which the detected air-fuel ratio change rate becomes a local maximum value and the magnitude of the detected air-fuel ratio change rate in the vicinity of the rich peak time point at which the detected air-fuel ratio change rate becomes a local minimum value are extremely small as compared to the average of the magnitudes of the detected air-fuel ratio change rates, and thus, are not appropriate as the data for obtaining the indicating amount of air-fuel ratio change rate.

In view of the above, as the two configurations described above, the detected air-fuel ratio change rate which is obtained within the predetermined time period before or after the lean peak time point, or the detected air-fuel ratio change rate which is obtained within the predetermined time period before or after the rich peak time point are prohibited to be used for obtaining the indicating amount of air-fuel ratio change rate. This allows to obtain the indicating amount of air-fuel ratio change rate which can represent the degree of the non-uniformity of the individual-cylinder-air-fuel-ratios with high accuracy. Consequently, the determination of an air-fuel ratio imbalance among cylinders can be performed with high accuracy.

Further, another of the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period; and so as to detect, as a lean peak time point, a time point at which the detected air-fuel ratio change rate changes from a positive value to a negative value; and so as not to use, as data for obtaining the indicating amount of air-fuel ratio change rate, the detected air-fuel ratio change rate obtained between two of the lean peak time points that are consecutively obtained when a lean-peak-to-lean-peak time which is a time between the two of the lean peak time points is shorter than a predetermined time threshold.

Similarly, another of the imbalance determining means which determines whether or not the air-fuel ratio imbalance among cylinders state is occurring based on the comparison result between the magnitude of the indicating amount of air-fuel ratio change rate and the imbalance determination threshold may be configured;

so as to obtain the output of the air-fuel ratio sensor every time a constant sampling period elapses;

so as to obtain, as the detected air-fuel ratio change rate, a difference between air-fuel ratios, each being represented by each of the outputs of the air-fuel ratio sensor that are obtained consecutively before and after the sampling period; and so as to detect, as a rich peak time point, a time point at which the detected air-fuel ratio change rate changes from a negative value to a positive value; and so as not to use, as data for obtaining the indicating amount of air-fuel ratio change rate, the detected air-fuel ratio change rate obtained between two of the rich peak time points that are consecutively obtained when a rich-peak-to-rich-peak time which is a time between the two of the rich peak time points is shorter than a predetermined time threshold.

As shown in FIG. 35 described later, when the air-fuel ratio imbalance among cylinders state is occurring, the lean-peak-to-lean-peak time TLL is longer than the predetermined time threshold TLLth, and the rich-peak-to-rich-peak time is longer than the predetermined time threshold TRRth. In contrast, as shown in FIG. 36, when the air-fuel ratio imbalance among cylinders is not occurring at all, the lean-peak-to-lean-peak time TLL is shorter than the predetermined time threshold TLLth, and the rich-peak-to-rich-peak time is shorter than the predetermined time threshold TRRth.

In view of the above, as the two of the configurations described above, the detected air-fuel ratio change rate obtained between two of the lean peak time points is not used for obtaining the indicating amount of air-fuel ratio change rate when the lean-peak-to-lean-peak time is shorter than the predetermined time threshold, and/or the detected air-fuel ratio change rate obtained between two of the rich peak time points is not used for obtaining the indicating amount of air-fuel ratio change rate when the rich-peak-to-rich-peak time is shorter than the predetermined time threshold. According to the configurations, the indicating amount of air-fuel ratio change rate can be obtained which can represent the degree of the non-uniformity of the individual-cylinder-air-fuel-ratios with high accuracy. Consequently, the determination of an air-fuel ratio imbalance among cylinders can be performed with high accuracy.

DESCRIPTION OF THE BEST EMBODIMENT TO CARRY OUT THE INVENTION

<First Embodiment>

An air-fuel ratio imbalance among cylinders determining apparatuses (hereinafter, simply referred to as a "first determining apparatus") according to a first embodiment of the present invention will next be described with reference to the drawings. The first determining apparatus is a portion of an air-fuel ratio control apparatus for controlling an air-fuel ratio of the air-fuel ratio of the engine. Further, the air-fuel ratio control apparatus is also a fuel injection amount control apparatus for controlling a fuel injection amount.

(Structure)

Figure 7:
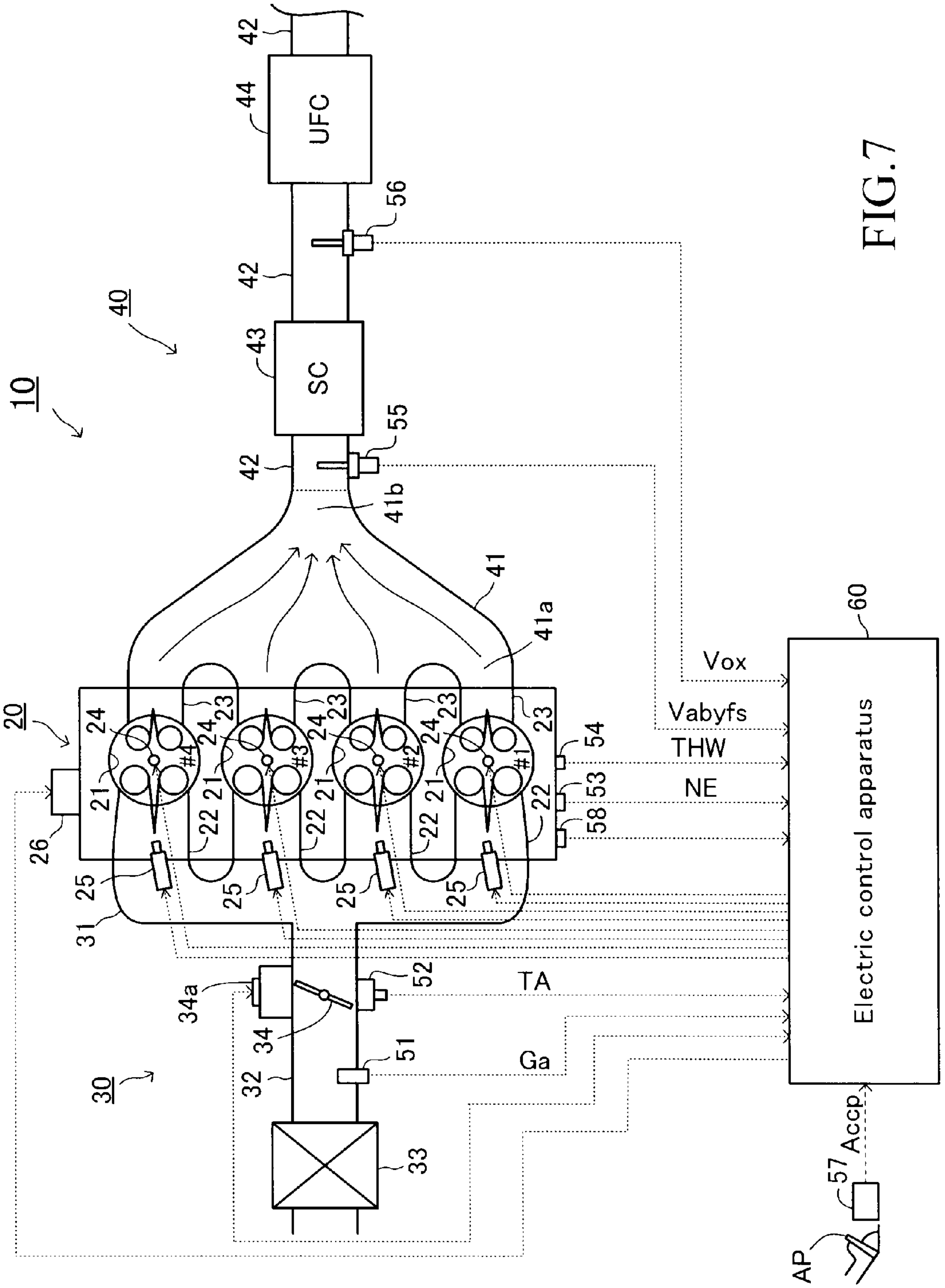
FIG. 7 is a schematic view of an internal combustion engine to which an air-fuel ratio imbalance among cylinders determining apparatus (first determining apparatus) according to a first embodiment of the present invention is applied.

FIG. 7 shows a schematic view of an internal combustion engine 10 to which the first determining apparatus is applied. The engine 10 is a 4-cycle, spark-ignition, multi-cylinder (e.g., 4-cylinder), gasoline engine. The engine 10 includes a main body section 20, a intake system 30, and an exhaust system 40.

The main body section 20 comprises a cylinder block section and a cylinder head section. The main body section 20 includes a plurality (four) of combustion chambers (a first cylinder #1 to a fourth cylinder #4) 21, each being formed of an upper surface of a piston, a wall surface of the cylinder, and a lower surface of the cylinder head section.

In the cylinder head section, intake ports 22, each of which is for supplying a "mixture comprising an air and a fuel" to each of the combustion chambers (each of the cylinders) 21, are formed, and exhaust ports 23, each of which is for discharging an exhaust gas (burnt gas) from each of the combustion chambers 21, are formed. Each of the intake ports 22 is opened and closed by an intake valve which is not shown, and each of the exhaust ports 23 is opened and closed by an exhaust valve which is not shown.

A plurality (four) of spark plugs 24 are fixed in the cylinder head section. Each of the spark plugs 24 is provided in such a manner that its spark generation portion is exposed at a center portion of each of the combustion chambers 21 and at a position close to the lower surface of the cylinder head section. Each of the spark plugs 24 is configured so as to generate a spark for an ignition from the spark generation portion in response to an ignition signal.

A plurality (four) of fuel injection valves (injectors) 25 are fixed in the cylinder head section. Each of the fuel injectors 25 is provided for each of the intake ports 22 one by one. Each of the fuel injectors 25 is configured so as to inject, in response to an injection instruction signal, a "fuel whose amount is equal to an instructed injection amount included in the injection instruction signal" into the corresponding intake port 22, when the fuel injector is normal. In this manner, each of a plurality of the cylinders 21 comprises the fuel injector 25 which supplies the fuel independently from the other cylinders.

An intake valve control apparatus 26 is further provided in the cylinder head section. The intake valve control apparatus 26 comprises a well known configuration for hydraulically adjusting a relative angle (phase angle) between an intake cam shaft (now shown) and intake cams (not shown). The intake valve control apparatus 26 operates in response to an instruction signal (driving signal) so as to change opening timing of the intake valve (intake valve opening timing).

The intake system 30 comprises an intake manifold 31, an intake pipe 32, an air filter 33, a throttle valve 34, and a throttle valve actuator 34*a*.

The intake manifold 31 includes a plurality of branch portions each of which is connected to each of the intake ports 22, and a surge tank to which the branch portions aggregate. The intake pipe 32 is connected to the surge tank. The intake manifold 31, the intake pipe 32, and a plurality of the intake ports 22 constitute an intake passage. The air filter is provided at an end of the intake pipe 32. The throttle valve 34 is rotatably supported by the intake pipe 32 at a position between the air filter 33 and the intake manifold 31. The throttle valve 34 is configured so as to adjust an opening sectional area of the intake passage provided by the intake pipe 32 when it rotates. The throttle valve actuator 34*a* includes a DC motor, and rotates the throttle valve 34 in response to an instruction signal (driving signal).

The exhaust system 40 includes an exhaust manifold 41, an exhaust pipe 42, an upstream-side catalytic converter 43, and a downstream-side catalytic converter 44.

The exhaust manifold 41 comprises a plurality of branch portions 41*a*, each of which is connected to each of the exhaust ports 23, and an aggregated (merging) portion (exhaust gas aggregated portion) 41*b* into which the branch portions 41*a* aggregate (merge). The exhaust pipe 42 is connected to the aggregated portion 41*b* of the exhaust manifold 41. The exhaust manifold 41, the exhaust pipe 42, and a plurality of the exhaust ports 23 constitute a passage through which the exhaust gas passes. It should be noted that a passage formed by the aggregated portion 41*b* of the exhaust manifold 41 and the exhaust pipe 42 is referred to as an "exhaust (gas) passage" for convenience, in the present specification.

The upstream-side catalytic converter 43 is a three-way catalyst which supports "noble (precious) metals which are catalytic substances" and "ceria ($CeO_2$)", on a support made of ceramics to provide an oxygen storage function and an oxygen release function (oxygen storage function). The upstream-side catalytic converter 43 is disposed (interposed) in the exhaust pipe 42. When a temperature of the upstream-side catalytic converter reaches a certain activation temperature, the upstream-side catalytic converter exerts a "catalytic function for purifying unburnt substances (HC, CO, $H_2$, and so on) and nitrogen oxide (NOx) simultaneously" and the "oxygen storage function".

The downstream-side catalytic converter 44 is the three-way catalyst similar to the upstream-side catalytic converter 43. The downstream-side catalytic converter 44 is disposed (interposed) in the exhaust pipe 42 at a position downstream of the upstream-side catalytic converter 43. It should be noted that, the upstream-side catalytic converter 43 and the downstream-side catalytic converter 44 may be catalysts other than the three-way catalysts.

The first determining apparatus includes a hot-wire air flowmeter 51, a throttle position sensor 52, a crank angle sensor 53, an intake cam position sensor 54, an upstream-side (upstream) air-fuel ratio sensor 55, a downstream-side (downstream) air-fuel ratio sensor 56, an accelerator opening sensor 57, and a water temperature sensor 58.

The hot-wire air flowmeter 51 measures a mass flow rate of an intake air flowing through the intake pipe 32 so as to output a signal representing the mass flow rate (intake air amount of the engine 10 per unit time) Ga. The intake air-flow rate Ga is substantially equal to a flow rate of the exhaust gas, and therefore, is proportional to the flow velocity (rate) of the exhaust gas.

The throttle position sensor 52 detects an opening (degree) of the throttle valve 34, and outputs a signal representing the throttle valve opening TA.

The crank angle sensor (crank position sensor) 53 outputs a signal which includes a narrow pulse generated every time the crank shaft of the engine 10 rotates 10 degrees and a wide pulse generated every time the crank shaft rotates 360 degrees. This signal is converted into an engine rotational speed NE by an electric control apparatus 60, which will be described later.

The intake cam position sensor 54 outputs one pulse every time the intake cam shaft rotates from a predetermined angle by 90 degrees, further rotates by 90 degrees, and further rotates by 180 degrees. The electric control apparatus 60 obtains, based on the signals from the crank angle sensor 53 and the intake cam position sensor 54, an absolute crank angle CA whose reference (origin) is a top dead center on the compression stroke of a reference cylinder (e.g., the first cylinder #1). The absolute crank angle CA is set to (at) "0° crank angle" at the top dead center on the compression stroke of the reference cylinder, is increased up to 720° crank angle, and then is set to (at) 0° crank angle again.

The upstream air-fuel ratio sensor 55 (an air-fuel ratio sensor 55 in the present invention) is disposed at a position between the aggregated portion 41*b* of the exhaust manifold 41 and the upstream-side catalytic converter 43, and in either one of the exhaust manifold 41 and the exhaust pipe 42 (that is, in the exhaust gas passage)". The upstream air-fuel ratio sensor 55 is a "wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
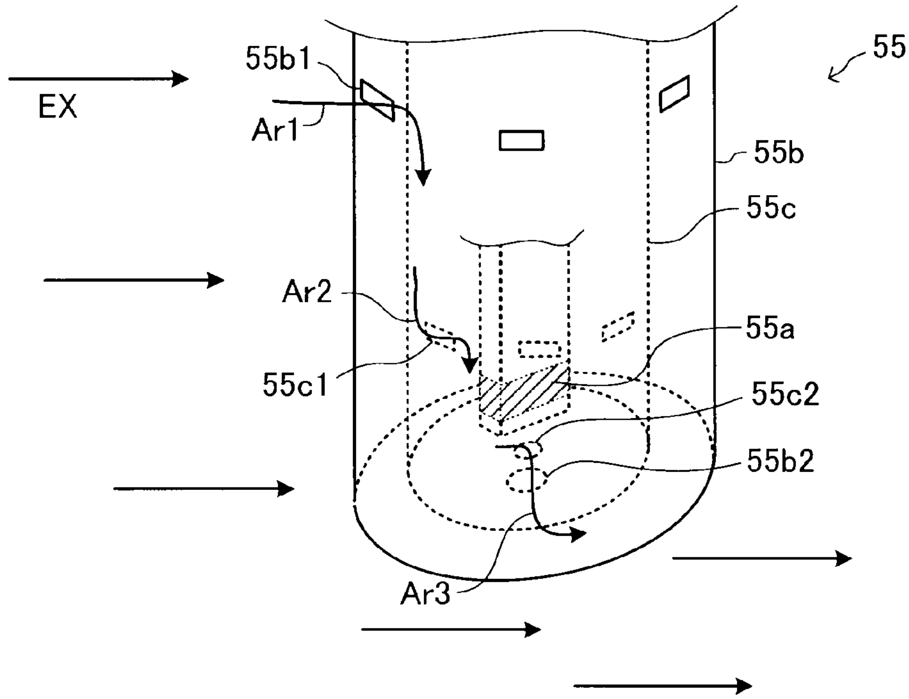
FIG. 2 is a partial, schematic perspective (transparent) view of the air-fuel ratio sensor.
Figure 3:
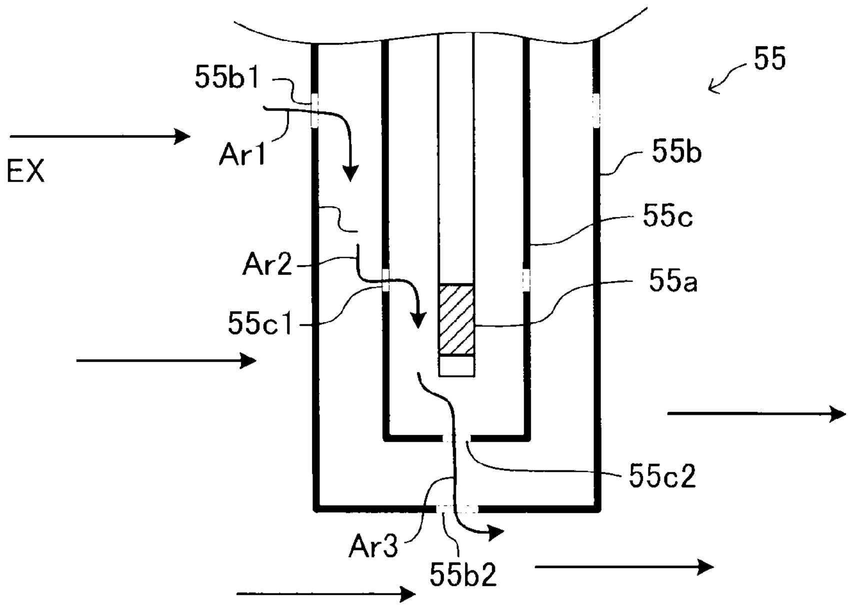
FIG. 3 is a partial sectional view of the air-fuel ratio sensor.

As shown in FIGS. 2 and 3, the upstream air-fuel ratio sensor 55 comprises an air-fuel ratio detection element 55*a*, an outer protective cover 55*b*, and an inner protective cover 55*c*.

The outer protective cover 55*b* has a hollow cylindrical body made of a metal. The outer protective cover 55*b* accommodates the inner protective cover 55*c* in its inside so as to cover the inner protective cover 55*c*. The outer protective cover 55*b* comprises a plurality of inflow holes 55*b*1 at its side surface. The inflow hole 55*b*1 is a through-hole which allows the exhaust gas EX (the exhaust gas outside of the outer protective cover 55*b*) passing through the exhaust gas passage to flow into the inside of the outer protective cover 55*b*. Further, the outer protective cover 55*b* has outflow holes 55*b*2 which allow the exhaust gas inside of the outer protective cover 55*b* to flow out to the outside (the exhaust gas passage) at a bottom surface of it.

The inner protective cover **55*c* is made of a metal and has a hollow cylindrical body having a diameter smaller than a diameter of the outer protective cover 55*b*. The inner protective cover 55*c* accommodates the air-fuel ratio detection element 55*a* in its inside so as to cover the air-fuel ratio detection element 55*a*. The inner protective cover 55*c* comprises a plurality of inflow holes 55*c*1 at its side surface. The inflow hole 55*c*1 is a through-hole which allows the exhaust gas flowing into a "space between the outer protective cover 55*b* and the inner protective cover 55*c*" through the inflow holes 55*b*1 of the outer protective cover 55*b* to further flow into the inside of the inner protective cover 55*c*. In addition, the inner protective cover 55*c* has outflow holes 55*c*2 which allow the exhaust gas inside of the inner protective cover 55*c* to flow out to the outside of the inner protective cover 55*c***, at a bottom surface of it.

Figure 8:
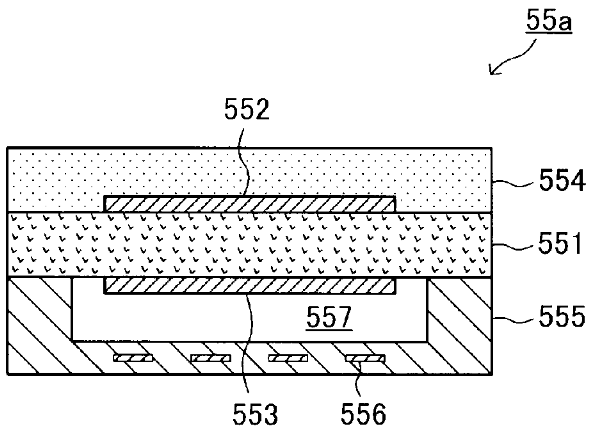
FIG. 8 is a sectional view of an air-fuel ratio detection element of the air-fuel ratio sensor (an upstream air-fuel ratio sensor) shown in FIG. 7.

As shown in FIG. 8, the air-fuel ratio detection element **55*a* includes a solid electrolyte layer 551, an exhaust-gas-side electrode layer 552, an atmosphere-side electrode layer 553, a diffusion resistance layer 554, a wall section 555, and a heater 556**.

The solid electrolyte layer 551 is an oxide sintered body having oxygen ion conductivity. In the present example, the solid electrolyte layer 551 is a "stabilized zirconia element" in which CaO as a stabilizing agent is solid-solved in $ZrO_2$ (zirconia). The solid electrolyte layer 551 exerts the well-known an "oxygen cell characteristic" and an "oxygen pumping characteristic", when a temperature of the solid electrolyte layer 551 is higher than an activating temperature. As described later, these characteristics are supposed to be exerted when the air-fuel ratio detection element **55*a* outputs an output value in accordance with the air-fuel ratio of the exhaust gas. The oxygen cell characteristic is one that generates an electro motive force by causing oxygen ions to move from a side where oxygen concentration is high to a side where the oxygen concentration is low. The oxygen pumping characteristic is one that, when a potential difference is provided between both sides of the solid electrolyte layer 551**, causes the oxygen ions of (in) an amount proportional to the potential difference from an negative electrode (lower potential side electrode) to a positive electrode (higher potential electrode).

The exhaust-gas-side electrode layer 552 is made of a precious metal such as Platinum (Pt) which has a high catalytic activity. The exhaust-gas-side electrode layer 552 is formed on one of surfaces of the solid electrolyte layer 551. The exhaust-gas-side electrode layer 552 is formed by chemical plating and the like in such a manner that it has an adequately high permeability (i.e., it is porous).

The atmosphere-side electrode layer 553 is made of a precious metal such as Platinum (Pt) which has a high catalytic activity. The atmosphere-side electrode layer 553 is formed on the other one of surfaces of the solid electrolyte layer 551 in such a manner that it faces (opposes) to the exhaust-gas-side electrode layer 552 to sandwich the solid electrolyte layer 551 therebetween. The atmosphere-side electrode layer 553 is formed by chemical plating and the like in such a manner that it has an adequately high permeability (i.e., it is porous).

The diffusion resistance layer (diffusion rate-limiting layer) 554 is made of a porous ceramic (a heat resistant inorganic substance). The diffusion resistance layer 554 is formed so as to cover an outer surface of the exhaust-gas-side electrode layer 552 by, for example, plasma spraying and the like.

The wall section 555 is made of a dense alumina ceramics through which gases can not pass. The wall section 555 is formed so as to form an "atmosphere chamber 557" which is a space that accommodates the atmosphere-side electrode layer 553. An air is introduced into the atmosphere chamber 557.

The heater 556 is buried in the wall section 555. The heater 556 generates heat when energized so as to heat up the solid electrolyte layer 551.

Figure 9:
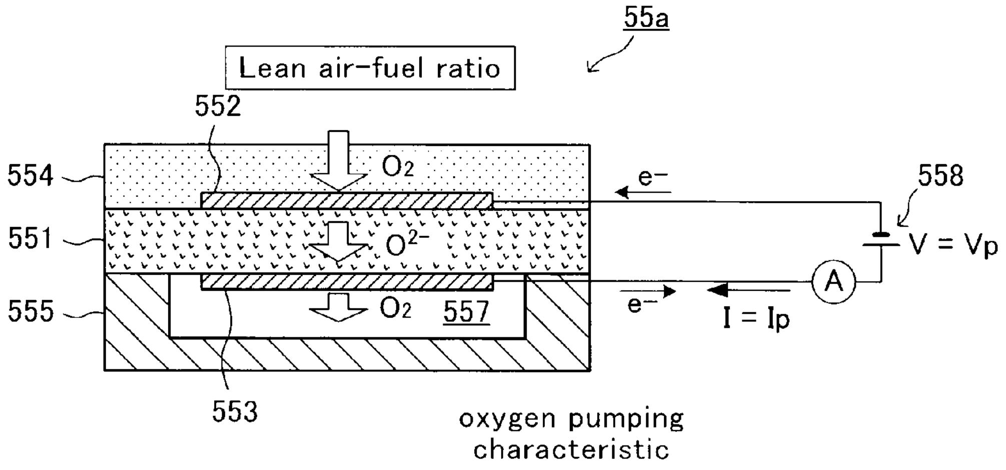
FIG. 9 is a view for describing an operation of the air-fuel ratio sensor when the air-fuel ratio of the exhaust gas is in leaner side with respect to the stoichiometric air-fuel ratio.

As shown in FIG. 9, the upstream air-fuel ratio sensor 55 uses an electric power supply 558. The electric power supply 558 applies an electric voltage V in such a manner that an electric potential of the atmosphere-side electrode layer 553 is higher than an electric potential of the exhaust-gas-side electrode layer 552.

As shown in FIG. 9, when the air-fuel ratio of the exhaust gas is in the lean side with respect to the stoichiometric air-fuel ratio, the oxygen pumping characteristic is utilized so as to detect the air-fuel ratio. That is, when the air-fuel ratio of the exhaust gas is leaner than the stoichiometric air-fuel ratio, a large amount of oxygen molecules included in the exhaust gas reach the exhaust-gas-side electrode layer 552 after passing through the diffusion resistance layer 554. The oxygen molecules receive electrons to change into oxygen ions. The oxygen ions pass through the solid electrolyte layer 551, and release the electrons to change into oxygen molecules at the atmosphere-side electrode layer 553. As a result, a current I flows from the positive electrode of the electric power supply 558 to the negative electrode of the electric power supply 558, thorough the atmosphere-side electrode layer 553, the solid electrolyte layer 551, and the exhaust-gas-side electrode layer 552.

Figure 10:
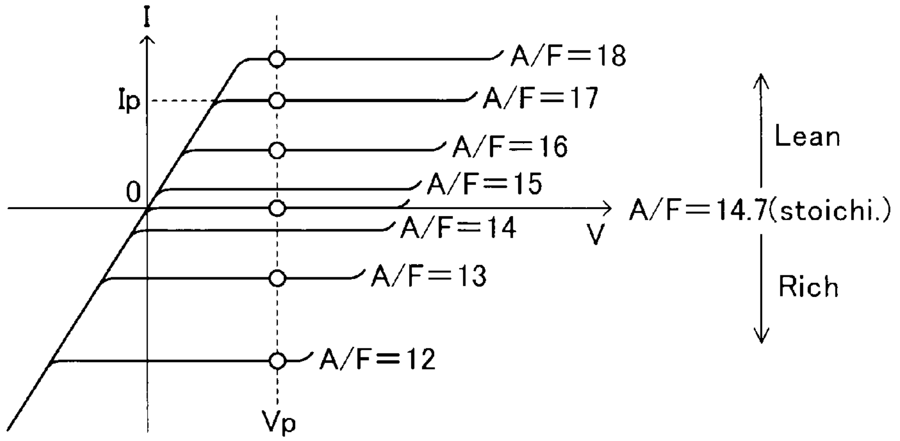
FIG. 10 is a graph showing a relationship between the air-fuel ratio of the exhaust gas and a limiting current value of the air-fuel ratio sensor.

When the magnitude of the electric voltage V is set to be equal to or higher than a predetermined value Vp, the magnitude of the electrical current I varies according to an amount of the "oxygen molecules reaching the exhaust-gas-side electrode layer 552 after passing through the diffusion resistance layer 554 by the diffusion" out of the oxygen molecules included in the exhaust gas reaching the outer surface of the diffusion resistance layer 554. That is, the magnitude of the electrical current I varies depending on a concentration (partial pressure) of oxygen at the exhaust-gas-side electrode layer 552. The concentration of oxygen at the exhaust-gas-side electrode layer 552 varies depending on the concentration of oxygen of the exhaust gas reaching the outer surface of the diffusion resistance layer 554. The current I, as shown in FIG. 10, does not vary when the voltage V is set at a value equal to or higher than the predetermined value Vp, and therefore, is referred to as a limiting current Ip. The air-fuel ratio detection element **55*a*** outputs a value corresponding to the air-fuel ratio based on the limiting current Ip.

Figure 11:
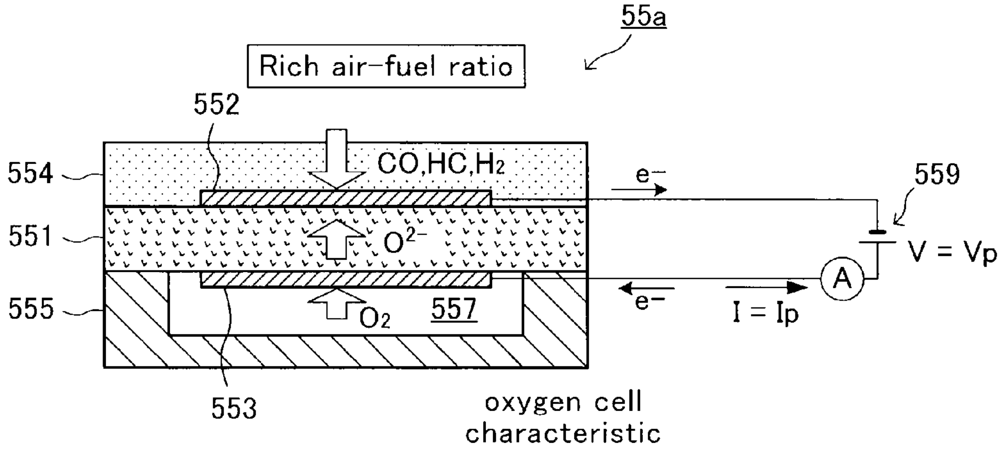
FIG. 11 is a view for describing an operation of the air-fuel ratio sensor when the air-fuel ratio of the exhaust gas is in richer side with respect to the stoichiometric air-fuel ratio.

On the other hand, as shown in FIG. 11, when the air-fuel ratio of the exhaust gas is in the rich side with respect to the stoichiometric air-fuel ratio, the oxygen cell characteristic described above is utilized so as to detect the air-fuel ratio. More specifically, when the air-fuel ratio of the exhaust gas is richer than the stoichiometric air-fuel ratio, a large amount of unburnt substances (HC, CO, and $H_2$ etc.) included in the exhaust gas reach the exhaust-gas-side electrode layer 552 through the diffusion resistance layer 554. In this case, a difference (oxygen partial pressure difference) between the concentration of oxygen at the atmosphere-side electrode layer 553 and the concentration of oxygen at the exhaust-gas-side electrode layer 552 becomes large, and thus, the solid electrolyte layer 551 functions as an oxygen cell. The applied voltage V is set at a value lower than the elective motive force of the oxygen cell.

Accordingly, oxygen molecules existing in the atmosphere chamber 557 receive electrons at the atmosphere-side electrode layer 553 so as to change into oxygen ions. The oxygen ions pass through the solid electrolyte layer 551, and move to the exhaust-gas-side electrode layer 552. Then, they oxidize the unburnt substances at the exhaust-gas-side electrode layer 552 to release electrons. Consequently, a current I flows from the negative electrode of the electric power supply 558 to the positive electrode of the electric power supply 558, thorough the exhaust-gas-side electrode layer 552, the solid electrolyte layer 551, and the atmosphere-side electrode layer 553.

The magnitude of the electrical current I varies according to an amount of the oxygen ions reaching the exhaust-gas-side electrode layer 552 from the atmosphere-side electrode layer 553 through the solid electrolyte layer 551. As described above, the oxygen ions are used to oxidize the unburnt substances at the exhaust-gas-side electrode layer 552. Accordingly, the amount of the oxygen ions passing through the solid electrolyte layer 551 becomes larger, as an amount of the unburnt substances reaching the exhaust-gas-side electrode layer 552 through the diffusion resistance layer 554 by the diffusion becomes larger. In other words, as the air-fuel ratio is smaller (as the air-fuel ratio is richer, and thus, an amount of the unburnt substances becomes larger), the magnitude of the electrical current I becomes larger. Meanwhile, the amount of the unburnt substances reaching the exhaust-gas-side electrode layer 552 is limited owing to the existence of the diffusion resistance layer 554, and therefore, the current I becomes a constant value Ip which corresponds to the air-fuel ratio. The air-fuel ratio detection element 55*a* outputs the value corresponding to the air-fuel ratio based on the limiting current Ip.

Figure 12:
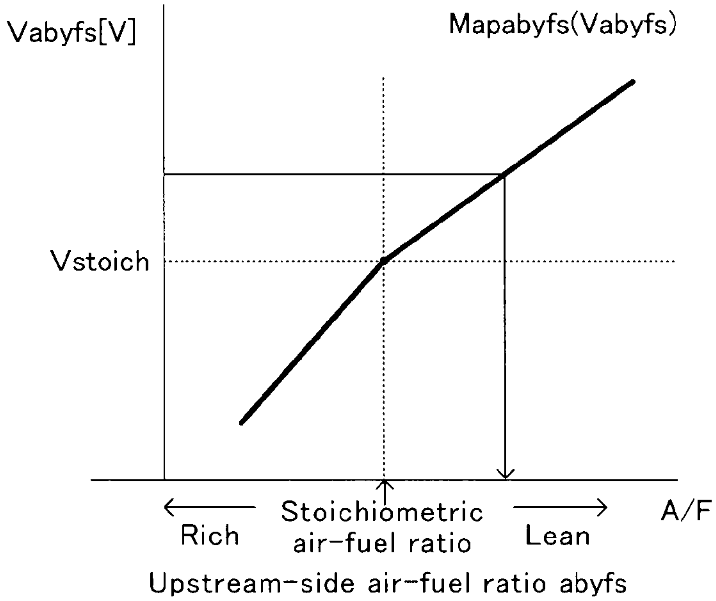
FIG. 12 is a graph showing a relationship between the air-fuel ratio of the exhaust gas and the output value of the air-fuel ratio sensor.

As shown in FIG. 12, the air-fuel ratio detection element 55*a* using the air-fuel ratio detecting principle described above generates, as an "air-fuel ratio sensor output Vabyfs", an output Vabyfs in accordance with the air-fuel ratio (upstream side air-fuel ratio abyfs, detected air-fuel ratio abyfs) of the gas reaching the air-fuel ratio detection element 55*a* after passing through the inflows holes 55*b*1 of the outer protective cover 55*b* and the inflow holes 55*c*1 of the inner protective cover 55*c*, the gas being flowing at the position where the upstream air-fuel ratio sensor 55 is disposed. The output Vabyfs of the air-fuel ratio sensor is obtained by converting the limiting current Ip into a voltage. The output Vabyfs of the air-fuel ratio sensor increases as the air-fuel ratio of the gas reaching the air-fuel ratio detection element 55*a* (i.e., as the air-fuel ratio of the gas becomes leaner). That is, the output of the air-fuel ratio sensor is substantially proportional to the air-fuel ratio of the gas reaching the air-fuel ratio detection element 55*a* (i.e., the gas contacting with the diffusion resistance layer 554).

The electric control apparatus 60 described later stores an air-fuel ratio conversion table (map) Mapabyfs shown in FIG. 12, and detects an actual upstream-side air-fuel ratio abyfs (that is, obtains the detected air-fuel ratio abyfs) by applying an actual output Vabyfs of the air-fuel ratio sensor 55 to the air-fuel ratio conversion table Mapabyfs.

Referring back to FIG. 7 again, the downstream air-fuel ratio sensor 56 is disposed in the exhaust pipe 42 and at a position downstream of the upstream-side catalyst 43 and upstream of the downstream-side catalyst 44 (that is, in the exhaust gas passage between the upstream-side catalyst 43 and the downstream-side catalyst 44). The downstream air-fuel ratio sensor 56 is a well-known concentration-cell-type oxygen sensor (O2 sensor). The downstream air-fuel ratio sensor 56 outputs an output value Voxs in accordance with an air-fuel ratio (downstream-side air-fuel ratio afdown) of the exhaust gas passing through a position at which the downstream air-fuel ratio sensor 56 is disposed.

Figure 13:
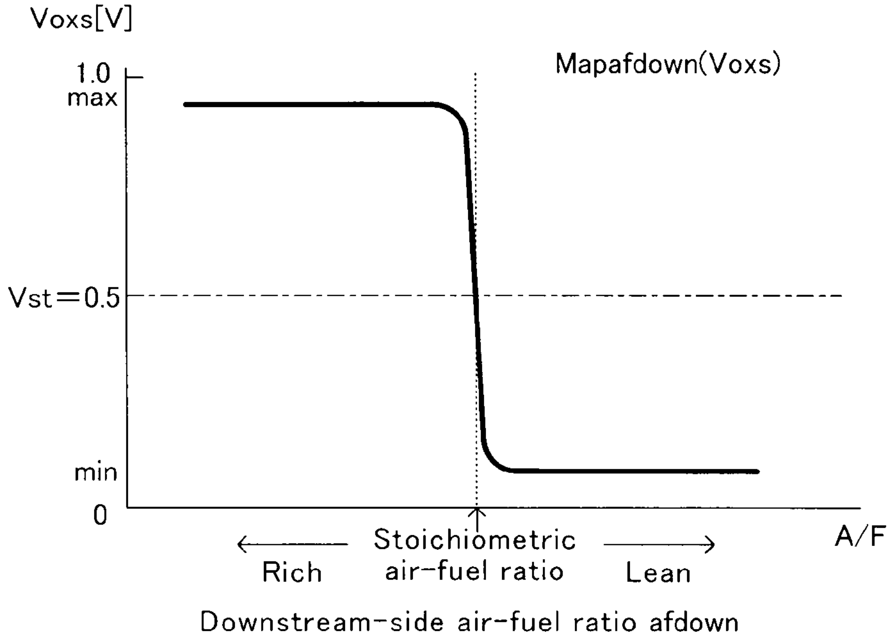
FIG. 13 is a graph showing a relationship between the air-fuel ratio of the exhaust gas and an output value of a downstream air-fuel ratio sensor.

As shown in FIG. 13, the output Voxs of the downstream air-fuel ratio sensor 56 becomes equal to a maximum output value max (e.g., about 0.9 V) when the air-fuel ratio of the gas to be detected is richer than the stoichiometric air-fuel ratio, becomes equal to a minimum output value min (e.g., about 0.1 V) when the air-fuel ratio of the gas to be detected is leaner than the stoichiometric air-fuel ratio, and becomes equal to a voltage Vst (mid voltage Vst, e.g., about 0.5 V) which is about a middle value between the maximum output value max and the minimum output value min when the air-fuel ratio of the gas to be detected is equal to the stoichiometric air-fuel ratio. Further, the output value Voxs varies rapidly from the maximum output value max to the minimum output value min when the air-fuel ratio of the gas to be detected varies from the air-fuel ratio richer than the stoichiometric air-fuel ratio to the air-fuel ratio leaner than the stoichiometric air-fuel ratio, and the output value Voxs varies rapidly from the minimum output value min to the maximum output value max when the air-fuel ratio of the gas to be detected varies from the air-fuel ratio leaner than the stoichiometric air-fuel ratio to the air-fuel ratio richer than the stoichiometric air-fuel ratio.

The accelerator opening sensor 57 shown in FIG. 7 detects an operation amount Accp of the accelerator pedal AP operated by a driver, so as to output a signal representing the operation amount Accp of the accelerator pedal AP.

The water temperature sensor 58 detects a temperature of a cooling water of the internal combustion engine 10, so as to output a signal representing the cooling water temperature THW.

The electric control apparatus 60 is a "well-known microcomputer", which includes "a CPU, a ROM 72, a RAM, a backup RAM (or a volatile memory such as an EEPROM and the like), and an interface including an AD converter, and so on".

The backup RAM is supplied with an electric power from a battery mounted on a vehicle on which the engine 10 is mounted, regardless of a position (off-position, start position, on-position, and so on) of an unillustrated ignition key switch of the vehicle. The backup RAM is configured in such a manner that data is stored in (written into) the backup RAM according to an instruction of the CPU while the electric power is supplied to the backup RAM, and the backup RAM holds (retains, stores) the data in such a manner that the data can be read out.

The interface of the electric control apparatus 60 is connected to the sensors 51 to 58 and supplies signals from the sensors to the CPU. Further, the interface sends instruction signals (drive signals), in accordance with instructions from the CPU, to each of the spark plugs 24 of each of the cylinders, each of the fuel injectors 25 of each of the cylinders, the intake valve control apparatus 26, the throttle valve actuator 34*a*, and so on. It should be noted that the electric control apparatus 60 sends the instruction signal to the throttle valve actuator 34*a*, in such a manner that the throttle valve opening angle TA is increased as the obtained accelerator pedal operation amount Accp becomes larger.

(Operation)

The first determining apparatus performs the determination of an air-fuel ratio imbalance among cylinders, according to the "basis of the determination of an air-fuel ratio imbalance among cylinders of the present invention". Next will be described an operation of the first determining apparatus.

<Fuel Injection Amount Control>

Figure 14:
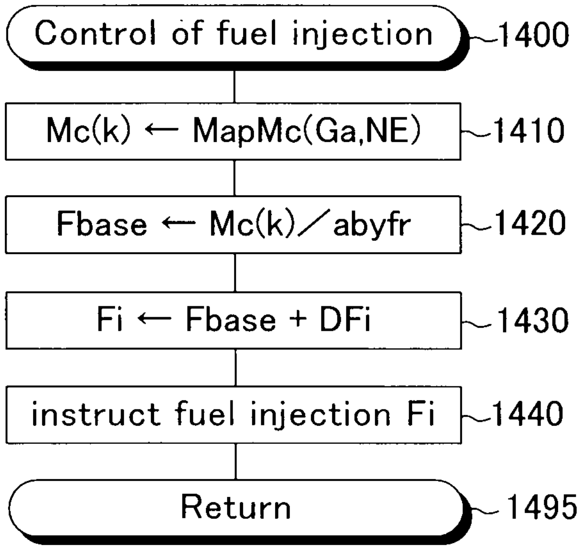
FIG. 14 is a flowchart showing a routine executed by a CPU of an electric control apparatus shown in FIG. 7.

The CPU repeatedly executes a routine to calculate a fuel injection amount Fi and instruct an fuel injection shown in FIG. 14, every time the crank angle of any one of the cylinders reaches a predetermined crank angle before its intake top dead center (e.g., BTDC 90° CA), for that cylinder (hereinafter, referred to as a "fuel injection cylinder"). Accordingly, at an appropriate timing, the CPU starts a process from step 1400, and executes processes of steps from step 1410 to step 1440 described below in order, and thereafter proceeds to step 1495 to end the present routine tentatively.

Step 1410: The CPU obtains a "cylinder intake air amount Mc(k)" which is an "air amount introduced into the fuel injection cylinder", on the basis of "the intake air flow rate Ga measured by the air-flow meter 51, the engine rotational speed NE, and a look-up table MapMc". The cylinder intake air amount Mc(k) is stored in the RAM, while being related to the intake stroke of each cylinder. The cylinder intake air amount Mc(k) may be calculated based on a well-known air model (a "model constructed according to laws of physics" describing and simulating a behavior of an air in the intake passage).

Step 1420: The CPU obtains a base fuel injection amount Fbase by dividing the cylinder intake air amount Mc(k) by the target upstream air-fuel ratio abyfr. The target upstream air-fuel ratio abyfr is set at (or to) the stoichiometric air-fuel ratio, except special cases.

Step 1430: The CPU calculates a final fuel injection amount Fi by correcting the base fuel injection amount Fbase with a main feedback amount DFi (more specifically, by adding the main feedback amount DFi to the main feedback amount DFi). The main feedback amount DFi will be described later.

Step 1440: The CPU sends an instruction signal to the "fuel injector 25 disposed so as to correspond to the fuel injection cylinder", so that a fuel of the final fuel injection amount (instructed fuel injection amount) Fi is injected from the fuel injector 25.

In this manner, an amount of the fuel injected from each of the fuel injectors 25 is uniformly increased or decreased with the main feedback amount DFi which is commonly used for all of the cylinders.

<Calculation of the Main Feedback Amount>

Figure 15:
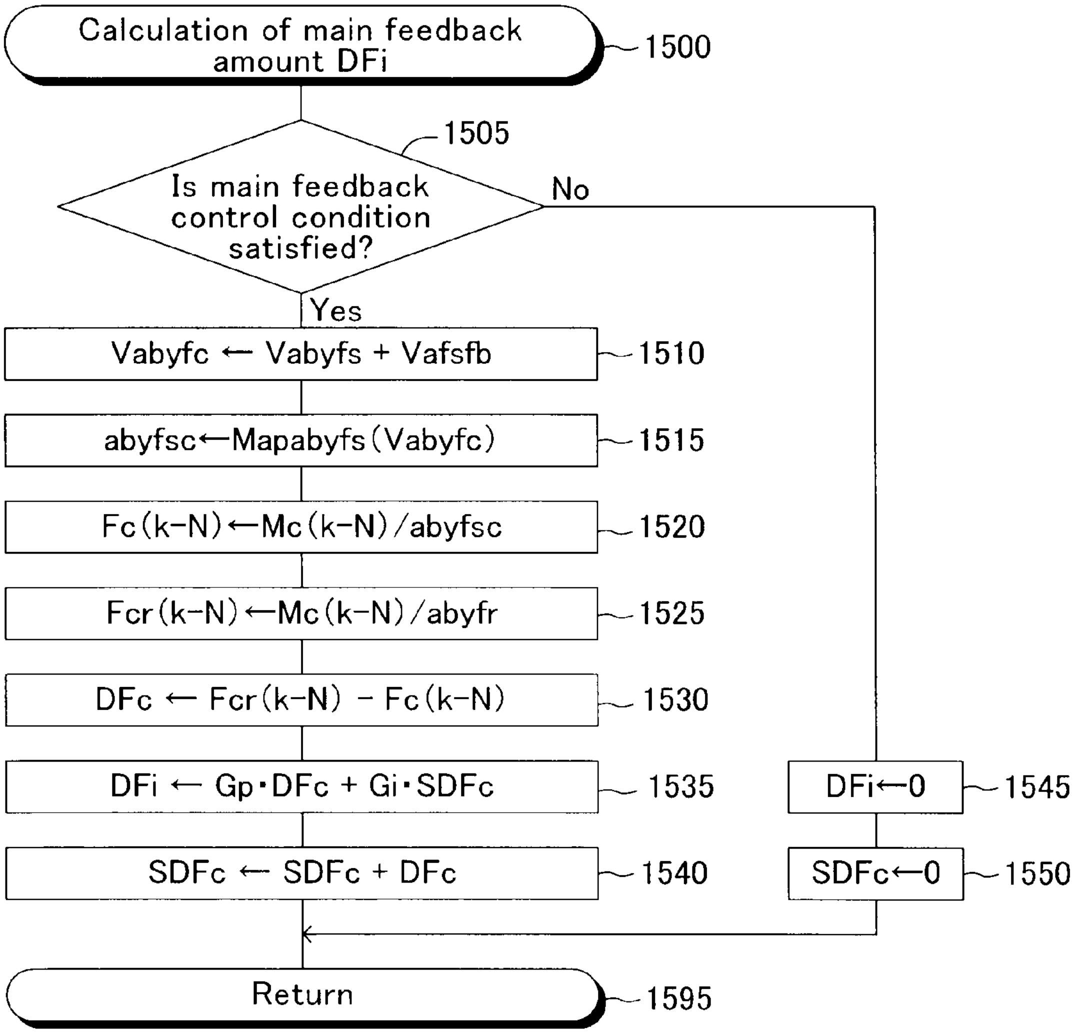
FIG. 15 is a flowchart showing a routine executed by the CPU of the electric control apparatus shown in FIG. 7.

The CPU repeatedly executes a routine for the calculation of the main feedback amount shown by a flowchart in FIG. 15, every time a predetermined time period elapses. Accordingly, at a predetermined timing, the CPU starts the process from step 1500 to proceed to step 1505 at which CPU determines whether or not a main feedback control condition (an upstream-side air-fuel ratio feedback control condition) is satisfied.

The main feedback control condition is satisfied when all of the following conditions are satisfied.

(Condition A1) The upstream air-fuel ratio sensor 55 has been activated.

(Condition A2) The load (load rate) KL of the engine is smaller than or equal to a threshold value KLth.

(Condition A3) The fuel cut control is not being performed.

It should be noted that the load rate KL is obtained based on the following formula (1). The accelerator pedal operation amount Accp or the throttle valve opening angle TA may be used as the load of the engine, in place of the load rate KL. In the formula (1), Mc is the cylinder intake air amount, pis an air density (unit is (g/l), L is a displacement of the engine 10 (unit is (l)), and "4" is the number of cylinders of the engine 10.

$$KL=(Mc/(\rho\cdot L/4))\cdot 100\% \tag{1}$$

The description continues assuming that the main feedback control condition is satisfied. In this case, the CPU makes a "Yes" determination at step 1505 to execute processes of steps from step 1510 to step 1540 described below in this order, and then proceed to step 1595 to end the present routine tentatively.

Step 1510: The CPU obtains an output value Vabyfc for a feedback control, according to a formula (2) described below. In the formula (2), Vabyfs is the output value of the upstream air-fuel ratio sensor 55, and Vafsfb is a sub feedback amount calculated based on the output value Voxs of the downstream air-fuel ratio sensor 56. These values are ones that are presently obtained. The way in which the sub feedback amount Vafsfb is calculated is described later. It should be noted that the CPU may obatain the output value Vabyfc for a feedback control by adding a sum of the sub feedback amount Vafsfb and a sub feedback learning value (sub FB learning value) Vafsfbg to the output value Vabyfs of the upstream air-fuel ratio sensor 55.

$$Vabyfc=Vabyfs+Vafsfb \tag{2}$$

Step 1515: The CPU obtains an air-fuel ratio abyfc for a feedback control by applying the output value Vabyfc for a feedback control to the air-fuel ratio conversion table Mapabyfs shown in FIG. 12, according to a formula (3) described below.

$$abyfsc=Mapabyfs(Vabyfc) \tag{3}$$

Step 1520: According to a formula (4) described below, the CPU obtains a "cylinder fuel supply amount Fc(k−N)" which is an "amount of the fuel actually supplied to the combustion chamber 21 for a cycle at a timing N cycles before the present time". That is, the CPU obtains the cylinder fuel supply amount Fc(k−N) through dividing the "cylinder intake air amount Mc(k−N) which is the cylinder intake air amount for the cycle the N cycles (i.e., N·720° crank angle) before the present time" by "the air-fuel ratio abyfsc for a feedback control".

$$Fc(k-N)=Mc(k-N)/\text{abyfsc} \tag{4}$$

The reason why the cylinder intake air amount Mc(k−N) for the cycle N cycles before the present time is divided by the air-fuel ratio abyfsc for a feedback control in order to obtain the cylinder fuel supply amount Fc(k−N) is because the "exhaust gas generated by the combustion of the mixture in the combustion chamber 21" requires a "time corresponding to the N cycles" to reach the upstream air-fuel ratio sensor 55.

Step 1525: The CPU obtains a "target cylinder fuel supply amount Fcr(k−N)" which is an "amount of the fuel supposed to be supplied to the combustion chamber 21 for the cycle the N cycles before the present time", according to a formula (5) described below. That is, the CPU obtains the target cylinder fuel supply amount Fcr(k−N) by dividing the cylinder intake air amount Mc(k−N) for the cycle the N cycles before the present time by the target upstream air-fuel ratio abyfr.

$$Fcr=Mc(k-N)/\text{abyfr} \tag{5}$$

Step 1530: The CPU obtains an "error DFc of the cylinder fuel supply amount", according to a formula (6) described below. That is, the CPU obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycle before the present time.

$$DFc=Fcr(k-N)-Fc(k-N) \tag{6}$$

Step 1535: The CPU obtains the main feedback amount DFi, according to a formula (7) described below. In the formula (7) below, Gp is a predetermined proportion gain, and Gi is a predetermined integration gain. Further, a "value SDFc" in the formula (7) is an "integrated value of the error DFc of the cylinder fuel supply amount". That is, the CPU calculates the "main feedback amount DFi" based on a proportional-integral control to have the air-fuel ratio abyfsc for a feedback control coincide with the target upstream air-fuel ratio abyfr.

$$DFi=Gp\cdot DFc+Gi\cdot SDFc \quad (7)$$

Step 1540: The CPU obtains a new integrated value SDFc of the error DFc of the cylinder fuel supply amount by adding the error DFc of the cylinder fuel supply amount obtained at the step 1530 to the current integrated value SDFc of the error DFc of the cylinder fuel supply amount.

As described above, the main feedback amount DFi is obtained based on the proportional-integral control. The main feedback amount DFi is reflected in (onto) the final fuel injection amount Fi by the process of the step 1430 in FIG. 14 described above.

Meanwhile, the "sub feedback amount Vafsfb" in the right-hand side of the formula (2) described above is small as compared to the output Vabyfs of the upstream air-fuel ratio sensor 55, and is also limited to a small value. Accordingly, the sub feedback amount Vafsfb may be considered to be as a "supplemental correction amount" to have the "output Voxs of the downstream air-fuel ratio sensor 56" coincide with a "target downstream value Vosxref corresponding to the stoichiometric air-fuel ratio". Consequently, the air-fuel ratio abyfsc for a feedback control is a value which is substantially based on the output Vabyfs of the upstream air-fuel ratio sensor 55. That is, the main feedback amount DFi can be said to be a correction amount to have the "air-fuel ratio of the engine represented by the output Vabyfs of the upstream air-fuel ratio sensor 55" coincide with the "target upstream air-fuel ratio abyfr (the stoichiometric air-fuel ratio)".

To the contrary, if the main feedback control condition is not satisfied at the time of determination at step 1505, the CPU makes a "No" determination at step 1505 to proceed to step 1545 to set the value of the main feedback amount DFi to (at) "0". Subsequently, the CPU stores "0" into the integrated value SDFc of the error of the cylinder fuel supply amount at step 1550. Thereafter, the CPU proceeds to step 1595 to end the present routine tentatively. As described above, when the main feedback control condition is not satisfied, the main feedback amount DFi is set to (at) "0". Accordingly, the correction for the base fuel injection amount Fbase with the main feedback amount DFi is not carried out.

<Calculation of the Sub Feedback Amount>

Figure 16:
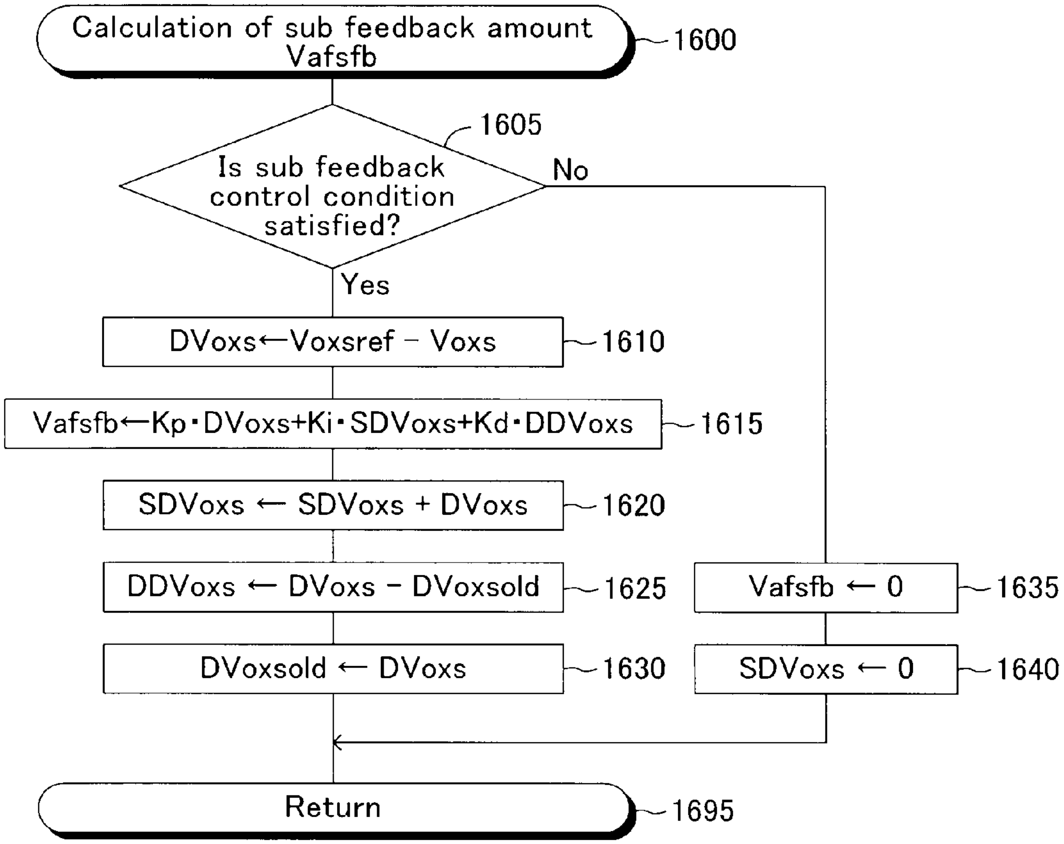
FIG. 16 is a flowchart showing a routine executed by the CPU of the electric control apparatus shown in FIG. 7.

The CPU executes a routine shown in FIG. 16 every time a predetermined time period elapses in order to calculate the sub feedback amount. Accordingly, at an appropriate predetermined timing, the CPU starts the process from step 1600 to proceed to step 1605 at which the CPU determines whether or not a sub feedback control condition is satisfied.

The sub feedback control condition is satisfied when all of the following conditions are satisfied.

(Condition B-1) The main feedback control condition is satisfied.

(Condition B-2) The downstream air-fuel ratio sensor 56 has been activated.

(Condition B-3) The target upstream air-fuel ratio is set to (at) the stoichiometric air-fuel ratio.

The description continues assuming that the sub feedback control condition is satisfied. In this case, the CPU makes a "Yes" determination at step 1605 to execute processes of steps from step 1610 to step 1630 described below in order, to calculate the sub feedback control amount Vafsfb.

Step 1610: The CPU obtains an "error amount of output DVoxs" which is a difference between the "target downstream value Voxsref" and the "output Voxs of the downstream air-fuel ratio sensor 56", according to a formula (8) described below. That is, the CPU obtains the "error amount of output DVoxs" by subtracting the "output Voxs of the downstream air-fuel ratio sensor 56 at the present time" from the "target downstream value Voxsref". The target downstream value Voxsref is set to (at) the value Vst (0.5 V) corresponding to the stoichiometric air-fuel ratio.

$$DVoxs=Voxsref-Voxs \quad (8)$$

Step 1615: The CPU obtains the sub feedback amount Vafsfb according to a formula (9) described below. In the formula (9), Kp is a predetermined proportion gain (proportional constant), Ki is a predetermined integration gain (integration constant), and Kd is a predetermined differential gain (differential constant). SDVoxs is an integrated value (temporal integrated value) of the error amount of output DVoxs, and DDVoxs is a differential value of the error amount of output DVoxs.

$$Vafsfb=Kp\cdot DVoxs+Ki\cdot SDVoxs+Kd\cdot DDVoxs \quad (9)$$

Step 1620: The CPU obtains a new integrated value SDVoxs of the error amount of output by adding the "error amount of output DVoxs obtained at step 1610" to the "integrated value SDVoxs of the error amount of output at the present time".

Step 1625: The CPU obtains a new differential value DDVoxs by subtracting a "previous error amount of the output DVoxsold calculated when the present routine was executed at a previous time" from the "error amount of output DVoxs calculated at the step 1610 described above".

Step 1630: The CPU stores the "error amount of output DVoxs calculated at the step 1510" as the "previous error amount of the output DVoxsold".

As described above, the CPU calculates the "sub feedback amount Vafsfb" according to the proportional-integral-differential (PID) control to have the output Voxs of the downstream air-fuel ratio sensor 56 coincide with the target downstream value Voxsref. As shown in the formula (2) described above, the sub feedback amount Vafsfb is used to calculate the output value Vabyfc for a feedback control.

In contrast, when the sub feedback control condition is not satisfied, the CPU makes a "No" determination at step 1605 shown in FIG. 16 to execute processes of step 1635 and step 1640 described below in order, and then proceeds to step 1695 to end the present routine tentatively.

Step 1635: The CPU sets the value of the sub feedback amount Vafsfb to (at) "0".

Step 1640: The CPU sets the value of the integrated value SDVoxs of the error amount of output to (at) "0".

<Determination of an Air-Fuel Ratio Imbalance Among Cylinders>

Next will be described processes for performing the "determination of an air-fuel ratio imbalance among cylinders" with referring to FIG. 17. The CPU is configured in such a manner that it executes a "routine for determining an air-fuel ratio imbalance among cylinders" shown by a flowchart in FIG. 17 every elapse of 4 ms (4 ms=a predetermined constant sampling time ts).

Accordingly, at an appropriate timing, the CPU starts process from step 1700 to execute processes of steps from step 1710 to step 1730 described below in order, and thereafter proceeds to step 1740.

Step 1710: The CPU obtains the output Vabyfs of the air-fuel ratio sensor at that time by an A/D conversion.

Step 1720: The CPU stores the detected air-fuel ratio abyfs (the upstream air-fuel ratio abyfs) at that time as a previous detected air-fuel ratio abyfsold. That is, the previous detected air-fuel ratio abyfsold is the detected air-fuel ratio abyfs which was obtained 4 ms (the sampling time ts) before the present time.

Step 1730: The CPU obtains a present (current) detected air-fuel ratio abyfs by applying the output Vabyfs of the air-fuel ratio sensor to the air-fuel ratio conversion table Mapabyfs.

Subsequently, the CPU proceeds to step 1740 to determine whether or not a determining execution condition of the determination of an air-fuel ratio imbalance among cylinders (hereinafter, referred to as an "determining execution condition") is satisfied. The determining execution condition is satisfied when all of the following conditions are satisfied. The determining execution condition may be a condition which is satisfied when both of the conditions C1 and C3 are satisfied. Further, the determining execution condition may be a condition which is satisfied when the condition C3 is satisfied, or when "at lease one or more of the conditions except C3" in addition to the condition C3 are satisfied. The determining execution condition may be a condition which is satisfied when another condition is further satisfied.

(Condition C1) The intake air flow rate Ga is larger than a lower intake air flow rate threshold (first threshold air flow rate) Ga1*th*, and is smaller than a higher intake air flow rate threshold (second threshold air flow rate) Ga2*th*. It should be noted that the higher intake air flow rate threshold Ga2*th* is larger than the lower intake air flow rate threshold Ga1*th*.

(Condition C2) The engine rotational speed NE is larger than a lower engine rotational speed threshold NE1*th*, and is smaller than a higher engine rotational speed threshold NE2*th*. It should be noted that the higher engine rotational speed threshold NE2*th* is larger than the lower engine rotational speed threshold NE1*th*.

(Condition C3) The fuel cut control is not being performed.

(Condition C4) The main feedback control condition is satisfied, and therefore, the main feedback control is being performed.

(Condition C5) The sub feedback control condition is satisfied, and therefore, the sub feedback control is being performed.

When the determining execution condition is not satisfied, the CPU makes a "No" determination at step 1740 to directly proceed to step 1795 to end the present routine tentatively.

In contrast, when the determining execution condition is satisfied, the CPU makes a "Yes" determination at step 1740 to proceed to step 1750 at which the CPU obtains the detected air-fuel ratio change rate ΔAF by subtracting the "previous detected air-fuel ratio abyfsold obtained at step 1720" from the "present detected air-fuel ratio abyfs obtained at step 1730". The detected air-fuel ratio change rate ΔAF is adopted as an indicating amount of air-fuel ratio change rate which varies depending on the detected air-fuel ratio change rate ΔAF.

Figure 18:
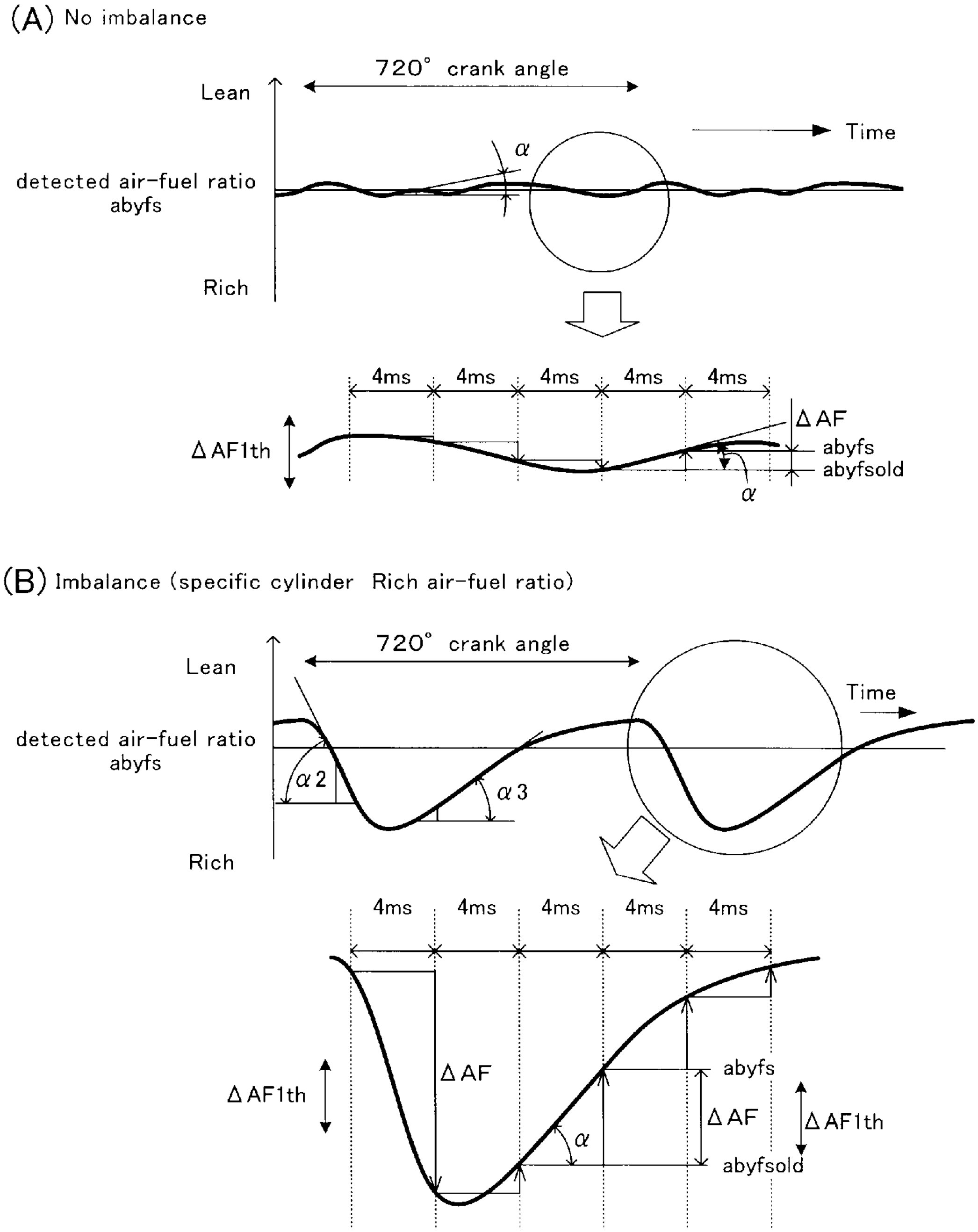
FIG. 18 is a chart showing the detected air-fuel ratio, wherein (A) shows the detected air-fuel ratio when the air-fuel ratio imbalance among cylinders state is not occurring, and (B) shows the detected air-fuel ratio when the air-fuel ratio imbalance among cylinders state is occurring.

As shown in (A) and (B) of FIG. 18, the detected air-fuel ratio change rate ΔAF is a change amount ΔAF of the detected air-fuel ratio abyfs in the sampling time ts. Further, since the sampling time ts is 4 ms and, thus is short, the detected air-fuel ratio change rate ΔAF is substantially proportional to a temporal differentiation value d(abyfs)/dt of the detected air-fuel ratio abyfs. Therefore, the detected air-fuel ratio change rate ΔAF represents an inclination aof a wave form formed by the detected air-fuel ratio abyfs.

Subsequently, the CPU proceeds to step 1760 shown in FIG. 17, at which the CPU determines whether or not a magnitude (an absolute value |ΔAF| of the detected air-fuel ratio change rate ΔAF) of the "detected air-fuel ratio change rate ΔAF adopted as the indicating amount of air-fuel ratio change rate" is larger than a predetermined imbalance determination threshold ΔAF1*th*. As shown in a block B1 of FIG. 17, the imbalance determination threshold ΔAF1*th* is set so as to become larger as the intake air-flow rate Ga becomes larger. This is because, as described above referring to FIG. 4, when the air-fuel ratio imbalance among cylinders state is occurring, the air-fuel ratio of the gas reaching the air-fuel ratio detection element 55*a* fluctuates at (with) larger change rate as the intake air-flow rate Ga becomes larger, and thus, the magnitude (|ΔAF|) of the detected air-fuel ratio change rate ΔAF becomes larger as the intake air-flow rate Ga becomes larger.

It should be noted that the imbalance determination threshold ΔAF1*th* may be constant. In such a case, it is preferable that a "magnitude of a difference between the lower intake air flow rate threshold Ga1*th* and the higher intake air flow rate threshold Ga2*th*" used in the determining execution condition be set to (at) a small value.

When the magnitude of the detected air-fuel ratio change rate ΔAF is larger than the imbalance determination threshold ΔAF1*th*, the CPU makes a "Yes" determination at step 1760 to proceed to step 1770, at which the CPU sets a value of an air-fuel ratio imbalance among cylinders occurrence flag XINB (hereinafter, referred to as an "imbalance occurrence flag XINB" to (at) "1". That is, the CPU determines that the air-fuel ratio imbalance among cylinders state is occurring. Further, at this time, the CPU may turn on an unillustrated warning lamp.

The value of the imbalance occurrence flag XINB is stored in the back up RAM. Further, the value of the imbalance occurrence flag XINB is set to (at) "0" by adding a specific operation to the electric control apparatus, when it is confirmed that the air-fuel ratio imbalance among cylinders state is not occurring in a case in which the vehicle on which the engine 10 is mounted is firstly shipped from a factory, a car service check is performed, or the like. Thereafter, the CPU proceeds to step 1795 to end the present routine tentatively.

In contrast, if the magnitude of the detected air-fuel ratio change rate ΔAF is equal to or smaller than the imbalance determination threshold ΔAF1*th* when the process at step 1760 is executed, the CPU makes a "No" determination at step 1760, and thereafter, the CPU proceeds to step 1795 to end the present routine tentatively.

Figure 1:
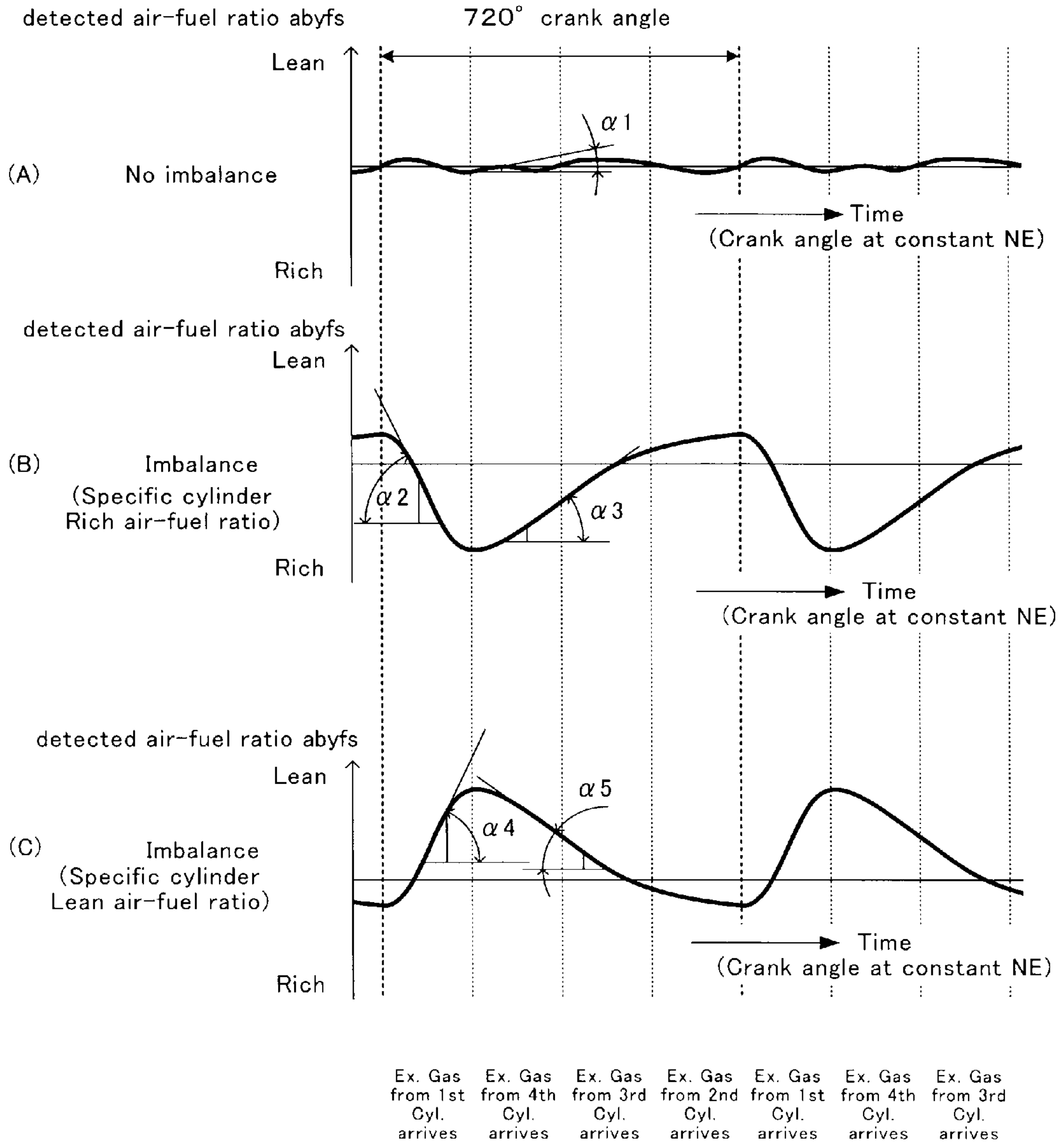
FIG. 1 is a chart showing a detected air-fuel ratio obtained based on an output of an air-fuel ratio sensor.

As is clear from FIGS. 1 and 18, when the air-fuel ratio imbalance among cylinders state is not occurring, the magnitude (|ΔAF|) of the detected air-fuel ratio change rate ΔAF does not become larger than the imbalance determination threshold ΔAF1*th* in a period in which 720° crank angle passes. In contrast, when the air-fuel ratio imbalance among cylinders state is occurring, a case occurs in which the magnitude (|ΔAF|) of the detected air-fuel ratio change rate ΔAF become larger than the imbalance determination threshold ΔAF1*th* in the period in which 720° crank angle passes. Accordingly, it is determined that the air-fuel ratio imbalance among cylinders state is occurring, and thus, the value of the imbalance occurrence flag XINB is set to (at) "1".

As described above, the first determining apparatus comprises;

the air-fuel ratio sensor 55 having the protective cover; and the imbalance determining means (routine shown in FIG. 17) which is configured in such a manner that it obtains, based on the output Vabyfs of the air-fuel ratio sensor, the "indicating amount of air-fuel ratio change rate (in the present example, the "detected air-fuel ratio change rate ΔAF itself"

varying in accordance with the "detected air-fuel ratio change rate ΔAF which is the change amount per unit time of the air-fuel ratio (detected air-fuel ratio abyfs) represented by the output Vabyfs of the air-fuel ratio sensor 55", and it performs the determination (determination of an air-fuel ratio imbalance among cylinders), based on the obtained indicating amount of air-fuel ratio change rate, as to whether or not the impermissible non-uniformity among the individual-cylinder-air-fuel-ratios is occurring, the individual-cylinder-air-fuel-ratio being the air-fuel ratio of the mixture supplied to each of at least the two or more of the cylinders whose exhaust gas reaches the air-fuel ratio sensor.

Figure 17:
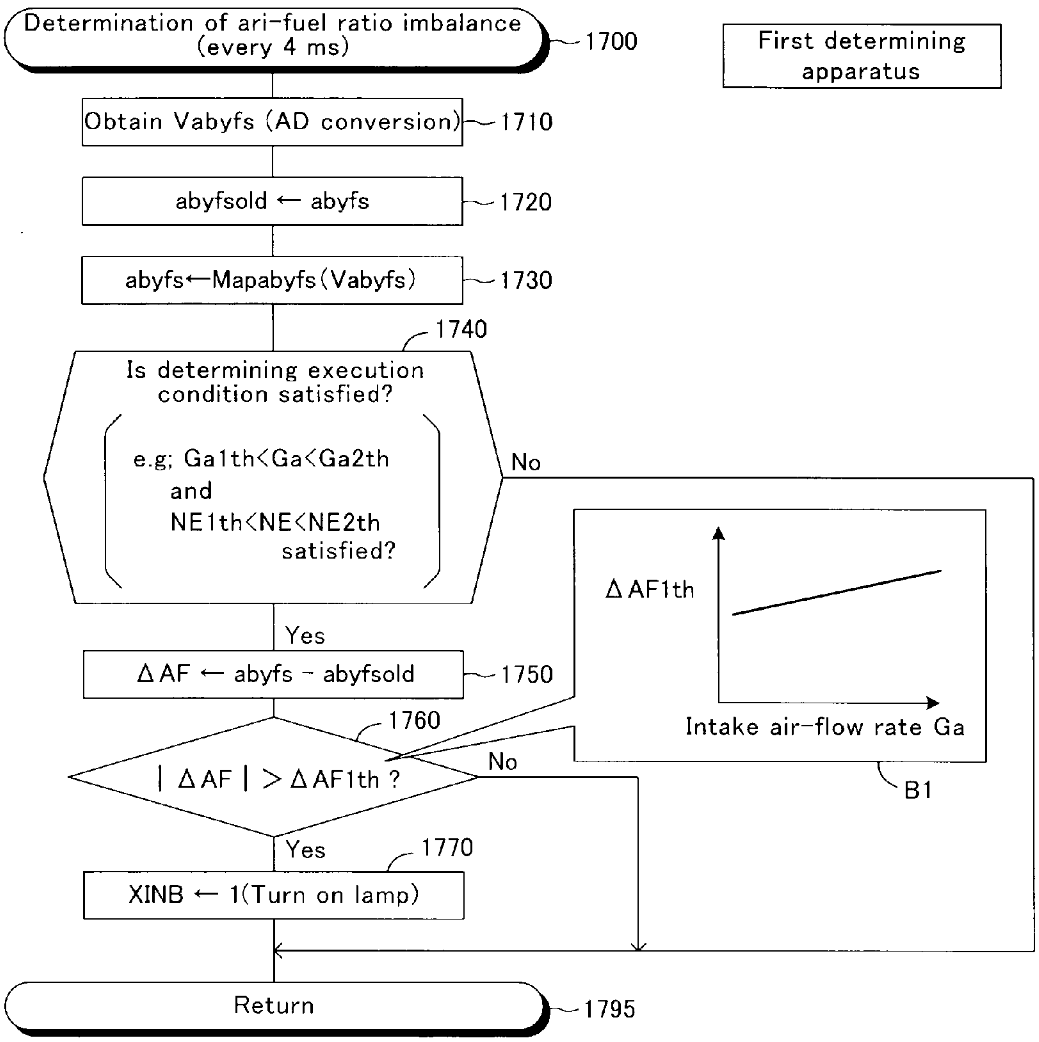
FIG. 17 is a flowchart showing a routine executed by the CPU of the electric control apparatus shown in FIG. 7.

Further, the imbalance determining means may be configured in such a manner that it compares the magnitude of the indicating amount of air-fuel ratio change rate (in the present example, the magnitude |ΔAF| of the detected air-fuel ratio change rate ΔAF) and the predetermined imbalance determination threshold ΔAF1*th*, and determines whether or not the air-fuel ratio imbalance among cylinders state is occurring based on the comparison result (refer to step 1760 and step 1770, shown in FIG. 17).

Further, the imbalance determining means is configured so as to determine that the air-fuel ratio imbalance among cylinders state is occurring when the comparison result indicates that the magnitude (in the present example, the magnitude |ΔAF| of the detected air-fuel ratio change rate ΔAF) of the obtained indicating amount of air-fuel ratio change rate is larger than the imbalance determination threshold ΔAF1*th* (refer to the "Yes" determination at step 1760).

Further, the imbalance determining means is configured so as to obtain the output Vabyfs of the air-fuel ratio sensor every time the constant sampling period (sampling time ts) elapses, and to obtain, as the indicating amount of air-fuel ratio change rate, the difference between air-fuel ratios, each being represented by each of the outputs of the air-fuel ratio sensor that are obtained consecutively before and after the sampling period (i.e., the difference ΔAF between the present detected air-fuel ratio abyfs and the previous detected air-fuel ratio abyfsold) (refer to steps from step 1710 to step 1730, and step 1750).

As described above, the detected air-fuel ratio change rate ΔAF is hardly affected by the engine rotational speed NE, and therefore, the indicating amount of air-fuel ratio change rate is also hardly affected by the engine rotational speed NE. Accordingly, by using the indicating amount of air-fuel ratio change rate, the determination of an air-fuel ratio imbalance among cylinders with high accuracy can be carried out. Further, according to the first determining apparatus, it is not necessary to precisely set the imbalance determination threshold ΔAF1*th* for each of the engine rotational speeds NE, the first determining apparatus can be developed with "much shorter developing time".

Further, as shown in the condition C1 above, the first determining apparatus is configured in such a manner that it performs the determination as to whether or not the air-fuel ratio imbalance among cylinders state is occurring when the "intake air-flow rate Ga" which is the "amount of air introduced into the engine per unit time" is larger than the "predetermined first air-flow rate threshold Ga1*th*", and it does not perform the "determination as to whether or not the air-fuel ratio imbalance among cylinders state is occurring" when the intake air-flow rate Ga is smaller than the first air-flow rate threshold Ga1*th* (refer to step 1740).

Figure 4:
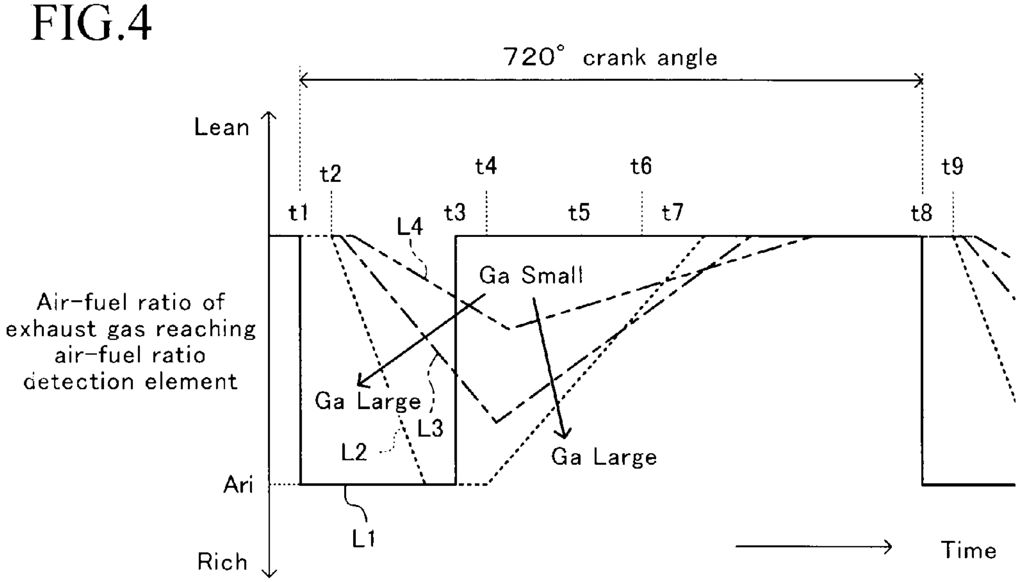
FIG. 4 schematically shows a temporal variation of an air-fuel ratio of an exhaust gas when a specific cylinder rich-side deviation imbalance state is occurring.
Figure 5:
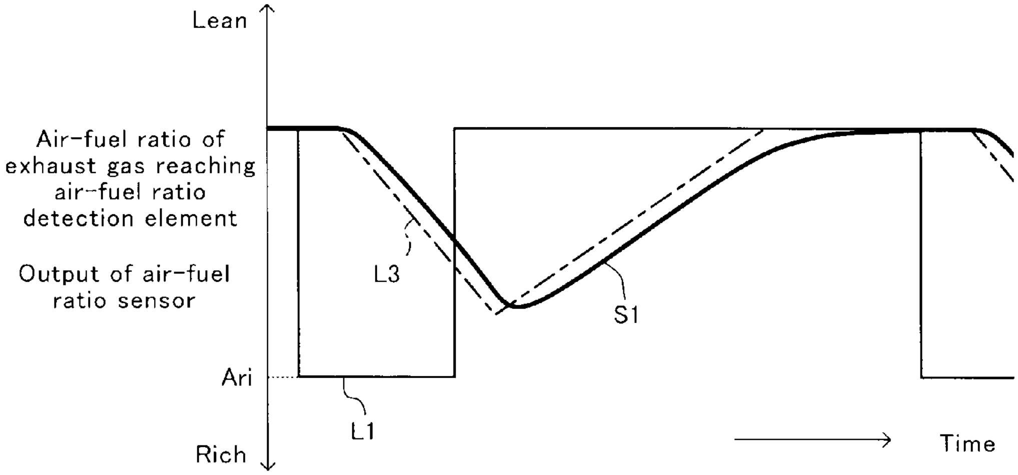
FIG. 5 schematically shows a temporal variation of an air-fuel ratio of an exhaust gas and the output of the air-fuel ratio sensor, when the specific cylinder rich-side deviation imbalance state is occurring.
Figure 6:
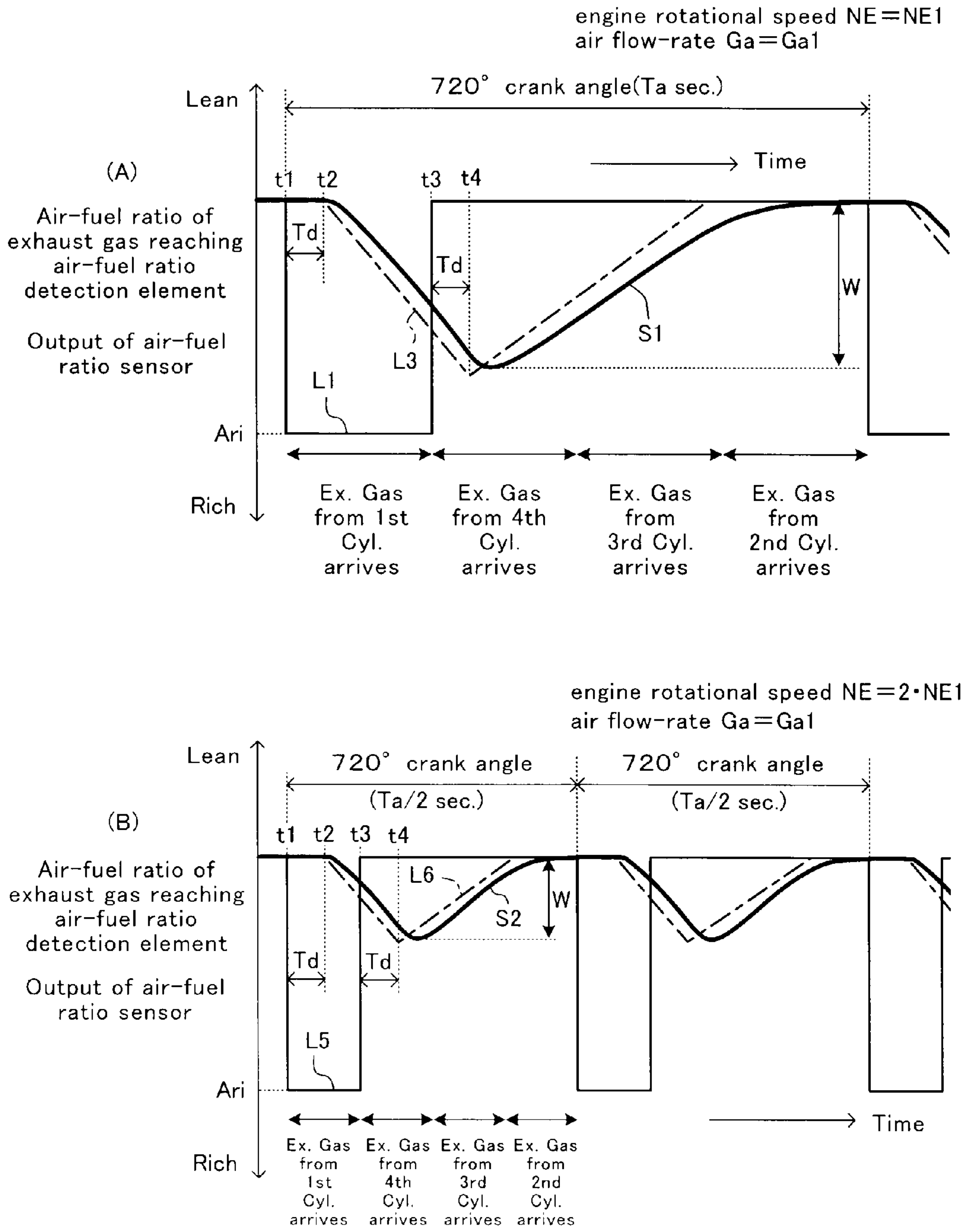
FIG. 6 is a chart for describing why the detected air-fuel ratio is not affected by an engine rotational speed, which shows an air-fuel ratio of an exhaust gas reaching inflow holes of an outer protective cover of the air-fuel ratio sensor, an air-fuel ratio of a gas reaching an air-fuel ratio detection element, and the output of the air-fuel ratio sensor.

As is understood from the descriptions made with referring to FIGS. 4 and 5, even when the air-fuel ratio imbalance among cylinders state is occurring, the magnitude of the detected air-fuel ratio change rate ΔAF becomes smaller as the intake air-flow rate Ga becomes smaller. Accordingly, there is a possibility that the erroneous determination is made by performing the determination of an air-fuel ratio imbalance among cylinders based on the indicating amount of air-fuel ratio change rate varying depending on the detected air-fuel ratio change rate ΔAF (in the present example, the detected air-fuel ratio change rate ΔAF=indicating amount of air-fuel ratio change rate), when the intake air-flow rate Ga is smaller than the first air-flow rate threshold Ga1*th*. Consequently, by including the condition C1 described above in the determining execution condition, the determination of an air-fuel ratio imbalance among cylinders can be performed with higher accuracy.

Further, the first determining apparatus is configured in such a manner that it increases the imbalance determination threshold ΔAF1*th* (change rate threshold) as the intake air-flow rate Ga is larger (refer to step 1760).

As is understood from the descriptions made with referring to FIGS. 4 and 5, when the air-fuel ratio imbalance among cylinders state is occurring, the magnitude of the detected air-fuel ratio change rate ΔAF (and thus, the indicating amount of air-fuel ratio change rate) becomes larger as the intake air-flow rate Ga becomes larger. Accordingly, as the first determining apparatus, by changing the imbalance determination threshold ΔAF1*th* to be a larger value as the intake air-flow rate Ga is larger, the determination of an air-fuel ratio imbalance among cylinders can be performed with higher accuracy.

<Second Embodiment>

A determining apparatus for the internal combustion engine (hereinafter, referred to as a "second determining apparatus") according to a second embodiment of the present invention will next be described.

The second determining apparatus is different from the first determining apparatus only in that the second determining apparatus obtains a plurality of the detected air-fuel ratio change rates ΔAF in a data obtaining period longer than the "sampling period (time ts) of the output Vabyfs of the air-fuel ratio sensor", obtains an average of those as the indicating amount of air-fuel ratio change rate, and performs the determination of an air-fuel ratio imbalance among cylinders by comparing the indicating amount of air-fuel ratio change rate with the imbalance determination threshold ΔAF1*th*. Accordingly, this different point is mainly described, hereinafter.

Figure 19:
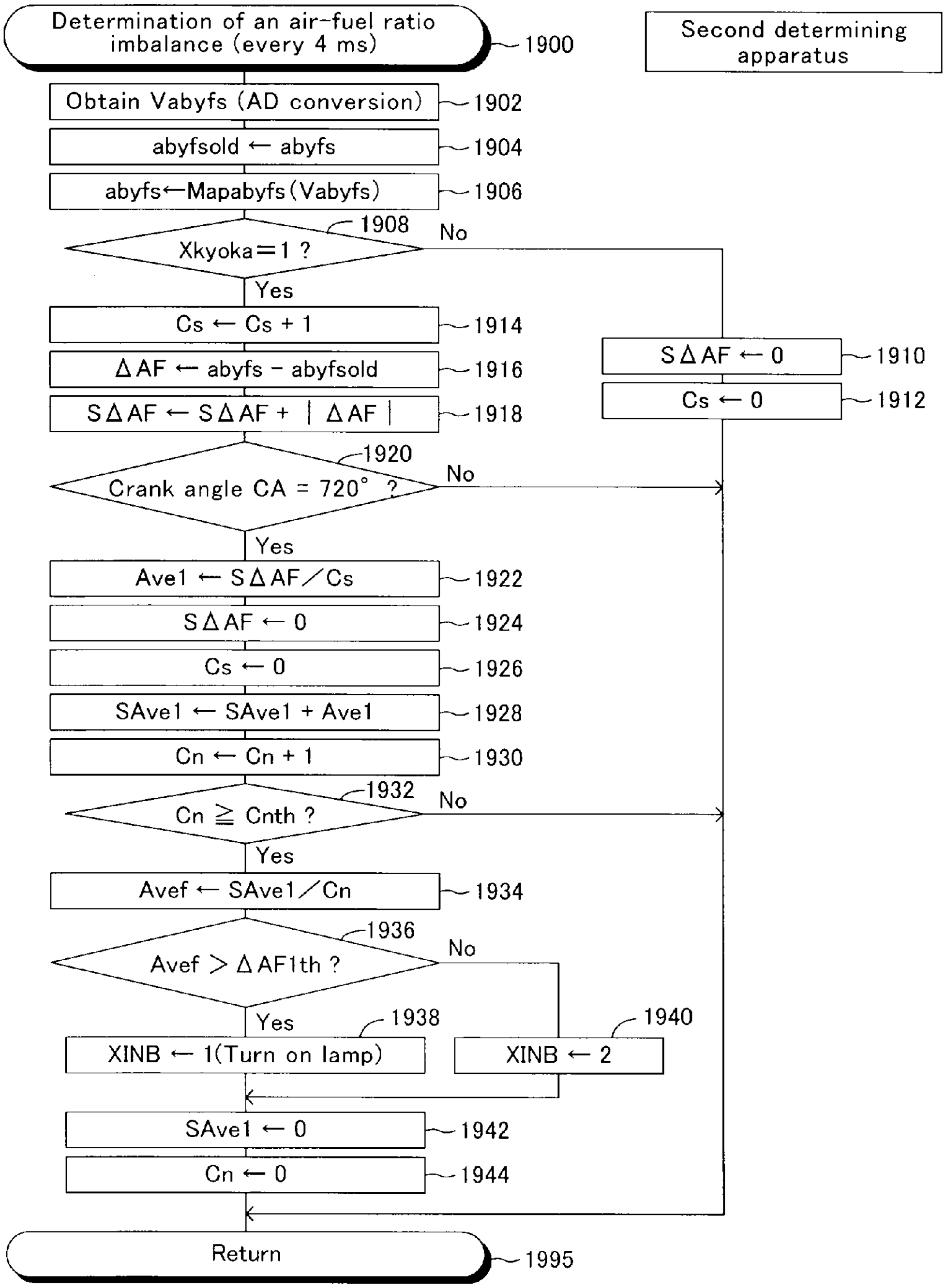
FIG. 19 is a flowchart showing a routine executed by a CPU of the air-fuel ratio imbalance among cylinders determining apparatus (second determining apparatus) according to a second embodiment of the present invention.

The CPU of the second determining apparatus is configured in such a manner that it executes a "routine for determining an air-fuel ratio imbalance among cylinders" shown by a flowchart in FIG. 19 every elapse of 4 ms (a predetermined constant sampling time ts), in place of the routine shown by the flowchart in FIG. 17. Further, the CPU of the second determining apparatus is configured in such a manner that it executes a "routine for setting a determination allowable flag" shown by a flowchart in FIG. 20 every elapse of a predetermined time (4 ms).

Accordingly, at an appropriate timing, the CPU starts process from step 1900 in FIG. 19 to execute processes of steps from step 1902 to step 1906. Steps 1902, 1904, and 1906 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 1908 to determine whether or not a value of a determination allowable flag Xkyoka is "1". The value of the determination allowable flag Xkyoka indicates, when the value is equal to "1", that the determining execution condition of the imbalance determination is satisfied, and thus, the determination of an air-fuel ratio imbalance among cylinders (obtaining data for the imbalance determination) is allowed to be performed. Further, the value of the determination allowable flag Xkyoka indicates, when the value is equal to "0", that the determining execution condition of the imbalance determination is unsatisfied, and thus, the determination of an air-fuel ratio imbalance among cylinders should not be performed. It should be noted that the value of the determination allowable flag Xkyoka is set to(at) "0" in an unillustrated initialization routine executed when a position of an unillustrated ignition key switch of the vehicle on which the engine 10 is mounted is changed from the off-position to the on-position. The value of the determination allowable flag Xkyoka is set in a "routine shown in FIG. 20" described later.

It is assumed here that the value of the determination allowable flag Xkyoka is "0". In this case, the CPU makes a "No" determination at step 1908 to proceed to step 1910, at which the CPU sets a value of an integrated value SΔAF of the detected air-fuel ratio change rate ΔAF to (at) "0" (i.e., the value is cleared). Subsequently, the CPU proceeds to step 1912 to set a value of a counter Cs to (at) "0", and thereafter, proceeds to step 1995 to end the present routine tentatively.

Next, it is assumed here that the value of the determination allowable flag Xkyoka is "1". In this case, the CPU makes a "Yes" determination at step 1908 to execute processes of steps from step 1914 to step 1918 described below in order, and then, proceeds to step 1920.

Step 1914: The CPU increments a counter Cs by "1". The value of the counter Cs indicates (represents) the number of data of the "detected air-fuel ratio change rate ΔAF (or the absolute value of ΔAF) which is added to the integrated value SΔAF of the detected air-fuel ratio change rate ΔAF" at step 1918 described later. It should be noted that the value of the counter Cs is set to (at) "0" by the initialization routine described above.

Step 1916: The CPU obtains the detected air-fuel ratio change rate ΔAF by subtracting the previous detected air-fuel ratio abyfsold from the present detected air-fuel ratio abyfs.

Step 1918: The CPU updates the integrated value SΔAF of the detected air-fuel ratio change rate ΔAF by adding an absolute value (|ΔAF|) of the detected air-fuel ratio change rate ΔAF obtained at step 1916 to the present integrated value SΔAF. The reason why the "absolute value|ΔAF| of the present detected air-fuel ratio change rate ΔAF" is integrated (accumulated) to the integrated value SΔAF is that the detected air-fuel ratio change rate ΔAF may become not only a positive value but also a negative value, as understood from (B) and (C) of FIG. 1.

Subsequently, the CPU proceeds to step 1920 to determine whether or not the crank angle CA (absolute crank angle CA) with respect to a top dead center of the reference cylinder (in the present example, the first cylinder) coincides with 720° crank angle. When the absolute crank angle CA is smaller than 720° crank angle, the CPU makes a "No" determination at step 1920 to directly proceed to step 1995 to end the present routine tentatively.

Step 1920 is a step for defining a minimum unit period for which an average of the detected air-fuel ratio change rate ΔAF is obtained, and here, 720° crank angle corresponds to the minimum unit period. 720° crank angle is a crank angle required for each and every of the cylinders (in the present example, the first to fourth cylinders) discharging an exhaust gas reaching the single air-fuel ratio sensor 55 to complete one combustion stroke. The minimum unit period may be shorter than 720° crank angle, but is preferably equal to or longer than a length obtained by multiplying the sampling time is by a plural number. That is, it is preferable that the minimum unit period be determined in such a manner that the a plurality of the detected air-fuel ratio change rates ΔAF are obtained in the minimum unit period.

On the other hand, if the absolute crank angle CA coincides with 720° crank angle when the CPU executes the process at step 1920, the CPU makes a "Yes" determination at step 1920 to execute processes of steps from step 1922 to step 1930 described below in order, and then, proceeds to step 1932.

Step 1922: The CPU calculates an average (first average) Ave1 of the magnitude (|ΔAF|) of the detected air-fuel ratio change rate ΔAF through dividing the integrated value SΔAF of the detected air-fuel ratio change rate ΔAF by the counter Cs.

Step 1924: The CPU sets the integrated value SΔAF of the detected air-fuel ratio change rate ΔAF to (at) "0" (i.e., the value is cleared).

Step 1926: The CPU sets the value of the counter Cs to (at) "0" (i.e., the value is cleared).

Step 1928: The CPU updates an integrated value SAve1 of the first average Ave1. Specifically, the CPU obtains a "present integrated value SAve1 of the first average Ave1" by adding the present first average Ave1 newly obtained at step 1922 to the "integrated value SAve1 of the first average Ave1" at that time point.

Step 1930: The CPU increments a value of a counter Cn by "1". The value of the counter Cn indicates (represents) the number of data of the first average Ave1 which is added to the "integrated value SAve1 of the first average Ave1". It should be noted that the value of the counter Cn is set to (at) "0" by the initialization routine described above.

Subsequently, the CPU proceeds to step 1932 to determine whether or not the value of the counter Cn is equal to or larger than a threshold Cnth. At this time, if the value of the counter Cn is smaller than the threshold Cnth, the CPU makes a "No" determination at step 1932 to directly proceeds to step 1995 to end the present routine tentatively. It should be noted that it is preferable that the threshold Cnth be a natural number, and be equal to or larger than 2.

In contrast, if the value of the counter Cn is equal to or larger than the threshold Cnth when the CPU execute the process of step 1932, the CPU makes a "Yes" determination at step 1932 to proceeds to step 1934, at which the CPU calculates an average (final average) Avef of the first average Ave1 through dividing the "integrated value SAve1 of the first average Ave1" by the value of the counter Cn (=Cnth). The final average Avef is a value corresponding to the detected air-fuel ratio change rate ΔAF (the value varying depending on ΔAF, the value being larger as the magnitude of ΔAF being larger), and is an indicating amount of air-fuel ratio change rate in the second determining apparatus.

Subsequently, the CPU proceeds to step 1936 to determine whether or not a magnitude (Avef=|Avef|) of the final average Avef (indicating amount of air-fuel ratio change rate) is larger than the imbalance determination threshold ΔAF1*th*. As shown in a block B1 of FIG. 17, it is preferable that the imbalance determination threshold ΔAF1*th* be set to a value which becomes larger as the intake air-flow rate Ga becomes larger.

When the final average Avef is larger than the imbalance determination threshold ΔAF1*th*, the CPU makes a "Yes" determination at step 1936 to proceed to step 1938, at which the CPU sets the value of the imbalance occurrence flag XINB to (at) "1". That is, the CPU determines that the air-fuel ratio imbalance among cylinders state is occurring. Further, at this time, the CPU may turn on an unillustrated warning lamp. Thereafter, the CPU proceeds to step 1942.

In contrast, if the final average Avef is equal to or smaller than the imbalance determination threshold ΔAF1*th* when the CPU executes the process of step 1936, the CPU makes a "No" determination at step 1936 to proceed to step 1940, at which the CPU sets the value of the imbalance occurrence flag XINB to (at) "2". That is, the CPU stores (memorizes) that "it is determined that the air-fuel ratio imbalance among cylinders state is not occurring, as a result of the determination of an air-fuel ratio imbalance among cylinders". Thereafter, the CPU proceeds to step 1942. It should be noted that step 1940 may be omitted.

The CPU sets the integrated value SAve of the first average Ave1" to (at) "0" (i.e., the value is cleared) at step 1942. Subsequently, the CPU sets the value of the counter Cn to (at) "0" (i.e., the value is cleared) at step 1944, and proceeds to step 1995 to end the present routine tentatively.

Figure 20:
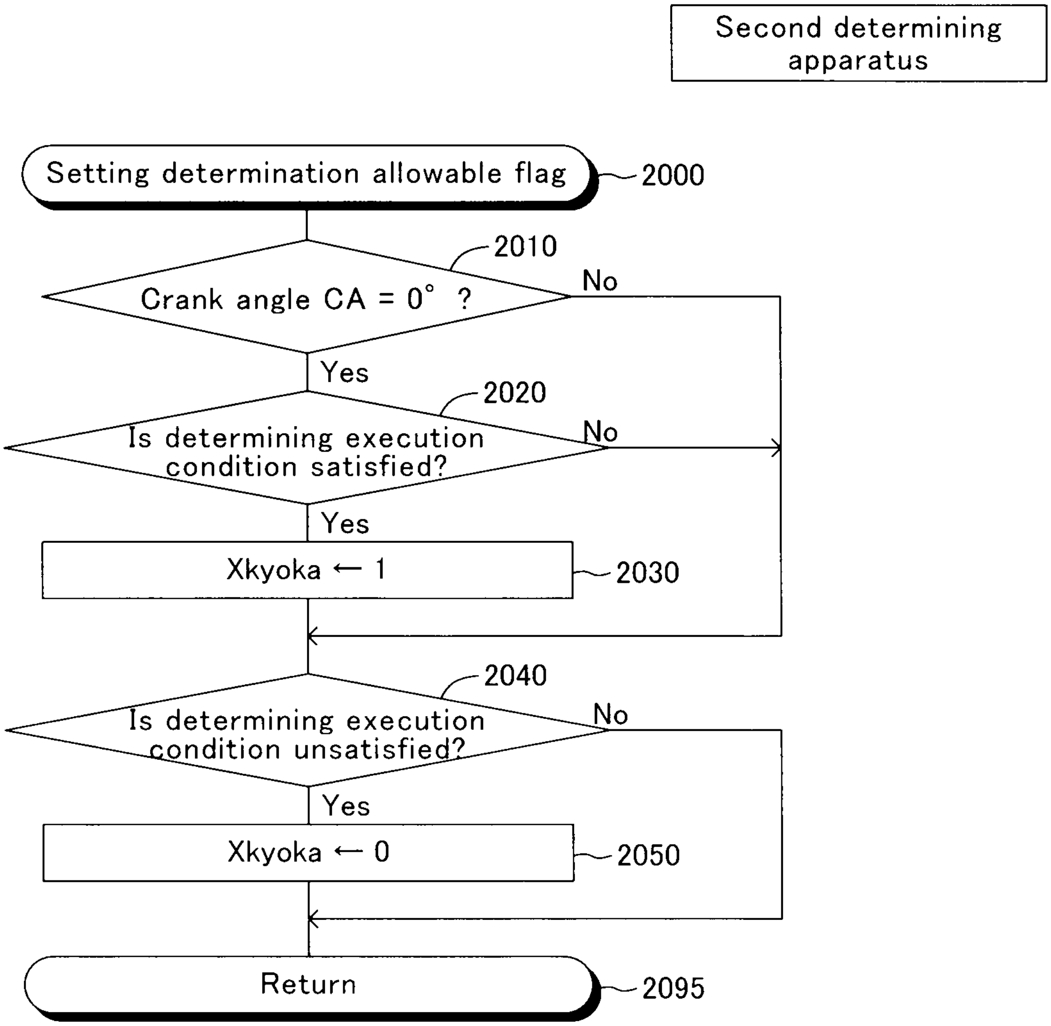
FIG. 20 is a flowchart showing a routine executed by the CPU of the second determining apparatus.

In the mean time, as described above, the CPU executes the "routine for setting a determination allowable flag" shown by the flowchart in FIG. 20 every elapse of the predetermined time (4 ms). Accordingly, at an appropriate timing, the CPU starts process from step 2000 in FIG. 20 to proceed to step 2010, at which the CPU determines whether or not the absolute crank angle coincides with 0° crank angle (=720° crank angle).

If the absolute crank angle is not 0° crank angle when the CPU executes the process of step 2010, the CPU makes a "No" determination at step 2010 to directly proceed to step 2040.

In contrast, If the absolute crank angle is not 0° crank angle when the CPU executes the process of step 2010, the CPU makes a "Yes" determination at step 2010 to proceed to step 2020, at which the CPU determines whether or not the determining execution condition is satisfied. The determining execution condition is the same condition as one to be determined at step 1740 in FIG. 17 (refer to conditions C1 to C5).

If the determining execution condition is not satisfied when the CPU executes the process of step 2020, the CPU makes a "No" determination at step 2020 to directly proceed to step 2040.

In contrast, if the determining execution condition is satisfied when the CPU executes the process of step 2020, the CPU makes a "Yes" determination at step 2020 to proceed to step 2030, at which the CPU sets the value of the determination allowable flag Xkyoka to (at) "1". Thereafter, the CPU proceeds to step 2040.

At step 2040, the CPU determines whether or not the determining execution condition described above is unsatisfied. When the execution condition described above is unsatisfied, the CPU proceeds to step 2050 from step 2040 to set the value of the determination allowable flag Xkyoka to (at) "0", and proceeds to step 2095 to end the present routine tentatively. In contrast, if the execution condition described above is satisfied when the CPU executes the process of step 2040, the CPU directly proceeds to step 2095 from step 2040 to end the present routine tentatively.

In this manner, determination allowable flag Xkyoka is set to (at) "1" if the determining execution condition is satisfied when the absolute crank angle coincides with 0° crank angle, and set to (at) "0" when the determining execution condition becomes unsatisfied.

Accordingly, after the determination allowable flag Xkyoka is set to (at) "1" when the determining execution condition is satisfied at time point at which the absolute crank angle coincides with 0° crank angle, and when the determining execution condition becomes unsatisfied before the absolute crank angle reaches 720° crank angle, the value of the determination allowable flag Xkyoka is set to (at) "0" at that moment. If this situation occurs, the CPU proceeds from step 1908 to step 1910 and step 1912 in FIG. 19, and thus, the data accumulated (collected) up to that time point (the integrated value SΔAF of the detected air-fuel ratio change rate ΔAF, and the value of the counter Cs) are discarded. That is, only in a case where the determining execution condition continues to be satisfied for "at least a period for which the crank angle rotates 720° angle", the average (first average Ave1) of the magnitude (|ΔAF|) of the detected air-fuel ratio change rate ΔAF is obtained.

As described above, the second determining apparatus comprises the imbalance determining means (routine shown in FIG. 19) which;

obtains, based on the output Vabyfs of the air-fuel ratio sensor, the indicating amount of air-fuel ratio change rate (in the present example, the final average Avef which is the average of the magnitude |ΔAF| of the detected air-fuel ratio change rate ΔAF) which varies in accordance with the detected air-fuel ratio change rate ΔAF;

compares the indicating amount of air-fuel ratio change rate (magnitude of the obtained indicating amount of air-fuel ratio change rate Avef (here, Avef is positive, and thus is equal to |Avef|)) and the predetermined imbalance determination threshold ΔAF1*th*; and performs the determination of an air-fuel ratio imbalance among cylinders based on the comparison result.

Accordingly, the second determining apparatus, similarly to the first determining apparatus, has advantages that "it can perform determination of an air-fuel ratio imbalance among cylinders with high accuracy, and it can be developed with much shorter developing time".

Further, the imbalance determining means is configured so as to obtain the output Vabyfs of the air-fuel ratio sensor every time the constant sampling period elapses (sampling time ts), to obtain, as the detected air-fuel ratio change rate ΔAF, a difference ΔAF between air-fuel ratios, each being represented by each of the outputs Vabyfs of the air-fuel ratio sensor that are obtained consecutively before and after the sampling period (i.e., between the present detected air-fuel ratio abyfs and the previous detected air-fuel ratio abyfsold), and to obtain, as the indicating amount of air-fuel ratio change rate, the average (final average Avef) of the magnitudes ΔAF of a plurality of the detected air-fuel ratio change rates ΔAF obtained in the data obtaining period (for which a time corresponding to a time obtained by multiplying 720° crank angle by Cnth elapses) longer than the sampling period.

Further, the second determining apparatus obtains, as indicating amount of air-fuel ratio change rate, the average (final average Avef) of a plurality of the detected air-fuel ratio change rates, and compares the indicating amount of air-fuel ratio change rate (magnitude of the indicating amount of air-fuel ratio change rate) with the imbalance determination threshold. Accordingly, even when a noise is superimposed on the output Vabyfs of the air-fuel ratio sensor, it is unlikely that the indicating amount of air-fuel ratio change rate is affected by the noise. Consequently, the determination of an air-fuel ratio imbalance among cylinders can be made with higher accuracy.

In addition, the second determining apparatus sets the data obtaining period to (at) a period which is a natural number Cnth times longer than the unit combustion cycle period (in the present example, a period corresponding to 720° crank angle), the unit combustion cycle period being a period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke.

Consequently, the indicating amount of air-fuel ratio change rate (final average Avef) when the air-fuel ratio imbalance among cylinders state is occurring is certainly larger than the indicating amount of air-fuel ratio change rate (final average Avef) when the air-fuel ratio imbalance among cylinders state is not occurring. Consequently, the second determining apparatus can perform the determination of an air-fuel ratio imbalance among cylinders with higher accuracy.

It should be noted that the second determining apparatus obtains, as the first average Ave1, the average of the magnitudes |ΔAF| of the detected air-fuel ratio change rates ΔAF every elapse of 720° crank angle, and further, obtains, as the final average Avef (indicating amount of air-fuel ratio change rate), the average of the Cnth first averages Ave1. Alternatively, it may obtain and adopts, as the final average Avef (indicating amount of air-fuel ratio change rate), an average of the magnitudes |ΔAF| of the detected air-fuel ratio change rates ΔAF that are obtained over an entire period which is equal to a plural number (an integer equal to or larger than 2) times longer than the 720° crank angle (unit combustion cycle period).

<Third Embodiment>

A control apparatus for the internal combustion engine (hereinafter, referred to as a "third determining apparatus") according to a third embodiment of the present invention will next be described.

The third determining apparatus is different from the first determining apparatus only in that the third determining apparatus obtains, as the indicating amount of air-fuel ratio change rate, a maximum detected air-fuel ratio change rate ΔAFmax whose magnitude |ΔAF| is the largest among a plurality of the detected air-fuel ratio change rates ΔAF that are obtained in a data obtaining period longer than the sampling period is of the detected air-fuel ratio change rate ΔAF, or an average AveΔAFmax which is an average of a plurality of the maximum detected air-fuel ratio change rates ΔAFmax; and performs the determination of an air-fuel ratio imbalance among cylinders by comparing the indicating amount of air-fuel ratio change rate with the imbalance determination threshold ΔAF1*th*. Accordingly, this different point is mainly described, herinafter.

Figure 21:
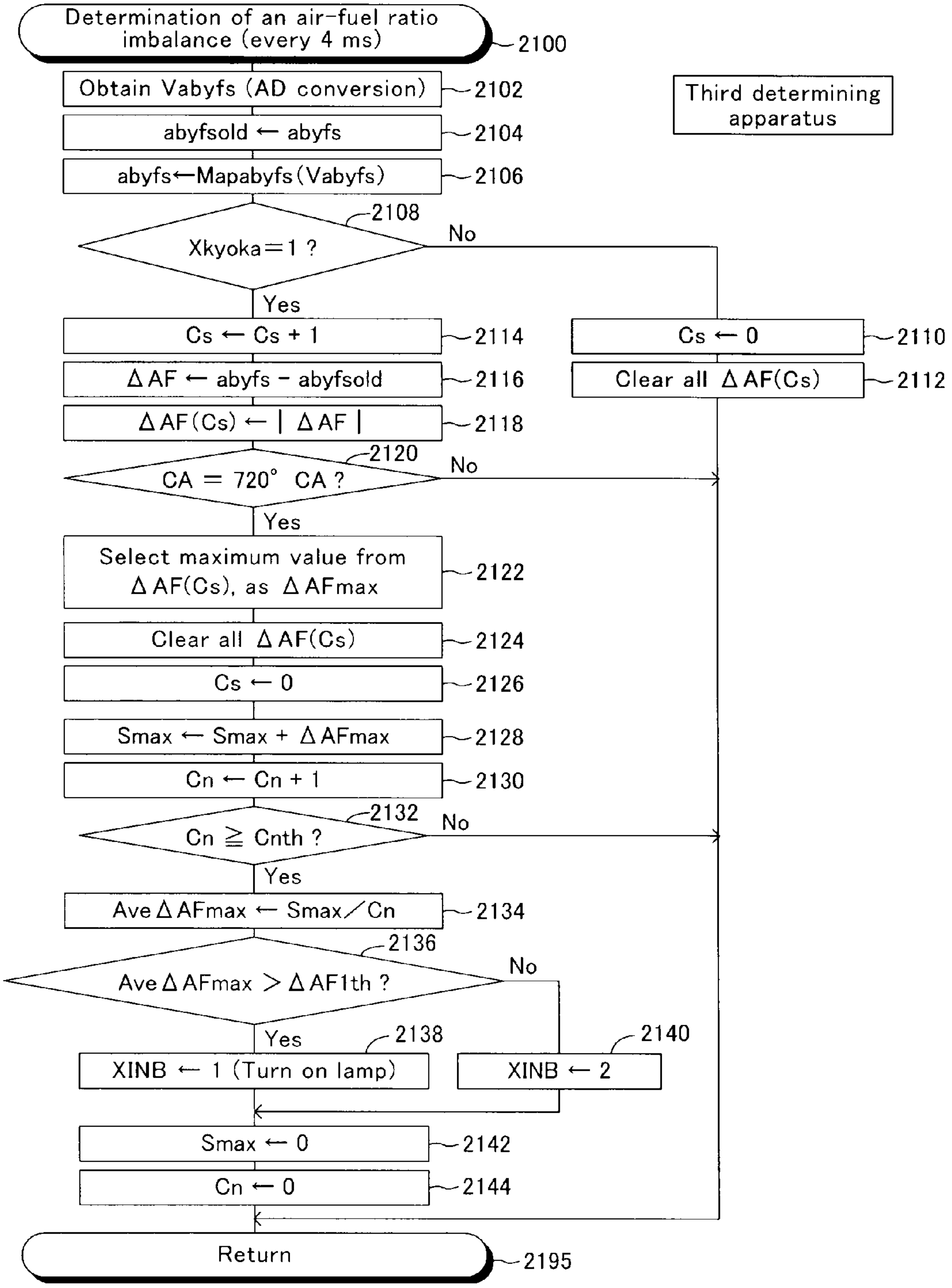
FIG. 21 is a flowchart showing a routine executed by a CPU of the air-fuel ratio imbalance among cylinders determining apparatus (third determining apparatus) according to a third embodiment of the present invention.

The CPU of the third determining apparatus is configured in such a manner that it executes a "routine for determining an air-fuel ratio imbalance among cylinders" shown by a flowchart in FIG. 21 every elapse of 4 ms (a predetermined constant sampling time ts), in place of the routine shown by the flowchart in FIG. 17. Further, the CPU of the third determining apparatus is configured in such a manner that it executes the "routine for setting a determination allowable flag" shown by a flowchart in FIG. 20 every elapse of the predetermined time (4 ms).

Accordingly, at an appropriate timing, the CPU starts process from step 2100 in FIG. 21 to execute processes of steps from step 2102 to step 2106. Steps 2102, 2104, and 2106 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 2108 to determine whether or not the value of a determination allowable flag Xkyoka is "1". The value of the determination allowable flag Xkyoka is set in the routine shown in FIG. 20, similarly to the second determining apparatus.

It is assumed here that the value of the determination allowable flag Xkyoka is "0". In this case, the CPU makes a "No" determination at step 2108 to proceed to step 2110, at which the CPU sets a value of a counter Cs to (at) "0" (i.e., the value is cleared). Subsequently, the CPU proceeds to step 2112 to set all of detected air-fuel ratio change rates ΔAF(Cs) to (at) "0" (i.e., the values are cleared). The detected air-fuel ratio change rate ΔAF(Cs) is a magnitude ΔAF of the detected air-fuel ratio change rate ΔAF stored corresponding to a value of the counter Cs at step 2118 described later. Thereafter, the CPU directly proceed to step 2195 to end the present routine tentatively.

Next, it is assumed that the value of the determination allowable flag Xkyoka is "1". In this case, the CPU makes a "Yes" determination at step 2108 to execute processes of steps from step 2114 to step 2118 described below in order, and proceeds to step 2120.

Step 2114: The CPU increments the value of the counter Cs by "1". It should be noted that the value of the counter Cs is set to (at) "0" by the initialization routine described above.

Step 2116: The CPU obtains the detected air-fuel ratio change rate ΔAF by subtracting the previous detected air-fuel ratio abyfsold from the present detected air-fuel ratio abyfs.

Step 2118: The CPU stores an absolute value |ΔAF| of the detected air-fuel ratio change rate ΔAF as the Cs-th data ΔAF(Cs). For example, if the present time is a "time immediately after the determination allowable flag Xkyoka is changed form 0 to 1", the value of the counter Cs is "1" (refer to step 2110 and step 2114). Accordingly, the absolute value |ΔAF| of the detected air-fuel ratio change rate ΔAF obtained at step 2116 is stored as data ΔAF(1).

Subsequently, the CPU proceeds to step 2120 to determine whether or not the absolute crank angle CA described above coincides with 720° crank angle. When the absolute crank angle CA is smaller than 720° crank angle, the CPU makes a "No" determination at step 2120 to directly proceed to step 2195 to end the present routine tentatively. The processes described above are repeatedly executed every elapse of 4 ms until the absolute crank angle CA coincides with 720° crank angle, when the value of the determination allowable flag Xkyoka is "1". Therefore, the ΔAF(Cs) is accumulated.

Step 2120 is a step for defining a minimum unit period for which a maximum value of the detected air-fuel ratio change rate ΔAF is obtained, and here, 720° crank angle corresponds to the minimum unit period. 720° crank angle is a crank angle required for each and every of the cylinders (in the present example, the first to fourth cylinders) discharging an exhaust gas reaching the single air-fuel ratio sensor 55 to complete one combustion stroke. In other words, a period for 720° crank angle is a period necessary for any one of the cylinders among at least the two or more of the cylinders discharging exhaust gases which reach the air-fuel ratio sensor 55 to complete one combustion cycle including an intake stroke, a compression stroke, an expansion stroke, and an exhaust stroke", and is the "unit combustion cycle period".

On the other hand, if the absolute crank angle CA coincides with 720° crank angle when the CPU executes the process at step 2120, the CPU makes a "Yes" determination at step 2120 to execute processes of steps from step 2122 to step 2130 described below in order.

Step 2122: The CPU selects a maximum value from (among) a plurality of the data ΔAF(Cs), and stores the maximum value as a maximum value ΔAFmax. That is, the CPU selects, as the maximum value ΔAFmax, the largest value among a plurality of the data ΔAF(Cs).

Step 2124: The CPU sets the all of a plurality of the data ΔAF(Cs) to (at) "0" (i.e., the data are cleared).

Step 2126: The CPU sets the value of the counter Cs to (at) "0" (i.e., the value is cleared).

Step 2128: The CPU updates an integrated value Smax by adding the present maximum value ΔAFmax newly selected at step 2122 to the integrated value Smax of the maximum value ΔAFmax at that time point.

Step 2130: The CPU increments a value of a counter Cn by "1". The value of the counter Cn indicates (represents) the number of data of the maximum value ΔAFmax which is added (accumulated) to the "integrated value Smax of the maximum value ΔAFmax". It should be noted that the value of the counter Cn is set to (at) "0" by the initialization routine described above.

Subsequently, the CPU proceeds to step 2132 to determine whether or not the value of the counter Cn is equal to or larger than a threshold Cnth. At this time, when the value of the counter Cn is smaller than the threshold Cnth, the CPU makes a "No" determination at step 2132 to directly proceeds to step 2195 to end the present routine tentatively. It should be noted that it is preferable that the threshold Cnth be a natural number, and be equal to or larger than 2.

In contrast, if the value of the counter Cn is equal to or larger than the threshold Cnth when the CPU executes the process of step 2132, the CPU makes a "Yes" determination at step 2132 to proceed to step 2134, at which the CPU calculates an average (final maximum average) AveΔAFmax of the maximum value ΔAFmax through dividing the "integrated value Smax of the maximum value ΔAFmax" by the value of the counter Cn (=Cnth). The final maximum average AveΔAFmax is a value corresponding to the detected air-fuel ratio change rate ΔAF (the value being larger as the maximum value of the magnitude |ΔAF| of the detected air-fuel ratio change rate ΔAF being larger), and is an indicating amount of air-fuel ratio change rate in the third determining apparatus. It should be noted that the final maximum average AveΔAFmax is equal to the maximum value ΔAFmax, when the threshold Cnth is "1".

Subsequently, the CPU proceeds to step 2136 to determine whether or not a magnitude of the final maximum average AveΔAFmax (indicating amount of air-fuel ratio change rate) is larger than the imbalance determination threshold ΔAF1*th*. As shown in a block B1 of FIG. 17, it is preferable that the imbalance determination threshold ΔAF1*th* be set to a value which becomes larger as the intake air-flow rate Ga becomes larger. It should be noted that, since the final maximum average AveΔAFmax is a positive value, the final maximum average AveΔAFmax is equal to the magnitude |AveΔAFmax| of the final maximum average AveΔAFmax.

When the magnitude of the final maximum average AveΔAFmax is larger than the imbalance determination threshold ΔAF1*th*, the CPU makes a "Yes" determination at step 2136 to proceed to step 2138, at which the CPU sets the value of the imbalance occurrence flag XINB to (at) "1". That is, the CPU determines that the air-fuel ratio imbalance among cylinders state is occurring. Further, at this time, the CPU may turn on an unillustrated warning lamp. Thereafter, the CPU proceeds to step 2142.

In contrast, if the final average Avef is equal to or smaller than the imbalance determination threshold ΔAF1*th* when the CPU executes the process of step 2136, the CPU makes a "No" determination at step 2136 to proceed to step 2140, at which the CPU sets the value of the imbalance occurrence flag XINB to (at) "2". Thereafter, the CPU proceeds to step 2142. It should be noted that step 2140 may be omitted.

The CPU sets the "integrated value Smax of the maximum value ΔAFmax" to (at) "0" (i.e., the value is cleared) at step 2142. Subsequently, the CPU sets the value of the counter Cn to (at) "0" (i.e., the value is cleared) at step 2144, and proceeds to step 2195 to end the present routine tentatively.

It should be noted that the determination allowable flag Xkyoka is set to (at) "1" if the determining execution condition is satisfied when the absolute crank angle coincides with 0° crank angle, and set to (at) "0" when the determining execution condition becomes unsatisfied.

Accordingly, after the determination allowable flag Xkyoka is set to (at) "1" when the determining execution condition is satisfied at time point at which the absolute crank angle coincides with 0° crank angle, and when the determining execution condition becomes unsatisfied before the absolute crank angle reaches 720° crank angle, the value of the determination allowable flag Xkyoka is set to (at) "0" at that moment. If this situation occurs, the CPU proceeds from step 2108 to step 2110 and step 2112 in FIG. 21, and thus, the data accumulated (collected) up to that time point (the data ΔAF(s), and the value of the counter Cs) are discarded. That is, only in a case where the determining execution condition continues to be satisfied for "at least a period for which the crank angle rotates 720° angle", the maximum value ΔAFmax among the magnitudes (|ΔAF|) of the detected air-fuel ratio change rates that are obtained in that period is obtained as data for obtaining the "final maximum average AveΔAFmax".

As described above, the third determining apparatus comprises the imbalance determining means (routine shown in FIG. 21) which;

obtains, based on the output Vabyfs of the air-fuel ratio sensor, the indicating amount of air-fuel ratio change rate (in the present example, the final maximum average AveΔAFmax which is the average of the maximum values ΔAFmax of the magnitude |ΔAF| of the detected air-fuel ratio change rate ΔAF) which varies in accordance with the detected air-fuel ratio change rate ΔAF; and performs the determination of an air-fuel ratio imbalance among cylinders based on the indicating amount of air-fuel ratio change rate (i.e., compares the magnitude of the obtained indicating amount of air-fuel ratio change rate with the predetermined imbalance determination threshold, and performs the determination of an air-fuel ratio imbalance among cylinders based on the comparison result).

Accordingly, the third determining apparatus, similarly to the first determining apparatus, has advantages that "it can perform determination of an air-fuel ratio imbalance among cylinders with high accuracy, and it can be developed with much shorter developing time".

Further, the imbalance determining means is configured so as to obtain the output Vabyfs of the air-fuel ratio sensor every time the constant sampling period (sampling time ts) elapses, to obtain, as the detected air-fuel ratio change rate ΔAF, a difference ΔAF between air-fuel ratios, each being represented by each of the outputs Vabyfs of the air-fuel ratio sensor that are obtained consecutively before and after the sampling period (i.e., between the present detected air-fuel ratio abyfs and the previous detected air-fuel ratio abyfsold), and to obtain, as the indicating amount of air-fuel ratio change rate, the value (the maximum value ΔAFmax when the threshold Cnth is 1, and the final maximum average AveΔAFmax when the threshold Cnth is equal to or larger than 2) corresponding to the detected air-fuel ratio change rate ΔAF whose magnitude |ΔAF| is the largest among a plurality of the detected air-fuel ratio change rates ΔAF obtained in the data obtaining period (for which 720° crank angle elapses) longer than the sampling period.

Even when a noise is superimposed on the output Vabyfs of the air-fuel ratio sensor, there is a great difference between the maximum value among magnitudes |ΔAF| of a plurality of the detected air-fuel ratio change rates ΔAF obtained when the air-fuel ratio imbalance among cylinders state is occurring and the maximum value among magnitudes |ΔAF| of a plurality of the detected air-fuel ratio change rates ΔAF obtained when the air-fuel ratio imbalance among cylinders state is not occurring. Consequently, the third determining apparatus can perform the determination of an air-fuel ratio imbalance among cylinders with higher accuracy.

Further, the data obtaining period is set at a period which is the natural number (threshold Cnth) times longer than the "unit combustion cycle period", the unit combustion cycle period being a "period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke".

In this manner, when the maximum value among the magnitudes of a plurality of the detected air-fuel ratio change rates is adopted as data for obtaining the indicating amount of air-fuel ratio change rate, by setting the period in which the maximum value is obtained to (at) the "period which is the natural number times longer than the unit combustion cycle period (and thus, the period longer than the unit combustion cycle period)", the indicating amount of air-fuel ratio change rate when the air-fuel ratio imbalance among cylinders state is occurring is certainly larger than the indicating amount of air-fuel ratio change rate when the air-fuel ratio imbalance among cylinders state is not occurring. Consequently, the embodiment can perform the determination of an air-fuel ratio imbalance among cylinders with higher accuracy.

Further, the imbalance determining means of the third determining apparatus is configured;

so as to obtain the output Vabyfs of the air-fuel ratio sensor every time a constant sampling period (sampling time ts) elapses, the constant sampling period being shorter than the unit combustion cycle period;

so as to obtain, as the detected air-fuel ratio change rate, a difference between air-fuel ratios (the present detected air-fuel ratio abyfs and the previous detected air-fuel ratio abyfsold), each being represented by each of the outputs Vabyfs of the air-fuel ratio sensor that are obtained consecutively before and after the sampling period;

so as to select, as the maximum change rate (maximum value) ΔAFmax, the detected air-fuel ratio change rate whose magnitude is the largest among a plurality of the detected air-fuel ratio change rates obtained in the unit combustion cycle period;

so as to obtain the average (final maximum average AveΔAFmax) of the maximum change rates ΔAFmax, each being obtained for each of a plurality of the unit combustion cycle periods; and so as to obtain/adopt the average (final maximum average AveΔAFmax) as the indicating amount of air-fuel ratio change rate (refer to step 2134).

Accordingly, even when the magnitude |ΔAF| of the detected air-fuel ratio change rate ΔAF becomes unexpectedly large due to a noise or the like when the air-fuel ratio imbalance among cylinders state is not occurring, the final maximum average AveΔAFmax does not become so large. Therefore, the third determining apparatus can perform the determination of an air-fuel ratio imbalance among cylinders with higher accuracy, even when the noise superimposes on the output Vabyfs of the air-fuel ratio sensor.

<Fourth Embodiment>

A control apparatus for the internal combustion engine (hereinafter, referred to as a "fourth determining apparatus") according to a fourth embodiment of the present invention will next be described.

The fourth determining apparatus has features as follows.

The fourth determining apparatus obtains the indicating amount of air-fuel ratio change rate (for example, the average of the magnitudes of the detected air-fuel ratio change rates ΔAF), discriminating between an "increasing indicating amount of change rate when the detected air-fuel ratio change rate ΔAF is positive" and a "decreasing indicating amount of change rate when the detected air-fuel ratio change rate ΔAF is negative".

The fourth determining apparatus compares a magnitude of the increasing indicating amount of change rate with an increasing change rate threshold serving as the imbalance determination threshold when the magnitude of the increasing indicating amount of change rate is larger than a magnitude of the decreasing indicating amount of change rate, and determines that the "air-fuel ratio imbalance among cylinders state is occurring in which an air-fuel ratio of one of the at least two or more of the cylinders deviates toward leaner side with respect to the stoichiometric air-fuel ratio" when the magnitude of the increasing indicating amount of change rate is larger than the increasing change rate threshold.

The fourth determining apparatus compares the magnitude of the decreasing indicating amount of change rate with a decreasing change rate threshold serving as the imbalance determination threshold when the magnitude of the decreasing indicating amount of change rate is larger than the magnitude of the increasing indicating amount of change rate, and determines that the "air-fuel ratio imbalance among cylinders state is occurring in which an air-fuel ratio of one of the at least two or more of the cylinders deviates toward richer side with respect to the stoichiometric air-fuel ratio" when the magnitude of the decreasing indicating amount of change rate is larger than the decreasing change rate threshold.

These features will next be described in detail.

Figure 22:
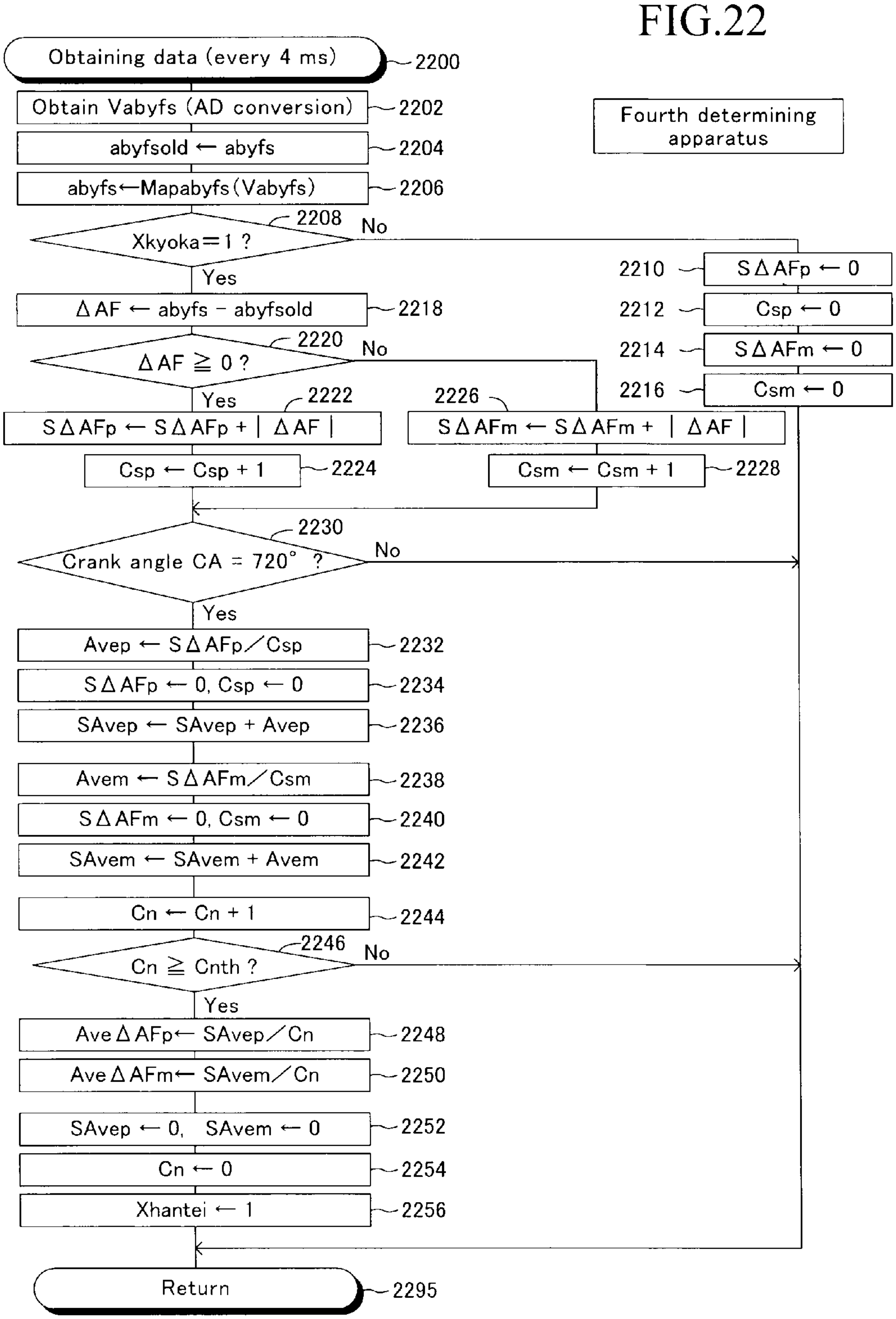
FIG. 22 is a flowchart showing a routine executed by a CPU of the air-fuel ratio imbalance among cylinders determining apparatus (fourth determining apparatus) according to a fourth embodiment of the present invention.

The CPU of the fourth determining apparatus is configured in such a manner that it executes the routines that the CPU of the second determining apparatus executes at the appropriate timings, and a "routine for obtaining data" shown by a flowchart in FIG. 22 every elapse of "4 ms (a predetermined constant sampling time ts)", in place of the routine shown by the flowchart in FIG. 19. Further, the CPU of the fourth determining apparatus is configured in such a manner that it executes the "routine for determination of an air-fuel ratio imbalance among cylinders" shown by a flowchart in FIG. 23 every elapse of the predetermined time (4 ms).

Accordingly, at an appropriate timing, the CPU starts process from step 2200 in FIG. 22 to execute processes of steps from step 2202 to step 2206. Steps 2202, 2204, and 2206 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 2208 to determine whether or not the value of a determination allowable flag Xkyoka is "1". The value of the determination allowable flag Xkyoka is set in the routine shown in FIG. 20, similarly to the second determining apparatus.

It is assumed here that the value of the determination allowable flag Xkyoka is "0". In this case, the CPU makes a "No"

determination at step 2208 to execute processes of steps from step 2110 to step 2216 described below in order, and proceeds to step 2295 to end the present routine tentatively.

Step 2210: The CPU sets a value of an integrated value SΔAFp of an "increasing change rate ΔAFp which is a positive detected air-fuel ratio change rate ΔAF" to (at) "0" (the value is cleared). The integrated value SΔAFp is hereinafter referred to as an "increasing change rate integrated value SΔAFp".

Step 2212: The CPU sets a value of a counter Csp to (at) "0" (i.e., the value is cleared). It should be noted that the value of the counter Csp is set to (at) "0" by the initialization routine described above.

Step 2214: The CPU sets a value of an integrated value SΔAFm of a "decreasing change rate ΔAFm which is a negative detected air-fuel ratio change rate ΔAF" to (at) "0" (the value is cleared). The integrated value SΔAFm is hereinafter referred to as a "decreasing change rate integrated value SΔAFm".

Step 2216: The CPU sets a value of a counter Csm to (at) "0" (i.e., the value is cleared). It should be noted that the value of the counter Csm is also set to (at) "0" by the initialization routine described above.

Next, it is assumed that the value of the determination allowable flag Xkyoka is changed to "1". In this case, the CPU makes a "Yes" determination at step 2208 to proceed to step 2218, at which the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to step 2220 to determine whether or not the detected air-fuel ratio change rate ΔAF is equal to or larger than "0" (whether it is a positive value including 0, or a negative value)

When the detected air-fuel ratio change rate ΔAF is equal to or larger than "0" (that is, the detected air-fuel ratio abyfs is increasing), the CPU makes a "Yes" determination at step 2220 to proceed to step 2222, at which the CPU updates the increasing change rate integrated value SΔAFp by adding an absolute value (|ΔAF|) of the detected air-fuel ratio change rate ΔAF obtained at step 2218 to the increasing change rate integrated value SΔAFp at that time point. It should be noted that, in this case, the detected air-fuel ratio change rate ΔAF is positive, and thus, the increasing change rate integrated value SΔAFp can be updated by adding the detected air-fuel ratio change rate ΔAF to the increasing change rate integrated value SΔAFp at that time point.

Subsequently, the CPU proceeds to step 2224 to increment the value of the counter Csp by "1". The value of the counter Csp indicates (represents) the number of data of the detected air-fuel ratio change rate ΔAF which is added (accumulated) to the increasing change rate integrated value SΔAFp. Thereafter, the CPU proceeds to step 2230.

In contrast, if the value of the detected air-fuel ratio change rate ΔAF is smaller than "0" (that is, the detected air-fuel ratio abyfs is decreasing) when the CPU executes the process of step 2220, the CPU makes a "No" determination at step 2220 to proceed to step 2226, at which the CPU updates the decreasing change rate integrated value SΔAFm by adding an absolute value (|ΔAF|) of the detected air-fuel ratio ΔAF obtained at step 2218 to the decreasing change rate integrated value SΔAFm at that time point.

Subsequently, the CPU proceeds to step 2228 to increment a value of the counter Csm by "1". The value of the counter Csm indicates (represents) the number of data of the detected air-fuel ratio change rate ΔAF which is added (accumulated) to the decreasing change rate integrated value SΔAFm. Thereafter, the CPU proceeds to step 2230.

Subsequently, the CPU determines whether or not the absolute crank angle CA coincides with 720° crank angle at step 2230. When the absolute crank angle CA is smaller than 720° crank angle, the CPU makes a "No" determination at step 2230 to directly proceed to step 2295 to end the present routine tentatively.

Step 2230 is a step for defining a minimum unit period for which an average (average increasing change rate Avep) of the increasing change rates ΔAFp and average (average decreasing change rate Avem) of the decreasing change rates ΔAFm are obtained, and here, 720° crank angle (the unit combustion cycle period) corresponds to the minimum unit period.

On the other hand, if the absolute crank angle CA coincides with 720° crank angle when the CPU executes the process at step 2230, the CPU makes a "Yes" determination at step 2230 to execute processes of steps from step 2232 to step 2244 described below in order, and to proceed to step 2246.

Step 2232: The CPU calculates an average (average increasing change rate Avep) of the increasing change rate ΔAFp through dividing the increasing change rate integrated value SΔAFp by the counter Csp.

Step 2234: The CPU sets the increasing change rate integrated value SΔAFp and the counter Csp to (at) "0", respectively (the values are cleared).

Step 2236: The CPU updates an integrated value SAvep of the average increasing change rate Avep. Specifically, the CPU calculates the present "integrated value SAvep of the average increasing change rate Avep" by adding the present average increasing change rate Avep newly obtained at step 2232 to the "integrated value SAvep of the average increasing change rate Avep" at that time point.

Step 2238: The CPU calculates an average (average decreasing change rate Avem) of the decreasing change rate ΔAFm through dividing the decreasing change rate integrated value SΔAFm by the counter Csm.

Step 2240: The CPU sets the decreasing change rate integrated value SΔAFm and the counter Csm to (at) "0", respectively (the values are cleared).

Step 2242: The CPU updates an integrated value SAvem of the average decreasing change rate Avem. Specifically, the CPU calculates the present "integrated value SAvem of the average decreasing change rate Avem" by adding the average decreasing change rate Avem newly obtained at step 2238 to the "integrated value SAvem of the average decreasing change rate Avem" at that time point.

Step 2244: The CPU increments a value of a counter Cn by "1". The value of the counter Cn indicates (represents) both the "number of data of the average increasing change rate Avep which is added (accumulated) to the integrated value SAvep" and the "number of data of the average decreasing change rate Avem which is added (accumulated) to the integrated value SAvem". It should be noted that the value of the counter Cn is set to (at) "0" by the initialization routine described above.

Subsequently, the CPU proceeds to step 2446 to determine whether or not the value of the counter Cn is equal to or larger than a threshold Cnth. At this time, when the value of the counter Cn is smaller than the threshold Cnth, the CPU makes a "No" determination at step 2246 to directly proceeds to step 2295 to end the present routine tentatively. It should be noted that it is preferable that the threshold Cnth be a natural number, and be equal to or larger than 2.

In contrast, if the value of the counter Cn is equal to or larger than the threshold Cnth when the CPU execute the process of step 2246, the CPU makes a "Yes" determination at step 2246 to execute processes of steps from step 2248 to step 2256 described below in order.

Step 2248: The CPU calculates an average (final average increasing change rate) AveΔAFp of the average increasing change rates Avep through dividing the "integrated value SAvep of the average increasing change rate Avep" by the counter Cn. The final average increasing change rate AveΔAFp is a value corresponding to the detected air-fuel ratio change rate ΔAF when the detected air-fuel ratio change rate ΔAF is positive (i.e., the value varying depending on ΔAF, the value being larger as the magnitude of ΔAF being larger). The final average increasing change rate AveΔAFp is one of the indicating amount of air-fuel ratio change rates, and is also referred to as an "increasing indicating amount of change rate".

Step 2250: The CPU calculates an average (final average decreasing change rate) AveΔAFm of the average decreasing change rates Avem through dividing the "integrated value SAvem of the average decreasing change rate Avem" by the counter Cn. The final average decreasing change rate AveΔAFm is a value corresponding to the detected air-fuel ratio change rate ΔAF when the detected air-fuel ratio change rate ΔAF is negative (i.e., the value varying depending on ΔAF, the value being larger as the magnitude of ΔAF being larger). The final average decreasing change rate AveΔAFm is one of the indicating amount of air-fuel ratio change rates, and is also referred to as an "decreasing indicating amount of change rate".

Step 2252: The CPU sets the value of the integrated value SAvep to (at) "0", and sets the value of the integrated value SAvem to (at) "0" (i.e., the value are cleared).

Step 2252: The CPU sets the value of the counter Cn to (at) "0" (i.e., the value is cleared).

Step 2256: The CPU sets a value of a determination execution flag Xhantei to (at) "1". The determination execution flag Xhantei indicates, when the value of the determination execution flag Xhantei is "1", that the data for performing the determination of an air-fuel ratio imbalance among cylinders (in the present example, the final average increasing change rate AveΔAFp and the final average decreasing change rate AveΔAFm) have been obtained, and the determination of an air-fuel ratio imbalance among cylinders can be performed using those data. Further, the value of the determination execution flag Xhantei is set to (at) "0" after the determination of an air-fuel ratio imbalance among cylinders is performed in the "routine shown in FIG. 23" described later. It should be noted that the value of the determination execution flag Xhantei is set to (at) "0" by the initialization routine described above.

Figure 23:
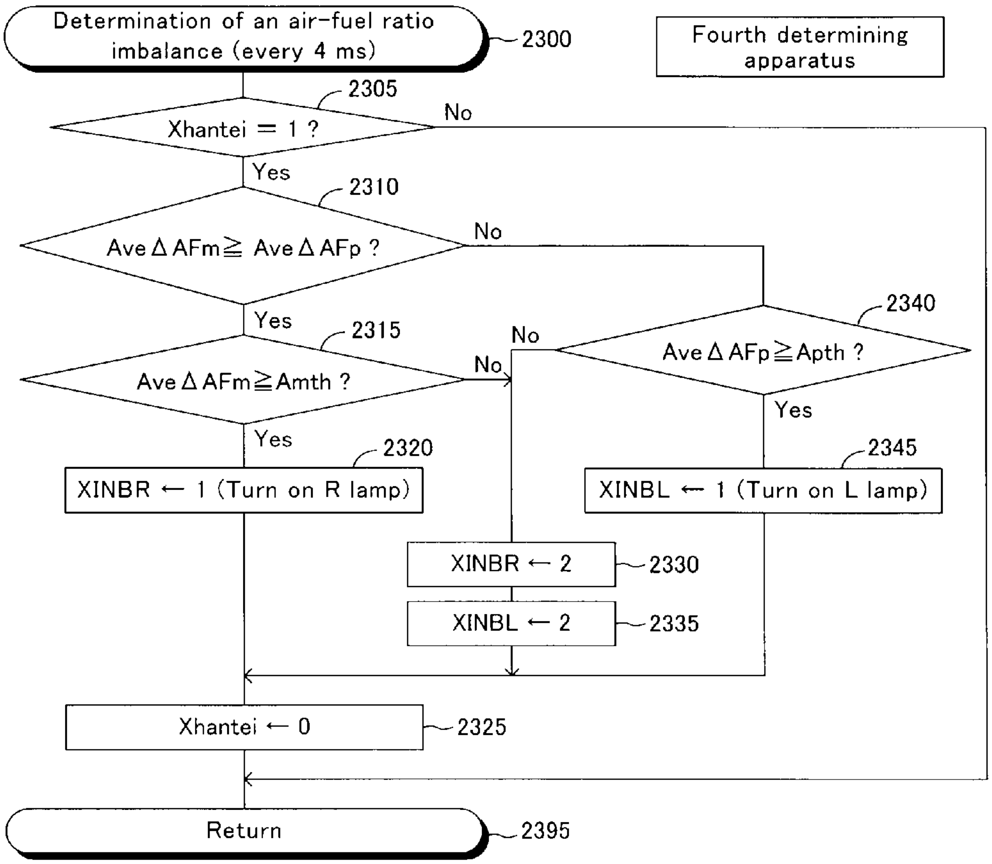
FIG. 23 is a flowchart showing a routine executed by the CPU of the fourth determining apparatus.

In the mean time, as described above, the CPU executes the "routine for determination of an air-fuel ratio imbalance among cylinders" shown by the flowchart in FIG. 23 every elapse of the predetermined time (4 ms). Accordingly, at an appropriate timing, the CPU starts process from step 2300 in FIG. 23 to proceed to step 2305, at which the CPU determines whether or not the value of the determination execution flag Xhantei is "1". When the value of the determination execution flag Xhantei is "0", the CPU makes a "No" determination at step 2305 to directly proceed to step 2395 to end the present routine tentatively.

In contrast, when the CPU executes the process of step 2305 immediately after the value of the determination execution flag Xhantei is set to (at) "1" at step 2256 in FIG. 22, the CPU makes a "Yes" determination at step 2305 to proceed to step 2310, at which the CPU determines whether or not the final average decreasing change rate AveΔAFm is equal to or larger than the final average increasing change rate AveΔAFp.

Meanwhile, the exhaust gas discharged from the cylinder which is in the rich-side deviation imbalance state or from the cylinder which is in the lean-side deviation imbalance state reaches the air-fuel ratio sensor 55, the output Vabyfs of the air-fuel ratio sensor drastically changes. Accordingly, as shown in (B) of FIG. 1, in a case in which the "air-fuel ratio imbalance among cylinders (i.e., the specific cylinder rich-side deviation imbalance state)" is occurring, in which only the air-fuel ratio of the specific cylinder (e.g., the first cylinder) deviates toward richer side than the stoichiometric air-fuel ratio, the magnitude (an absolute value |ΔAF|, or a magnitude of the inclination fo the detected air-fuel ratio abyfs) of the detected air-fuel ratio change rate ΔAF is larger when the detected air-fuel ratio abyfs is decreasing than when the detected air-fuel ratio abyfs is increasing (the magnitude α2>the magnitude α3).

To the contrary, as shown in (C) of FIG. 1, in a case in which the "air-fuel ratio imbalance among cylinders (i.e., the specific cylinder lean-side deviation imbalance state)" is occurring, in which only the air-fuel ratio of the specific cylinder (e.g., the first cylinder) deviates toward leaner side than the stoichiometric air-fuel ratio, the magnitude of the detected air-fuel ratio change rate ΔAF is larger when the detected air-fuel ratio abyfs is increasing than when the detected air-fuel ratio abyfs is decreasing (the magnitude α4>the magnitude α5).

In view of the above, the determining apparatus utilizes the phenomena to perform the determination of an air-fuel ratio imbalance among cylinders as follows.

It is now assumed that the final average decreasing change rate AveΔAFm is larger than the final average increasing change rate AveΔAFp. In this case, the CPU makes a "Yes" determination at step 2310 to proceed to step 2315, at which the CPU determines whether or not the final average decreasing change rate AveΔAFm is equal to or larger than a rich deviation determination threshold Amth. The rich deviation determination threshold Amth is also referred to as a "decreasing change rate threshold".

When the final average decreasing change rate AveΔAFm is equal to or larger than the rich deviation determination threshold Amth, the CPU makes a "Yes" determination at step 2315 to proceed to step 2320, at which the CPU sets a value of a rich-side deviation imbalance occurrence flag XINBR to (at) "1". That is, the CPU determines that the "rich-side deviation imbalance state" is occurring. Further, at this time, the CPU may turn on an unillustrated warning lamp. The warning lamp which is turned on at this time point may be different or the same as a warning lamp which is turned on when it is determined that the lean-side deviation imbalance state is occurring.

Subsequently, the CPU proceeds to step 2325 to set the value of the determination execution flag Xhantei to (at) "0", and proceeds to step 2395 to end the present routine tentatively.

In contrast, if the final average decreasing change rate AveΔAFm is smaller than the rich deviation determination threshold Amth when the CPU executes the process of step 2315, the CPU makes a "No" determination at step 2315 to proceed to step 2330, at which the CPU sets the value of a rich-side deviation imbalance occurrence flag XINBR to (at) "2". Thereafter, the CPU sets a value of a lean-side deviation imbalance occurrence flag XINBL to (at) "2" at step 2335, then proceeds to step 2395 through step 2325. It should be noted that, when the value of the rich-side deviation imbalance occurrence flag XINBR is "2", it is indicated that the rich-side deviation imbalance state is not occurring. Similarly, when the value of the lean-side deviation imbalance occurrence flag XINBL is "2", it is indicated that the lean-side deviation imbalance state is not occurring. Steps 2330 and 2335 may be omitted.

Further, if the final average decreasing change rate AveΔAFm is smaller than the final average increasing change rate AveΔAFp when the CPU executes the process of step 2310, the CPU makes a "No" determination at step 2310 to proceed to step 2340. At step 2340, the CPU determines whether or not the final average increasing change rate AveΔAFp is equal to or larger than a lean deviation determination threshold Apth. The lean deviation determination threshold Apth is also referred to as an "increasing change rate threshold".

When the final average increasing change rate AveΔAFp is equal to or larger than the lean deviation determination threshold Apth, the CPU makes a "Yes" determination at step 2340 to proceed to step 2345, at which the CPU sets the value of a lean-side deviation imbalance occurrence flag XINBL to (at) "1". That is, the CPU determines that the "lean-side deviation imbalance state" is occurring. Further, at this time, the CPU may turn on the unillustrated warning lamp. The warning lamp which is turned on at this time point may be different or the same as the warning lamp which is turned on when it is determined the rich-side deviation imbalance state is occurring.

Subsequently, the CPU proceeds to step 2325 to set the value of the determination execution flag Xhantei to (at) "0", and proceeds to step 2395 to end the present routine tentatively.

In contrast, if the final average increasing change rate AveΔAFp is smaller than the lean deviation determination threshold Apth when the CPU executes the process of step 2340, the CPU makes a "No" determination at step 2340 to proceed to step 2330, at which the CPU sets the value of the rich-side deviation imbalance occurrence flag XINBR to (at) "2". Thereafter, the CPU sets the value of the lean-side deviation imbalance occurrence flag XINBL to (at) "2" at step 2335, then proceeds to step 2395 through step 2325. In this manner, the fourth determining apparatus perform the determination of an air-fuel ratio imbalance among cylinders.

The CPU may set the value of the lean-side deviation imbalance occurrence flag XINBL to (at) "2" at step 2320. Similarly, the CPU may set the value of the rich-side deviation imbalance occurrence flag XINBR to (at) "2" at step 2345.

As described above, the fourth determining apparatus obtains, as the indicating amount of air-fuel ratio change rate, the final average increasing change rate AveΔAFp and the final average decreasing change rate AveΔAFm. Further, the fourth determining apparatus comprises the imbalance determining means which is configured so as to compare the "(the magnitude of) final average increasing change rate AveΔAFp" and the "lean deviation determination threshold Apth (increasing change rate threshold) serving as the imbalance determination threshold", and so as to determine whether or not the air-fuel ratio imbalance among cylinders state (lean-side deviation air-fuel ratio imbalance among cylinders state) is occurring based on the result of the comparison. Further, the imbalance determining means is configured so as to compare the "(magnitude of) final average decreasing change rate AveΔAFm" and the "rich deviation determination threshold Amth (decreasing change rate threshold) serving as the imbalance determination threshold", and so as to determine whether or not the air-fuel ratio imbalance among cylinders state (rich-side deviation air-fuel ratio imbalance among cylinders state) is occurring based on the result of the comparison.

Accordingly, the fourth determining apparatus, similarly to the first determining apparatus, has advantages that "it can perform determination of an air-fuel ratio imbalance among cylinders with high accuracy, and it can be developed with much shorter developing time".

Further, the imbalance determining means of the fourth determining apparatus is configured;

(1) so as to obtain the indicating amount of air-fuel ratio change rate (parameter used for the imbalance determination), discriminating between the "increasing indicating amount of change rate (i.e., final average increasing change rate AveΔAFp) when the detected air-fuel ratio change rate ΔAF is positive" and the "decreasing indicating amount of change rate (i.e., final average decreasing change rate AveΔAFm) when the detected air-fuel ratio change rate ΔAF is negative" (refer to step 2218 to step 2228, and step 2230 to step 2254);

(2) so as to compare the "magnitude of the increasing indicating amount of change rate (final average increasing change rate AveΔAFp)" with the "increasing change rate threshold (lean deviation determination threshold Apth) serving as the imbalance determination threshold" when the magnitude of the increasing indicating amount of change rate (final average increasing change rate AveΔAFp) is larger than the magnitude of the decreasing indicating amount of change rate (final average decreasing change rate AveiAFm), and so as to determine that the "air-fuel ratio imbalance among cylinders state (lean-side deviation imbalance state) is occurring in which the air-fuel ratio of one of the cylinders deviates toward leaner side with respect to the stoichiometric air-fuel ratio" when the magnitude of the increasing indicating amount of change rate is larger than the increasing change rate threshold (refer to step 2310 and step 2340, shown in FIG. 23); and (3) so as to compare the "magnitude of the decreasing indicating amount of change rate (final average decreasing change rate AveΔAFm)" with the "decreasing change rate threshold (rich deviation determination threshold Amth) serving as the imbalance determination threshold" when the magnitude of the decreasing indicating amount of change rate (final average decreasing change rate AveΔAFm) is larger than the magnitude of the increasing indicating amount of change rate (final average increasing change rate AveΔAFp), and so as to determine that the "air-fuel ratio imbalance among cylinders state (rich-side deviation imbalance state) is occurring in which the air-fuel ratio of one of the cylinders deviates toward richer side with respect to the stoichiometric air-fuel ratio" when the magnitude of the decreasing indicating amount of change rate is larger than the decreasing change rate threshold (refer to step 2310 and step 2315, shown in FIG. 23).

According to the configuration, it is possible to determine that the rich-side deviation imbalance state is occurring, the lean-side deviation imbalance state is occurring, or none of these is occurring, while discriminating these states.

Further, the imbalance determining means of the fourth determining apparatus is configured (refer to the routine shown in FIG. 22);

so as to obtain the output Vabyfs of the air-fuel ratio sensor every time the constant sampling period elapses (sampling time ts), so as to obtain, as the detected air-fuel ratio change rate ΔAF, a difference between air-fuel ratios, each being represented by each of the outputs of the air-fuel ratio sensor that are obtained consecutively before and after the sampling period (that is, the difference ΔAF between the present detected air-fuel ratio abyfs and the previous detected air-fuel ratio abyfsold);

so as to obtain, as the increasing indicating amount of change rate (that is, the final average increasing change rate AveΔAFp), the average of the change rates, each having a positive value, among a plurality of the detected air-fuel ratio change rates obtained in the data obtaining period longer than the sampling period; and so as to obtain, as the decreasing indicating amount of change rate (final average decreasing change rate AveΔAFm), the average of the change rates, each having a negative value, among a plurality of the detected air-fuel ratio change rates.

According to the configuration above, the fourth determining apparatus can reduce an adverse affect due to a noise superimposing on the output Vabyfs of the air-fuel ratio sensor on the indicating amount of air-fuel ratio change rate (increasing indicating amount of change rate and decreasing indicating amount of change rate). Therefore, the determination of an air-fuel ratio imbalance among cylinders can be performed with higher accuracy.

<Fifth Embodiment>

A control apparatus for the internal combustion engine (hereinafter, referred to as a "fifth determining apparatus") according to a fifth embodiment of the present invention will next be described.

The fifth determining apparatus, similarly to the fourth determining apparatus, obtains the final average increasing change rate AveΔAFp and the final average decreasing change rate AveΔAFm. Note that the fifth determining apparatus determines that the air-fuel ratio imbalance among cylinders state is occurring when the final average decreasing change rate AveΔAFm is equal to or larger than the rich deviation determination threshold Amth and the final average increasing change rate AveΔAFp is equal to or larger than the lean deviation determination threshold Apth.

Further, when the fifth determining apparatus determines that the air-fuel ratio imbalance among cylinders state is occurring, the fifth determining apparatus determines that the rich-side deviation imbalance state is occurring if the final average decreasing change rate AveΔAFm is larger than the final average increasing change rate AveΔAFp; and determines that the lean-side deviation imbalance state is occurring if the final average increasing change rate AveΔAFp is larger than the final average decreasing change rate AveΔAFm.

These features will next be described in detail.

Figure 24:
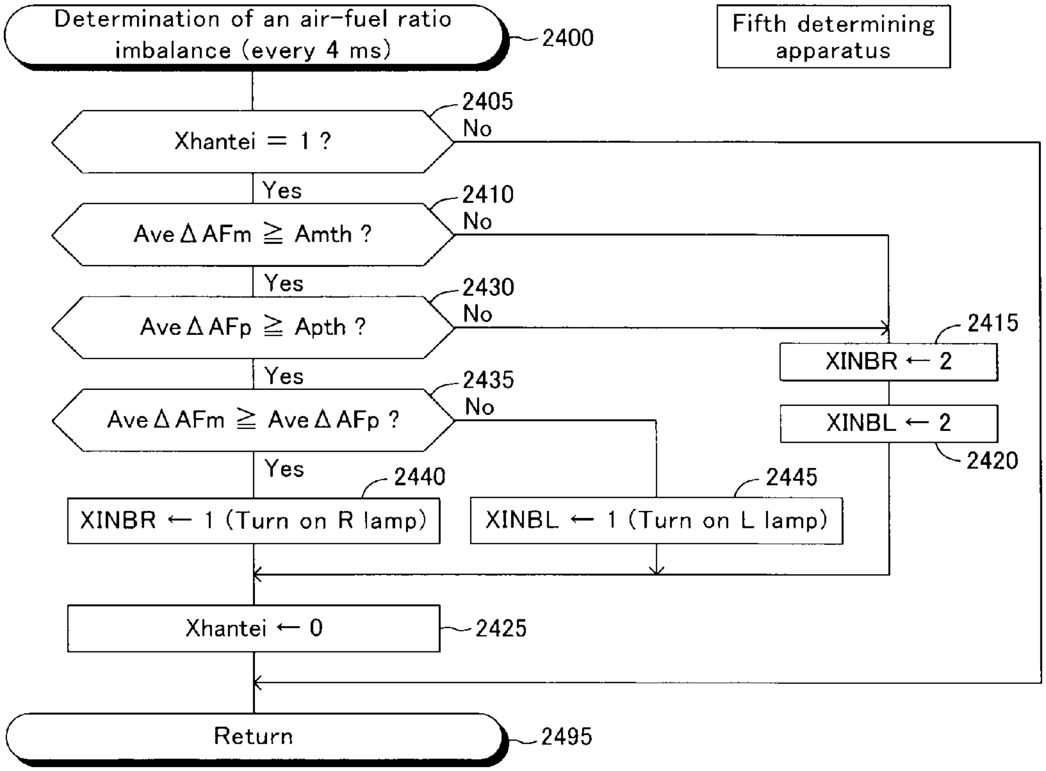
FIG. 24 is a flowchart showing a routine executed by a CPU of the air-fuel ratio imbalance among cylinders determining apparatus (fifth determining apparatus) according to a fifth embodiment of the present invention.

The CPU of the fifth determining apparatus is configured in such a manner that it executes the routines that the CPU of the fourth determining apparatus executes at the appropriate timings (except the routine shown in FIG. 23), and a "routine for determination of an air-fuel ratio imbalance among cylinders" shown by a flowchart in FIG. 24 every elapse of the predetermined time (4 ms) in place of the routine shown in FIG. 23.

Accordingly, similarly to the CPU of the fourth determining apparatus, the CPU obtains the final average increasing change rate AveΔAFp and the final average decreasing change rate AveΔAFm, and sets the determination execution flag Xhantei to (at) "1" (refer to the routine shown in FIG. 22).

On the other hand, the CPU starts a process from step 2400 in the routine of FIG. 24 at an appropriate predetermined timing to proceed to step 2405, at which the CPU determines whether or not the determination execution flag Xhantei is "1". Therefore, when the value of the determination execution flag Xhantei is changed to "1", the CPU makes a "Yes" determination at step 2405 to proceed to step 2410, at which the CPU determines whether or not the final average decreasing change rate AveΔAFm is equal to or larger than the decreasing change rate threshold Amth.

When the final average decreasing change rate AveΔAFm is smaller than the decreasing change rate threshold Amth, the CPU makes a "No" determination at step 2410 to execute processes of steps form step 2415 to step 2425 described below in order, and then proceeds to step 2495 to end the present routine tentatively.

Step 2415: The CPU sets the value of the rich-side deviation imbalance occurrence flag XINBR to (at) "2". That is, the CPU determines that the rich-side deviation imbalance state is not occurring.

Step 2420: The CPU sets the value of the lean-side deviation imbalance occurrence flag XINBL to (at) "2". That is, the CPU determines that the lean-side deviation imbalance state is not occurring.

Step 2425: The CPU sets the value of the determination execution flag Xhantei to (at) "0".

If the final average decreasing change rate AveΔAFm is equal to or larger than the decreasing change rate threshold Amth when the CPU executes the process of step 2410, the CPU makes a "Yes" determination at step 2410 to proceed to step 2430, at which the CPU determines whether or not the final average increasing change rate AveΔAFp is equal to or larger than the increasing change rate threshold Apth.

When the final average increasing change rate AveΔAFp is smaller than the increasing change rate threshold Apth, the CPU makes a "No" determination at step 2430 to execute processes of steps form step 2415 to step 2425 described above in order, and then proceeds to step 2495 to end the present routine tentatively.

In contrast, if the final average increasing change rate AveΔAFp is equal to or larger than the increasing change rate threshold Apth when the CPU executes the process of step 2430, the CPU makes a "Yes" determination at step 2430 to proceed to step 2435, at which the CPU determines whether or not the final average decreasing change rate AveΔAFm is equal to or larger than the final average increasing change rate AveΔAFp.

When the final average decreasing change rate AveΔAFm is equal to or larger than the final average increasing change rate AveΔAFp, the CPU makes a "Yes" determination at step 2440 to set the value of the rich-side deviation imbalance occurrence flag XINBR to (at) "1". That is, the CPU determines that the "rich-side deviation imbalance state" is occurring. Further, at this time, the CPU may turn on an unillustrated warning lamp. The warning lamp which is turned on at this time point may be different or the same as a warning lamp which is turned on when it is determined that the lean-side deviation imbalance state is occurring. Thereafter, the CPU proceeds to step 2495 via step 2425 to end the present routine tentatively.

If the final average decreasing change rate AveΔAFm is smaller than the final average increasing change rate AveΔAFp when the CPU executes the process of step 2435, the CPU makes a "No" determination at step 2435 to proceed to step 2445, at which the CPU sets the value of the lean deviation imbalance occurrence flag XINBL to (at) "1". That is, the CPU determines that the "lean-side deviation imbalance state" is occurring. Further, at this time, the CPU may turn on an unillustrated warning lamp. The warning lamp which is turned on at this time point may be different or the same as the warning lamp which is turned on when it is determined that the rich-side deviation imbalance state described above is occurring. Thereafter, the CPU proceeds to step 2495 via step 2425 to end the present routine tentatively.

It should be noted that, if the value of the determination execution flag Xhantei is "0" when the CPU executes the process of step 2405, the CPU makes a "No" determination at step 2405 to directly proceed to step 2495 so as to end the present routine tentatively.

The CPU may set the value of the lean-side deviation imbalance occurrence flag XINBL to (at) "2" at step 2440. Similarly, the CPU may further set the value of the rich-side deviation imbalance occurrence flag XINBR to (at) "2" at step 2445. In addition, the fifth determining apparatus may omit steps from step 2435 to step 2445, and may executes a routine in which the CPU sets the value of the imbalance occurrence flag XINB to (at) "1", when the CPU makes a "Yes" determination at step 2430. Further, in this case, in place of step 2415 and step 2420, a step for setting the value of the imbalance occurrence flag XINB to (at) "2" may be arranged at a position of step 2415.

As described above, the fifth determining apparatus, similarly to the fourth determining apparatus, obtains the final average increasing change rate AveΔAFp and the final average decreasing change rate AveΔAFm. Then, the fifth determining apparatus comprises the imbalance determining means for performing the determination of an air-fuel ratio imbalance among cylinders using those.

Accordingly, the fifth determining apparatus, similarly to the first determining apparatus, has advantages that "it can perform determination of an air-fuel ratio imbalance among cylinders with high accuracy, and it can be developed with much shorter developing time".

Further, the imbalance determining means of the fifth determining apparatus is configured;

(1) so as to obtain the indicating amount of air-fuel ratio change rate (parameter used for the imbalance determination), discriminating between the "increasing indicating amount of change rate (i.e., final average increasing change rate AveΔAFp) when the detected air-fuel ratio change rate ΔAF is positive" and the "decreasing indicating amount of change rate (i.e., final average decreasing change rate AveΔAFm) when the detected air-fuel ratio change rate ΔAF is negative" (refer to step 2218 to step 2228, and step 2230 to step 2254);

(2) so as to compare the "magnitude of the increasing indicating amount of change rate (final average increasing change rate AveΔAFp)" with the "increasing change rate threshold Apth serving as the imbalance determination threshold", and so as to compare the "magnitude of the decreasing indicating amount of change rate (final average decreasing change rate AveΔAFm)" with the "decreasing change rate threshold serving as the imbalance determination threshold"; and (3) so as to determine that the "air-fuel ratio imbalance among cylinders state is occurring, when the magnitude of the increasing indicating amount of change rate is larger than the increasing change rate threshold (AveΔAFp≧Apth), and the magnitude of the decreasing indicating amount of change rate is larger than the decreasing change rate threshold (AveΔAFm≧Amth) (refer to step 2410 and step 2430, shown in FIG. 24).

According to the configuration described above, the increasing change rate threshold Apth can be set to be different from the decreasing change rate threshold Amth, and therefore, the determination of an air-fuel ratio imbalance among cylinders can be performed with higher accuracy. For example, when the rich-side deviation imbalance state needs to be detected more accurately, the decreasing change rate threshold Amth may be set at a value larger than the increasing change rate threshold Apth. When the lean-side deviation imbalance state needs to be detected more accurately, the increasing change rate threshold Apth may be set at a value larger than the decreasing change rate threshold Amth. Note that the increasing change rate threshold Apth and the decreasing change rate Amth threshold can be set at the same value as each other. The increasing change rate threshold Apth and the decreasing change rate threshold Amth may be varied depending on a kind of the air-fuel ratio imbalance among cylinders states (lean-side deviation imbalance state or rich-side deviation imbalance state) to be detetected.

Further, the imbalance determining means of the fifth determining apparatus is configured, when the magnitude of the decreasing indicating amount of change rate is larger than the decreasing change rate threshold (refer to the "Yes" determination at step 2410) and the magnitude of the increasing indicating amount of change rate is larger than the increasing change rate threshold (refer to the "Yes" determination at step 2430);

so as to determine that the air-fuel ratio imbalance among cylinders state (lean-side deviation imbalance state) is occurring in which the air-fuel ratio of one of the cylinders deviates toward leaner side with respect to the stoichiometric air-fuel ratio, when the magnitude of the increasing indicating amount of change rate (final average increasing change rate AveΔAFp) is larger than the magnitude of the decreasing indicating amount of change rate (final average decreasing change rate AveΔAFm) (refer to step 2435 and step 2445); and so as to determine that the air-fuel ratio imbalance among cylinders state (rich-side deviation imbalance state) is occurring in which an air-fuel ratio of one of the at least two or more of the cylinders deviates toward richer side with respect to the stoichiometric air-fuel ratio, when the magnitude of the decreasing indicating amount of change rate (final average decreasing change rate AveΔAFm) is larger than the magnitude of the increasing indicating amount of change rate final (average increasing change rate AveΔAFp) (refer to step 2435 and step 2440).

Accordingly, it is possible to determine that the rich-side deviation imbalance state is occurring, the lean-side deviation imbalance state is occurring, or none of these is occurring, while discriminating these states.

Further, the imbalance determining means of the fifth determining apparatus is configured;

so as to obtain the output Vabyfs of the air-fuel ratio sensor every time the constant sampling period (sampling time ts) elapses, so as to obtain, as the detected air-fuel ratio change rate ΔAF, a difference between air-fuel ratios, each being represented by each of the outputs of the air-fuel ratio sensor that are obtained consecutively before and after the sampling period (that is, a difference ΔAF between the present detected air-fuel ratio abyfs and the previous detected air-fuel ratio abyfsold);

so as to obtain, as the increasing indicating amount of change rate (i.e., final average increasing change rate AveΔAFp), the average of the change rates, each having a positive value, among a plurality of the detected air-fuel ratio change rates obtained in the data obtaining period longer than the sampling period; and so as to obtain, as the decreasing indicating amount of change rate (i.e., final average decreasing change rate AveΔAFm), the average of the change rates, each having a negative value, among a plurality of the detected air-fuel ratio change rates (refer to the routine shown in FIG. 22).

Accordingly, the fifth determining apparatus can reduce the adverse affect due to a noise superimposing on the output Vabyfs of the air-fuel ratio sensor on the indicating amount of air-fuel ratio change rate (increasing indicating amount of change rate and decreasing indicating amount of change rate). Therefore, the determination of an air-fuel ratio imbalance among cylinders can be performed with higher accuracy.

<Sixth Embodiment>

A control apparatus for the internal combustion engine (hereinafter, referred to as a "sixth determining apparatus") according to a sixth embodiment of the present invention will next be described.

The sixth determining apparatus, similarly to the fourth and fifth determining apparatuses, obtains the indicating amount of air-fuel ratio change rates, discriminating a case in which the detected air-fuel ratio change rate ΔAF is positive and a case in which the detected air-fuel ratio change rate ΔAF is negative. Note that, the sixth determining apparatus obtains a maximum value of the magnitude of the detected air-fuel ratio change rate ΔAF (or, an average of a plurality of the maximum values) when the detected air-fuel ratio change rate ΔAF is positive, and a maximum value of the magnitude of the detected air-fuel ratio change rate ΔAF (or, an average of a plurality of the maximum values) when the detected air-fuel ratio change rate ΔAF is negative. The sixth determining apparatus performs the imbalance determination using those values.

These features will next be described in detail.

Figure 25:
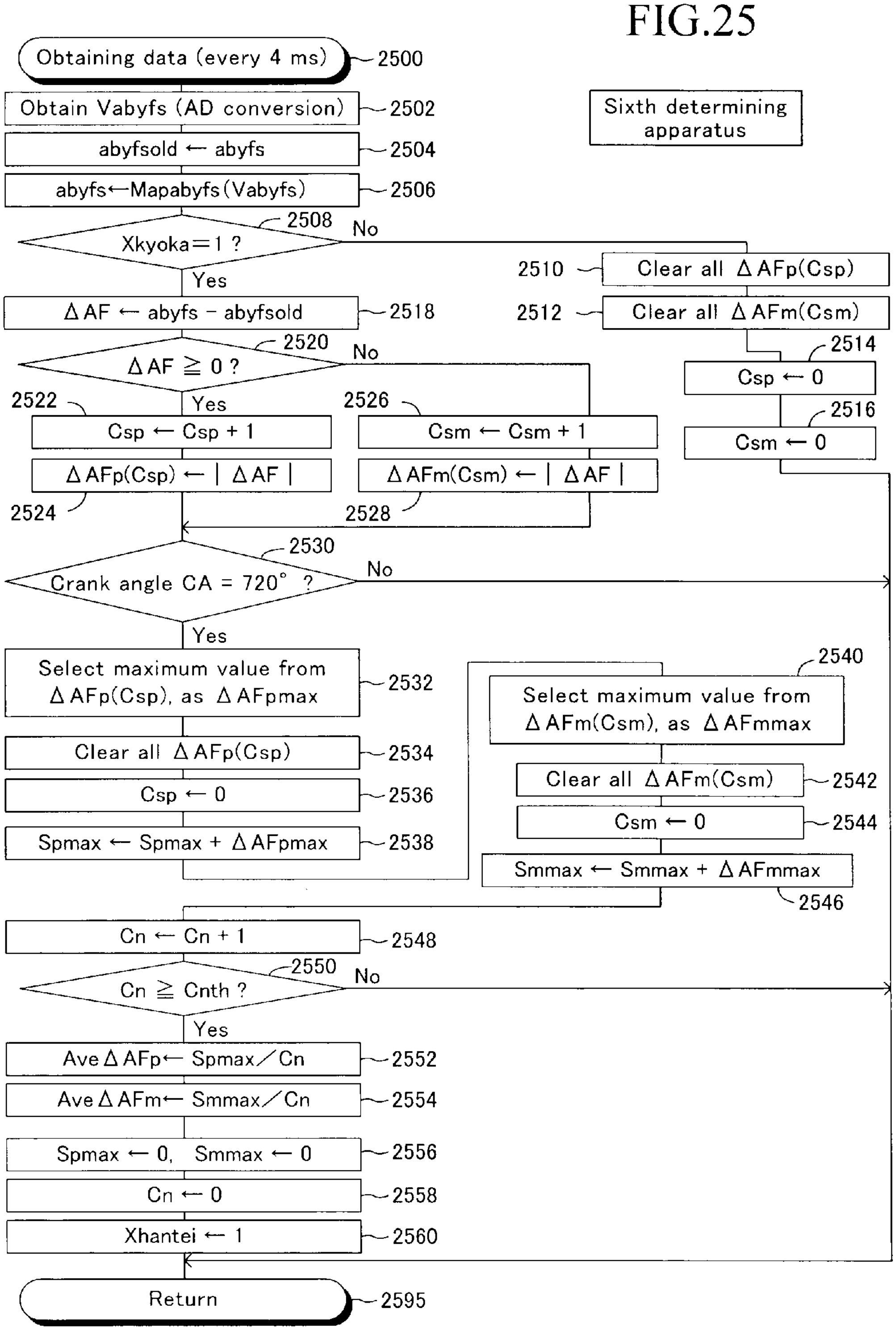
FIG. 25 is a flowchart showing a routine executed by a CPU of the air-fuel ratio imbalance among cylinders determining apparatus (sixth determining apparatus) according to a sixth embodiment of the present invention.

The CPU of the sixth determining apparatus is configured in such a manner that it executes the routines that the CPU of the fourth determining apparatus executes at the appropriate timings (except the routine shown in FIG. 22), and a "routine for obtaining data" shown by a flowchart in FIG. 25 every elapse of "4 ms (a predetermined sampling time ts)" in place of the routine shown in FIG. 22. The CPU of the sixth determining apparatus executes the "routine for the determination of an air-fuel ratio imbalance among cylinders" shown in FIG. 23, however, in place this routine, it may execute the "routine for the determination of an air-fuel ratio imbalance among cylinders" shown in FIG. 24.

At an appropriate timing, the CPU starts process from step 2500 in FIG. 25 to execute processes of steps from step 2502 to step 2506. Steps 2502, 2504, and 2506 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 2508 to determine whether or not the value of the determination allowable flag Xkyoka is "1". The value of the determination allowable flag Xkyoka is set in the routine shown in FIG. 20, similarly to the second determining apparatus.

It is assumed here that the value of the determination allowable flag Xkyoka is "0". In this case, the CPU makes a "No" determination at step 2508 to execute processes of steps from step 2510 to step 2516 described later in order, and then proceeds to step 2595 to end the present routine tentatively.

Step 2510: The CPU sets all of detected air-fuel ratio change rates ΔAFp(Csp) to (at) "0" (i.e., the values are cleared). The detected air-fuel ratio change rate ΔAFp(Csp) is a magnitude (absolute value |ΔAF|) of the detected air-fuel ratio change rate ΔAF stored corresponding to a value of the counter Csp at step 2524 described later, when the detected air-fuel ratio change rate ΔAF is positive.

Step 2512: The CPU sets all of detected air-fuel ratio change rates ΔAFm(Csm) to (at) "0" (i.e., the values are cleared). The detected air-fuel ratio change rate ΔAFm(Csm) is a magnitude (absolute value |ΔAF|) of the detected air-fuel ratio change rate ΔAF stored corresponding to a value of the counter Csm at step 2528 described later, when the detected air-fuel ratio change rate ΔAF is negative.

Step 2514: The CPU sets the value of the counter Csp to (at) "0". The value of the counter Csp is set to (at) "0" by the initialization routine described above.

Step 2516: The CPU sets the value of the counter Csm to (at) "0". The value of the counter Csm is also set to (at) "0" by the initialization routine described above.

Next, it is assumed here that the value of the determination allowable flag Xkyoka is changed to "1". In this case, the CPU makes a "Yes" determination at step 2508 to proceed to step 2518, at which the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to step 2520 to determine whether or not the detected air-fuel ratio change rate ΔAF is equal to or larger than "0" (whether it is a positive value including 0, or a negative value).

When the detected air-fuel ratio change rate ΔAF is equal to or larger than "0" (that is, the detected air-fuel ratio abyfs is increasing), the CPU makes a "Yes" determination at step 2520 to proceed to step 2522, at which the CPU increments the value of the counter Csp by "1".

Subsequently, the CPU proceeds to step 2524 to store an absolute value (|ΔAF|) of the detected air-fuel ratio change rate ΔAF as the Csp-th data ΔAFp(Csp). For example, if the present time is a "time immediately after the determination allowable flag Xkyoka is changed form 0 to 1", the value of the counter Csp is "1" (refer to step 2514 and step 2522). Accordingly, the absolute value of the detected air-fuel ratio change rate ΔAF presently obtained at step 2518 is stored as data ΔAFp(1).

In contrast, if the detected air-fuel ratio change rate ΔAF is smaller than "0" (that is, the detected air-fuel ratio abyfs is decreasing) when the CPU executes the process of step 2520, the CPU makes a "No" determination at step 2520 to proceed to step 2526, at which the CPU increments the value of the counter Csm by "1".

Subsequently, the CPU proceeds to step 2528 to store the absolute value (|ΔAF|) of the detected air-fuel ratio change rate ΔAF as the Csm-th data ΔAFm(Csm). For example, if the present time is a "time immediately after the determination allowable flag Xkyoka is changed form 0 to 1", the value of the counter Csm is "1" (refer to step 2516 and step 2526). Accordingly, the absolute value of the detected air-fuel ratio change rate ΔAF presently obtained at step 2518 is stored as data ΔAFm(1).

Subsequently, the CPU proceeds to step 2530 to determine whether or not the absolute crank angle CA coincides with 720° crank angle. When the absolute crank angle CA is smaller than 720° crank angle, the CPU makes a "No" determination at step 2530 to directly proceed to step 2595 to end the present routine tentatively.

Step 2530 is a step for defining a minimum unit period for which a maximum value ΔAFpmax of a magnitude of the increasing change rate ΔAFp and a maximum value ΔAFmmax of a magnitude of the decreasing change rate ΔAFm are obtained, and here, 720° crank angle (the unit combustion cycle period) corresponds to the minimum unit period.

On the other hand, if the absolute crank angle CA coincides with 720° crank angle when the CPU executes the process at step 2530, the CPU makes a "Yes" determination at step 2530 to execute processes of steps from step 2532 to step 2548 described below in order, and then, proceeds to step 2550.

Step 2532: The CPU selects a maximum value from (among) a plurality of the data ΔAFp(Csp), and stores the maximum value as an increasing-side maximum value ΔAFpmax. That is, the CPU selects, as the increasing-side maximum value ΔAFpmax, the largest value among a plurality of the data ΔAFp(Csp).

Step 2534: The CPU sets the all of a plurality of the data ΔAFp(Csp) to (at) "0" (i.e., the data are cleared).

Step 2536: The CPU sets the value of the counter Csp to (at) "0" (i.e., the value is cleared).

Step 2538: The CPU updates an integrated value Spmax of the increasing-side maximum value ΔAFpmax by adding the present increasing-side maximum value ΔAFpmax newly selected at step 2532 to the integrated value Spmax at that time point.

Step 2540: The CPU selects a maximum value from (among) a plurality of the data ΔAFm(Csm), and stores the maximum value as an decreasing-side maximum value ΔAFmmax. That is, the CPU selects, as the decreasing-side maximum value ΔAFmmax, the largest value among a plurality of the data ΔAFm(Csm).

Step 2542: The CPU sets the all of a plurality of the data ΔAFm(Csm) to (at) "0" (i.e., the data are cleared).

Step 2544: The CPU sets the value of the counter Csm to (at) "0" (i.e., the value is cleared).

Step 2546: The CPU updates an integrated value Smmax of the decreasing-side maximum value ΔAFmmax by adding the present decreasing-side maximum value ΔAFmmax newly selected at step 2540 to the integrated value Smmax at that time point.

Step 2548: The CPU increments the value of the counter Cn by "1". The value of the counter Cn indicates (represents) the number of data of the increasing-side maximum value ΔAFpmax and the decreasing-side maximum value ΔAFmmax added (accumulated) to "the integrated value Spmax and the integerated value Smmax", respectively. It should be noted that the value of the counter Cn is set to (at) "0" by the initialization routine described above.

Subsequently, the CPU proceeds to step 2550 to determine whether or not the value of the counter Cn is equal to or larger than a threshold Cnth. At this time, if the value of the counter Cn is smaller than the threshold Cnth, the CPU makes a "No" determination at step 2550 to directly proceeds to step 2595 to end the present routine tentatively. It should be noted that it is preferable that the threshold Cnth be a natural number, and be equal to or larger than 2.

In contrast, if the value of the counter Cn is equal to or larger than the threshold Cnth when the CPU executes the process of step 2550, the CPU makes a "Yes" determination at step 2550 to execute processes of steps from step 2552 to step 2560 described later in order, and then proceeds to step 2595 to end the present routine tentatively.

Step 2552: The CPU calculates an average (final average of the increasing-side maximum value) AveΔAFpmax of the increasing-side maximum values ΔAFpmax through dividing the "integrated value Spmax of the increasing-side maximum value ΔAFpmax" by the value of the counter Cn. The final average of the increasing-side maximum value AveΔAFpmax is stored as the final average increasing change rate AveΔAFp. The final average of the increasing-side maximum value AveΔAFpmax is a value corresponding to the detected air-fuel ratio change rate ΔAF (the value varying depending on ΔAF, or the value being larger as the maximum value of a plurality among the magnitudes of the detected air-fuel ratio change rates ΔAF obtained when the detected air-fuel ratio change rate ΔAF is positive being larger). The final average of the increasing-side maximum value AveΔAFpmax is an indicating amount of air-fuel ratio change rate in the sixth determining apparatus. It should be noted that the final average of the increasing-side maximum value AveΔAFpmax is equal to the increasing-side maximum value ΔAFpmax, when the threshold Cnth is "1".

Step 2554: The CPU calculates an average (final average of the decreasing-side maximum value) AveΔAFmmax of the decreasing-side maximum values ΔAFmmax through dividing the "integrated value Smmax of the decreasing-side maximum value ΔAFmmax" by the value of the counter Cn. The final average of the decreasing-side maximum value AveΔAFmmax is stored as the final average decreasing change rate AveΔAFm. The final average of the decreasing-side maximum value AveΔAFmmax is a value corresponding to the detected air-fuel ratio change rate ΔAF (the value varying depending on ΔAF, or the value being larger as the maximum value among the magnitudes of the detected air-fuel ratio change rates ΔAF obtained when the detected air-fuel ratio change rate ΔAF is negative being larger). The final average of the decreasing-side maximum value AveΔAFmmax is an indicating amount of air-fuel ratio change rate in the sixth determining apparatus. It should be noted that the final average of the decreasing-side maximum value AveΔAFmmax is equal to the decreasing-side maximum value ΔAFmmax, when the threshold Cnth is "1".

Step 2556: The CPU sets the "integrated value Spmax of the increasing-side maximum value ΔAFpmax" to (at) "0" (i.e., the value is cleared), and sets the "integrated value Smmax of the decreasing-side maximum value ΔAFmmax" to (at) "0" (i.e., the value is cleared).

Step 2558: The CPU sets the value of the counter Cn to (at) "0" (i.e., the value is cleared).

Step 2560: The CPU sets the value of a determination execution flag Xhantei to (at) "1". It should be noted that the value of the determination execution flag Xhantei is set to (at) "0" after the determination of an air-fuel ratio imbalance among cylinders is performed in the "routines shown in FIG. 23 of FIG. 24" described above. Further, the value of the determination execution flag Xhantei is set to (at) "0" by the initialization routine described above.

With the processes described above, the final average of the increasing-side maximum value AveΔAFpmax is obtained as the final average increasing change rate AveΔAFp, the final average of the decreasing-side maximum value AveΔAFmmax is obtained as the final average decreasing change rate AveΔAFm, and the value of the determination execution flag Xhantei is set to (at) "1". Accordingly, when the CPU proceeds to step 2305 in FIG. 23, it makes a "Yes" determination at step 2305, and performs the processes of steps from step 2310, based on the "thus obtained final average increasing change rate AveΔAFp" and the "thus obtained final average decreasing change rate AveΔAFm". Consequently, the determination of an air-fuel ratio imbalance among cylinders is performed.

It should be noted that the threshold Cnth used in step 2550 of FIG. 25 may be "1", as described above. In this case, the final average of the increasing-side maximum value AveΔAFpmax (final average increasing change rate AveΔAFp) is equal to the "increasing-side maximum value ΔAFpmax obtained at step 2532", and the final average of the decreasing-side maximum value AveΔAFmmax (final average decreasing change rate AveΔAFm) is equal to the "decreasing-side maximum value ΔAFmmax obtained at step 2540".

Also, as described above, the sixth determining apparatus may perform the "routine for determination of an air-fuel ratio imbalance among cylinders" shown by a flowchart in FIG. 24 in place of the routine shown in FIG. 23.

As described above, the sixth determining apparatus comprises the imbalance determining means which is configured;

(1) so as to obtain the output Vabyfs of the air-fuel ratio sensor every time the constant sampling period (sampling time ts) elapses, and to obtain, as the detected air-fuel ratio change rate ΔAF, a difference between air-fuel ratios, each being represented by each of the outputs Vabyfs of the air-fuel ratio sensor that are obtained consecutively before and after the sampling period (i.e, the difference ΔAF between the present detected air-fuel ratio abyfs and the previous detected air-fuel ratio abyfsold; and (2) so as to obtain, as the increasing indicating amount of change rate (i.e., the final average of the increasing-side maximum value AveΔAFpmax=the final average increasing change rate AveΔAFp), a value corresponding to the detected air-fuel ratio change rate whose magnitude is the largest among the change rates (ΔAFp(Csp)) of a plurality of the detected air-fuel ratio change rates, having positive values, obtained in a data obtaining period longer than the sampling period (refer to steps from step 2520 to step 2560, shown in FIG. 25); and to obtain, as the decreasing indicating amount of change rate (i.e., the final average of the decreasing-side maximum value AveΔAFmmax=the final average decreasing change rate AveΔAFm), a value corresponding to the detected air-fuel ratio change rate whose magnitude is the largest among the change rates (ΔAFm(Csm)) of a plurality of the detected air-fuel ratio change rates, having positive values.

According to the configuration above, it is more likely to obtain the increasing indicating amount of change rate and the decreasing indicating amount of change rate, in such a manner that the magnitudes of "the increasing indicating amount of change rate (final average of the increasing-side maximum value AveΔAFpmax) and the decreasing indicating amount of change rate (final average of the decreasing-side maximum value AveΔAFmmax)" that are obtained when the air-fuel ratio imbalance among cylinders state is occurring are larger than the magnitudes of "the increasing indicating amount of change rate and the decreasing indicating amount of change rate", respectively, that are obtained when the air-fuel ratio imbalance among cylinders is not occurring. Therefore, the determination of an air-fuel ratio imbalance among cylinders can be performed with high accuracy.

Further, the data obtaining period is set at a period which is a natural number Cnth times longer than the "unit combustion cycle period", the unit combustion cycle period being the "period necessary for any one of the cylinders among at least the two or more of the cylinders discharging exhaust gases which reach the exhaust-gas-aggregated-portion to complete one combustion cycle including an intake stroke, a compression stroke, an expansion stroke, and an exhaust stroke" (refer to step 2550 shown in FIG. 25).

In this manner, by setting the "period in which the maximum value of a plurality of the detected air-fuel ratio change rates, each having a positive value, is obtained" and the "period in which the maximum value of a plurality of the detected air-fuel ratio change rates, each having a negative value, is obtained" to (at) the "period which is the natural number times longer than the unit combustion cycle period", the indicating amount of air-fuel ratio change rate (the increasing indicating amount of change rate and the decreasing indicating amount of change rate) when the air-fuel ratio imbalance among cylinders state is occurring is certainly larger than the indicating amount of air-fuel ratio change rate when the air-fuel ratio imbalance among cylinders is not occurring. Consequently, the present determining apparatus can perform the determination of an air-fuel ratio imbalance among cylinders with higher accuracy.

Further, the imbalance determining means of the present determining apparatus is configured;

so as to select, as a maximum value of increasing change rate (ΔAFpmax), the detected air-fuel ratio change rate whose magnitude is the largest among the change rates (ΔAFp (Csp)), each having a positive value, in a plurality of the detected air-fuel ratio change rates obtained in the unit combustion cycle period, to obtain the average (AveΔAFpmax) of (a plurality of) the maximum value of increasing change rates, each being selected for each of a plurality of the unit combustion cycle periods, and to obtain the average as the increasing indicating amount of change rate (final average increasing change rate AveΔAFp); and so as to select, as a maximum value of decreasing change rate (ΔAFmmax), the detected air-fuel ratio change rate whose magnitude is the largest among change rates (ΔAFm (Csm)), each having a negative value, in a plurality of the detected air-fuel ratio change rates obtained in the unit combustion cycle period, to obtain an average (AveΔAFmmax) of (a plurality of) the maximum value of decreasing change rates, each being selected for each of a plurality of the unit combustion cycle periods, and to obtain the average as the decreasing indicating amount of change rate (final average decreasing change rate AveΔAFm) (refer to the routine shown in FIG. 25).

Accordingly, the present determining apparatus can reduce the adverse affect due to the noise superimposing on the output of the air-fuel ratio sensor on the indicating amount of air-fuel ratio change rate (increasing indicating amount of change rate and decreasing indicating amount of change rate). Therefore, the determination of an air-fuel ratio imbalance among cylinders can be performed with higher accuracy.

<Seventh Embodiment>

A control apparatus for the internal combustion engine (hereinafter, referred to as a "seventh determining apparatus") according to a seventh embodiment of the present invention will next be described.

The seventh determining apparatus, similarly to the fourth to sixth determining apparatuses, obtains the indicating amount of air-fuel ratio change rates, discriminating the case in which the detected air-fuel ratio change rate ΔAF is positive and the case in which the detected air-fuel ratio change rate ΔAF is negative.

Further, the seventh determining apparatus adopts, as the "indicating amount of air-fuel ratio change rate", the increasing indicating amount of change rate which corresponds to the magnitude of the detected air-fuel ratio change rate when the detected air-fuel ratio change rate is positive; and adopts, as the "imbalance determination threshold", a decreasing indicating amount of change rate which corresponds to a magnitude of the detected air-fuel ratio change rate when the detected air-fuel ratio change rate is negative.

Further, the seventh determining apparatus performs the determination of an air-fuel ratio imbalance among cylinders, based on a comparison between the magnitude of the indicating amount of air-fuel ratio change rate and the imbalance determination threshold, similarly to another apparatuses.

It should be noted that the seventh determining apparatus may;

adopt, as the "indicating amount of air-fuel ratio change rate", the decreasing indicating amount of change rate which corresponds to the magnitude of the detected air-fuel ratio change rate when the detected air-fuel ratio is negative, and adopt, as the "imbalance determination threshold", the increasing indicating amount of change rate which corresponds to the magnitude of the detected air-fuel ratio change rate when the detected air-fuel ratio change rate is positive.

These features will next be described in detail.

Figure 26:
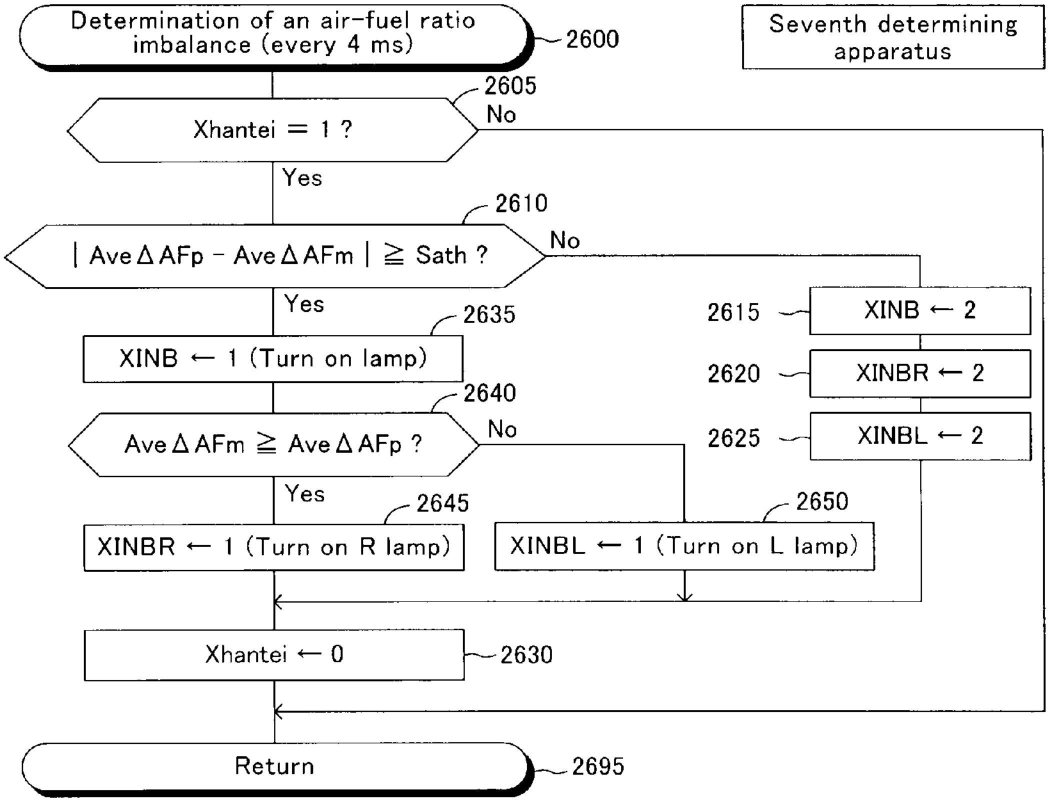
FIG. 26 is a flowchart showing a routine executed by a CPU of the air-fuel ratio imbalance among cylinders determining apparatus (seventh determining apparatus) according to a seventh embodiment of the present invention.

The CPU of the seventh determining apparatus is configured in such a manner that it executes the routines that the CPU of the fourth determining apparatus executes at the appropriate timings (except the routine shown in FIG. 23), and a "routine for determination of an air-fuel ratio imbalance among cylinders" shown by a flowchart in FIG. 26 every elapse of 4 ms (predetermined constant sampling time ts) in place of the routine shown in FIG. 23.

Accordingly, at an appropriate timing, the CPU starts a process from step 2600 shown in FIG. 26 to proceed to step 2605, at which the CPU determines whether or not the value of the determination execution flag Xhantei is "1". When the value of the determination execution flag Xhantei is not "1", the CPU directly proceeds to step 2695 to end the present routine tentatively. These processes are repeatedly executed.

Therefore, when the value of the determination execution flag Xhantei is changed to "1", the CPU makes a "Yes" determination at step 2605 to proceed to step 2610, at which the CPU determines whether or not a magnitude (absolute value) of a difference between the "magnitude of the final average increasing change rate AveΔAFp serving as the indicating amount of air-fuel ratio change rate" and the "final average decreasing change rate AveΔAFm serving as the imbalance determination threshold" is equal to or larger than the threshold Sath.

In the mean time, as shown in (A) of FIG. 1, when the air-fuel ratio imbalance among cylinders state is not occurring, a difference between the detected air-fuel ratio change rate ΔAF having a positive value and the detected air-fuel ratio change rate ΔAF having a negative value is extremely small, although the detected air-fuel ratio change rate ΔAF can be positive or negative. Accordingly, when the magnitude (absolute value) of the difference between the final average increasing change rate AveΔAFp and the final average decreasing change rate AveΔAFm is smaller than the threshold Sath, the CPU makes a "No" determination at step 2610 to execute processes of steps from step 2615 to step 2630 described below in order, and then proceeds to step 2695 to end the present routine tentatively.

Step 2615: The CPU sets the value of the imbalance occurrence flag XINB to (at) "2". That is, the CPU determines that the air-fuel ratio imbalance among cylinders state is not occurring.

Step 2620: The CPU sets the value of the rich-side deviation imbalance occurrence flag XINBR to (at) "2". That is, the CPU determines that the rich-side deviation air-fuel ratio imbalance among cylinders state is not occurring.

Step 2625: The CPU sets the value of the lean-side deviation imbalance occurrence flag XINBL to (at) "2". That is, the CPU determines that the lean-side deviation air-fuel ratio imbalance among cylinders state is not occurring.

Step 2630: The CPU sets the value of the determination execution flag Xhantei to (at) "0".

In contrast, it is now assumed that the rich-side deviation imbalance state is occurring. In this case, as shown in (B) of FIG. 1, the magnitude (absolute value) of the difference between the final average increasing change rate AveΔAFp and the final average decreasing change rate AveΔAFm becomes relatively large. Further, the magnitude of the final average decreasing change rate AveΔAFm (magnitude of the angle α2) is larger than the final average increasing change rate AveΔAFp (magnitude of the angle α3).

In view of the above, if the magnitude (absolute value) of the difference between the final average increasing change rate AveΔAFp and the final average decreasing change rate AveΔAFm is equal to or larger than the threshold Sath when the CPU executes the process of step 2610, the CPU makes a "Yes" determination at step 2610 to proceed to step 2635, at which the CPU sets the value of the imbalance occurrence flag XINB to (at) "1". That is, the CPU determines that the air-fuel ratio imbalance among cylinders state is occurring. Further, at this time, the CPU may turn on an unillustrated warning lamp.

Subsequently, the CPU proceeds to step 2640 to determine whether or not the final average decreasing change rate AveΔAFm is equal to or larger than the final average increasing change rate AveΔAFp. According to the assumption described above (i.e., the rich-side deviation imbalance state is occurring), the final average decreasing change rate AveΔAFm is equal to or larger than the final average increasing change rate AveΔAFp. Therefore, the CPU makes a "Yes" determination at step 2640 to proceed to step 2645, at which the CPU sets the rich-side deviation imbalance occurrence flag XINBR to (at) "1". That is, the CPU determines that the "rich-side deviation air-fuel ratio imbalance among cylinders state" is occurring. Further, at this time, the CPU may turn on an unillustrated warning lamp. Furthermore, the CPU may set the lean-side deviation imbalance occurrence flag XINBL to (at) "2".

Thereafter, the CPU proceeds to step 2630 to set the value of the determination execution flag Xhantei to (at) "0", and proceeds to step 2695 to end the present routine tentatively.

On the other hand, it is now assumed that the lean-side deviation imbalance state is occurring. In this case, as shown in (C) of FIG. 1, the magnitude (absolute value) of the difference between the final average increasing change rate AveΔAFp and the final average decreasing change rate AveΔAFm becomes relatively large. Further, the magnitude of the final average increasing change rate AveΔAFp (magnitude of the angle α4) is larger than the final average decreasing change rate AveΔAFm (magnitude of the angle α5).

In this case, the magnitude (absolute value) of the difference between the final average increasing change rate AveΔAFp and the final average decreasing change rate AveΔAFm is equal to or larger than the threshold Sath. Thus, when the CPU executes the process of step 2610, the CPU makes a "Yes" determination at step 2610 to proceed to step 2635, at which the CPU sets the value of the imbalance occurrence flag XINB to (at) "1".

Further, in this case, the final average decreasing change rate AveΔAFm is smaller than the final average increasing change rate AveΔAFp. Therefore, the CPU makes a "No" determination at step 2640 to proceed to step 2650, at which the CPU sets the value of the lean-side deviation imbalance occurrence flag XINBL to (at) "1". That is, the CPU determines that the "lean-side deviation air-fuel ratio imbalance among cylinders state" is occurring. Further, at this time, the CPU may turn on an unillustrated warning lamp. Furthermore, the CPU may set the rich-side deviation imbalance occurrence flag XINBR to (at) "2".

Thereafter, the CPU sets the determination execution flag Xhantei to (at) "0" at step 2630, and proceeds to step 2695 to end the present routine tentatively.

As described above, the seventh determining apparatus obtains the indicating amount of air-fuel ratio change rates, discriminating the case in which the detected air-fuel ratio change rate ΔAF is positive and the case in which the detected air-fuel ratio change rate ΔAF is negative. That is, the seventh determining apparatus obtains the final average decreasing change rate AveΔAFm and the final average increasing change rate AveΔAFp.

Further, the seventh determining apparatus comprises the imbalance determination means which is configured;

so as to adopt, as the “indicating amount of air-fuel ratio change rate”, the increasing indicating amount of change rate (that is, the final average increasing change rate AveΔAFp) which is a value corresponding to the magnitude (|ΔAF|) of the detected air-fuel ratio change rate ΔAF when the detected air-fuel ratio change rate ΔAF is positive; and so as to adopt, as the “imbalance determination threshold”, the decreasing indicating amount of change rate (that is, the final average decreasing change rate AveΔAFm) which is a value corresponding to a magnitude (|ΔAF|) of the detected air-fuel ratio change rate ΔAF when the detected air-fuel ratio change rate ΔAF is negative.

Further, the seventh determining apparatus performs the determination of an air-fuel ratio imbalance among cylinders, based on the comparison between the magnitude of the indicating amount of air-fuel ratio change rate (final average increasing change rate AveΔAFp) and the imbalance determination threshold (final average decreasing change rate AveΔAFm), similarly to another apparatuses (refer to step 2610 shown in FIG. 26).

It should be noted that the imbalance determining means of the seventh determining apparatus may be configured;

so as to adopt, as the “indicating amount of air-fuel ratio change rate”, the decreasing indicating amount of change rate (that is, the final average decreasing change rate AveΔAFm) which is the value corresponding to a magnitude (|ΔAF|) of the detected air-fuel ratio change rate ΔAF when the detected air-fuel ratio change rate ΔAF is negative; and so as to adopt, as the “imbalance determination threshold”, the increasing indicating amount of change rate (that is, the final average increasing change rate AveΔAFp) which is the value corresponding to the magnitude (|ΔAF|) of the detected air-fuel ratio change rate ΔAF when the detected air-fuel ratio change rate ΔAF is positive.

As described above, in any of both cases, one in which the rich-side deviation imbalance state is occurring, the other one in which the lean-side deviation imbalance state is occurring, the magnitude of the difference between the increasing indicating amount of change rate obtained as described above (final average increasing change rate AveΔAFp) and the decreasing indicating amount of change rate obtained as described above (final average decreasing change rate AveΔAFm) (that is, the difference between the magnitude of the indicating amount of air-fuel ratio change rate and the imbalance determination threshold) becomes prominently larger than one when the air-fuel ratio imbalance among cylinders state is not occurring.

Meanwhile, there may be a case where a noise (disturbance) superimposes on the output Vabyfs of the air-fuel ratio sensor, due to an introduction of an evaporated fuel gas into the combustion chambers, an introduction of an EGR gas into the combustion chambers, an introduction of a blow-by gas into the combustion chambers, or the like. In such a case, the noise superimposes evenly between when the detected air-fuel ratio change rate is positive and when the detected air-fuel ratio change rate is negative. Thus, the magnitude (absolute value) of the difference between the increasing indicating amount of change rate and the decreasing indicating amount of change rate is a value obtained by eliminating the affect caused by the noise.

Accordingly, the seventh determining apparatus can perform the determination of an air-fuel ratio imbalance among cylinders while reducing the affect caused by the noise superimposing on the output Vabyfs of the air-fuel ratio sensor.

Further, the seventh determining apparatus may execute the routine shown in FIG. 24, in place of the routine shown in FIG. 22. By this configuration, the average (final average of the increasing-side maximum value) AveΔAFpmax of the increasing-side maximum values ΔAFpmax is adopted as the “indicating amount of air-fuel ratio change rate (or the imbalance determination threshold)”. In addition, by this configuration, the average (final average of the decreasing-side maximum value) AveΔAFmmax of the decreasing-side maximum values ΔAFmmax is adopted as the “imbalance determination threshold (or the indicating amount of air-fuel ratio change rate)”.

Furthermore, the imbalance determining means of the seventh determining apparatus is configured;

so as to determine whether or not the magnitude of the difference between the increasing indicating amount of change rate and the decreasing indicating amount of change rate (|final average increasing change rate AveΔAFp−final average decreasing change rate AveΔAFm|) is equal to or larger than the threshold Sath, and determine that the determination of an air-fuel ratio imbalance among cylinders state is occurring when the difference is equal to or larger than the threshold Sath (step 2610 and step 2635);

so as to determine that the air-fuel ratio imbalance among cylinders state is occurring in which an air-fuel ratio of one of the at least two or more of the cylinders deviates toward richer side with respect to the stoichiometric air-fuel ratio, when the decreasing indicating amount of change rate is larger than the increasing indicating amount of change rate (step 2640 and step 2645); and so as to determine that the air-fuel ratio imbalance among cylinders state is occurring in which an air-fuel ratio of one of the at least two or more of the cylinders deviates toward leaner side with respect to the stoichiometric air-fuel ratio, when the increasing indicating amount of change rate is larger than the decreasing indicating amount of change rate (step 2640 and step 2650).

As described above, magnitude relation between the magnitude of the increasing indicating amount of change rate and the magnitude of the decreasing indicating amount of change rate is different between when the specific cylinder rich-side deviation imbalance state is occurring and when specific cylinder lean-side deviation imbalance state is occurring. Therefore, the seventh determining apparatus can determine that the rich-side deviation imbalance state is occurring, or the lean-side deviation imbalance state is occurring, while discriminating these states.

<Eighth Embodiment>

A control apparatus for the internal combustion engine (hereinafter, referred to as an “eighth determining apparatus”) according to an eighth embodiment of the present invention will next be described.

The eighth determining apparatus, similarly to the fourth to seventh determining apparatuses, obtains the indicating amount of air-fuel ratio change rates, discriminating the case in which the detected air-fuel ratio change rate ΔAF is positive and the case in which the detected air-fuel ratio change rate ΔAF is negative.

Note that the eighth determining apparatus obtains the indicating amount of air-fuel ratio change rate (increasing indicating amount of change rate and decreasing indicating amount of change rate) using detected air-fuel ratio change rates ΔAF whose magnitude |ΔAF| is equal to or larger than the effective determination threshold Yukoth.

In addition, the eighth determining apparatus performs the determination of an air-fuel ratio imbalance among cylinders using the routine shown in FIG. 23. Note that, the eighth determining apparatus may perform the determination of an air-fuel ratio imbalance among cylinders using either the routine shown in FIG. 24 or the routine shown in FIG. 26.

These features will next be described in detail.

Figure 27:
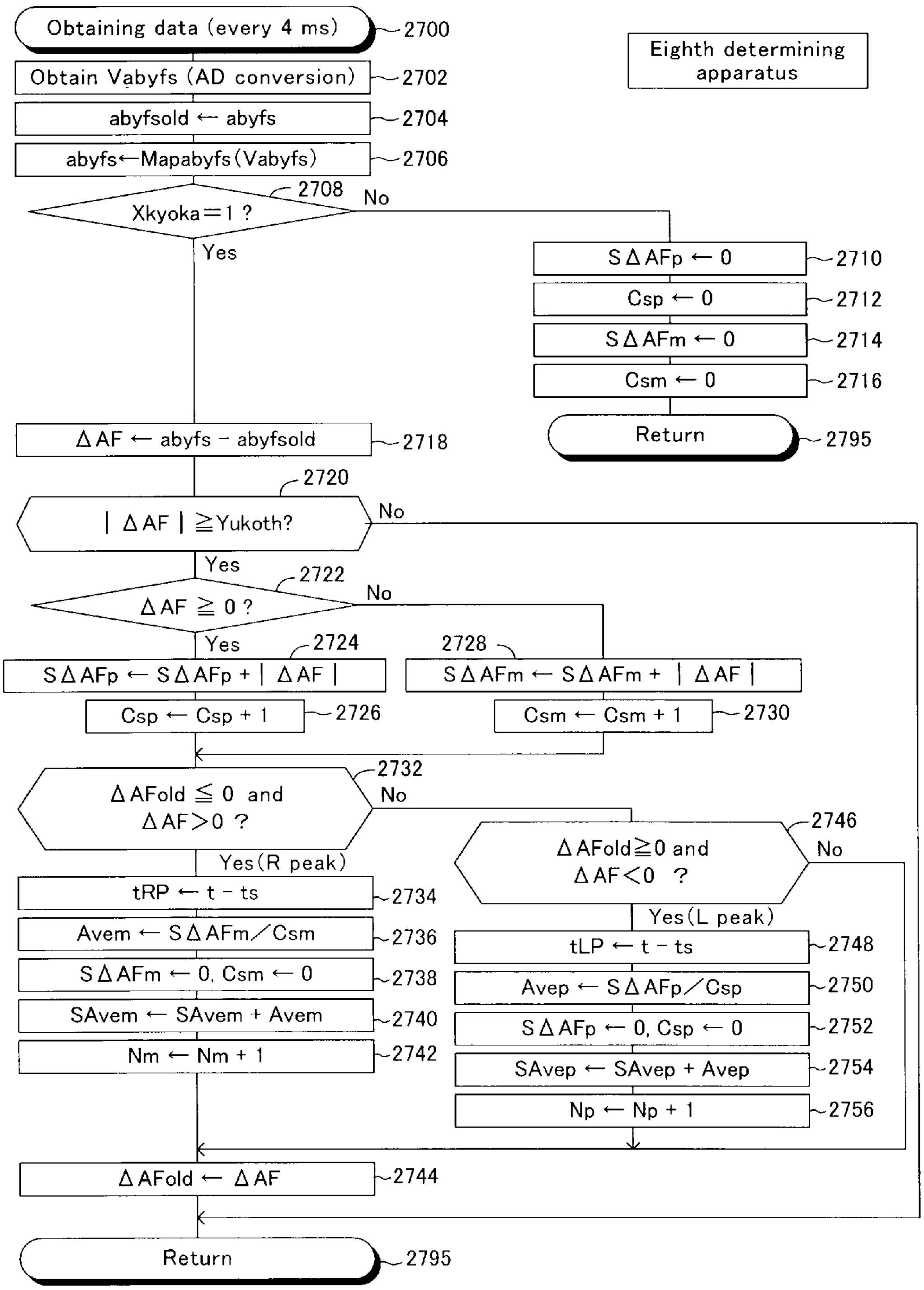
FIG. 27 is a flowchart showing a routine executed by a CPU of the air-fuel ratio imbalance among cylinders determining apparatus (eighth determining apparatus) according to an eighth embodiment of the present invention.

The CPU of the eighth determining apparatus is configured in such a manner that it executes the routines that the CPU of the fourth determining apparatus executes at the appropriate timings (except the routine shown in FIG. 22), and a “routine for obtaining data” shown by a flowchart in FIG. 27 every elapse of “4 ms (predetermined constant sampling time ts)” in place of the routine shown in FIG. 22. Further, the CPU of the eighth determining apparatus is configured in such a manner that it executes a “routine for processing data” shown by a flowchart in FIG. 28 every elapse of “4 ms (predetermined constant sampling time ts)”, Accordingly, at an appropriate timing, the CPU starts a process from step 2700 shown in FIG. 27 to execute processes of steps from step 2702 to step 2706. Steps 2702, 2704, and 2706 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 2708 to determine whether or not the value of a determination allowable flag Xkyoka is “1”. The value of the determination allowable flag Xkyoka is set in the routine shown in FIG. 20, similarly to the second determining apparatus.

It is assumed here that the value of the determination allowable flag Xkyoka is “0”. In this case, the CPU makes a “No” determination at step 2708 to execute processes of steps from step 2710 to step 2716 described below in order, and proceeds to step 2795 to end the present routine tentatively.

Step 2710: The CPU sets a value of an integrated value SΔAFp (increasing change rate integrated value SΔAFp) of the “increasing change rate ΔAFp which is a positive detected air-fuel ratio change rate ΔAF” to (at) “0” (the value is cleared).

Step 2712: The CPU sets a value of the counter Csp to (at) “0” (i.e., the value is cleared). It should be noted that the value of the counter Csp is set to (at) “0” by the initialization routine described above.

Step 2714: The CPU sets a value of an integrated value SΔAFm (decreasing change rate integrated value SΔAFm) of the “decreasing change rate ΔAFm which is a negative detected air-fuel ratio change rate ΔAF” to (at) “0” (the value is cleared).

Step 2716: The CPU sets a value of the counter Csm to (at) “0” (i.e., the value is cleared). It should be noted that the value of the counter Csm is set to (at) “0” by the initialization routine described above.

Next, it is assumed that the value of the determination allowable flag Xkyoka is changed to “1”. In this case, the CPU makes a “Yes” determination at step 2708 to proceed to 2718, at which the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to step 2720 to determine whether or not the magnitude (absolute value |ΔAF| of ΔAF) of the detected air-fuel ratio change rate ΔAF is equal to or larger than an effective determination threshold Yukoth. The effective determination threshold Yukoth is a value obtained by adding a predetermined value δ serving as a margin to an average or a maximum value of the magnitude (|ΔAF|) of the detected air-fuel ratio change rate ΔAF when the individual-cylinder-air-fuel-ratios are substantially the same as each other. Thus, the effective determination threshold Yukoth is determined to be roughly equal to a noise superimposing on the output Vabyfs of the air-fuel ratio sensor.

When the magnitude (absolute value |ΔAF| of ΔAF) of the detected air-fuel ratio change rate ΔAF is smaller than the effective determination threshold Yukoth, the CPU makes a “No” determination at step 2720 to directly proceed to step 2795 to end the present routine tentatively.

In contrast, if the magnitude (absolute value |ΔAF| of ΔAF) of the detected air-fuel ratio change rate ΔAF is equal to or larger than the effective determination threshold Yukoth, the CPU makes a “Yes” determination at step 2720 to proceed to step 2722, at which the CPU determines whether or not the detected air-fuel ratio change rate ΔAF is equal to or larger than “0” (whether ΔAF is a positive value including “0”, or a negative value).

When the detected air-fuel ratio change rate ΔAF is equal to or larger than “0” (that is, the detected air-fuel ratio abyfs is increasing), the CPU makes a “Yes” determination at step 2722 to proceed to step 2724, at which the CPU updates the increasing change rate integrated value SΔAFp by adding the absolute value (|ΔAF|) of the detected air-fuel ratio change rate ΔAF obtained at step 2718 to the increasing change rate integrated value SΔAFp at that time point. It should be noted that, in this case, the detected air-fuel ratio change rate ΔAF is positive, and thus, the increasing change rate integrated value SΔAFp can be updated by adding the detected air-fuel ratio change rate ΔAF to the increasing change rate integrated value SΔAFp at that time point.

Subsequently, the CPU proceeds to step 2726 to increment the value of the counter Csp by “1”. The value of the counter Csp indicates (represents) the number of data of the detected air-fuel ratio change rate ΔAF which is added (accumulated) to the increasing change rate integrated value SΔAFp. Thereafter, the CPU proceeds to step 2732.

In contrast, if the value of the detected air-fuel ratio change rate ΔAF is smaller than “0” (that is, the detected air-fuel ratio abyfs is decreasing) when the CPU executes the process of step 2722, the CPU makes a “No” determination at step 2722 to proceed to step 2728, at which the CPU updates the decreasing change rate integrated value SΔAFm by adding an absolute value (|ΔAF|) of the detected air-fuel ratio ΔAF obtained at step 2718 to the decreasing change rate integrated value SΔAFm at that time point.

Subsequently, the CPU proceeds to step 2730 to increment a value of a counter Csm by “1”. The value of the counter Csm indicates (represents) the number of data of the detected air-fuel ratio change rate ΔAF which is added (accumulated) to the decreasing change rate integrated value SΔAFm. Thereafter, the CPU proceeds to step 2732.

At step 2732, the CPU determines whether or not a previous detected air-fuel ratio change rate ΔAFold (detected air-fuel ratio change rate ΔAF, obtained at step 2718 when the present routine was executed 4 ms ago, and stored at step 2744 which will be described later) is equal to or smaller than “0”, and whether or not the present detected air-fuel ratio change rate ΔAF obtained at step 2718 is larger than “0”. That is, at step 2732, the CPU determines whether or not the inclination of the detected air-fuel ratio abyfs has changed from a negative value to a positive value (i.e., whether or not the detected air-fuel ratio abyfs passes a “rich peak” which is a peak being convex downward).

When the previous detected air-fuel ratio change rate ΔAFold is equal to or smaller than “0”, and the present detected air-fuel ratio change rate ΔAF is larger than “0”, the CPU makes a “Yes” determination at step 2732 to execute processes of step 2734 to step 2744 described below in order, and then proceeds to step 2795 to end the present routine tentatively.

Step 2734: The CPU obtains, as a "rich peak time point tRP", a time point the sampling time ts before the present time point t. That is, since it is confirmed that the detected air-fuel ratio change rate ΔAF has changed form the negative value to the positive value at the present time point, the CPU infers that the detected air-fuel ratio abyfs reached the rich peak the sampling time ts before the present time point t. It should be noted that the CPU may infer that the detected air-fuel ratio abyfs reached the rich peak at the present time point t.

Step 2736: The CPU calculates an average (average decreasing change rate Avem) of the decreasing change rate ΔAFm through dividing the decreasing change rate integrated value SΔAFm by the counter Csm.

Step 2738: The CPU sets the decreasing change rate integrated value SΔAFm and the counter Csm to (at) "0", respectively (the values are cleared).

Step 2740: The CPU updates an integrated value SAvem of the average decreasing change rate Avem. Specifically, the CPU calculates the present "integrated value SAvem of the average decreasing change rate Avem" by adding the present average decreasing change rate Avem newly obtained at step 2736 to the "integrated value SAvem of the average decreasing change rate Avem" at that time point.

Step 2742: The CPU increments a value of a counter Nm by "1".

Step 2744: The CPU stores, as the previous detected air-fuel ratio change rate ΔAFold, the detected air-fuel ratio change rate ΔAF obtained at step 2718. Thereafter, the CPU proceeds to step 2795 to end the present routine tentatively.

In contrast, if the previous detected air-fuel ratio change rate ΔAFold is larger than "0" or the present detected air-fuel ratio change rate ΔAF is equal to or smaller than "0" when the CPU executes the process of step 2732, the CPU makes a "No" determination at step 2732 to proceed to step 2746. At step 2746, the CPU determines whether or not the "previous detected air-fuel ratio change rate ΔAFold is equal to or larger than "0", and the present detected air-fuel ratio change rate ΔAF is smaller than "0"". That is, at step 2746, the CPU determines whether or not the inclination of the detected air-fuel ratio abyfs has changed from a positive value to a negative value (i.e., whether or not the detected air-fuel ratio abyfs passes a "lean peak" which is a peak being convex upward).

When the previous detected air-fuel ratio change rate ΔAFold is equal to or larger than "0", and the present detected air-fuel ratio change rate ΔAF is smaller than "0", the CPU makes a "Yes" determination at step 2746 to execute processes of steps from step 2748 to step 2756 described below in order, and then proceeds to step 2795 via step 2744.

Step 2748: The CPU obtains, as a "lean peak time point tLP", a time point the sampling time ts before the present time point t. That is, since it is confirmed that the detected air-fuel ratio change rate ΔAF has changed form the positive value to the negative value at the present time point, the CPU infers that the detected air-fuel ratio abyfs reached the lean peak the sampling time ts before the present time point t. It should be noted that the CPU may infer that the detected air-fuel ratio abyfs reached the lean peak at the present time point t.

Step 2750: The CPU calculates an average (average increasing change rate Avep) of the increasing change rate ΔAFp through dividing the increasing change rate integrated value SΔAFp by the counter Csp.

Step 2752: The CPU sets the increasing change rate integrated value SΔAFp and the counter Csp to (at) "0", respectively (the values are cleared).

Step 2754: The CPU updates an integrated value SAvep of the average increasing change rate Avep. Specifically, the CPU calculates the present "integrated value SAvep of the average increasing change rate Avep" by adding the present average increasing change rate Avep newly obtained at step 2750 to the "integrated value SAvep of the average increasing change rate Avep" at that time point.

Step 2756: The CPU increments a value of a counter Np by "1".

To the contrary, if the previous detected air-fuel ratio change rate ΔAFold is smaller than "0", or the present detected air-fuel ratio change rate ΔAF is equal to or larger than "0", when the CPU executes the process of step 2746, the CPU makes a "No" determination at step 2746 to proceed to step 2795 via step 2744.

In this manner, the CPU of the eighth determining apparatus detects the rich peak at step 2732. Further, when the rich peak is detected, the CPU calculates the average decreasing change rate Avem through dividing the decreasing change rate integrated value SΔAFm by the counter Csm (step 2736), and clear the value of the decreasing change rate integrated value SΔAFm and the value of the counter Csm (step 2738). The decreasing change rate integrated value SΔAFm is the integrated value of the absolute value (|ΔAF|) of the detected air-fuel ratio ΔAF when the detected air-fuel ratio change rate ΔAF is negative (step 2728). The counter Csm indicates the number of data of the detected air-fuel ratio change rate ΔAF which is added (accumulated) to the decreasing change rate integrated value SΔAFm (step 2730). Accordingly, the average decreasing change rate Avem becomes equal to an average of the magnitudes of the detected air-fuel ratio change rates ΔAF, each having a negative value, obtained from the previous rich peak to the present rich peak.

Similarly, when the lean peak is detected, the CPU calculates the average increasing change rate Avep through dividing the increasing change rate integrated value SΔAFp by the counter Csp (step 2750), and clear the value of the increasing change rate integrated value SΔAFp and the value of the counter Csp (step 2752). The increasing change rate integrated value SΔAFp is the integrated value of the absolute value (|ΔAF|) of the detected air-fuel ratio ΔAF when the detected air-fuel ratio change rate ΔAF is positive (step 2724). The counter Csp indicates the number of data of the detected air-fuel ratio change rate ΔAF which is added (accumulated) to the increasing change rate integrated value SΔAFp (step 2726). Accordingly, the average increasing change rate Avep becomes equal to an average of the magnitudes of the detected air-fuel ratio change rates ΔAF, each having a positive value, obtained from the previous lean peak to the present lean peak.

Further, the CPU does not use the detected air-fuel ratio change rate (invalid data) ΔAF whose magnitude (absolute value |ΔAF| of the detected air-fuel ratio change rate ΔAF) is smaller than the effective determination threshold Yukoth, for the calculation of the average increasing change rate Avep and the average decreasing change rate Avem (refer to the case in which the CPU directly proceeds to step 2795 from step 2720).

Figure 28:
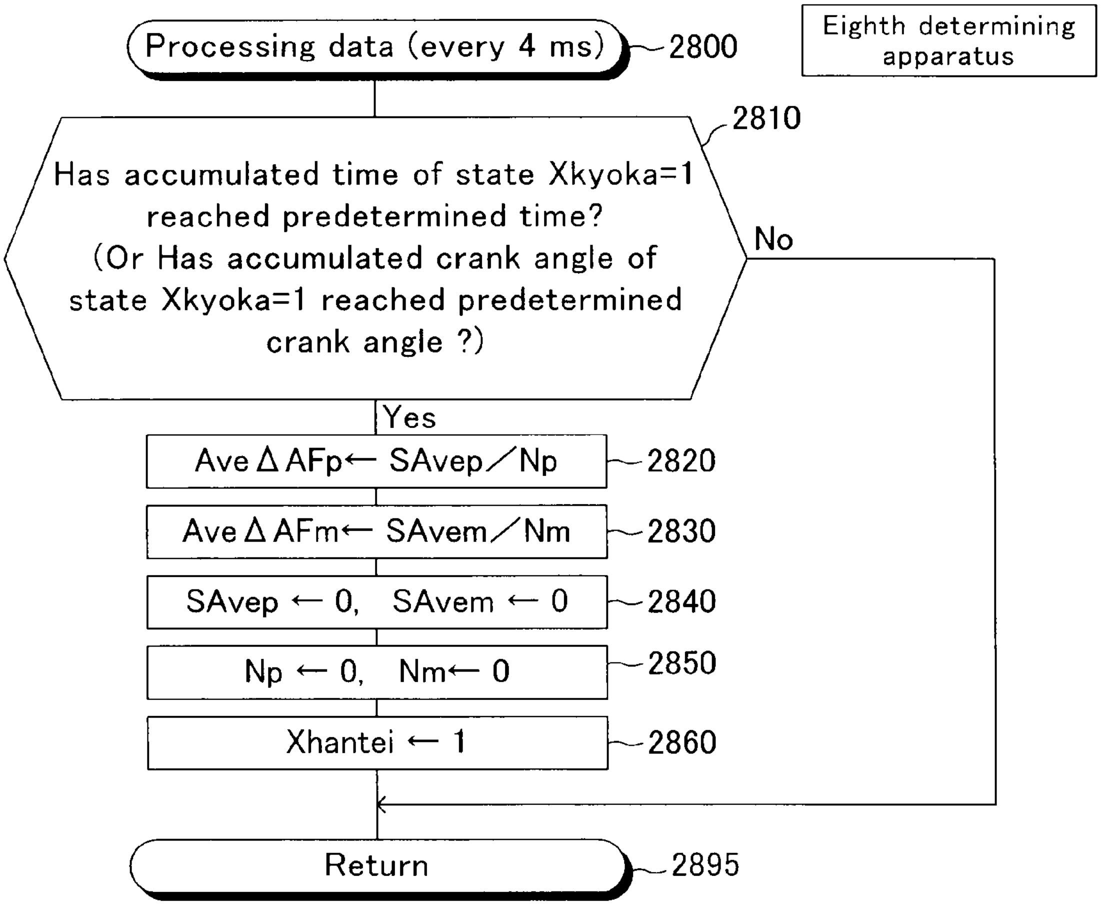
FIG. 28 is a flowchart showing a routine executed by the CPU of the eighth determining apparatus.

In the meantime, the CPU is configured in such a manner that it executes the "routine for processing data" shown by the flowchart in FIG. 28 every elapse of predetermined time (4 ms). Accordingly, at an appropriate timing, the CPU starts a process from step 2800 shown in FIG. 28 to proceed to step 2810, at which the CPU determines whether or not an accumulated time of a case in which the value of the determination allowable flag Xkyoka is "1" has reached a predetermined time. At this step, the CPU may determine "whether or not an accumulated crank angle of a case in which the value of the determination allowable flag Xkyoka is "1" has reached a predetermined crank angle".

When the accumulated time of the case in which the value of the determination allowable flag Xkyoka is "1" has not reached the predetermined time, the CPU makes a "No" determination at step 2810 to directly proceed to step 2895 to end the present routine tentatively.

To the contrary, if the accumulated time of the case in which the value of the determination allowable flag Xkyoka is "1" has reached the predetermined time when the CPU executes the process of step 2810, the CPU makes a "Yes" determination at step 2810 to execute processes of steps from steps 2820 to 2860 described below in order, and thereafter proceeds to step 2895 to end the present routine tentatively.

Step 2820: The CPU calculates an average (final average increasing change rate) AveΔAFp of the average increasing change rate Avep through dividing the "integrated value SAvep of the average increasing change rate Avep" by the counter Np. The final average increasing change rate AveΔAFp is a value corresponding to the detected air-fuel ratio change rate ΔAF when the detected air-fuel ratio change rate ΔAF is positive (i.e., the value varying depending on ΔAF, the value being larger as the magnitude of ΔAF being larger). As described above, the final average increasing change rate AveΔAFp is one of the indicating amount of air-fuel ratio change rates, and is also referred to as the "increasing indicating amount of change rate".

Step 2830: The CPU calculates an average (final average decreasing change rate) AveΔAFm of the average decreasing change rate Avem through dividing the "integrated value SAvem of the average decreasing change rate Avem" by the counter Nm. The final average decreasing change rate AveΔAFm is a value corresponding to the detected air-fuel ratio change rate ΔAF when the detected air-fuel ratio change rate ΔAF is negative (i.e., the value varying depending on ΔAF, the value being larger as the magnitude of ΔAF being larger). As described above, the final average decreasing change rate AveΔAFm is one of the indicating amount of air-fuel ratio change rates, and is also referred to as the "decreasing indicating amount of change rate".

Step 2840: The CPU sets the value of the integrated value SAvem to (at) "0" (the value is cleared), and sets the value of the integrated value SAvep to (at) "0" (the value is cleared).

Step 2850: The CPU sets the value of the counter Np to (at) "0" (the value is cleared), and sets the value of the counter Nm to (at) "0" (the value is cleared).

Step 2860: The CPU sets the value of the determination execution flag Xhantei to (at) "1".

Accordingly, since the value of the determination execution flag Xhantei is changed to "1", the CPU proceeds to steps from step 2310 of the routine shown in FIG. 23 to perform the determination of an air-fuel ratio imbalance among cylinders using the "increasing indicating amount of change rate (that is, final average increasing change rate Ave1AFp) obtained at step 2820 shown in FIG. 28" and the "decreasing indicating amount of change rate (that is, final average decreasing change rate AveΔAFm) obtained at step 2830 shown in FIG. 28".

As described above, the CPU does not use the detected air-fuel ratio change rate (invalid data) ΔAF whose magnitude (absolute value |ΔAF| of ΔAF) is smaller than the effective determination threshold Yukoth, for the calculation of the average increasing change rate Avep and the average decreasing change rate Avem (refer to the case in which the CPU directly proceeds to step 2795 from step 2720). Accordingly, the invalid data is not used for the "calculation of the increasing indicating amount of change rate (i.e., final average increasing change rate AveΔAFp) and the decreasing indicating amount of change rate (i.e., final average decreasing change rate AveΔAFm)".

Consequently, the adverse affect due to the noise superimposing on the output Vabyfs of the air-fuel ratio sensor on the indicating amount of the "increasing indicating amount of change rate and the decreasing indicating amount of change rate" can be reduced without using a special filter. Therefore, the determination of an air-fuel ratio imbalance among cylinders can be performed with higher accuracy.

That is, the eighth determining apparatus;

obtains the output Vabyfs of the air-fuel ratio sensor every time a constant sampling period (sampling time ts) elapses;

obtains, as the detected air-fuel ratio change rate ΔAF, a difference between air-fuel ratios, each being represented by each of the outputs of the air-fuel ratio sensor that are obtained consecutively before and after the sampling period (i.e., the difference ΔAF between the present detected air-fuel ratio abyfs and the previous detected air-fuel ratio abyfsold);

uses, as data for obtaining the indicating amount of air-fuel ratio change rate, the obtained detected air-fuel ratio change rate ΔAF when the magnitude (|ΔAF|) of the obtained detected air-fuel ratio change rate ΔAF is larger than or equal to the predetermined effective determination threshold (Yukoth); and does not use, as data for obtaining the indicating amount of air-fuel ratio change rate, the obtained detected air-fuel ratio change rate ΔAF when the magnitude (|ΔAF|) of the obtained detected air-fuel ratio change rate ΔAF is smaller than the predetermined effective determination threshold (Yukoth).

According to the configuration described above, only the detected air-fuel ratio change rates ΔAF, each having the magnitude larger than or equal to the predetermined effective determination threshold Yukoth, are used as data for obtaining the indicating amount of air-fuel ratio change rate. In other words, the detected air-fuel ratio change rate ΔAF which varies due to the noise superimposing on the output Vabyfs of the air-fuel ratio sensor only (i.e., without owing to a difference in individual-cylinder-air-fuel-ratios) can be eliminated from data for calculation of the indicating amount of air-fuel ratio change rate which is used for the determination of an air-fuel ratio imbalance among cylinders. Therefore, the "indicating amount of air-fuel ratio change rate" can be obtained which varies depending on a degree of the non-uniformity of the individual-cylinder-air-fuel-ratios with high precision. Consequently, the determination of an air-fuel ratio imbalance among cylinders can be performed with high accuracy, without performing a special filtering on the detected air-fuel ratio change rate.

<Ninth Embodiment>

A control apparatus for the internal combustion engine (hereinafter, referred to as a "ninth determining apparatus") according to a ninth embodiment of the present invention will next be described.

The ninth determining apparatus, similarly to the eighth determining apparatus, obtains the indicating amount of air-fuel ratio change rates, discriminating the case in which the detected air-fuel ratio change rate ΔAF is positive and the case in which the detected air-fuel ratio change rate ΔAF is negative.

Further, similarly to the eighth determining apparatus, the ninth determining apparatus obtains the indicating amount of air-fuel ratio change rate (increasing indicating amount of change rate and decreasing indicating amount of change rate) using detected air-fuel ratio change rates ΔAF whose magnitude |ΔAF| is equal to or larger than the effective determination threshold Yukoth.

Note that the ninth determining apparatus selects, as a maximum value ΔAFmmax, data whose magnitude (|ΔAF|) is the largest in data having a negative value, among the detected air-fuel ratio change rate ΔAF obtained in a period from the previous rich peak to the present rich peak, and obtains the final average decreasing change rate AveΔAFm by obtaining and averaging a plurality of the maximum values ΔAFmmax.

Similarly, the ninth determining apparatus selects, as a maximum value ΔAFpmax, data whose magnitude (|ΔAF|) is the largest in data having a positive value, among the detected air-fuel ratio change rate ΔAF obtained in a period from the previous lean peak to the present lean peak, and obtains the final average increasing change rate AveΔAFp by obtaining and averaging a plurality of the maximum values ΔAFpmax.

It should be noted that the method of the determination of an air-fuel ratio imbalance among cylinders which the ninth determining apparatus adopts is the same as one that the eighth determining apparatus adopts. That is, the ninth determining apparatus performs the determination of an air-fuel ratio imbalance among cylinders using the routine shown in FIG. 23. Note that the ninth determining apparatus may perform the determination of an air-fuel ratio imbalance among cylinders using the routine shown in either FIG. 24 or FIG. 26.

These features will next be described in detail.

Figure 29:
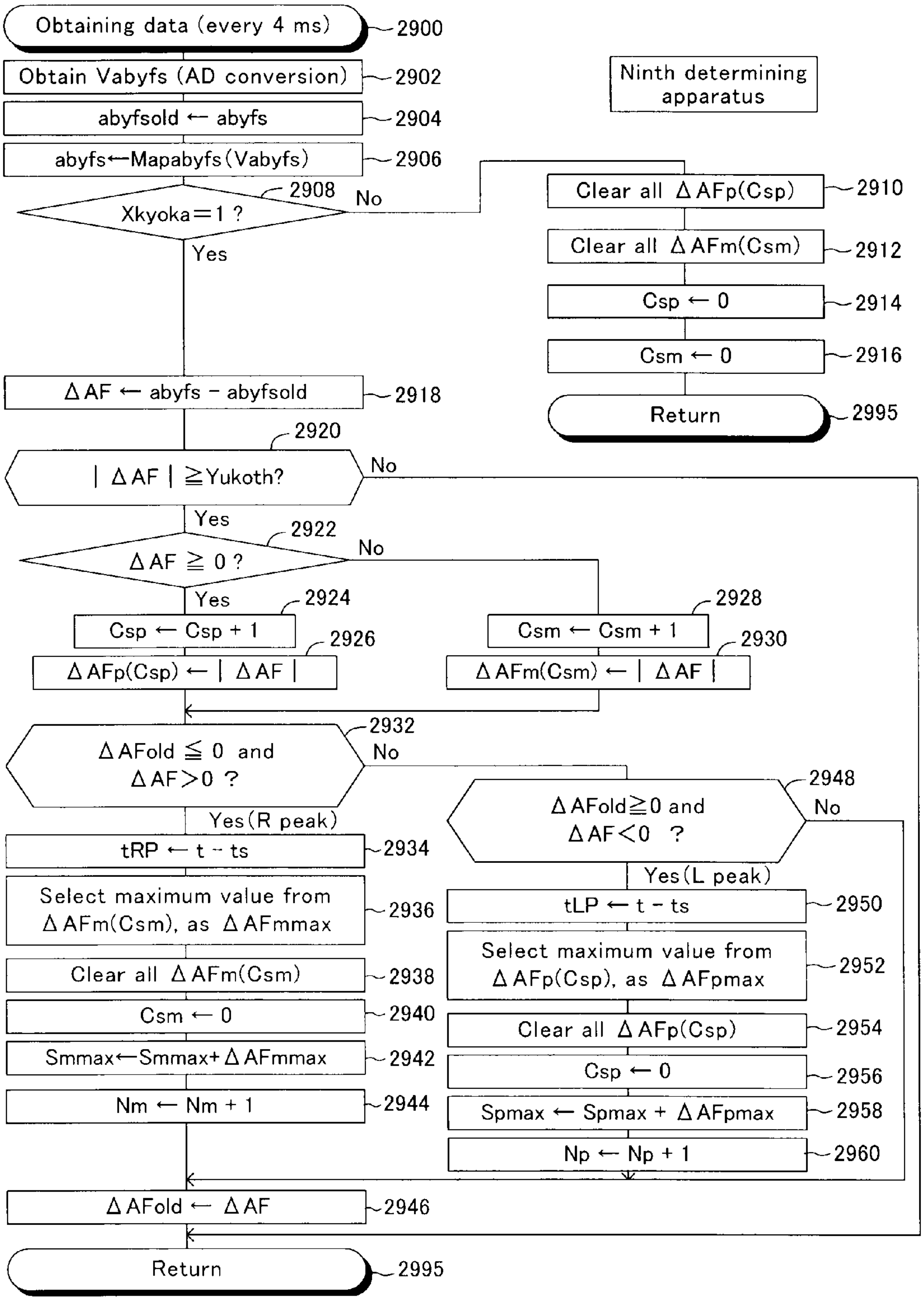
FIG. 29 is a flowchart showing a routine executed by a CPU of the air-fuel ratio imbalance among cylinders determining apparatus (ninth determining apparatus) according to a ninth embodiment of the present invention.

The CPU of the ninth determining apparatus is configured in such a manner that it executes the routines that the CPU of the fourth determining apparatus executes at the appropriate timings (except the routine shown in FIG. 22), and a "routine for obtaining data" shown by a flowchart in FIG. 29 every elapse of "4 ms (predetermined constant sampling time ts)", in place of the routine shown in FIG. 22. Further, the CPU of the ninth determining apparatus is configured in such a manner that it executes the "routine for processing data" shown in FIG. 30 every elapse of the "4 ms (predetermined sampling time)".

Accordingly, at an appropriate timing, the CPU starts process from step 2900 in FIG. 29 to execute processes of steps from steps 2902 to 2906. Steps 2902, 2904, and 2906 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 2908 to determine whether or not the value of the determination allowable flag Xkyoka is "1". The value of the determination allowable flag Xkyoka is set in the routine shown in FIG. 20, similarly to the second determining apparatus.

It is assumed here that the value of the determination allowable flag Xkyoka is "0". In this case, the CPU makes a "No" determination at step 2908 to execute processes of steps from step 2910 to step 2916 described below in order, and proceeds to step 2995 to end the present routine tentatively.

Step 2910: The CPU sets all of detected air-fuel ratio change rates ΔAFp(Csp) to (at) "0" (i.e., the values are cleared). The detected air-fuel ratio change rate ΔAFp(Csp) is a magnitude (absolute value |ΔAF|) of the detected air-fuel ratio change rate ΔAF stored corresponding to a value of the counter Csp at step 2926 described later, when the detected air-fuel ratio change rate ΔAF is positive.

Step 2912: The CPU sets all of detected air-fuel ratio change rates ΔAFm(Csm) to (at) "0" (i.e., the values are cleared). The detected air-fuel ratio change rate ΔAFm(Csm) is a magnitude (absolute value |ΔAF|) of the detected air-fuel ratio change rate ΔAF stored corresponding to a value of the counter Csm at step 2930 described later, when the detected air-fuel ratio change rate ΔAF is negative.

Step 2914: The CPU sets the value of the counter Csp to (at) "0" (the value is cleared). Note that the value of the counter Csp is set to (at) "0" by the initialization routine described above.

Step 2916: The CPU sets the value of the counter Csm to (at) "0" (the value is cleared). Note that the value of the counter Csm is also set to (at) "0" by the initialization routine described above.

Next, it is assumed here that the value of the determination allowable flag Xkyoka is changed to "1". In this case, the CPU makes a "Yes" determination at step 2908 to proceed to step 2918, at which the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to step 2920 to determine whether or not the magnitude (absolute value |ΔAF| of ΔAF) of the detected air-fuel ratio change rate ΔAF is equal to or larger than the effective determination threshold Yukoth. The effective determination threshold Yukoth is the value obtained by adding the predetermined value δ serving as the margin to an average or a maximum value of the magnitude (|ΔAF|) of the detected air-fuel ratio change rate ΔAF when the individual-cylinder-air-fuel-ratios are substantially the same as each other. Thus, the effective determination threshold Yukoth is determined to be roughly equal to the noise superimposing on the output Vabyfs of the air-fuel ratio sensor.

When the magnitude (absolute value |ΔAF| of ΔAF) of the detected air-fuel ratio change rate ΔAF is smaller than the effective determination threshold Yukoth, the CPU makes a "No" determination at step 2920 to directly proceed to step 2995 to end the present routine tentatively.

In contrast, if the magnitude (absolute value |ΔAF| of ΔAF) of the detected air-fuel ratio change rate ΔAF is equal to or larger than the effective determination threshold Yukoth, the CPU makes a "Yes" determination at step 2920 to proceed to step 2922, at which the CPU determines whether or not the detected air-fuel ratio change rate ΔAF is equal to or larger than "0" (whether ΔAF is a positive value including "0", or a negative value).

When the detected air-fuel ratio change rate ΔAF is equal to or larger than "0" (that is, the detected air-fuel ratio abyfs is increasing), the CPU makes a "Yes" determination at step 2922 to proceed to step 2924, at which the CPU increments the value of the counter Csp by "1".

Subsequently, the CPU proceeds to step 2926 to store an absolute value (|ΔAF|) of the detected air-fuel ratio change rate ΔAF as the Csp-th data ΔAFp(Csp). For example, if the present time is a "time immediately after the determination allowable flag Xkyoka is changed form 0 to 1", the value of the counter Csp is "1" (refer to step 2914 and step 2924). Accordingly, the absolute value |ΔAF| of the detected air-fuel ratio change rate ΔAF obtained at step 2918 is stored as data ΔAFp(1). Thereafter, the CPU proceeds to step 2932.

In contrast, if the detected air-fuel ratio change rate ΔAF is smaller than "0" (that is, the detected air-fuel ratio abyfs is decreasing) when the CPU executes the process of step 2922, the CPU makes a "No" determination at step 2922 to proceed to 2928, at which the CPU increments the value of the counter Csm by "1".

Subsequently, the CPU proceeds to step 2930 to store the absolute value (|ΔAF|) of the detected air-fuel ratio change rate ΔAF as the Csm-th data ΔAFm(Csm). For example, if the present time is a "time immediately after the determination allowable flag Xkyoka is changed form 0 to 1", the value of the counter Csm is "1" (refer to step 2916 and step 2928). Accordingly, the absolute value |ΔAF| of the detected air-fuel ratio change rate ΔAF obtained at step 2918 is stored as data ΔAFm(1). Thereafter, the CPU proceeds to step 2932.

At step 2932, the CPU determines whether or not a previous detected air-fuel ratio change rate ΔAFold (detected air-fuel ratio change rate ΔAF, obtained at step 2918 when the present routine was executed 4 ms ago, and stored at step 2946 which will be described later) is equal to or smaller than "0", and whether or not the present detected air-fuel ratio change rate ΔAF obtained at step 2918 is larger than "0". That is, at step 2932, the CPU determines whether or not the inclination of the detected air-fuel ratio abyfs has changed from a negative value to a positive value (i.e., whether or not the detected air-fuel ratio abyfs passes a "rich peak" which is a peak being convex downward).

When the previous detected air-fuel ratio change rate ΔAFold is equal to or smaller than "0", and the present detected air-fuel ratio change rate ΔAF is larger than "0", the CPU makes a "Yes" determination at step 2932 to execute processes of steps from step 2934 to step 2946 described below in order, and then proceeds to step 2995 to end the present routine tentatively.

Step 2934: The CPU obtains, as a "rich peak time point tRP", a time point the sampling time ts before the present time point t. That is, since it is confirmed that the detected air-fuel ratio change rate ΔAF has changed form the negative value to the positive value at the present time point, the CPU infers that the detected air-fuel ratio abyfs reached the rich peak the sampling time ts before the present time point t. It should be noted that the CPU may infer that the detected air-fuel ratio abyfs reached the rich peak at the present time point t.

Step 2936: The CPU selects a maximum value among a plurality of the data ΔAFm(Csm), and stores the maximum value as the decreasing-side maximum value ΔAFmmax. That is, the CPU selects the largest value in a plurality of the data ΔAFm(Csm) as the decreasing-side maximum value ΔAFmmax.

Step 2938: The CPU sets all of a plurality of the data ΔAFm(Csm) to (at) "0" (the values are cleared).

Step 2940: The CPU sets the value of the counter Csm to (at) "0" (the values are cleared).

Step 2942: The CPU updates an integrated value Smmax by adding the present decreasing-side maximum value ΔAFmmax selected at step 2936 to the integrated value Smmax at that time point.

Step 2944: The CPU increments the value of the counter Nm by "1".

Step 2946: The CPU stores, as the previous detected air-fuel ratio change rate ΔAFold, the detected air-fuel ratio change rate ΔAF obtained at step 2918.

In contrast, if the previous detected air-fuel ratio change rate ΔAFold is larger than "0" or the present detected air-fuel ratio change rate ΔAF is equal to or smaller than "0" when the CPU executes the process of step 2932, the CPU makes a "No" determination at step 2932 to proceed to step 2948. At step 2948, the CPU determines whether or not the "previous detected air-fuel ratio change rate ΔAFold is equal to or larger than "0", and the present detected air-fuel ratio change rate ΔAF is smaller than "0"". That is, at step 2948, the CPU determines whether or not the inclination of the detected air-fuel ratio abyfs has changed from a positive value to a negative value (i.e., whether or not the detected air-fuel ratio abyfs passes a "lean peak" which is a peak being convex upward).

When the previous detected air-fuel ratio change rate ΔAFold is equal to or larger than "0", and the present detected air-fuel ratio change rate ΔAF is smaller than "0", the CPU makes a "Yes" determination at step 2948 to execute processes of steps from 2950 to step 2960 described below in order, and then proceeds to step 2995 via step 2946.

Step 2950: The CPU obtains, as a "lean peak time point tLP", a time point the sampling time ts before the present time point t. That is, since it is confirmed that the detected air-fuel ratio change rate ΔAF has changed form the positive value to the negative value at the present time point, the CPU infers that the detected air-fuel ratio abyfs reached the lean peak the sampling time ts before the present time point t. It should be noted that the CPU may obtain, as the "lean peak time point tLP", the present time point t.

Step 2952: The CPU selects a maximum value among a plurality of the data ΔAFp(Csp), and stores the maximum value as the increasing-side maximum value ΔAFpmax. That is, the CPU selects the largest value in a plurality of the data ΔAFp(Csp) as the increasing-side maximum value ΔAFpmax.

Step 2954: The CPU sets all of a plurality of the data ΔAFp(Csp) to (at) "0" (the values are cleared).

Step 2956: The CPU sets the value of the counter Csp to (at) "0" (the values are cleared).

Step 2958: The CPU updates an integrated value Spmax by adding the present increasing-side maximum value ΔAFpmax selected at step 2952 to the integrated value Spmax at that time point.

Step 2960: The CPU increments the value of the counter Np by "1".

In this manner, the CPU of the ninth determining apparatus detects the rich peak at step 2932. Further, when the rich peak is detected, the CPU selects the detected air-fuel ratio change rate ΔAF whose magnitude (|ΔAF|) is the largest among the detected air-fuel ratio change rates ΔAF, each having a negative value, in a period from the previous rich peak to the present rich peak, and stores the largest changing rate ΔAF as the decreasing-side maximum value ΔAFmmax. That is, the CPU selects, as the decreasing-side maximum value ΔAFmmax, the maximum value in a plurality of the data ΔAFm (Csm) obtained in the period from the previous rich peak to the present rich peak (step 2936).

Similarly, the CPU detects the lean peak at step 2948. Further, when the lean peak is detected, the CPU selects the detected air-fuel ratio change rate ΔAF whose magnitude (|ΔAF|) is the largest among the detected air-fuel ratio change rates ΔAF, each having a positive value, in a period from the previous lean peak to the present lean peak, and stores the largest changing rate ΔAF as the increasing-side maximum value ΔAFpmax. That is, the CPU selects, as the increasing-side maximum value ΔAFpmax, the maximum value in a plurality of the data ΔAFp(Csp) obtained in the period from the previous leak peak to the present lean peak (step 2952).

Further, the CPU does not use the detected air-fuel ratio change rate (invalid data) ΔAF whose magnitude (absolute value |ΔAF| of the detected air-fuel ratio change rate ΔAF) is smaller than the effective determination threshold Yukoth, for the data for the increasing-side maximum value ΔAFpmax and the decreasing-side maximum value ΔAFmmax (refer to the case in which the CPU directly proceeds to step 2995 from step 2920).

Figure 30:
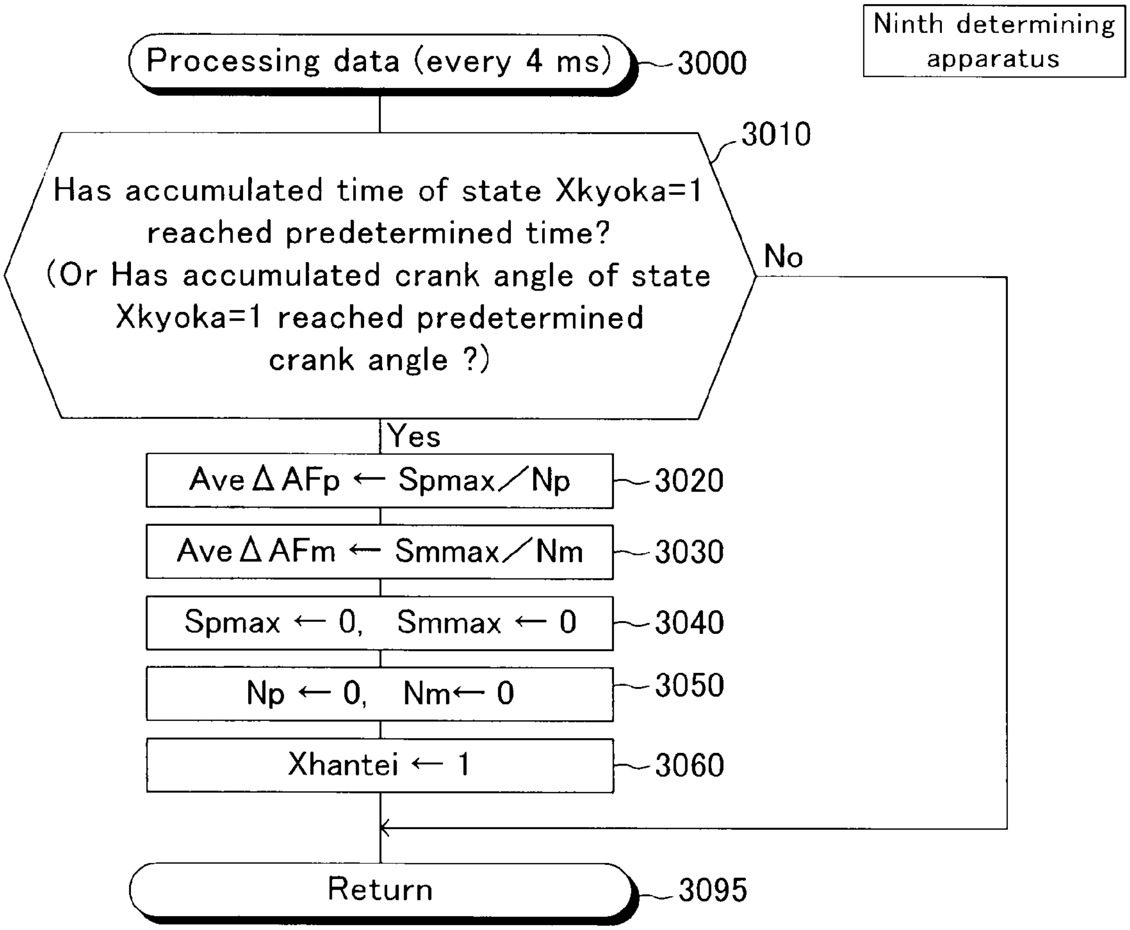
FIG. 30 is a flowchart showing a routine executed by the CPU of the ninth determining apparatus.

In the meantime, the CPU is configured in such a manner that it executes the "routine for processing data" shown by the flowchart in FIG. 30 every elapse of the predetermined time (4 ms). Accordingly, at an appropriate timing, the CPU starts a process from step 3000 shown in FIG. 30 to proceed to step 3010, at which the CPU determines whether or not an accumulated time of a case in which the value of the determination allowable flag Xkyoka is "1" has reached a predetermined time. At this step, the CPU may determine "whether or not an accumulated crank angle of a case in which the value of the determination allowable flag Xkyoka is "1" has reached a predetermined crank angle".

When the accumulated time of the case in which the value of the determination allowable flag Xkyoka is "1" has not reached the predetermined time, the CPU makes a "No" determination at step 3010 to directly proceed to step 3095 to end the present routine tentatively.

To the contrary, if the accumulated time of the case in which the value of the determination allowable flag Xkyoka is "1" has reached the predetermined time when the CPU executes the process of step 3010, the CPU makes a "Yes" determination at step 3010 to execute processes of steps from steps 3020 to 3060 described below in order, and thereafter proceeds to step 3095 to end the present routine tentatively.

Step 3020: The CPU calculates an average (final average of the increasing-side maximum value) AveΔAFpmax of the increasing-side maximum value ΔAFpmax through dividing the "integrated value Spmax of the increasing-side maximum value ΔAFpmax" by the counter Np. The final average of the increasing-side maximum value AveΔAFpmax is stored as the final average increasing change rate AveΔAFp. The final average of the increasing-side maximum value AveΔAFpmax is a value corresponding to the detected air-fuel ratio change rate ΔAF (the value varying depending on ΔAF, or the value being larger as the maximum value among a plurality of the magnitudes of the detected air-fuel ratio change rates ΔAF obtained when the detected air-fuel ratio change rate ΔAF is positive being larger). That is, the final average of the increasing-side maximum value AveΔAFpmax is one of the indicating amount of air-fuel ratio change rates, and is referred to as the "increasing indicating amount of change rate".

Step 3030: The CPU calculates an average (final average of the decreasing-side maximum value) AveΔAFmmax of the decreasing-side maximum value ΔAFmmax through dividing the "integrated value Smmax of the decreasing-side maximum value ΔAFmmax" by the counter Nm. The final average of the decreasing-side maximum value AveΔAFmmax is stored as the final average decreasing change rate AveΔAFm. The final average of the decreasing-side maximum value AveΔAFmmax is a value corresponding to the detected air-fuel ratio change rate ΔAF (the value varying depending on ΔAF, or the value being larger as the maximum value among a plurality of the magnitudes of the detected air-fuel ratio change rates ΔAF obtained when the detected air-fuel ratio change rate ΔAF is negative being larger). That is, the final average of the decreasing-side maximum value AveΔAFmmax is one of the indicating amount of air-fuel ratio change rates, and is referred to as the "decreasing indicating amount of change rate".

Step 3040: The CPU sets the "integrated value Spmax of the increasing-side maximum value ΔAFpmax" to (at) "0" (i.e., the value is cleared), and sets the "integrated value Smmax of the decreasing-side maximum value ΔAFmmax" to (at) "0" (i.e., the value is cleared).

Step 3050: The CPU sets the value of the counter Np and the value of the counter Nm to (at) "0", respectively (i.e., the values are cleared).

Step 3060: The CPU sets the value of the determination execution flag Xhantei to (at) "1".

As a result of this, the value of the determination execution flag Xhantei is set to (at) "1". Accordingly, the CPU proceeds to steps from step 2310 shown in the routine of FIG. 23 to perform the determination of an air-fuel ratio imbalance among cylinders using the "increasing indicating amount of change rate AveΔAFp (that is, the final average of the increasing-side maximum value AveΔAFpmax) obtained at step 3020 shown in FIG. 30" and the "decreasing indicating amount of change rate AveΔAFm (that is, the final average of the decreasing-side maximum value AveΔAFmmax) obtained at step 3030 shown in FIG. 30".

As described above, the CPU does not use the detected air-fuel ratio change rate (invalid data) ΔAF whose magnitude (absolute value |ΔAF| of ΔAF) is smaller than the effective determination threshold Yukoth, for the calculation of the maximum value ΔAFmmax and the maximum value ΔAFpmax (refer to the case in which the CPU directly proceeds to step 2995 from step 2920). Accordingly, the invalid data are not used for the calculation of "the increasing indicating amount of change rate AveΔAFp (i.e., final average of the increasing-side maximum value AveΔAFpmax) and the decreasing indicating amount of change rate AveΔAFm (i.e., final average of the decreasing-side maximum value AveΔAFmmax)".

Consequently, similarly to the eighth determining apparatus, the ninth determining apparatus can reduce the adverse affect due to the noise superimposing on the detected air-fuel ratio change rate ΔAF on "the increasing indicating amount of change rate and the decreasing indicating amount of change rate" without using a special filter. Therefore, the ninth determining apparatus can perform the determination of an air-fuel ratio imbalance among cylinders with higher accuracy.

<Tenth Embodiment>

A control apparatus for the internal combustion engine (hereinafter, referred to as a "tenth determining apparatus") according to a tenth embodiment of the present invention will next be described.

The tenth determining apparatus obtains, in a certain period, the number (Cyuko) of effective (valid) data of the detected air-fuel ratio change rate ΔAF whose magnitude (|ΔAF|) is equal to or larger than a predetermined effective determination threshold Yukoth2 (second effective determination threshold); obtains the number (Cmuko) of ineffective (invalid) data of the detected air-fuel ratio change rate ΔAF whose magnitude (|ΔAF|) is smaller than the effective determination threshold Yukoth2; and performs determination of an air-fuel ratio imbalance among cylinders by comparing the number of effective data (Cyuko) and the number of data (Cmuko).

These features will next be described in detail.

Figure 31:
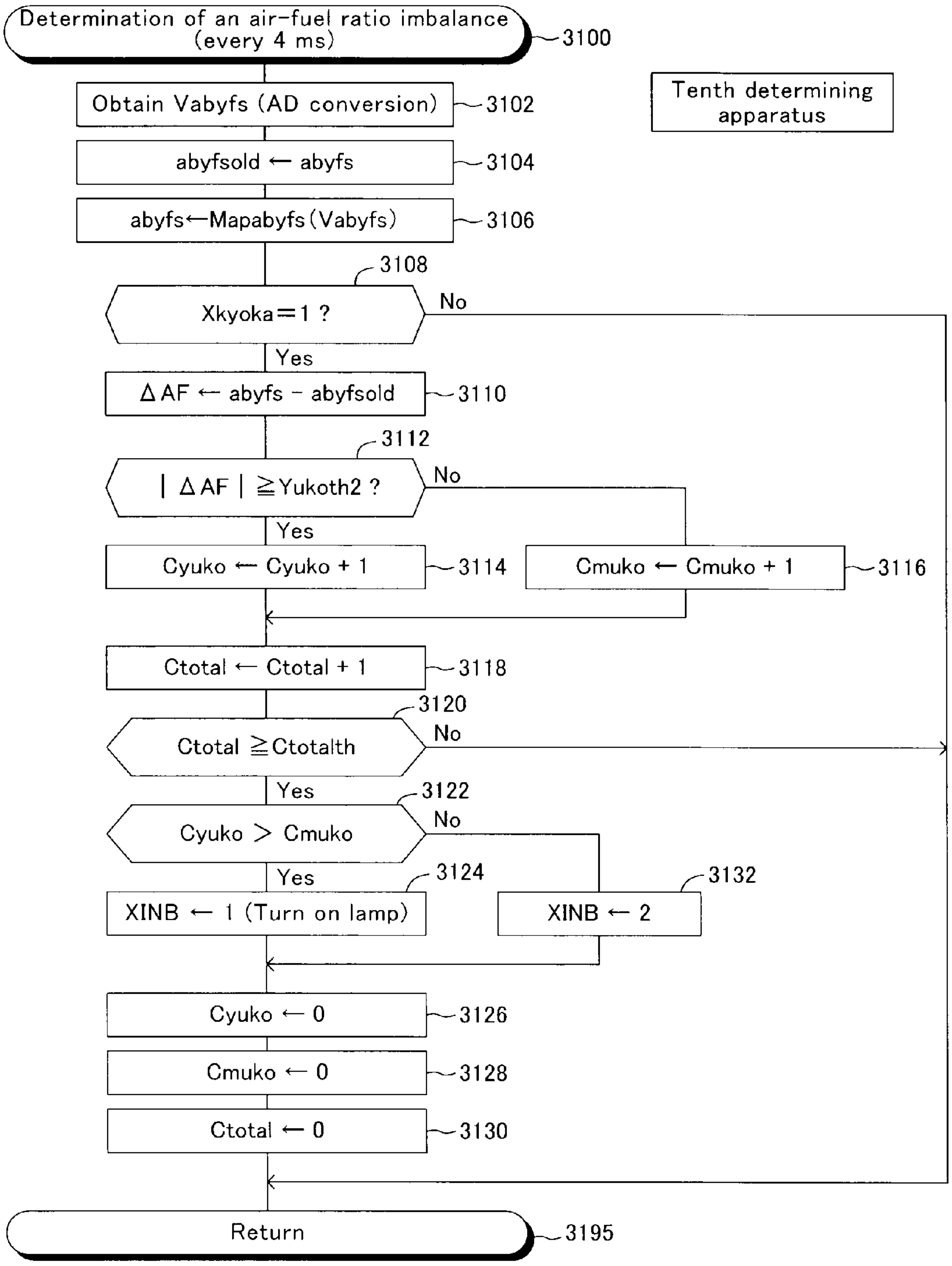
FIG. 31 is a flowchart showing a routine executed by a CPU of the air-fuel ratio imbalance among cylinders determining apparatus (tenth determining apparatus) according to a tenth embodiment of the present invention.

The CPU of the tenth determining apparatus is configured in such a manner that it executes the routines that the CPU of the first determining apparatus executes at the appropriate timings (except the routine shown in FIG. 17), and a "routine for determination of an air-fuel ratio imbalance among cylinders" shown by a flowchart in FIG. 31 every elapse of "4 ms (predetermined constant sampling time ts)", in place of the routine shown in FIG. 17. Further, the CPU of the tenth determining apparatus is configured in such a manner that it executes the routine shown in FIG. 20 every elapse of the predetermined time to set the value of the determination allowable flag Xkyoka.

Accordingly, at an appropriate timing, the CPU starts process from step 3100 in FIG. 31 to execute processes of steps from steps 3102 to 3106. Steps 3102, 3104, and 3106 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 3108 to determine whether or not the value of the determination allowable flag Xkyoka is "1". It is assumed here that the value of the determination allowable flag Xkyoka is "0". In this case, the CPU makes a "No" determination at step 3108 to proceed to step 3195 to end the present routine tentatively.

Next, it is assumed here that the value of the determination allowable flag Xkyoka is changed to "1". In this case, the CPU makes a "Yes" determination at step 3108 to proceed to step 3110, at which the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to step 3112 to determine whether or not the magnitude (absolute value ΔAF of ΔAF) of the detected air-fuel ratio change rate ΔAF is equal to or larger than the effective determination threshold Yukoth2. The effective determination threshold Yukoth2 is the value obtained by adding the "predetermined value δ serving as the margin" to "an average or a maximum value of the magnitude (ΔAF) of the detected air-fuel ratio change rate ΔAF" obtained when the air-fuel ratio imbalance among cylinders state which should be detected is not occurring (i.e., in a case in which the individual-cylinder-air-fuel-ratios are slightly different from each other, but the emission is permissible level). In other words, the determination threshold Yukoth2 is set to be a value than which the magnitude (|ΔAF|) of the detected air-fuel ratio change rate ΔAF does not become larger when the "air-fuel ratio imbalance among cylinders state which should be detected" is not occurring.

When the magnitude (absolute value |ΔAF| of ΔAF) of the detected air-fuel ratio change rate ΔAF is equal to or larger than the effective determination threshold Yukoth2, the CPU makes a "Yes" determination at step 3112 to proceed to step 3114, at which the CPU increments a value of an effective (valid) data number counter Cyuko by "1". The effective data number counter Cyuko is set to (at) "0" (the value is cleared) at step 3126 described later, and is also set to (at) "0" (the value is cleared) by the initialization routine described above. Accordingly, the effective data number counter Cyuko becomes a value indicating the number of data of the detected air-fuel ratio change rate ΔAF whose magnitude (|ΔAF|) is equal to or larger than the effective determination threshold Yukoth2.

In contrast, if the magnitude (|ΔAF|) of the detected air-fuel ratio change rate ΔAF is smaller than the effective determination threshold Yukoth2 when the CPU executes the process of step 3112, the CPU makes a "No" determination at step 3112 to proceed to step 3116, at which the CPU increments a value of an ineffective (invalid) data number counter Cmuko by "1". The ineffective data number counter Cmuko is set to (at) "0" (the value is cleared) at step 3128 described later, and is also set to (at) "0" (the value is cleared) by the initialization routine described above. Accordingly, the ineffective data number counter Cmuko becomes a value indicating the number of data of the detected air-fuel ratio change rate ΔAF whose magnitude (ΔAF) is smaller than the effective determination threshold Yukoth2.

Subsequently, the CPU proceeds to step 3118 to increment a value of the total data number counter Ctotal by "1", and proceeds to step 3120 to determine whether or not the value of the total data number counter Ctotal is equal to or larger than the total number counter threshold Ctotalth. The total data number counter Ctotal is set to (at) "0" (the value is cleared) at step 3130 described later, and is also set to (at) "0" (the value is cleared) by the initialization routine described above. Accordingly, the total data number counter Ctotal becomes a value indicating a sum of the value of the effective data number counter Cyuko and the value of the ineffective data number counter.

When the value of the total data number counter Ctotal is smaller than the total number counter threshold Ctotalth, the CPU makes a "No" determination at step 3120 to directly proceed to step 3195 to end the present routine tentatively.

On the other hand, if the value of the total data number counter Ctotal is equal to or larger than the total number counter threshold Ctotalth, when the CPU executes the process of step 3120, the CPU makes a "Yes" determination at step 3120 to proceed to step 3122, at which the CPU determines whether or not the value of the effective data number counter Cyuko is equal to or larger than the value of the ineffective data number counter Cmuko.

When the value of the effective data number counter Cyuko is equal to or larger than the value of the ineffective data number counter Cmuko, the CPU proceeds to step 3124 to set the value of the imbalance occurrence flag XINB to (at) "1". That is, the CPU determines that the air-fuel ratio imbalance among cylinders state is occurring. Further, at this time, the CPU may turn on an unillustrated warning lamp. Thereafter, the CPU proceeds to step 3126.

In contrast, when the value of the effective data number counter Cyuko is smaller than the value of the ineffective data number counter Cmuko, the CPU makes a "No" determination at step 3122 to proceed to step 3132, at which the CPU sets the value of the imbalance occurrence flag XINB to (at) "2". That is, the CPU determines that the air-fuel ratio imbalance among cylinders state is not occurring. Thereafter, the CPU proceeds to step 3126. It should be noted that the CPU may directly proceed to step 3126 without executing the process of step 3132, when the CPU makes the "No" determination at step 3122.

Subsequently, the CPU executes processes of steps from step 3126 to step 3130 described below in order, and then, proceeds to step 3195 to end the present routine tentatively.

Step 3126: The CPU sets the value of the effective data number counter Cyuko to (at) "0" (i.e., the value is cleared).

Step 3128: The CPU sets the value of the ineffective data number counter Cmuko to (at) "0" (i.e., the value is cleared).

Step 3130: The CPU sets the total data number counter Ctotal to (at) "0" (i.e., the value is cleared).

As described above, the tenth determining apparatus is configured;

so as to obtain the output Vabyfs of the air-fuel ratio sensor every time the constant sampling period (sampling time ts) elapses, and to obtain, as the indicating amount of air-fuel ratio change rate ΔAF, the difference between air-fuel ratios, each being represented by each of the outputs of the air-fuel ratio sensor that are obtained consecutively before and after the sampling period (i.e., the difference ΔAF between the present detected air-fuel ratio abyfs and the previous detected air-fuel ratio abyfsold);

so as to obtain, as one of the indicating amount of air-fuel ratio change rates, the number of effective data Cyuko representing the number of data of the detected air-fuel ratio change rate whose magnitude is equal to or larger than the predetermined effective determination threshold Yukoth2 among a plurality of the detected air-fuel ratio change rates obtained in a data obtaining period longer than the sampling period, and so as to obtain, as another of the indicating amount of air-fuel ratio change rates, the number of ineffective data Cmuko representing the number of data of the detected air-fuel ratio change rate whose magnitude is smaller than the effective determination threshold among a plurality of the detected air-fuel ratio change rates obtained in the data obtaining period (step 3112 to step 3116); and so as to determine whether or not the air-fuel ratio imbalance among cylinders state is occurring based on the number of effective data Cyuko and the number of ineffective data Cmuko (step 3112 to step 3132).

When the air-fuel ratio imbalance among cylinders state is occurring (i.e., when the non-uniformity of the air-fuel ratios among the cylinders is large enough to be detected), magnitude (|ΔAF|) of the detected air-fuel ratio change rate ΔAF becomes large. Therefore, when the air-fuel ratio imbalance among cylinders state is occurring, the number of effective data Cyuko relatively increases and the number of ineffective data Cmuko relatively decreases. Consequently, by the present determining apparatus, the determination of an air-fuel ratio imbalance among cylinders can be made using simple determination which includes comparing the number of effective data Cyuko and the number of ineffective data Cmuko.

It should be noted that the CPU of the tenth determining apparatus determines, at step 3020, whether or not an accumulated (integrated) crank angle in a period in which the value of the determination allowable flag Xkyoka is set to (at) "1" reaches a crank angle which is a natural number times longer than 720° crank angle, and proceeds to steps from step 3020 when the accumulated crank angle reaches the crank angle which is the natural number times longer than 720° crank angle. That is, the CPU may perform the imbalance determination by comparing the number of the effective data and the number of the ineffective data in the unit combustion cycle period or in a period which is the natural number times longer than the unit combustion cycle period.

Further, the CPU of the tenth determining apparatus may be configured so as to determine, at step 3122, a data number threshold Cdatath which varies based on the "total data number (i.e., the value of the total data number counter Ctotal) which is a sum of the number of the effective data Cyuko and the number of the ineffective data Cmuko", and so as to determine that the air-fuel ratio imbalance among cylinders state is occurring when the number of the effective data Cyuko is equal to or larger than the data number threshold Cdatath. The data number threshold Cdatath may be set at a value which is a predetermined fraction of the total data number (=kd·Ctotal; kd is between 0 to 1). With this, the determination of an air-fuel ratio imbalance among cylinders can be made using simple configuration.

<Eleventh Embodiment>

A control apparatus for the internal combustion engine (hereinafter, referred to as an "eleventh determining apparatus") according to an eleventh embodiment of the present invention will next be described.

The eleventh determining apparatus detects the rich peak and the lean peak, similarly to the eighth determining apparatus. However, the eleventh determining apparatus is different from the eighth determining apparatus only in that the eleventh determining apparatus does not use (i.e., discard) the detected air-fuel ratio change rate which is obtained at a time point in the vicinity of the time points of the rich peak and the lean peak, as data for obtaining the indicating amount of air-fuel ratio change rate.

More specifically, the eleventh determining apparatus does not adopt, as the data for obtaining the indicating amount of air-fuel ratio change rate, "the previous detected air-fuel ratio change rate ΔAFold and the present detected air-fuel ratio change rate ΔAF" that were used for detecting the rich peak and the lean peak. That is, the detected air-fuel ratio change rates ΔAF immediately before and immediately after the local maximum value and the local minimum value of the detected air-fuel ratio abyfs are not used for the calculation of the "indicating amount of air-fuel ratio change rate which is used for the determination of an air-fuel ratio imbalance among cylinders".

Figure 32:
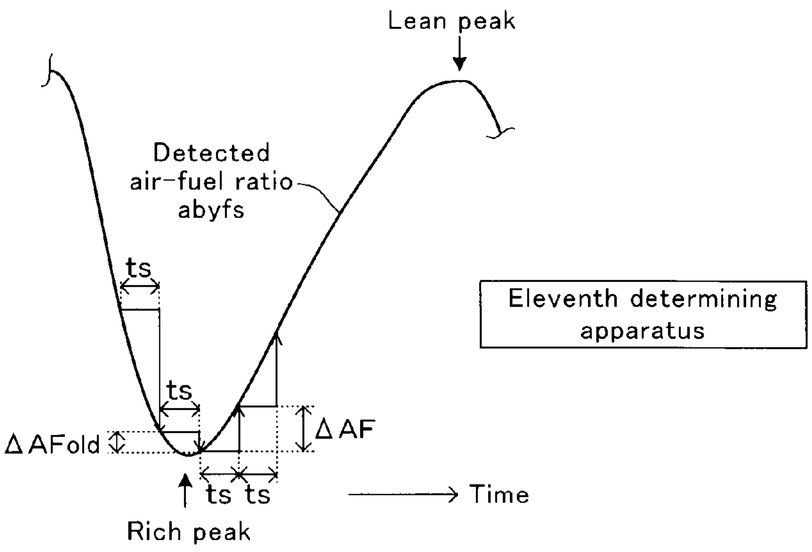
FIG. 32 shows the detected air-fuel ratio in the vicinity of a rich peak.
Figure 33:
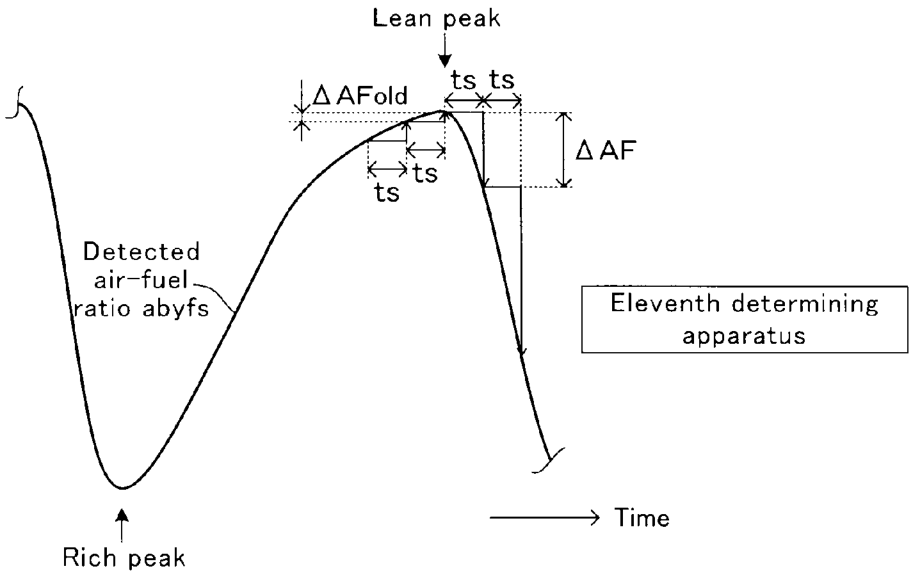
FIG. 33 shows the detected air-fuel ratio in the vicinity of a lean peak.

FIG. 32 is a timing chart showing the detected air-fuel ratio abyfs in the vicinity of the rich peak. As is clear from FIG. 32, the detected air-fuel ratio abyfs in the vicinity of the rich peak changes slowly, and thus, is not appropriate for the data to calculate the indicating amount of air-fuel ratio change rate. Similarly, FIG. 33 is a timing chart showing the detected air-fuel ratio abyfs in the vicinity of the lean peak. As is clear from FIG. 33, the detected air-fuel ratio abyfs in the vicinity of the lean peak changes slowly, and thus, is not appropriate for the data to calculate the indicating amount of air-fuel ratio change rate.

In view of the above, the eleventh determining apparatus does not use "the detected air-fuel ratio change rate ΔAF when the newest rich peak was detected, and the detected air-fuel ratio change rate ΔAF when the previous lean peak immediately before the newest rich peak was detected" for calculating the average decreasing change rate Avem which is a base for the calculation of the final average decreasing change rate AveΔAFm which is the indicating amount of air-fuel ratio change rate.

Similarly, the eleventh determining apparatus does not use "the detected air-fuel ratio change rate ΔAF when the newest lean peak was detected, and the detected air-fuel ratio change rate ΔAF when the previous rich peak immediately before the newest lean peak was detected" for calculating the average increasing change rate Avep which is a base for the calculation of the final average increasing change rate AveΔAFp which is the indicating amount of air-fuel ratio change rate.

The actual operation of the eleventh determining apparatus will next be described.

Figure 34:
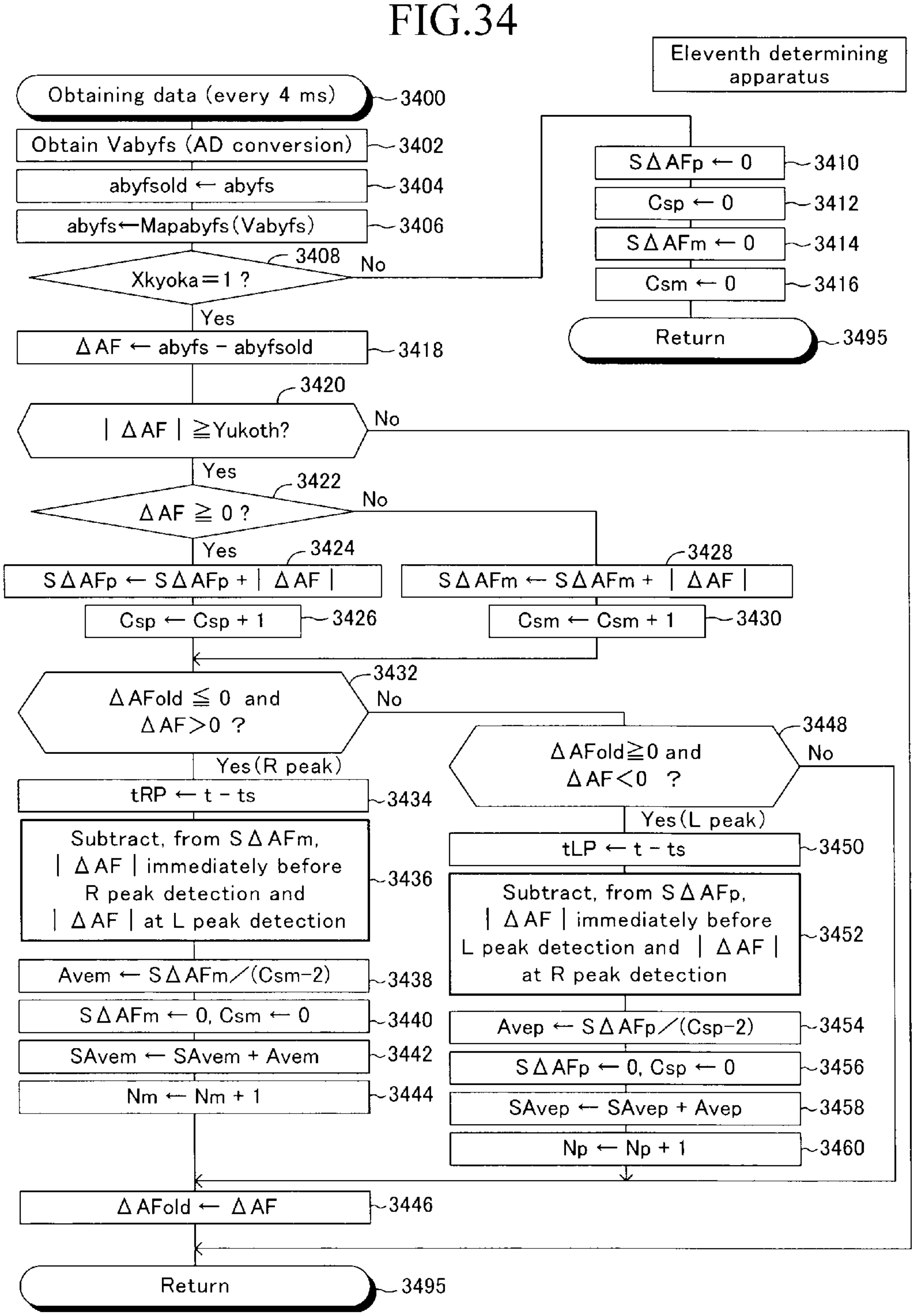
FIG. 34 is a flowchart showing a routine executed by a CPU of the air-fuel ratio imbalance among cylinders determining apparatus (eleventh determining apparatus) according to an eleventh embodiment of the present invention.

The CPU of the eleventh determining apparatus is configured in such a manner that it executes the routines that the CPU of the fourth determining apparatus executes at the appropriate timings (except the routine shown in FIG. 22), and a "routine for obtaining data" shown by a flowchart in FIG. 34 every elapse of "4 ms (a predetermined constant sampling time ts)" in place of the routine shown in FIG. 22. Further, the CPU of the eleventh determining apparatus is configured in such a manner that it executes the "routine for processing data" shown by the flowchart in FIG. 28 every elapse of "4 ms (predetermined constant sampling time ts)".

Accordingly, at an appropriate timing, the CPU starts a process from step 3400 shown in FIG. 34 to execute processes of steps from step 3402 to step 3406. Steps 3402, 3404, and 3406 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 2408 to determine whether or not the value of the determination allowable flag Xkyoka is "1". The value of the determination allowable flag Xkyoka is set in the routine shown in FIG. 20, similarly to the second determining apparatus.

It is assumed here that the value of the determination allowable flag Xkyoka is "0". In this case, the CPU makes a "No" determination at step 3408 to execute processes of steps from step 3410 to step 3416 described below in order. Steps from step 3410 to step 3416 are the same as steps from step 2710 to step 2716 shown in FIG. 27, respectively. Therefore, the value of the increasing change rate integrated value SΔAFp, the value of the counter Csp, the value of the decreasing change rate integrated value SΔAFm, and the value of the counter Csm are set to (at) "0", respectively (the values are cleared). Thereafter, the CPU proceeds to step 3495 to end the present routine tentatively.

Next, it is assumed that the value of the determination allowable flag Xkyoka is changed to "1". In this case, the CPU makes a "Yes" determination at step 3408 to proceed to step 3418, at which the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to some of appropriate steps from step 3420 to step 3430. Steps from step 3420 to step 3430 are the same as steps from step 2720 to step 2730 shown in FIG. 27, respectively.

Accordingly, when the detected air-fuel ratio change rate ΔAF is equal to or larger than "0" in a case in which the magnitude (absolute value |ΔAF| of the ΔAF) of the detected air-fuel ratio change rate ΔAF is equal to or larger than the effective determination threshold Yukoth, the increasing change rate integrated value SΔAFp is updated, and the value of the counter Csp is incremented by "1". Further, when the detected air-fuel ratio change rate ΔAF is smaller than "0" in a case in which the magnitude (absolute value |ΔAF| of the ΔAF) of the detected air-fuel ratio change rate ΔAF is equal to or larger than the effective determination threshold Yukoth, the decreasing change rate integrated value SΔAFm is updated, and the value of the counter Csm is incremented by "1".

Thereafter, the CPU proceeds to "step 3432 which is the same as step 2732 shown in FIG. 27" to determine whether or not the rich peak has come. When the rich peak has emerged, the CPU executes processes of steps from step 3434 to step 3446 described below in order, and then, proceeds to step 3495 to end the present routine tentatively.

Step 3434: The CPU obtains, as a "rich peak time point tRP", a time point the sampling time ts before the present time point t. That is, since it is confirmed that the detected air-fuel ratio change rate ΔAF has changed form the negative value to the positive value at the present time point, the CPU infers that the detected air-fuel ratio abyfs reached the rich peak the sampling time ts before the present time point t.

Step 3436: The CPU obtains, as a new decreasing change rate integrated value SΔAFm, a value obtained by subtracting "an absolute value of the detected air-fuel ratio change rate ΔAF obtained immediately before the detection of the rich peak (i.e., the previous detected air-fuel ratio change rate ΔAFold at the present time) and an absolute value of the detected air-fuel ratio change rate ΔAF at a time of the lean peak which was detected immediately before the present rich peak" from the decreasing change rate integrated value SΔAFm.

That is, the CPU subtracts, from the integrated value SΔAFm of the magnitudes (|ΔAF|) of the detected air-fuel ratio change rates ΔAF obtained in the period between the currently detected rich peak and the lean peak detected immediately before the currently detected rich peak, the magnitudes of the detected air-fuel ratio change rates ΔAF at the both ends of that period. By this process, two of data including the detected air-fuel ratio change rate ΔAF used for the detection of the current rich peak and the detected air-fuel ratio change rate ΔAF used for the detection of the lean peak immediately before the current rich peak are subtracted from the decreasing change rate integrated value SΔAFm.

Step 3438: The CPU calculates an average (average decreasing change rate Avem) of the decreasing change rates ΔAFm through dividing the decreasing change rate integrated value SΔAFm by a "value (Cms-2) obtained by subtracting 2 from the counter Csm". The reason why 2 is subtracted from the counter Csm is that the decreasing change rate integrated value SΔAFm is an integrated value of the absolute values of "Csm-2" detected air-fuel ratio change rates ΔAF, each having a negative value.

Step 3440: The CPU sets the decreasing change rate integrated value SΔAFm and the counter Csm to (at) "0", respectively (the values are cleared).

Step 3442: The CPU updates an integrated value SAvem of the average decreasing change rate Avem. Specifically, the CPU calculates the present "integrated value SAvem of the average decreasing change rate Avem" by adding the present average decreasing change rate Avem newly obtained at step 3438 to the "integrated value SAvem of the average decreasing change rate Avem" at that time point.

Step 3444: The CPU increments the value of the counter Nm by "1".

Step 3446: The CPU stores, as the previous detected air-fuel ratio change rate ΔAFold, the detected air-fuel ratio change rate ΔAF obtained at step 3418. Thereafter, the CPU proceeds to step 3495 to end the present routine tentatively.

In contrast, if the previous detected air-fuel ratio change rate ΔAFold is larger than "0" or the present detected air-fuel ratio change rate ΔAF is equal to or smaller than "0" when the CPU executes the process of step 3432, the CPU makes a "No" determination at step 3432 to proceed to step 3448. At step 3448, the CPU determines whether or not the "previous detected air-fuel ratio change rate ΔAFold is equal to or larger than "0", and the present detected air-fuel ratio change rate ΔAF is smaller than "0"". That is, at step 3448, the CPU determines whether or not the inclination of the detected air-fuel ratio abyfs has changed from a positive value to a negative value (i.e., whether or not the detected air-fuel ratio abyfs passes a "lean peak" which is a peak being convex upward).

When the previous detected air-fuel ratio change rate ΔAFold is equal to or larger than "0", and the present detected air-fuel ratio change rate ΔAF is smaller than "0", the CPU makes a "Yes" determination at step 3448 to execute processes of step 3450 to step 3460 described below in order, and then proceeds to step 3495 via step 3446.

Step 3450: The CPU obtains, as a "lean peak time point tLP", a time point the sampling time ts before the present time point t. That is, since it is confirmed that the detected air-fuel ratio change rate ΔAF has changed form the positive value to the negative value at the present time point, the CPU infers that the detected air-fuel ratio abyfs reached the lean peak the sampling time ts before the present time point t.

Step 3452: The CPU obtains, as a new increasing change rate integrated value SΔAFp, a value obtained by subtracting "an absolute value of the detected air-fuel ratio change rate ΔAF obtained immediately before the detection of the lean peak (i.e., the previous detected air-fuel ratio change rate ΔAFold at the present time) and an absolute value of the detected air-fuel ratio change rate ΔAF at a time of the rich peak which was detected immediately before the present lean peak" from the increasing change rate integrated value SΔAFp.

That is, the CPU subtracts, from the integrated value SΔAFp of the magnitudes (|ΔAF|) of the detected air-fuel ratio change rates ΔAF obtained in the period between the currently detected lean peak and the rich peak detected immediately before the currently detected lean peak, the magnitudes of the detected air-fuel ratio change rates ΔAF at the both ends of that period. By this process, two of data including the detected air-fuel ratio change rate ΔAF used for the detection of the current lean peak and the detected air-fuel ratio change rate ΔAF used for the detection of the rich peak immediately before the current lean peak are subtracted from the increasing change rate integrated value SΔAFp.

Step 3454: The CPU calculates an average (average increasing change rate Avep) of the increasing change rates ΔAFp through dividing the increasing change rate integrated value SΔAFp by a "value (Csp-2) obtained by subtracting 2 from the counter Csp". The reason why 2 is subtracted from the counter Csp is that the increasing change rate integrated value SΔAFp is an integrated value of the absolute values of "Csp-2" detected air-fuel ratio change rates ΔAF, each having a positive value.

Step 3456: The CPU sets the increasing change rate integrated value SΔAFp and the counter Csp to (at) "0", respectively (the values are cleared).

Step 3458: The CPU updates an integrated value SAvep of the average increasing change rate Avep. Specifically, the CPU calculates the present "integrated value SAvep of the average increasing change rate Avep" by adding the present average increasing change rate Avep newly obtained at step 3454 to the "integrated value SAvep of the average increasing change rate Avep" at that time point.

Step 3460: The CPU increments the value of the counter Np by "1".

To the contrary, if the previous detected air-fuel ratio change rate ΔAFold is smaller than "0", or the present detected air-fuel ratio change rate ΔAF is equal to or larger than "0", when the CPU executes the process of step 3448, the CPU makes a "No" determination at step 3448 to proceed to step 3495 via step 3446.

In this manner, the CPU use neither the detected air-fuel ratio change rate ΔAF, which has the negative value among the detected air-fuel ratio change rate ΔAF, and which was used to the detection of the lean peak, nor the detected air-fuel ratio change rate ΔAF, which has the negative value among the detected air-fuel ratio change rate ΔAF, and which was used to the detection of the rich peak, for the calculation of the average decreasing change rate Avem. Similarly, the CPU use neither the detected air-fuel ratio change rate ΔAF, which has the positive value among the detected air-fuel ratio change rate ΔAF, and which was used to the detection of the lean peak, nor the detected air-fuel ratio change rate ΔAF, which has the positive value among the detected air-fuel ratio change rate ΔAF, and which was used to the detection of the rich peak, for the calculation of the average increasing change rate Avep.

In the meantime, the CPU is configured in such a manner that it executes the "routine for processing data" shown by the flowchart in FIG. 28 every elapse of predetermined time (4 ms). Accordingly, the average AveΔAFp (final average increasing change rate which is the indicating amount of air-fuel ratio change rate) of the average increasing change rate Avep, and the average AveΔAFm (final average decreasing change rate which is the indicating amount of air-fuel ratio change rate) of the average decreasing change rate Avem are calculated. In addition, since the value of the determination execution flag Xhantei is set to (at) "1" at step 2860, the determination of an air-fuel ratio imbalance among cylinders is performed by the routine shown in FIG. 23 (or, FIG. 24 or 26).

It should be noted that the eleventh determining apparatus may be configured in such a manner that it does not use an older data of the two data used at the time of detecting the rich peak (e.g., the previous detected air-fuel ratio change rate ΔAFold in step 3432 of FIG. 34) for the calculation of the indicating amount of air-fuel ratio change rate. Similarly, the eleventh determining apparatus may be configured in such a manner that it does not use an older data of the two data used at the time of detecting the lean peak (e.g., the previous detected air-fuel ratio change rate ΔAFold in step 3448 of FIG. 34) for the calculation of the indicating amount of air-fuel ratio change rate.

Further, the eleventh determining apparatus may be configured in such a manner that it does not use the detected air-fuel ratio change rates ΔAF which are obtained in a period from a "time point a predetermined time (predetermined first time) before the rich peak time point tRP" to a "time point a predetermined time (predetermined second time) after the rich peak time point tRP" for the calculation of the indicating amount of air-fuel ratio change rate. Similarly, the eleventh determining apparatus may be configured in such a manner that it does not use the detected air-fuel ratio change rates ΔAF which are obtained in a period from a "time point a predetermined time (predetermined third time) before the lean peak time point tLP" to a "time point a predetermined time (predetermined fourth time) after the lean peak time point tLP" for the calculation of the indicating amount of air-fuel ratio change rate.

As described above, the eleventh determining apparatus is configured;

so as to obtain the output Vabyfs of the air-fuel ratio sensor every time the constant sampling period (sampling time ts) elapses, and so as to obtain, as the detected air-fuel ratio change rate ΔAF, the difference between air-fuel ratios, each being represented by each of the outputs of the air-fuel ratio sensor that are obtained consecutively before and after the sampling period (i.e., the difference ΔAF between the present detected air-fuel ratio abyfs and the previous detected air-fuel ratio abyfsold);

so as to detect, as the lean peak time point tLP, a time point at which the detected air-fuel ratio change rate ΔAF changes from a positive value to a negative value (step 3448); and so as not to use, as data for obtaining the indicating amount of air-fuel ratio change rate, the detected air-fuel ratio change rates ΔAF which are obtained within a predetermined time before or after the detected lean peak time point tLP (step 3452).

Further, the eleventh determining apparatus is configured;

so as to detect, as the rich peak time point tRP, a time point at which the detected air-fuel ratio change rate ΔAF changes from a negative value to a positive value (step 3432); and so as not to use, as data for obtaining the indicating amount of air-fuel ratio change rate, the detected air-fuel ratio change rates ΔAF which are obtained within a predetermined time before or after the detected rich peak time point tRP (step 3436).

As shown in FIGS. 32 and 33, the "magnitude of the detected air-fuel ratio change rate in the vicinity of the lean peak time point at which the detected air-fuel ratio change rate becomes a local maximum value" and "magnitude of the detected air-fuel ratio change rate in the vicinity of the rich peak time point at which the detected air-fuel ratio change rate becomes a local minimum value" are small as compared with the average of the magnitude of the detected air-fuel ratio change rates, and thus, are not appropriate for obtaining the indicating amount of air-fuel ratio change rate.

In view of the above, as the present determining apparatus, the detected air-fuel ratio change rates which are obtained within the predetermined time before or after the detected lean peak time point, or the detected air-fuel ratio change rates which are obtained within the predetermined time before or after the detected rich peak time point are not used as data for obtaining the indicating amount of air-fuel ratio change rate. This enables to obtain the indicating amount of air-fuel ratio change rate (final average increasing change rate AveΔAFp and final average decreasing change rate AveΔAFm) representing the degree of the non-uniformity of the individual-cylinder-air-fuel-ratios with high accuracy. Consequently, the eleventh determining apparatus can perform the determination of an air-fuel ratio imbalance among cylinders with high accuracy.

<Twelfth Embodiment>

A control apparatus for the internal combustion engine (hereinafter, referred to as a "twelfth determining apparatus") according to a twelfth embodiment of the present invention will next be described.

The twelfth determining apparatus, similarly to the eighth determining apparatus, obtains the indicating amount of air-fuel ratio change rates, discriminating the case in which the detected air-fuel ratio change rate ΔAF is positive and the case in which the detected air-fuel ratio change rate ΔAF is negative. Further, the twelfth determining apparatus, similarly to the eighth determining apparatus, obtains the indicating amount of air-fuel ratio change rate (increasing indicating amount of change rate and decreasing indicating amount of change rate) using detected air-fuel ratio change rates ΔAF whose magnitude |ΔAF| is equal to or larger than the effective determination threshold Yukoth.

Figure 35:
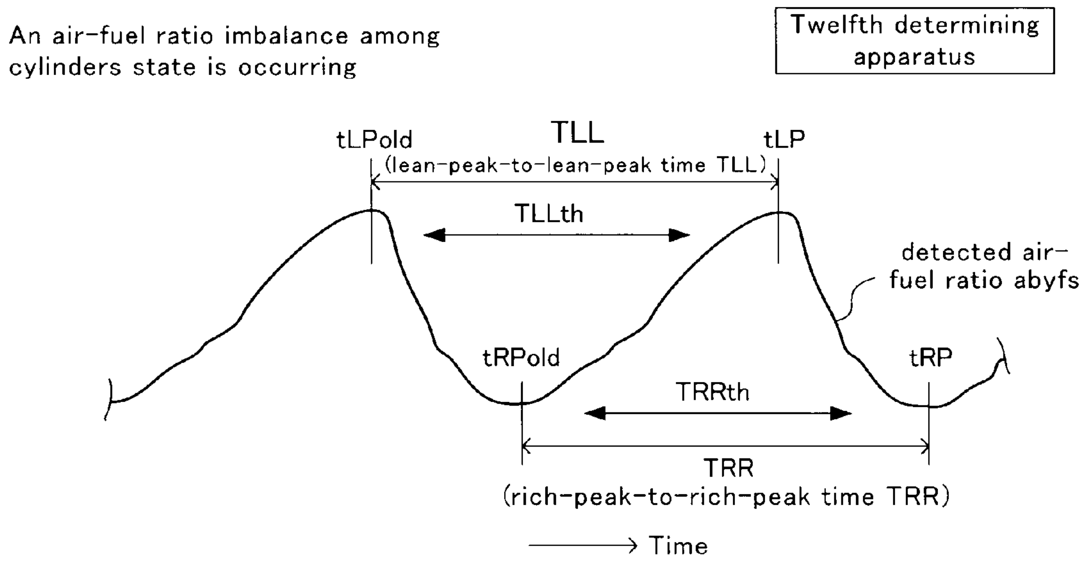
FIG. 35 shows the detected air-fuel ratio when the air-fuel ratio imbalance among cylinders state is occurring.
Figure 36:
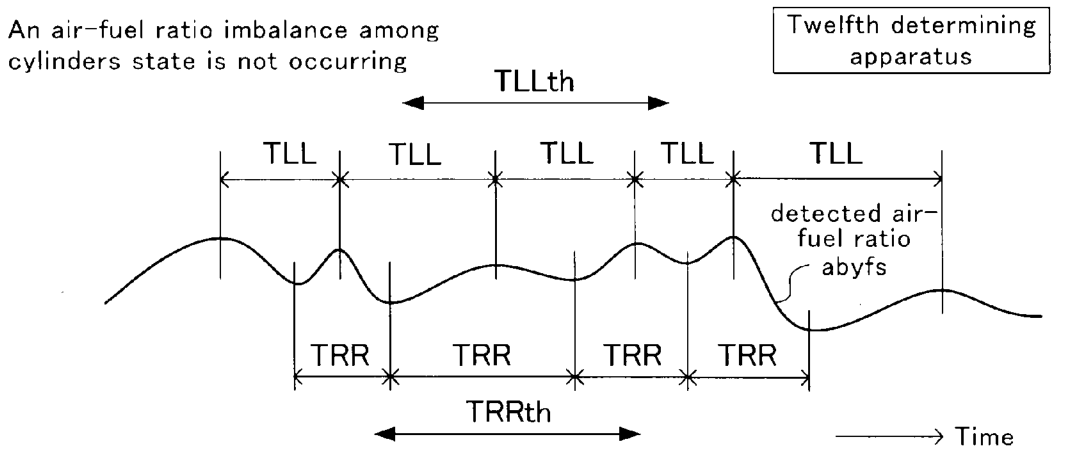
FIG. 36 shows the detected air-fuel ratio when the air-fuel ratio imbalance among cylinders state is not occurring.

In addition, the twelfth determining apparatus detects "the lean peak and the rich peak" shown in FIGS. 35 and 36. FIG. 35 shows the detected air-fuel ratio abyfs when the air-fuel ratio imbalance among cylinders state which should be detected is occurring. FIG. 36 shows the detected air-fuel ratio abyfs when the air-fuel ratio imbalance among cylinders state which should be detected is not occurring. In those FIGs., a time point tLP indicates a time point of a present lean peak, a time point tLPold indicates a time point of a previous lean peak, a time point tRP indicates a time point of a present rich peak, and a time point tRPold indicates a time point of a previous rich peak. Accordingly, a time TLL indicates a time from the previous lean peak to the present lean peak (lean-peak-to-lean-peak time TLL), and a time TRR indicates a time from the previous rich peak to the present rich peak (rich-peak-to-rich-peak time TRR).

As understood from FIG. 35, when the air-fuel ratio imbalance among cylinders state is occurring, the lean-peak-to-lean-peak time TLL and the rich-peak-to-rich-peak time TRR are substantially the same as each other. Further, the lean-peak-to-lean-peak time TLL is longer than a threshold time TLLth, and the rich-peak-to-rich-peak time TRR is longer than a threshold time TRRth. In the present example, the threshold time TLLth is the same as threshold time TRRth, and for example, is set roughly 70 to 80% of an average length of the rich-peak-to-rich-peak time TRR (or the lean-peak-to-lean-peak time TLL).

In contrast, as understood from FIG. 36, when the air-fuel ratio imbalance among cylinders state is not occurring at all, peaks often appears due to noises superimposing on the detected air-fuel ratio abyfs. Therefore, the lean-peak-to-lean-peak time TLL is shorter than the threshold time TLLth, and the rich-peak-to-rich-peak time TRR is shorter than the threshold time TRRth.

In view of the above, when the lean-peak-to-lean-peak time TLL is shorter than the threshold time TLLth, the twelfth determining apparatus does not use (discard) the detected air-fuel ratio change rates ΔAF obtained in the lean-peak-to-lean-peak time TLL, as the data for the indicating amount of air-fuel ratio change rate. Similarly, when the rich-peak-to-rich-peak time TRR is shorter than the threshold time TRRth, the twelfth determining apparatus does not use (discard) the detected air-fuel ratio change rates ΔAF obtained in the rich-peak-to-rich-peak time TRR, as the data for the indicating amount of air-fuel ratio change rate.

In addition, the twelfth determining apparatus performs the determination of an air-fuel ratio imbalance among cylinders using the routine shown in FIG. 23. Note that, the twelfth determining apparatus may perform the determination of an air-fuel ratio imbalance among cylinders using either the routine shown in FIG. 24 or the routine shown in FIG. 26.

The actual operation of the twelfth determining apparatus will next be described. The CPU of the twelfth determining apparatus is configured in such a manner that it executes the routines that the CPU of the eighth determining apparatus executes at the appropriate timings (except the routine shown in FIG. 27), and "routines for obtaining data shown by flowcharts in FIGS. 37 and 38" every elapse of "4 ms (predetermined constant sampling time ts)", in place of the routine shown in FIG. 27.

Figure 37:
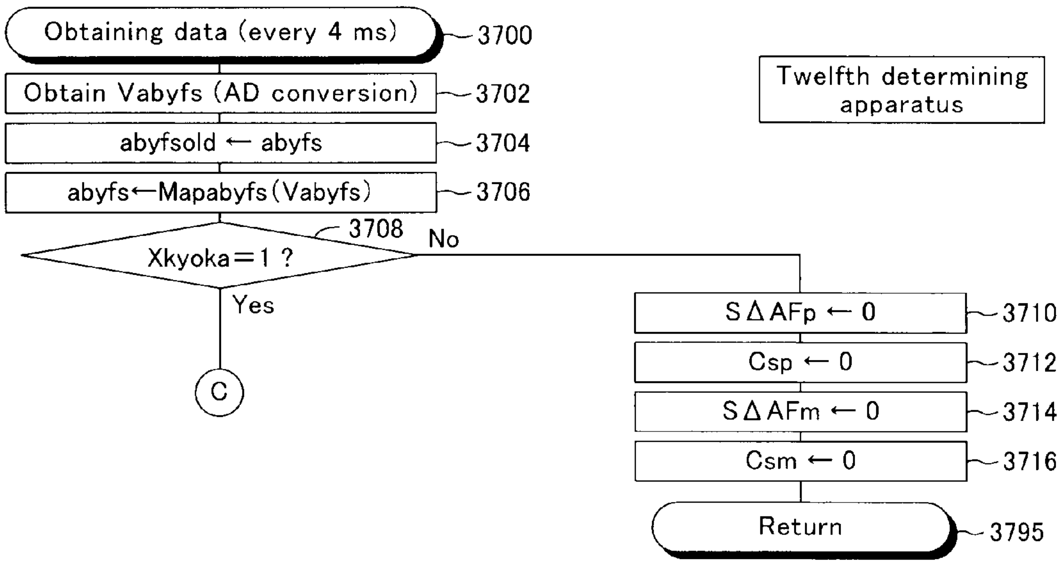
FIG. 37 is a flowchart showing a routine executed by a CPU of the air-fuel ratio imbalance among cylinders determining apparatus (twelfth determining apparatus) according to a twelfth embodiment of the present invention.

Accordingly, at an appropriate timing, the CPU starts a process from step 3700 shown in FIG. 37 to execute processes of steps from step 3702 to step 3706. Steps 3702, 3704, and 3706 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 3708 to determine whether or not the value of a determination allowable flag Xkyoka is "1". The value of the determination allowable flag Xkyoka is set in the routine shown in FIG. 20, similarly to the second determining apparatus. Further, the CPU changes the value of the determination allowable flag Xkyoka by the routine for setting flags shown in FIG. 39.

It is assumed here that the value of the determination allowable flag Xkyoka is "0". In this case, the CPU makes a "No" determination at step 3708 to execute processes of steps from step 3710 to step 3716 described below in order, and proceeds to step 3795 to end the present routine tentatively.

Steps from step 3710 to step 3716 are the same as steps from step 2710 to step 2716 shown in FIG. 27, respectively. Therefore, the value of the increasing change rate integrated value SΔAFp, the value of the counter Cs, the value of the decreasing change rate integrated value SΔAFm, and the value of the counter Csm are set to (at) "0", respectively. Thereafter, the CPU proceeds to step 3795 to end the present routine tentatively.

Next, it is assumed that the value of the determination allowable flag Xkyoka is changed to "1". In this case, the CPU makes a "Yes" determination at step 3708 to proceed to step 3802 shown in FIG. 38 (refer to "C"). At step 3802, the CPU obtains the detected air-fuel ratio change rate ΔAF (=present detected air-fuel ratio abyfs−previous detected air-fuel ratio abyfsold) by subtracting the previous detected air-fuel ratio abyfsold from the present detected air-fuel ratio abyfs.

Subsequently, the CPU proceeds to some of appropriate steps from step 3804 to step 3814. Steps from step 3804 to step 3814 are the same as steps from step 2720 to step 2730 shown in FIG. 27, respectively.

Accordingly, when the detected air-fuel ratio change rate ΔAF is equal to or larger than "0" in a case in which the magnitude (absolute value |ΔAF| of the ΔAF) of the detected air-fuel ratio change rate ΔAF is equal to or larger than the effective determination threshold Yukoth, the increasing change rate integrated value SΔAFp is updated, and the value of the counter Csp is incremented by "1". Further, when the detected air-fuel ratio change rate ΔAF is smaller than "0" in a case in which the magnitude (absolute value |ΔAF| of the ΔAF) of the detected air-fuel ratio change rate ΔAF is equal to or larger than the effective determination threshold Yukoth, the decreasing change rate integrated value SΔAFm is updated, and the value of the counter Csm is incremented by "1".

Thereafter, the CPU proceeds to "step 3816 which is the same as step 2732 shown in FIG. 27" to determine whether or not the rich peak has come. When the rich peak has come, the CPU executes processes of steps from step 3818 to step 3822 described below in order.

Step 3818: The CPU stores, as a previous rich peak time point tRPold, the rich peak time point tRP which was previously obtained.

Step 3820: The CPU obtains, as a "present rich peak time point tRP", a time point the sampling time ts before the present time point t. That is, since it is confirmed that the detected air-fuel ratio change rate ΔAF has changed form the negative value to the positive value at the present time point, the CPU infers that the detected air-fuel ratio abyfs reached the rich peak the sampling time ts before the present time point t.

Step 3822: The CPU obtains, as the rich-peak-to-rich-peak time TRR, a difference between the previous rich peak time point tRPold and the present rich peak time point tRP, and determines whether or not the rich-peak-to-rich-peak time TRR is shorter than the threshold time TRRth.

When the rich-peak-to-rich-peak time TRR is shorter than the threshold time TRRth, the CPU makes a "Yes" determination at step 3822 to proceed to step 3830, at which the CPU sets the value of a noise occurrence flag Xnoise to (at) "1". The noise occurrence flag Xnoise is set to (at) "0" by the initialization routine described above. Further, the noise occurrence flag Xnoise is set to (at) "0" at step 3930 shown in FIG. 39 described later, when a predetermined time Tnoise has elapsed from a time point at which the value of the noise occurrence flag Xnoise was changed from "0" to "1".

Subsequently, the CPU executes processes of steps from step 3832 to step 3836 described below, and proceeds to step 3795 to end the present routine tentatively.

Step 3832: The CPU sets the decreasing change rate integrated value SΔAFm and the counter Csm to (at) "0", respectively (the values are cleared).

Step 3834: The CPU sets the increasing change rate integrated value SΔAFp and the counter Csp to (at) "0", respectively (the values are cleared).

Step 3836: The CPU stores, as the previous detected air-fuel ratio change rate ΔAF, the detected air-fuel ratio change rate ΔAF obtained at step 3802.

In contrast, the rich-peak-to-rich-peak time TRR is equal to or longer than the threshold time TRRth, the CPU makes a "No" determination at step 3822 to proceed to step 3824, at which the CPU obtains an average (average decreasing change rate Avem) of the decreasing change rate ΔAFm through dividing the decreasing change rate integrated value SΔAFm by the counter Csm.

Subsequently, the CPU proceeds to step 3826 to update an integrated value SAvem of the average decreasing change rate Avem. Specifically, the CPU calculates the present "integrated value SAvem of the average decreasing change rate Avem" by adding the present average decreasing change rate Avem newly obtained at step 3824 to the "integrated value SAvem of the average decreasing change rate Avem" at that time point. Thereafter, the CPU proceeds to step 3828 to increment the value of the counter Nm by "1" to proceed to step 3795 via steps from step 3832 to step 3836.

In contrast, if the previous detected air-fuel ratio change rate ΔAFold is larger than "0" or the present detected air-fuel ratio change rate ΔAF is equal to or smaller than "0" when the CPU executes the process of step 3816, the CPU makes a "No" determination at step 3816 to proceed to step 3838. At step 3838, the CPU determines whether or not the "previous detected air-fuel ratio change rate ΔAFold is equal to or larger than "0", and the present detected air-fuel ratio change rate ΔAF is smaller than "0"". That is, at step 3838, the CPU determines whether or not the inclination of the detected air-fuel ratio abyfs has changed from a positive value to a negative value (i.e., whether or not the detected air-fuel ratio abyfs passes a "lean peak" which is a peak being convex upward).

When the previous detected air-fuel ratio change rate ΔAFold is equal to or larger than "0", and the present detected air-fuel ratio change rate ΔAF is smaller than "0", the CPU makes a "Yes" determination at step 3838 to execute processes of steps from step 3840 to step 3844 described below in order.

Step 3840: The CPU stores, as a previous lean peak time point tLPold, the lean peak time point tLP which was previously obtained.

Step 3842: The CPU obtains, as a "present lean peak time point tLP", a time point the sampling time ts before the present time point t. That is, since it is confirmed that the detected air-fuel ratio change rate ΔAF has changed form the positive value to the negative value at the present time point, the CPU infers that the detected air-fuel ratio abyfs reached the lean peak the sampling time ts before the present time point t.

Step 3844: The CPU obtains, as the lean-peak-to-lean-peak time TLL, a difference between the previous lean peak time point tLPold and the present lean peak time point tLP, and determines whether or not the lean-peak-to-lean-peak time TLL is shorter than the threshold time TLLth.

When the lean-peak-to-lean-peak time TLL is shorter than the threshold time TLLth, the CPU makes a "Yes" determination at step 3844 to proceed to step 3852, at which the CPU sets the value of the noise occurrence flag Xnoise to (at) "1". Thereafter, the CPU proceeds to steps from step 3832.

In contrast, the lean-peak-to-lean-peak time TLL is equal to or longer than the threshold time TLLth, the CPU makes a "No" determination at step 3844 to proceed to step 3846, at which the CPU obtains an average (average increasing change rate Avep) of the increasing change rate ΔAFp through dividing the increasing change rate integrated value SΔAFp by the counter Csp.

Subsequently, the CPU proceeds to step 3848 to update an integrated value SAvep of the average increasing change rate Avep. Specifically, the CPU calculates the present "integrated value SAvep of the average increasing change rate Avep" by adding the present average increasing change rate Avep newly obtained at step 3846 to the "integrated value SAvep of the average increasing change rate Avep" at that time point.

Thereafter, the CPU proceeds to step 3850 to increment the value of the counter Np by "1" to proceed to step 3795 via steps from step 3832 to step 3836.

In this manner, when the "Yes" determination is made at step 3822, that is, when the rich-peak-to-rich-peak time TRR is shorter than the threshold time TRRth, the decreasing change rate integrated value SΔAFm obtained in the rich-peak-to-rich-peak time TRR is discarded at step 3832, and the increasing change rate integrated value SΔAFp obtained in the rich-peak-to-rich-peak time TRR is discarded at step 3834.

Similarly, when the "Yes" determination is made at step 3844, that is, when the lean-peak-to-lean-peak time TLL is shorter than the threshold time TLLth, the decreasing change rate integrated value SΔAFm obtained in the lean-peak-to-lean-peak time TLL is discarded at step 3832, and the increasing change rate integrated value SΔAFp obtained in the lean-peak-to-lean-peak time TLL is discarded at step 3834.

Further, the CPU performs the "routine for processing data" shown in FIG. 28 every time the predetermined time (4 ms) elapses to thereby calculate the average AveΔAFp (final average increasing change rate which is the indicating amount of air-fuel ratio change rate) of the average increasing change rate Avep, and the average AveΔAFm (final average decreasing change rate which is the indicating amount of air-fuel ratio change rate) of the average decreasing change rate Avem. In addition, since the value of the determination execution flag Xhantei is set to (at) "1" at step 2860, the CPU performs the determination of an air-fuel ratio imbalance among cylinders according to the routine shown in FIG. 23 (or, FIG. 24 or 26).

Figure 39:
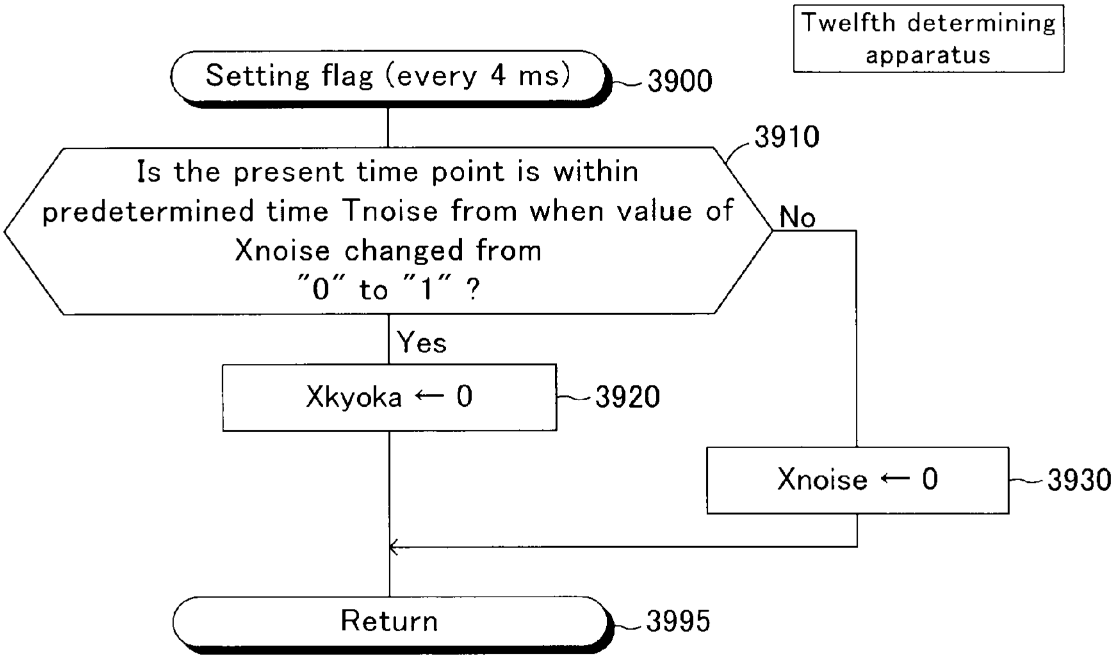
FIG. 39 is a flowchart showing a routine executed by the CPU of the twelfth determining apparatus.

In addition, the CPU starts a process from step 3900 shown in FIG. 39 to proceed to step 3910, at which the CPU determines whether or not "the present time point is within the predetermined time Tnoise from the time point at which the value of the noise occurrence flag Xnoise changed from "0" to "1"".

When the present time point is within the predetermined time Tnoise from the time point at which the value of the noise occurrence flag Xnoise changed from "0" to "1", the CPU proceeds to step 3920 to set the value of the determination allowable flag Xkyoka to (at) "0".

As a result, since the value of the determination allowable flag Xkyoka is maintained at "0", the CPU makes a "No" determination at step 3708 when the CPU proceeds to step 3708 to proceed to step 3710. Accordingly, the calculation of the indicating amount of air-fuel ratio change rate (in the present example, the final average increasing change rate AveΔAFp and the final average decreasing change rate AveΔAFm)" using the detected air-fuel ratio change rate ΔAF are substantially prohibited, in the period within the predetermined time Tnoise from the time point at which the value of the noise occurrence flag Xnoise changed from "0" to "1".

In contrast, if the present time point is not within the predetermined time Tnoise from the time point at which the value of the noise occurrence flag Xnoise changed from "0" to "1" when the CPU executes the process of step 3910, the CPU makes a "No" determination at step 3910 to proceed to step 3930, at which the CPU sets the value of the noise occurrence flag Xnoise to (at) "0". Further, in this case, the CPU does not set the value of the determination allowable flag Xkyoka to (at) "0". Consequently, when the value of the determination allowable flag Xkyoka is to (at) "1", the CPU makes a "Yes" determination at step 3708 shown in FIG. 37, so that the CPU executes the routine shown in FIG. 38.

As described above, the twelfth determining apparatus is configured in such a manner that it detects, as the lean peak time point tLP, the time point at which the detected air-fuel ratio change rate ΔAF changes from a positive value to a negative value; and it does not use the detected air-fuel ratio change rates ΔAF obtained in the lean-peak-to-lean-peak time TLL which is a time between two of lean peak time points tLP consecutively detected, as the data for the indicating amount of air-fuel ratio change rate, when the lean-peak-to-lean-peak time TLL is shorter than the threshold time TLLth (refer to the "Yes" determination at step 3844, step 3832 and step 3834).

Similarly, the twelfth determining apparatus is configured in such a manner that it detects, as the rich peak time point tRP, the time point at which the detected air-fuel ratio change rate ΔAF changes from a negative value to a positive value; and it does not use the detected air-fuel ratio change rates ΔAF obtained in the rich-peak-to-rich-peak time TRR which is a time between two of rich peak time points tRP consecutively detected, as the data for the indicating amount of air-fuel ratio change rate, when the rich-peak-to-rich-peak time TRR is shorter than the threshold time TRRth (refer to the "Yes" determination at step 3822, step 3832 and step 3834).

As described above, when the air-fuel ratio imbalance among cylinders state is not occurring at all, the lean-peak-to-lean-peak time TLL is shorter than the threshold time TLLth, and the rich-peak-to-rich-peak time TRR is shorter than the threshold time TRRth.

According to the twelfth determining apparatus, the detected air-fuel ratio change rate ΔAF obtained when the air-fuel ratio imbalance among cylinders is not occurring at all is not used for the calculation of the indicating amount of air-fuel ratio change rate, and thus, the indicating amount of air-fuel ratio change rate which can represent the degree of the non-uniformity of the individual-cylinder-air-fuel-ratios with high accuracy can be obtained. Consequently, the determination of an air-fuel ratio imbalance among cylinders can be performed with high accuracy.

Figure 38:
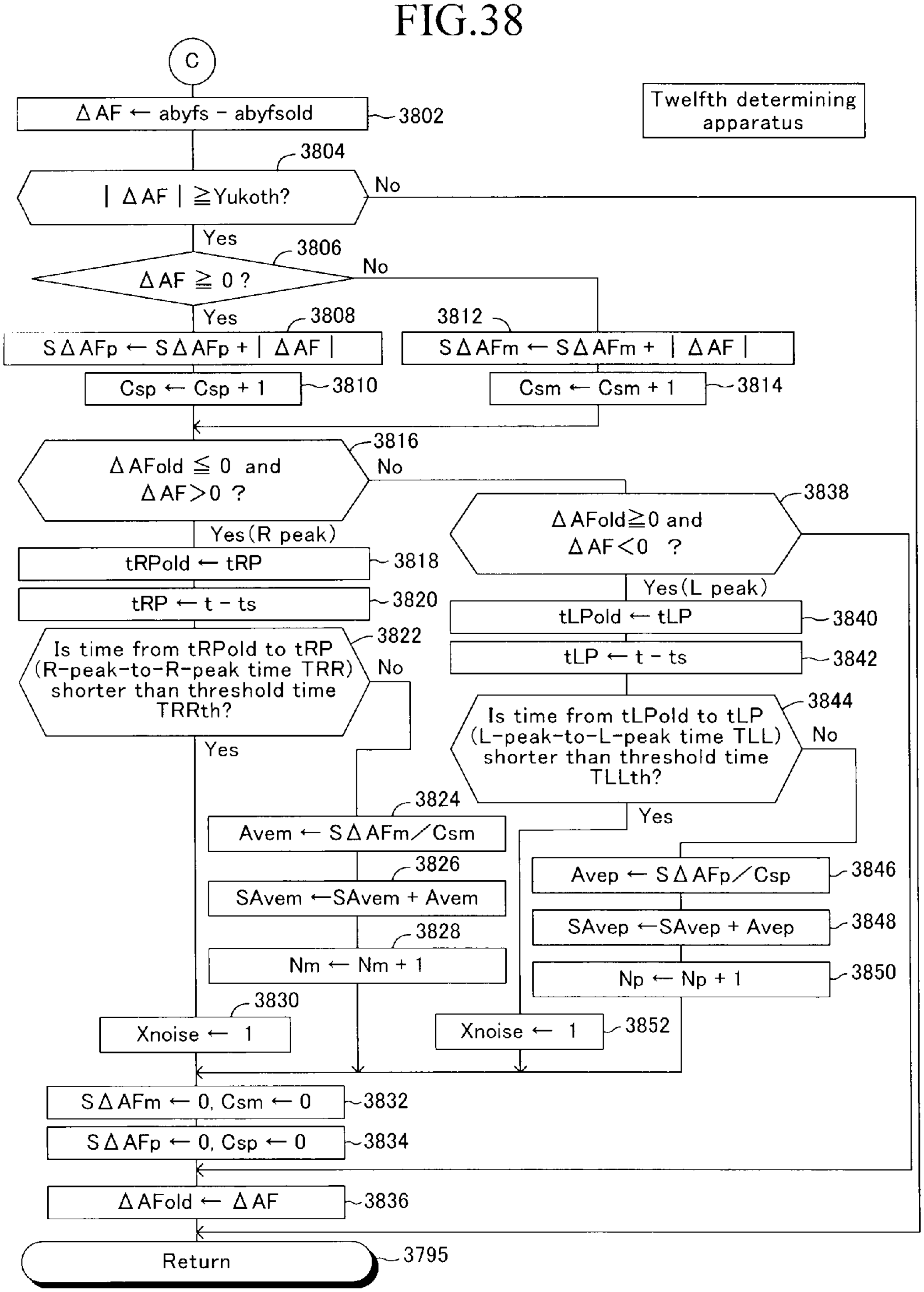
FIG. 38 is a flowchart showing a routine executed by the CPU of the twelfth determining apparatus.

Further, when it is detected that the lean-peak-to-lean-peak time TLL is shorter than the threshold time TLLth, or when it is detected than the rich-peak-to-rich-peak time TRR is shorter than the threshold time TRRth, the determination allowable flag Xkyoka is maintained at "0" by setting the noise occurrence flag Xnoise to (at) 1 until the predetermined time Tnoise elapses from that detecting time point (step 3830 and step 3852 in FIG. 38, the routine shown in FIG. 39). Accordingly, up to when the predetermined time Tnoise elapses from when it is determined that the air-fuel ratio imbalance among cylinders state is not occurring (when it is detected that the lean-peak-to-lean-peak time TLL is shorter than the threshold time TLLth, or when it is detected than the rich-peak-to-rich-peak time TRR is shorter than the threshold time TRRth), the determination of an air-fuel ratio imbalance among cylinders is not performed based on the output abyfs of the air-fuel ratio sensor on which the a lot of noises are superimposing. Therefore, the twelfth determining apparatus can perform the determination of an air-fuel ratio imbalance among cylinders with high accuracy.

It should be noted that the twelfth determining apparatus may execute a routine in which the CPU goes through step 3832 and step 3836 only after it performs the process of step 3828 shown in FIG. 38 (that is, not through step 3834). Similarly, the twelfth determining apparatus may execute a routine in which the CPU goes through step 3834 and step 3836 only after it performs the process of step 3850 shown in FIG. 38 (that is, not through step 3832).

<Modification of the Twelfth Embodiment>

Figure 40:
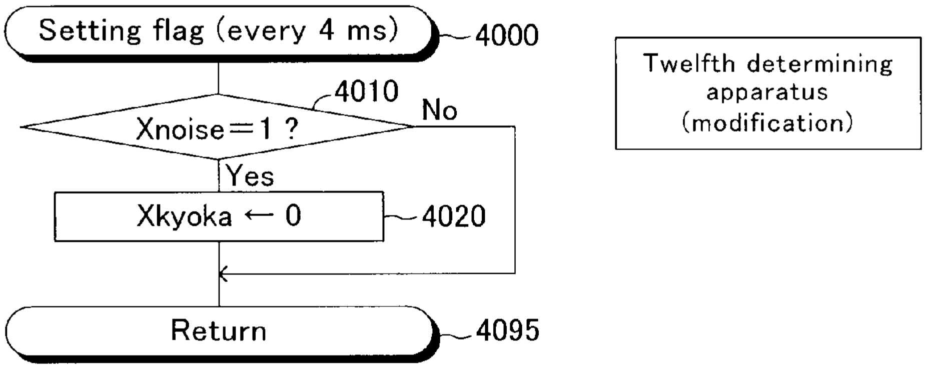
FIG. 40 is a flowchart showing a routine executed by the CPU of a modification of the twelfth determining apparatus.
Figure 41:
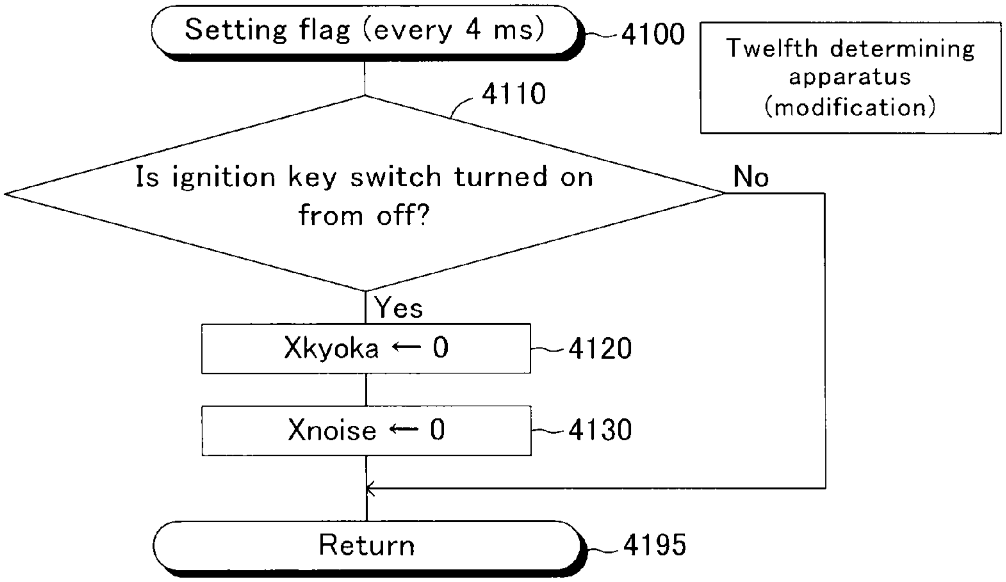
FIG. 41 is a flowchart showing a routine executed by the CPU of the modification of the twelfth determining apparatus.

A CPU of a modification of the twelfth embodiment is configured so as to execute routines for setting flags shown in FIGS. 40 and 41, in place of the routine shown in FIG. 39. Note that the CPU stores the value of the noise occurrence flag Xnoise in the back up RAM.

The CPU, at an appropriate timing, starts a process from step 4000 shown in FIG. 40 to proceed to step 4010, at which the CPU determines whether or not the value of the noise occurrence flag Xnoise is “1”. When the value of the noise occurrence flag Xnoise is not “1”, the CPU makes a “No” determination at step 4010 to directly proceed to step 4095 to end the present routine tentatively.

In contrast, if the value of the noise occurrence flag Xnoise is “1” when the CPU executes the process of step 4010, the CPU makes a “Yes” determination at step 4010 to proceed to step 4020, at which the CPU sets the value of the determination allowable flag Xkyoka to (at) “0”, then proceeds to step 4095 to end the present routine tentatively. Therefore, the determination allowable flag Xkyoka is maintained at “0” as long as the noise occurrence flag Xnoise is “1”.

Further, at an appropriate timing, the CPU starts a process from step 4100 shown in FIG. 41 to proceed to step 4110, at which the CPU monitors whether or not the ignition key switch is turned on from off. When the ignition key switch is turned on from off, the CPU makes a “Yes” determination at step 4110 to proceed to step 4120, at which the CPU sets the value of the determination allowable flag Xkyoka to (at) “0” (the value is cleared). Further, the CPU proceeds to step 4130 to set the noise occurrence flag Xnoise to (at) “0” (the value is cleared). In contrast, when the present time point is not immediately after the time point when the ignition key switch is turned on from off, the CPU makes a “No” determination at step 4110 to directly proceed to step 4195 to end the present routine tentatively.

Consequently, in the modification of the twelfth determining apparatus, once the value of the noise occurrence flag Xnoise is set to (at) “1”, the value of the noise occurrence flag Xnoise is maintained at “1” and the value of the determination allowable flag Xkyoka is maintained at “0” until the ignition key switch is turned on from off. Accordingly, when it is detected that the lean-peak-to-lean-peak time TLL is shorter than the threshold time TLLth, or when it is detected than the rich-peak-to-rich-peak time TRR is shorter than the threshold time TRRth, the calculation of the “indicating amount of air-fuel ratio change rate (in the present example, the final average increasing change rate AveΔAFp and the final average decreasing change rate AveΔAFm)” using the detected air-fuel ratio change rate ΔAF are substantially prohibited, until the engine is stopped and is again started. In addition, since the value of the determination allowable flag Xkyoka is maintained at “0”, the CPU continues to make the “No” determination at step 2810 shown in FIG. 28. Accordingly, when the value of the value of the noise occurrence flag Xnoise is set to (at) “1”, the determination of an air-fuel ratio imbalance among cylinders is not performed until the engine 10 is restarted.

As described above, according to the modification of the twelfth determining apparatus, the determination of an air-fuel ratio imbalance among cylinders is not performed based on the output abyfs of the air-fuel ratio sensor on which the a lot of noises are superimposing. Therefore, the modification of the twelfth determining apparatus can perform the determination of an air-fuel ratio imbalance among cylinders with high accuracy.

It should be noted that the twelfth determining apparatus and its modification may determine the threshold time TRRth and the threshold time TLLth, based on a “time Tcy corresponding to the single unit combustion cycle period”. For example, the threshold time TRRth and the threshold time TLLth may be k (k being 0.7 to 0.8, or so) times longer than the time Tcy.

It should be also noted that the twelfth determining apparatus and its modification may be configured so as to detects the rich peak (local minimum value of the indicating amount of air-fuel ratio change rate) based on a change in the sign of the indicating amount of air-fuel ratio change rate; so as to determine whether or not a time period between the consecutive two rich peaks (rich-peak-to-rich-peak time TRR) is longer than a predetermined time, and so as to determine that the air-fuel ratio imbalance among cylinders state is occurring when the rich-peak-to-rich-peak time TRR is longer than the predetermined time.

Similarly, the twelfth determining apparatus and its modification may be configured so as to detects the lean peak (local maximum value of the indicating amount of air-fuel ratio change rate) based on a change in the sign of the indicating amount of air-fuel ratio change rate; so as to determine whether or not a time period between the consecutive two lean peaks (lean-peak-to-lean-peak time TLL) is longer than a predetermined time, and so as to determine that the air-fuel ratio imbalance among cylinders state is occurring when the lean-peak-to-lean-peak time TLL is longer than the predetermined time.

<Thirteenth Embodiment>

A control apparatus for the internal combustion engine (hereinafter, referred to as a “thirteenth determining apparatus”) according to a thirteenth embodiment of the present invention will next be described.

The thirteenth determining apparatus is different from the twelfth determining apparatus only in that the thirteenth determining apparatus determines “the threshold time TRRth used at step 3822 shown in FIG. 38, and the threshold time TLLth used at step 3844 shown in FIG. 38” based on “a plurality of rich-peak-to-rich-peak times TRR and a plurality of the lean-peak-to-lean-peak times TLL”, respectively. Accordingly, this different point is mainly described, hereinafter.

Figure 42:
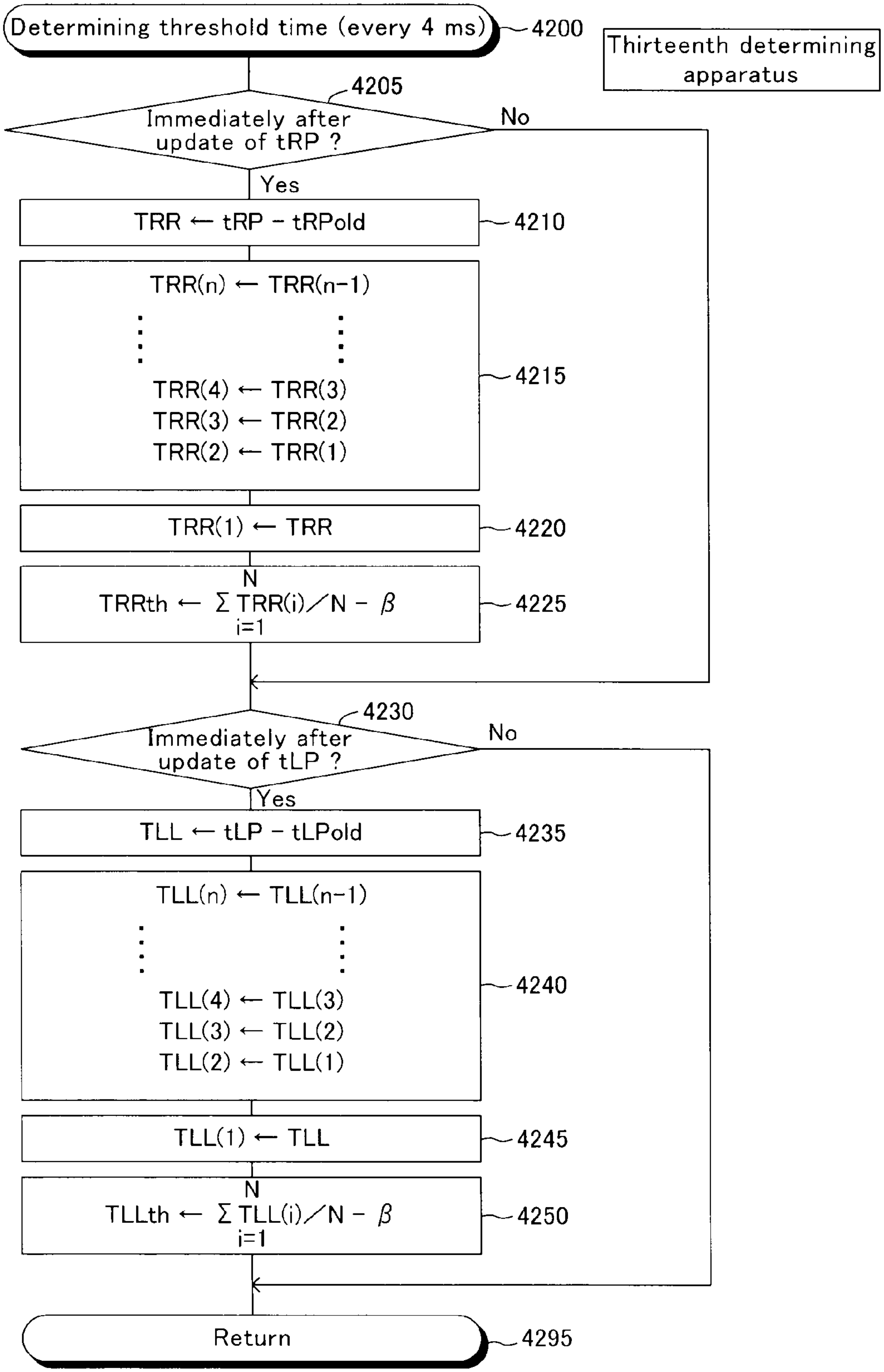
FIG. 42 is a flowchart showing a routine executed by a CPU of the air-fuel ratio imbalance among cylinders determining apparatus (thirteenth determining apparatus) according to a thirteenth embodiment of the present invention.

The CPU of the thirteenth determining apparatus is configured so as to execute a “routine for determining threshold time” shown by a flowchart in FIG. 42 every elapse of a predetermine time (e.g., 4 ms), in addition to the routines that the CPU of the twelfth determining apparatus executes.

Accordingly, at an appropriate timing, the CPU starts process from step 4200 in FIG. 42 to proceed to step 4205, at which the CPU determines whether or not the present time point is immediately after an update of the rich peak time point tRP (i,e, whether or not the present time point is immediately after the process of step 3820 shown in FIG. 38 is executed). When the present time point is not immediately after the update of the rich peak time point tRP, the CPU directly proceeds to step 4230.

In contrast, when the present time point is immediately after the update of the rich peak time point tRP, the CPU executes processes of steps from step 4210 to step 4225 described below in order, then proceeds to step 4230.

Step 4210: The CPU obtains the newest rich-peak-to-rich-peak time TRR by subtracting the previous rich peak time point tRPold from the present rich peak time point tRP.

Step 4215: The CPU transfers a time TRR(k−1) to a time TRR(k), wherein k is an any natural number from 2 to n (n is 10, for example).

Step 4220: The CPU stores the newest rich-peak-to-rich-peak time TRR obtained at step 4220 as a time TRR(1).

Step 4225: The CPU obtaines an average of a time TRR (m), wherein m is an any natural number from 1 to n, and sets, as the threshold time TRRth used at step 3822 shown in FIG. 38, a value obtained by subtracting a perdetermined positive value β from the average.

According to these processes, the threshold time TRRth becomes a value based on the averaged time of a plurality of the past n rich-peak-to-rich-peak times TRR, the value being the predetermined time β shorter than the averaged time.

Further, when the CPU proceeds to step 4230, the CPU determines the present time point is immediately after an update of the lean peak time point tLP (i,e, whether or not the present time point is immediately after the process of step 3842 shown in FIG. 38 is executed). When the present time point is not immediately after the update of the lean peak time point tLP, the CPU directly proceeds to step 4295 to end the present routine tentatively.

In contrast, when the present time point is immediately after the update of the lean peak time point tLP, the CPU executes processes of steps from step 4235 to step 4250 described below in order, then proceeds to step 4295.

Step 4235: The CPU obtains the newest lean-peak-to-lean-peak time TLL by subtracting the previous lean peak time point tLPold from the present lean peak time point tLP.

Step 4240: The CPU transfers a time TLL(k−1) to a time TLL(k), wherein k is an any natural number from 2 to n (n is 10, for example).

Step 4245: The CPU stores the newest lean-peak-to-lean-peak time TLL obtained at step 4235 as a time TLL(1).

Step 4250: The CPU obtaines an average of a time TLL(m), wherein m is an any natural number from 1 to n, and sets, as the threshold time TLLth used at step 3844 shown in FIG. 38, a value obtained by subtracting the perdetermined positive value β from the average.

According to these processes, the threshold time TLLth becomes a value based on the averaged time of a plurality of the past n lean-peak-to-lean-peak times TLL, the value being the predetermined time 13 shorter than the averaged time.

As described above, the thirteenth determining apparatus determines the threshold time TRRth based on n of the past rich-peak-to-rich-peak times TRR, and determines the threshold time TLLth based on n of the past lean-peak-to-lean-peak times TLL. Accordingly, the thirteenth determining apparatus can determine whether or not the noises start to superimpose on the output abyfs of the air-fuel ratio sensor with high accuracy.

<Fourteenth Embodiment>

A control apparatus for the internal combustion engine (hereinafter, referred to as a "fourteenth determining apparatus") according to a fourtheenth embodiment of the present invention will next be described.

The fourteenth determining apparatus is different from the twelfth determining apparatus only in that the CPU sets "the threshold time TRRth used at step 3822 shown in FIG. 38, and the threshold time TLLth used at step 3844 shown in FIG. 38" to a "value varying depending on the engine rotational speed NE (more specifically, the value being smaller as the engine rotational speed NE beign larger)". Accordingly, this different point is mainly described, hereinafter.

Figure 43:
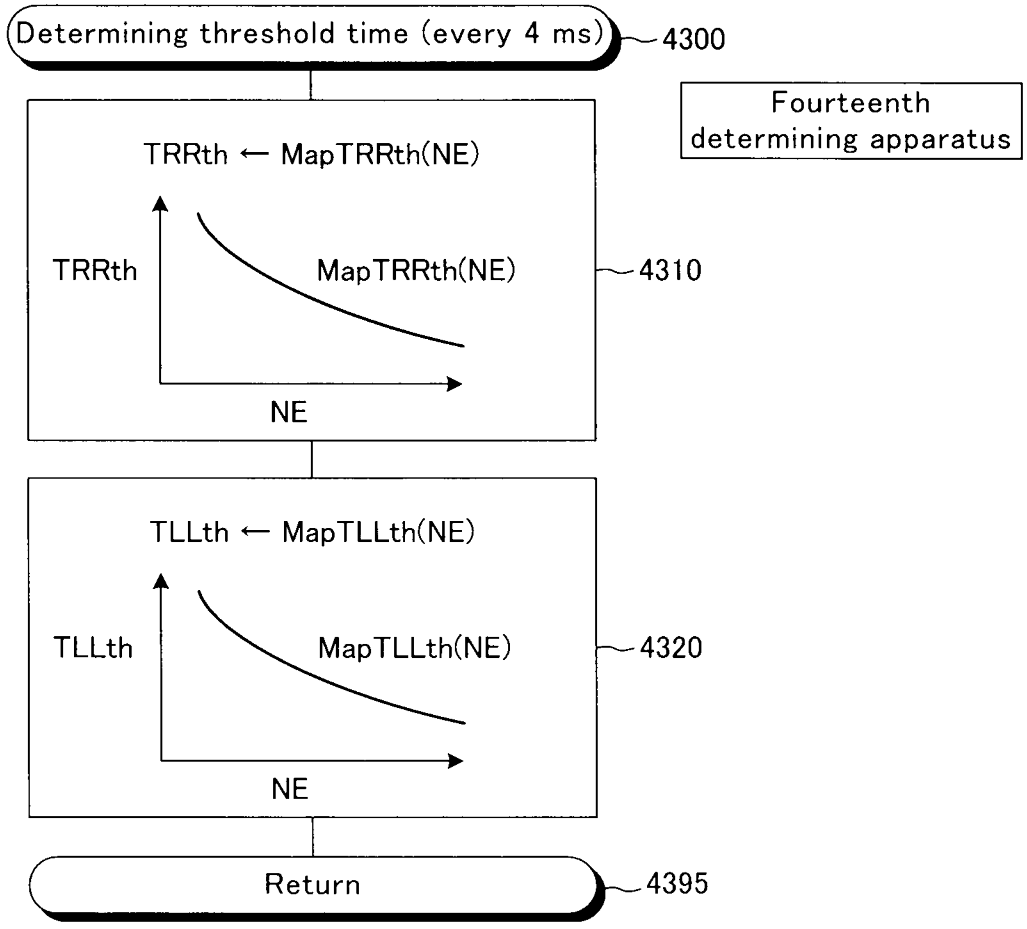
FIG. 43 is a flowchart showing a routine executed by a CPU of the air-fuel ratio imbalance among cylinders determining apparatus (fourteenth determining apparatus) according to a fourteenth embodiment of the present invention.

The CPU of the fourteenth determining apparatus is configured so as to execute a "routine for determining threshold time" shown by a flowchart in FIG. 43 every elapse of a predetermine time (e.g., 4 ms), in addition to the routines that the CPU of the twelfth determining apparatus executes.

Accordingly, at an appropriate timing, the CPU starts process from step 4300 in FIG. 43 to proceed to setp 4310, at which the CPU determines the threshold time TRRth by applying the engine rotational speed NE to a "rich threshold time determining table MapTRRth" shown in a block of step 4310 in FIG. 43". According to the rich threshold time determining table MapTRRth, the rich threshold time TRR is obtained so as to be smaller as the engine rotational speed NE becomes larger (the rich threshold time TRRth is determined so as to be substantially inversely proportional to the engine rotational speed NE).

Subsequently, the CPU proceeds to step 4320 to determine the threshold time TLLth by applying the engine rotational speed NE to a "lean threshold time determining table MapTLLth" shown in a block of step 4320". According to the lean threshold time determining table MapTLLth, the lean threshold time TLL is obtained so as to be smaller as the engine rotational speed NE becomes larger (the lean threshold time TLLth is determined so as to be substantially inversely proportional to the engine rotational speed NE). Thereafter, the CPU proceeds to step 4395 to end the present routine tentatively.

As descrived above, when the air-fuel ratio imbalance among cylinders state is occurring, the rich peak emerges once per one unit combustion combustion cycle, and the lean peak emerges once per one unit combustion combustion cycle. Therefore, the rich-peak-to-rich-peak time TRR becomes shorter as the engine rotational speed NE becomes larger. Similarly, the lean-peak-to-lean-peak time TLL becomes shorter as the engine rotational speed NE becomes larger.

Accordingly, as the fourteenth determining apparatus, by setting the rich threshold time TRRth the "time which is inversely proportional to the engine rotational speed NE, and is shorter than the rich-peak-to-rich-peak time TRR when the air-fuel ratio imbalance among cylinders state is occurring", it can be avoided that the indicating amount of air-fuel ratio change rate is obtained based on the output abyfs of the air-fuel ratio sensor on which the noise is superimposing. Similarly, as the fourteenth determining apparatus, by setting the rich threshold time TLLth the "time which is inversely proportional to the engine rotational speed NE, and is shorter than the lean-peak-to-lean-peak time TLL when the air-fuel ratio imbalance among cylinders state is occurring", it can be avoided that the indicating amount of air-fuel ratio change rate is obtained based on the output abyfs of the air-fuel ratio sensor on which the noise is superimposing.

<Fifteenth Embodiment>

A control apparatus for the internal combustion engine (hereinafter, referred to as a "fifteenth determining apparatus") according to a fifteenth embodiment of the present invention will next be described.

The fifteenth determining apparatus detects the rich peak and the lean peak, similarly to the eighth determining apparatus. However, when it is determined that a magnitude of a difference between the "number of data DnRR of the detected air-fuel ratio change rate ΔAF obtained in a period from the previous rich peak (time point tRPold) to the present rich peak (time point tRP)" and the "number of data DnLL of the detected air-fuel ratio change rate ΔAF obtained in a period from the previous lean peak (time point tLPold) to the present lean peak (time point tLP)" is equal to or smaller than a threshold ath, the fifteenth determining apparatus does not use (discard) the detected air-fuel ratio change rates ΔAF obtained within the one unit combustion cycle period prior to that detection time point, for the calculation of the indicating amount of air-fuel ratio change rate.

Further, when the number of data (the number of effective data) that is not discarded reaches a constant value Cokth, the fifteenth determining apparatus obtains, as the final average increasing change rate AveΔAFp, an average of the effective data, each having a positive value, and it also obtains, as the final average decreasing change rate AveΔAFm, an average of the effective data, each having a negative value.

Thereafter, the fifteenth determining apparatus performs the determination of an air-fuel ratio imbalance among cylinders using the routine shown in FIG. 23. Note that, the fifteenth determining apparatus may perform the determination of an air-fuel ratio imbalance among cylinders using either the routine shown in FIG. 24 or the routine showin in FIG. 26.

The actual operation of the fifteenth determining apparatus will next be described. The CPU of the fifteenth determining apparatus is configured in such a manner that it executes the routines that the CPU of the eighth determining apparatus executes at the appropriate timings (except the routine shown in FIG. 27), and executes "routines for obtaining data" shown by flowcharts in FIGS. 44 and 45" every elapse of "4 ms (a predetermined constant sampling time ts)", in place of the routine shown in FIG. 27.

Figure 44:
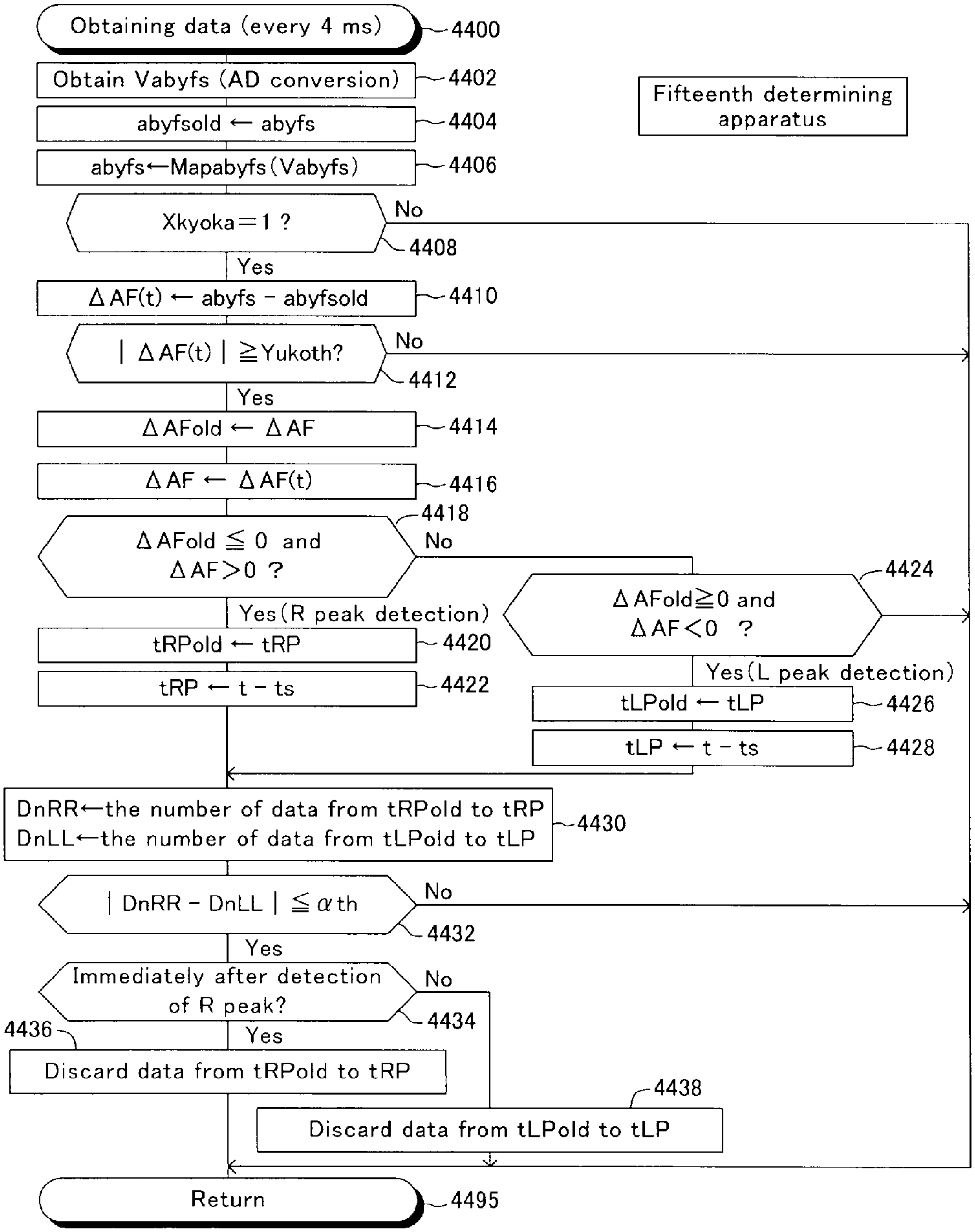
FIG. 44 is a flowchart showing a routine executed by a CPU of the air-fuel ratio imbalance among cylinders determining apparatus (fifteenth determining apparatus) according to a fifteenth embodiment of the present invention.

Accordingly, at an appropriate timing, the CPU starts a process from step 4400 shown in FIG. 44 to execute processes of steps from step 4402 to step 4406. Steps 4402, 4404, and 4406 are the same as steps 1710, 1720, and 1730 shown in FIG. 17, respectively. Therefore, the output Vabyfs of the air-fuel ratio sensor, the previous detected air-fuel ratio abyfsold, and the present detected air-fuel ratio abyfs are obtained, every elapse of the sampling time ts.

Subsequently, the CPU proceeds to step 4408 to determine whether or not the value of the determination allowable flag Xkyoka is "1". The value of the determination allowable flag Xkyoka is set in the routine shown in FIG. 20, similarly to the second determining apparatus.

It is assumed here that the value of the determination allowable flag Xkyoka is "0". In this case, the CPU makes a "No" determination at step 4408 to directly proceed to step 4495 to end the present routine tentatively.

In contrast, when the value of the determination allowable flag Xkyoka is "1", the CPU makes a "Yes" determination at step 4408 to proceed to step 4410, at which the CPU obtains the "detected air-fuel ratio change rate ΔAF(t) at the present time point t (=present detected air-fuel ratio abyfs−previous detected air-fuel ratio abyfsold) by subtracting the previous detected air-fuel ratio abyfsold from the present detected air-fuel ratio abyfs. The detected air-fuel ratio change rate ΔAF(t) at the present time point t is stored in the RAM while correlating the time point t.

Subsequently, the CPU proceeds to step 4412 to determine whether or not a magnitude of the detected air-fuel ratio change rate ΔAF(t) (an absolute value |ΔAF(t)| of ΔAF(t)) is equal to or larger than a effective determination threshold Yukoth. The effective determination threshold Yukoth is a value obtained by adding a predetermined value δ serving as a margin to an average or a maximum value of the magnitude (|ΔAF|) of the detected air-fuel ratio change rate ΔAF when the individual-cylinder-air-fuel-ratios are substantially the same as each other.

When the magnitude (absolute value |ΔAF(t)| of ΔAF) of the detected air-fuel ratio change rate ΔAF(t) is smaller than the effective determination threshold Yukoth, the CPU makes a "No" determination at step 4412 to directly proceed to step 4495 to end the present routine tentatively.

In contrast, if the magnitude (absolute value |ΔAF(t)| of ΔAF) of the detected air-fuel ratio change rate ΔAF(t) is equal to or larger than the effective determination threshold Yukoth, the CPU makes a "Yes" determination at step 4412 to executes some of appropriate steps from step 4414 to step 4428, then proceeds to step 4430.

Step 4414: The CPU stores, as the "previous detected air-fuel ratio change rate ΔAFold", the detected air-fuel ratio change rate ΔAF which the CPU retains at that time point. As a result, the previous detected air-fuel ratio change rate ΔAFold is the detected air-fuel ratio change rate ΔAF the sampling time is (4 ms) before the present time point.

Step 4416: The CPU stores, as the "present detected air-fuel ratio change rate ΔAF", the detected air-fuel ratio change rate ΔAF(t) obtained at step 4410 described above.

Step 4418: The CPU determines, similarly to step 2732 shown in FIG. 27, whether or not the previous detected air-fuel ratio change rate ΔAFold is equal to or smaller than "0", and whether or not the present detected air-fuel ratio change rate ΔAF is larger than "0". That is, at step 4418, the CPU determines whether or not the inclination of the detected air-fuel ratio abyfs has changed from a negative value to a positive value (i.e., whether or not the detected air-fuel ratio abyfs passes the "rich peak" which is the peak being convex downward). When this condition is satisfied, the CPU proceeds to step 4420. When this condition is not satisfied, the CPU proceeds to step 4424.

Step 4420: The CPU stores, as the "previous rich peak time point tRPold", the data stored as the rich peak time point tRP at the present time point.

Step 4422: The CPU obtains, as the "present rich peak time point tRP", a time point the sampling time ts before the present time point t. That is, since it is confirmed that the value of the detected air-fuel ratio change rate ΔAF has changed form the negative value to the positive value at the present time point, the CPU infers that the detected air-fuel ratio abyfs reached the rich peak the sampling time ts before the present time point t. Thereafter, the CPU proceeds to step 4430.

Step 4424: The CPU determines whether or not the "previous detected air-fuel ratio change rate ΔAFold is equal to or larger than "0", and the present detected air-fuel ratio change rate ΔAF is smaller than "0". That is, at step 4424 similar to step 2746 shown in FIG. 27, the CPU determines whether or not the inclination of the detected air-fuel ratio abyfs has changed from a positive value to a negative value (i.e., whether or not the detected air-fuel ratio abyfs passes the "lean peak" which is the peak being convex upward). When this condition at step 4424 is satisfied, the CPU proceeds to step 4426. When this condition at step 4424 is not satisfied, the CPU directly proceeds to step 4495 to end the present routine tentatively.

Step 4426: The CPU stores, as the "previous lean peak time point tLPold", the data stored as the lean peak time point tLP at the present time point.

Step 4428: The CPU obtains, as the "present lean peak time point tLP", a time point the sampling time ts before the present time point t. That is, since it is confirmed that the value of the detected air-fuel ratio change rate ΔAF has changed form the positive value to the negative value at the present time point, the CPU infers that the detected air-fuel ratio abyfs reached the lean peak the sampling time is before the present time point t. Thereafter, the CPU proceeds to step 4430.

At step 4430, the CPU obtains the "number of data DnRR of the detected air-fuel ratio change rate ΔAF(t) obtained and stored in the RAM, in a period from the previous rich peak (time point tRPold) to the present rich peak (time point tRP)", and obtains the "number of data DnLL of the detected air-fuel ratio change rate ΔAF obtained and stored in the RAM, in a period from the previous lean peak (time point tLPold) to the present lean peak (time point tLP)".

Subsequently, the CPU determines whether or not a magnitude |DnRR-DnLL| of a difference between the number of data DnRR and the number of data DnLL is equal to or smaller than the threshold ath. When the magnitude |DnRR-DnLL| of the difference is larger than the threshold ath, the CPU makes a "No" determination at step 4432 to directly proceed to step 4495 so as to end the present routine tentatively. Accordingly, in this case, the detected air-fuel ratio change rate ΔAF(t) having its magnitude |ΔAF(t)| which is equal to or larger than the effective determination threshold Yukoth is not discarded.

In contrast, if the magnitude |DnRR-DnLL| of the difference between the number of data DnRR and the number of data DnLL is equal to or smaller than the threshold ath when the CPU executes the process of step 4432, the CPU proceeds to step 4434 to determine whether or not "the present time point is immediately after the detection of the rich peak (i,e, whether or not the present time point is immediately after the "Yes" determination is made at step 4418)".

When the present time point is immediately after the detection of the rich peak, the CPU proceeds to step 4436, at which the CPU discards/eliminates the detected air-fuel ratio change rate ΔAF(t) (that is, ΔAF(tRPpold)−ΔAF(tRP)) obtained in the "period from the previous rich peak time point tRPold to the present rich peak time point tRP (rich-peak-to-rich-peak time) in order not to use them for the calculation of the indicating amount of air-fuel ratio change rate. It should be noted that the CPU may discard the detected air-fuel ratio change rates ΔAF(t) obtained between a time point 720° crank angle before the present time point and the present time point. That is, the CPU may eliminate the detected air-fuel ratio change rates ΔAF(t) obtained between a time point one unit combustion cycle before the present time point and the present time point.

If the present time point is not immediately after the detection of the rich peak (that is, the present time point is immediately after the detection of the lean peak) when the CPU executes the process of the step 4434, the CPU proceeds to step 4438 to discard/eliminate the detected air-fuel ratio change rate ΔAF(t) obtained in a "period from the previous lean peak time point tLPold to the present lean peak time point tLP (lean-peak-to-lean-peak time TLL)" in order not to use them for the calculation of the indicating amount of air-fuel ratio change rate. It should be noted that the CPU may discard the detected air-fuel ratio change rates ΔAF(t) obtained between a time point 720° crank angle before the present time point and the present time point. That is, the CPU may eliminate the detected air-fuel ratio change rates ΔAF(t) obtained between a time point one unit combustion cycle before the present time point and the present time point.

Figure 45:
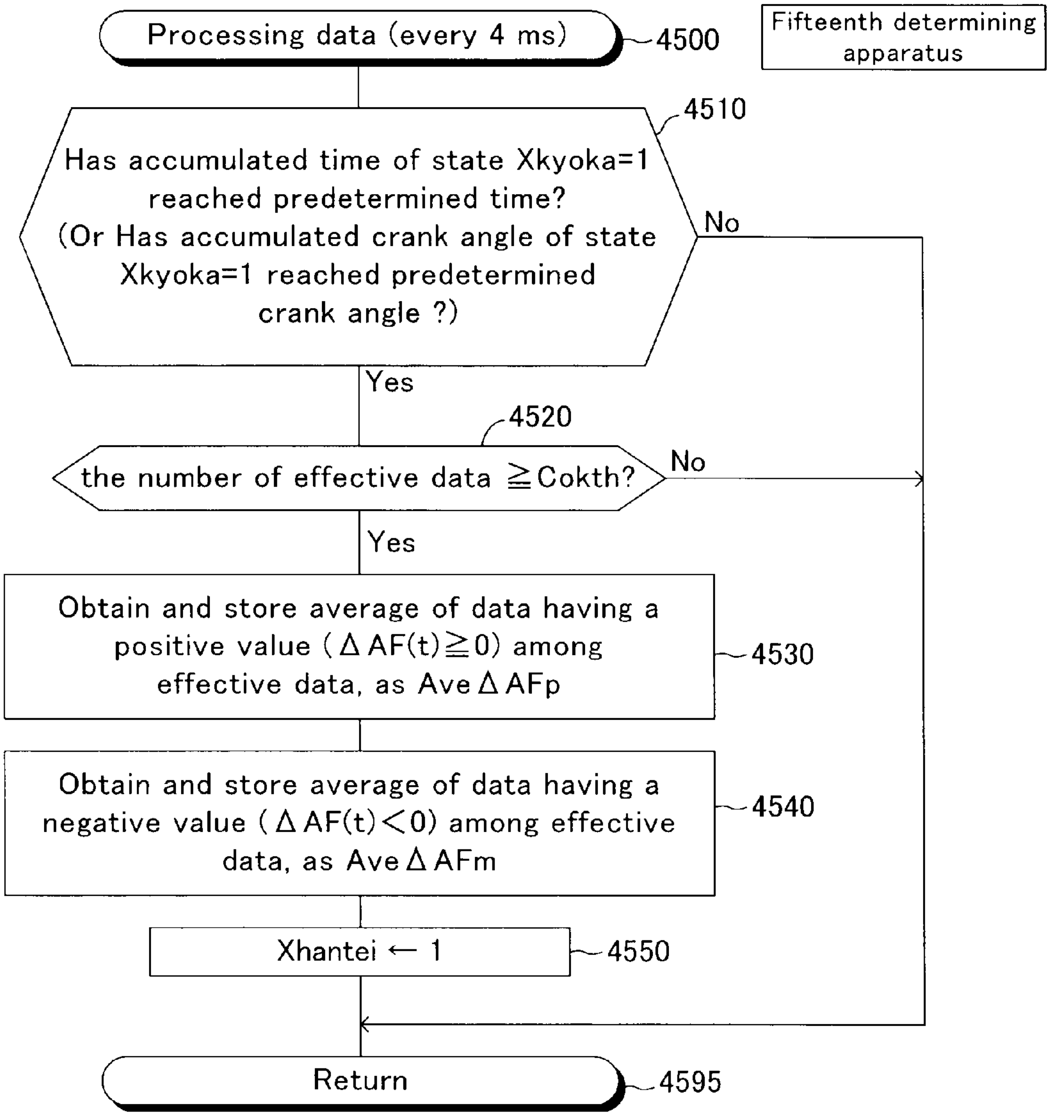
FIG. 45 is a flowchart showing a routine executed by the CPU of the fifteenth determining apparatus.

As described above, the CPU executes the routine for obtaining data shown in FIG. 45 every elapse of 4 ms. Accordingly, at an appropriate timing, the CPU starts a process from step 4500 shown in FIG. 45 to proceed to step 4510, at which the CPU determines whether or not an accumulated time of a case in which the value of the determination allowable flag Xkyoka is "1" has reached a predetermined time. Note that, at this step, the CPU may determine "whether or not an accumulated crank angle of a case in which the value of the determination allowable flag Xkyoka is "1" has reached a predetermined crank angle".

When the accumulated time of the case in which the value of the determination allowable flag Xkyoka is "1" has not reached the predetermined time, the CPU makes a "No" determination at step 4510 to directly proceed to step 4595 to end the present routine tentatively.

To the contrary, if the accumulated time of the case in which the value of the determination allowable flag Xkyoka is "1" has reached the predetermined time when the CPU executes the process of step 4510, the CPU makes a "Yes" determination at step 4510 to proceed to step 4520, at which the CPU determines whether or not the number of effective data is equal to or larger than a constant value Cokth. The number of effective data is the number of data of the "detected air-fuel ratio change rate ΔAF(t), whose magnitude (absolute value |ΔAF| of ΔAF(t)) is equal to or larger than the effective determination threshold Yukoth, and which has not been discarded at step 4436 or at step 4438".

When the number of effective data is smaller than the predetermined value Cokth, the CPU makes a "No" determination at step 4520 to directly proceed to step 4595 to end the present routine tentatively.

On the other hand, if the number of effective data is equal to or larger than the predetermined value Cokth, the CPU makes a "Yes" determination at step 4520 to execute processes of steps from step 4530 to step 4550 described below in order, and then proceeds to step 4995 to end the present routine tentatively.

Step 4530: The CPU obtains, as final average increasing change rate AveΔAFp (which is an increasing indicating amount of change rate being one of the indicating amount of air-fuel ratio change rates), an average of the effective data ΔAF(t) having a positive value.

Step 4540: The CPU obtains, as final average decreasing change rate AveΔAFm (which is a decreasing indicating amount of change rate being one of the indicating amount of air-fuel ratio change rates), an average of the effective data ΔAF(t) having a negative value.

Step 4550: The CPU sets the value of the determination execution flag Xhantei to (at) "1".

As a result, since the value of the determination execution flag Xhantei is set to (at) "1", the CPU proceeds to steps from step 2310 shown in FIG. 23 so as to perform the determination of an air-fuel ratio imbalance among cylinders using the "increasing indicating amount of change rate (i.e., final average increasing change rate AveΔAFp) obtained at step 4530 shown in FIG. 45" and the "decreasing indicating amount of change rate (i.e., final average decreasing change rate AveΔAFm) obtained at step 4540 shown in FIG. 45".

As described above, the CPU does not use the detected air-fuel ratio change rate (ineffective data) ΔAF whose magnitude (absolute value |ΔAF| of ΔAF) is smaller than the effective determination threshold Yukoth, for the calculation of the final average increasing change rate AveΔAFp and the final average decreasing change rate AveΔAFm (refer to the case in which the CPU directly proceeds to step 4495 from step 4412). In addition, when the magnitude |DnRR-DnLL| of the difference between the number of data DnRR and the number of data DnLL is equal to or smaller than the threshold ath, in other words, when it is determined that the there is no possibility that the air-fuel ratio imbalance among cylinders state is occurring because the difference between the number of data DnRR and the number of data DnLL is small, the CPU does not use at least the detected air-fuel ratio change rate ΔAF(t) obtained in a period from the time point predetermined time prior to the time point of the determination" to the "time point of the determination", for the calculation of the final average increasing change rate AveΔAFp and the final average decreasing change rate AveΔAFm (refer to steps from step 4432 to step 4438).

Consequently, the adverse affect due to the noise superimposing on the detected air-fuel ratio change rate ΔAF on "the increasing indicating amount of change rate and the decreasing indicating amount of change rate" can be reduced without using a special filter. Therefore, the fifteenth determining apparatus can perform the determination of an air-fuel ratio imbalance among cylinders with higher accuracy.

<Sixteenth Embodiment>

A control apparatus for the internal combustion engine (hereinafter, referred to as a "sixteenth determining apparatus") according to a sixteenth embodiment of the present invention will next be described.

The sixteenth determining apparatus detects the rich peak and the lean peak, similarly to the eighth determining apparatus. However, when it is determined that the air-fuel ratio imbalance among cylinders state is occurring, and if the air-fuel ratio imbalance among cylinders is the specific cylinder rich-side deviation imbalance state, the sixteenth determining apparatus specify the specific cylinder based on the rich peak time point tRPold and the engine rotational speed NE. Similarly, when it is determined that the air-fuel ratio imbalance among cylinders state is occurring, and if the air-fuel ratio imbalance among cylinders is the specific cylinder lean-side deviation imbalance state, the sixteenth determining apparatus specify the specific cylinder based on the lean peak time point tLPold and the engine rotational speed NE. An operation of the sixteenth determining apparatus will next be described.

Figure 46:
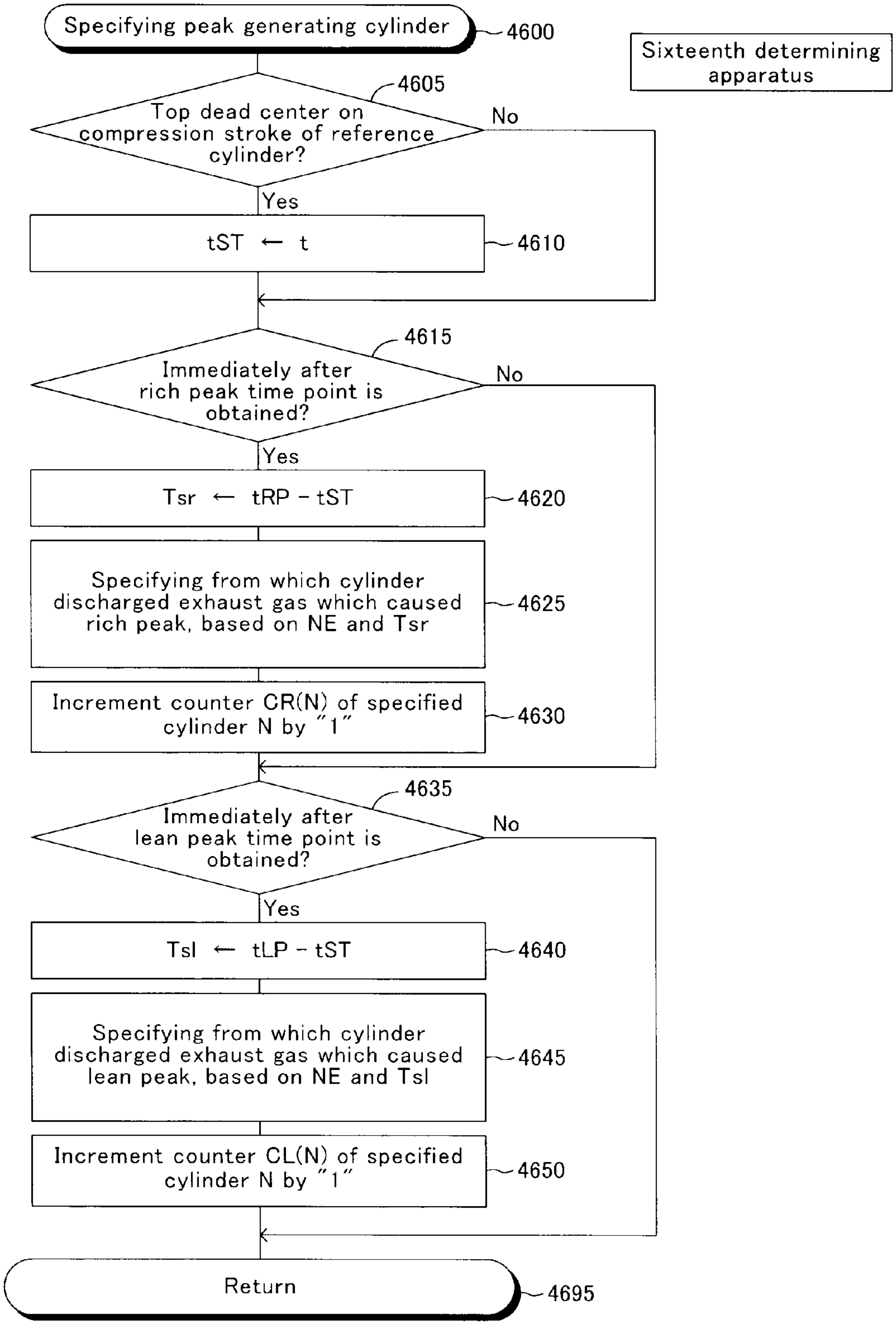
FIG. 46 is a flowchart showing a routine executed by a CPU of the air-fuel ratio imbalance among cylinders determining apparatus (sixteenth determining apparatus) according to a sixteenth embodiment of the present invention.
Figure 47:
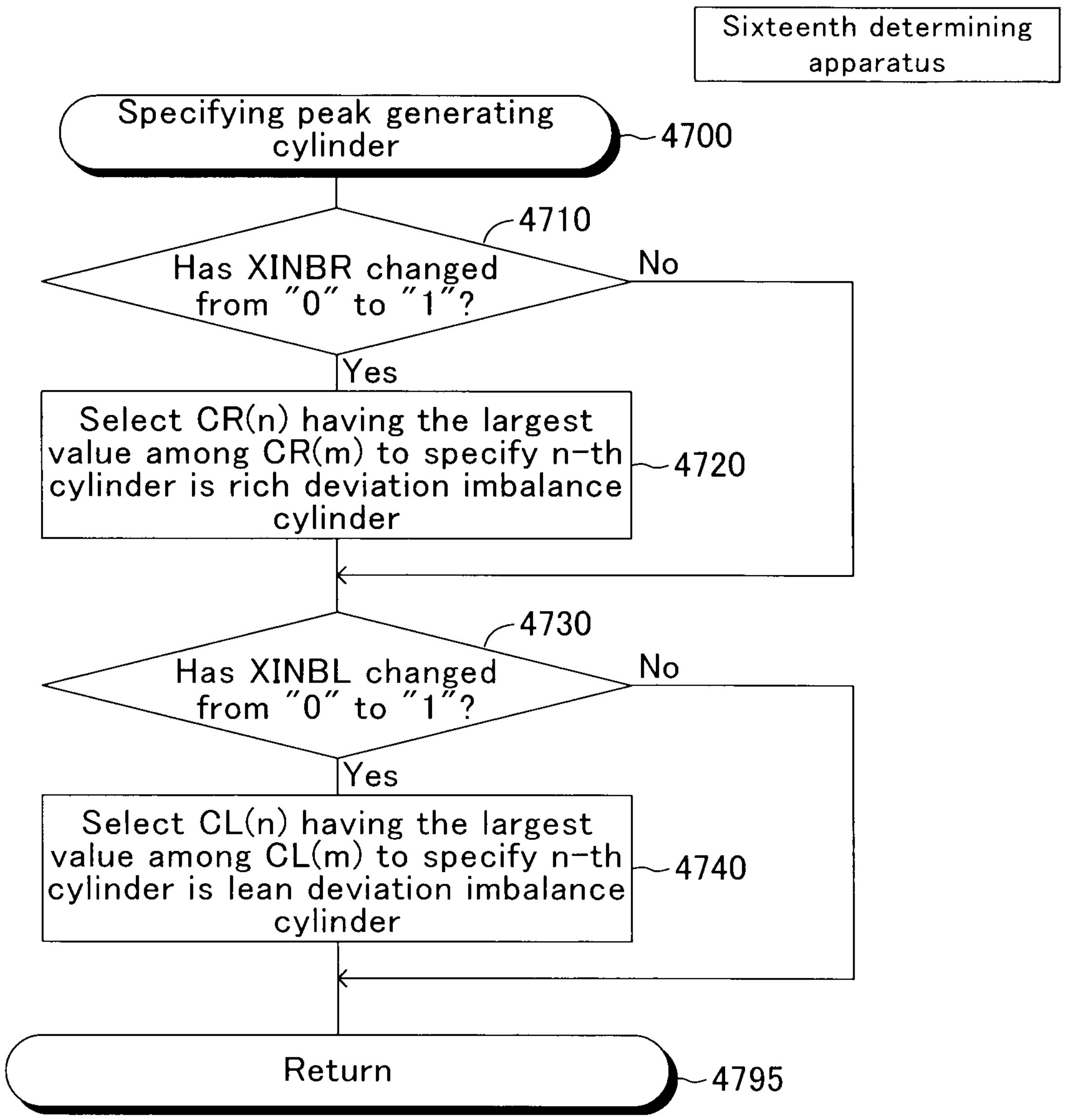
FIG. 47 is a flowchart showing a routine executed by the CPU of the sixteenth determining apparatus.

The CPU of the sixteenth determining apparatus is configured in such a manner that it executes "routines for specifying peak generating cylinder" shown in FIGS. 46 and 47 at the appropriate timings, in addition to the routines that the CPU of the eighth determining apparatus executes. Accordingly, at an appropriate timing, the CPU starts a process from step 4600 shown in FIG. 46 to proceed to step 4605, at which the CPU determines whether or not the present time point coincides with a "top dead center on the compression stroke of a reference cylinder (in the present example, the first cylinder) ".

When the present time point coincides with the "top dead center on the compression stroke of the reference cylinder", the CPU makes a "Yes" determination at step 4605 to proceed to step 4610, at which the CPU stores the present time point as a time point tST of the top dead center on the compression stroke of the reference cylinder. Thereafter, the CPU proceeds to step 4615. In contrast, when the present time point does not coincide with the "top dead center on the compression stroke of the reference cylinder", the CPU makes a "No" determination at step 4605 to directly proceed to step 4615.

Subsequently, at step 4615, the CPU determines whether or not the present time point is a "time point immediately after the rich peak time point tRP is obtained (i,e, whether or not the present time point is immediately after the process of step 2734 shown in FIG. 27 is executed). When the present time point is not the "time point immediately after the rich peak time point tRP is obtained", the CPU directly proceeds to step 4635.

In contrast, when the present time point is the "time point immediately after the rich peak time point tRP is obtained, the CPU makes a "Yes" determination at step 4615 to execute processes of steps from step 4620 to step 4630 described below in order, then proceeds to step 4635.

Step 4620: The CPU calculates a time Tsr from the top dead center on the compression stroke of the reference cylinder to the rich peak time point tRP, by subtracting the time point tST of the top dead center on the compression stroke of the reference cylinder from the rich peak time point tRP obtained at step 2734 shown in FIG. 27.

Step 4625: The CPU specifies (identifies), based on the engine rotational speed NE and the time Tsr, from which cylinder N (N-th cylinder) the exhaust gas which caused the rich peak was discharged (which cylinder N (discharged the exhaust gas) which caused the rich peak).

When the individual-cylinder-air-fuel-ratio of the specific cylinder deviates toward rich side with respect to the stoichiometric air-fuel ratio, a time required for the exhaust gas discharged from the specific cylinder to emerge on the output Vabyfs of the air-fuel ratio sensor varies depending on the engine rotational speed NE. Therefore, it is possible to specify from which cylinder N the exhaust gas which caused the rich peak was discharged, based on the engine rotational speed and the time Tsr. It should be noted that the CPU may specify the cylinder N which caused the rich peak based on the intake air-flow rate Ga, the engine rotational speed NE, and the time Tsr.

Step 4630: The CPU increments a value of a counter CR(N) corresponding to the cylinder N specified at step 4625 by "1". For example, when the cylinder specified at step 4625 is the first cylinder, the counter CR(1) is incremented by "1". It should be noted that all of the values of the counters CR(N) are set to (at) "0" by the initialization routine described above.

Subsequently, at step 4635, the CPU determines whether or not the present time point is a "time point immediately after the lean peak time point tLP is obtained" (i,e, whether or not the present time point is immediately after the process of step 2748 shown in FIG. 27 is executed). When the present time point is not the "time point immediately after the lean peak time point tLP is obtained", the CPU directly proceeds to step 4695 to end the present routine tentatively.

In contrast, when the present time point is the "time point immediately after the lean peak time point tLP is obtained, the CPU makes a "Yes" determination at step 4635 to execute processes of steps from step 4640 to step 4650 described below in order, then proceeds to step 4695 to end the present routine tentatively.

Step 4640: The CPU calculates a time Tsl from the top dead center on the compression stroke of the reference cylinder to the lean peak time point tLP, by subtracting the time point tST of the top dead center on the compression stroke of the reference cylinder from the lean peak time point tLP obtained at step 2748 shown in FIG. 27.

Step 4645: The CPU specifies (identifies), based on the engine rotational speed NE and the time Tsl, from which cylinder N the exhaust gas which caused the lean peak was discharged (which cylinder N (discharged the exhaust gas which) caused the lean peak).

When the individual-cylinder-air-fuel-ratio of the specific cylinder deviates toward lean side with respect to the stoichiometric air-fuel ratio, a time required for the exhaust gas discharged from the specific cylinder to emerge on the output Vabyfs of the air-fuel ratio sensor varies depending on the engine rotational speed NE. Therefore, it is possible to specify from which cylinder N the exhaust gas which caused the lean peak was discharged according to the engine rotational speed and the time Tsl. It should be noted that the CPU may specify the cylinder N which caused the lean peak based on the intake air-flow rate Ga, the engine rotational speed NE, and the time Tsl.

Step 4650: The CPU increments a value of a counter CL(N) corresponding to the cylinder N specified at step 4645 by "1". For example, when the cylinder specified at step 4645 is the first cylinder, the counter CL(1) is incremented by "1". It should be noted that all of the values of the counters CL(N) are set to (at) "0" by the initialization routine described above.

Further, at an appropriate timing, the CPU starts process from step 4700 in FIG. 47 to proceed to step 4710, at which the CPU determines whether or not the present time point is immediately after a "time point at which the rich-side deviation imbalance occurrence flag XINBR changed from "0" to "1"". When the condition at step 4710 is not satisfied, the CPU makes a "No" determination at step 4710 to directly proceed to step 4730.

In contrast, when the condition at step 4710 is satisfied, the CPU makes a "Yes" determination at step 4710 to proceed to step 4720, at which the CPU selects a counter CR(n) having the largest value among the counters CR(m) (wherein m is any natural number from 1 to N), and specifies the n-th cylinder as the rich deviation cylinder. Thereafter, the CPU proceeds to step 4730.

The CPU proceeds to step 4730 to determine whether or not the present time point is immediately after a "time point at which the lean-side deviation imbalance occurrence flag XINBL changed from "0" to "1"". When the condition at step 4730 is not satisfied, the CPU makes a "No" determination at step 4730 to directly proceed to step 4795 to end the present routine tentatively.

In contrast, when the condition at step 4730 is satisfied, the CPU makes a "Yes" determination at step 4730 to proceed to step 4740, at which the CPU selects a counter CL(n) having the largest value among the counters CL(m) (wherein m is any natural number from 1 to N), and specifies the n-th cylinder as the lean deviation cylinder. Thereafter, the CPU proceeds to step 4795 to end the present routine tentatively.

In this manner, the sixteenth determining apparatus can specify (identify) which cylinder is in the rich deviation state or in the lean deviation state, based on the time point tRP at which the rich peak emerged or the time point tLP at which the lean peak emerged.

As described above, the air-fuel ratio imbalance among cylinders determining apparatus according to each of the embodiments of the present invention can determine whether or not the air-fuel ratio imbalance among cylinders state is occurring which high accuracy, by utilizing the indicating amount of air-fuel ratio change rate which varies in accordance with the detected air-fuel ratio change rate ΔAF.

The present invention is not limited to the embodiments described above, but various modifications may be adopted without departing from the scope of the invention. For example, when the determination of an air-fuel ratio imbalance among cylinders is performed (or when the indicating amount of air-fuel ratio change rate is obtained), the air-fuel ratio of the mixture supplied to the engine may be maintained at a constant value (corresponding to the stoichiometric air-fuel ratio), by causing the main feedback control condition or the sub feedback control condition to be unsatisfied.

The invention claimed is:

1. An air-fuel ratio imbalance among cylinders determining apparatus applied to a multi-cylinder internal combustion engine having a plurality of cylinders, comprising:

an air-fuel ratio sensor, disposed either at an exhaust-gas-aggregated-portion onto which exhaust gases discharged from at least two or more of cylinders among a plurality of said cylinders merge in an exhaust gas passage of said engine or at a position downstream of said exhaust-gas-aggregated-portion in said exhaust gas passage, said air-fuel ratio sensor including an air-fuel ratio detection element and a protective cover which accommodates said air-fuel ratio detection element in its inside so as to cover said air-fuel ratio detection element, said protective cover having an inflow hole which allows said exhaust gas flowing through said exhaust gas passage to flow into said inside, and an outflow hole which allows said exhaust gas which has flowed into said inside to flow out to said exhaust gas passage, wherein said air-fuel ratio detection element generates, as an output of said air-fuel ratio sensor, an output in accordance with said exhaust gas reaching said air-fuel ratio detection element; and imbalance determining portion configured so as to obtain, when a target value of an air-fuel ratio of a mixture supplied to each of at least two or more of said cylinders is set at a constant target air-fuel ratio, a value for a unit combustion cycle period, based on said output of said air-fuel ratio sensor in said unit combustion cycle period, said value corresponding to a detected air-fuel ratio change rate which corresponds to a change amount per unit time of an air-fuel ratio represented by said output of said air-fuel ratio sensor, and said unit combustion cycle period being a period necessary for anyone of said cylinders among at least said two or more of said cylinders discharging exhaust gases which reach said exhaust-gas-aggregated-portion to complete one combustion cycle including an intake stroke, a compression stroke, an expansion stroke, and an exhaust stroke, and so as to perform a determination, based on an indicating amount of air-fuel ratio change rate which is determined in accordance with said value corresponding to said detected air-fuel ratio change rate, as to whether or not an air-fuel ratio imbalance among cylinders state is occurring in which an imbalance among individual-cylinder-air-fuel-ratios, each being an air-fuel ratio of a mixture supplied to each of at least said two or more of said cylinders, is occurring.

2. The air-fuel ratio imbalance among cylinders determining apparatus according to claim 1, wherein, said imbalance determining portion is configured so as to compare a magnitude of said indicating amount of air-fuel ratio change rate and a predetermined imbalance determination threshold, and so as to determine, based on said comparison result, whether or not said air-fuel ratio imbalance among cylinders state is occurring.

3. The air-fuel ratio imbalance among cylinders determining apparatus according to claim 2, wherein, said imbalance determining portion is configured so as to determine that said air-fuel ratio imbalance among cylinders state is occurring when said comparison result indicates that said magnitude of said obtained indicating amount of air-fuel ratio change rate is larger than said imbalance determination threshold.

4. The air-fuel ratio imbalance among cylinders determining apparatus according to claim 2 or claim 3, wherein, said imbalance determining portion is configured so as to obtain said output of said air-fuel ratio sensor every time a constant sampling period elapses; so as to obtain, as said detected air-fuel ratio change rates, a difference between air-fuel ratios, each being represented by each of said outputs of said air-fuel ratio sensor that are obtained consecutively before and after said sampling period, to obtain a plurality of said detected air-fuel ratio change rates in said unit combustion cycle period; and so as to obtain, as said indicating amount of air-fuel ratio change rate, a value corresponding to an average of magnitudes of a plurality of said obtained detected air-fuel ratio change rates.

5. The air-fuel ratio imbalance among cylinders determining apparatus according to claim 2 or claim 3, wherein, said imbalance determining portion is configured so as to obtain said output of said air-fuel ratio sensor every time a constant sampling period elapses; so as to obtain, as said detected air-fuel ratio change rates, a difference between air-fuel ratios, each being represented by each of said outputs of said air-fuel ratio sensor that are obtained consecutively before and after said sampling period, to obtain a plurality of said detected air-fuel ratio change rates in said unit combustion cycle period; and so as to obtain, as said indicating amount of air-fuel ratio change rate, a value corresponding to said detected air-fuel ratio change rate whose magnitude is the largest among a plurality of said obtained detected air-fuel ratio change rates.

6. The air-fuel ratio imbalance among cylinders determining apparatus according to claim 2 or claim 3, wherein, said imbalance determining portion is configured;

so as to obtain said output of said air-fuel ratio sensor every time a constant sampling period shorter than said unit combustion cycle period elapses;

so as to obtain, as said detected air-fuel ratio change rate, a difference between air-fuel ratios, each being represented by each of said outputs of said air-fuel ratio sensor that are obtained consecutively before and after said sampling period;

so as to select, as a maximum change rate, said detected air-fuel ratio change rate whose magnitude is the largest among a plurality of said detected air-fuel ratio change rates obtained in said unit combustion cycle period;

so as to obtain an average of said maximum change rates, each being selected for each of a plurality of said unit combustion cycle periods, as said indicating amount of air-fuel ratio change rate.

7. The air-fuel ratio imbalance among cylinders determining apparatus according to claim 2 or claim 3, wherein, said imbalance determining portion is configured so as to increase said imbalance determination threshold as an intake air-flow rate which is an air amount introduced into said engine per unit time is larger.

8. The air-fuel ratio imbalance among cylinders determining apparatus according to claim 2, wherein, said imbalance determining portion is configured;

so as to obtain said indicating amount of air-fuel ratio change rate, discriminating between an increasing indicating amount of change rate when said detected air-fuel ratio change rate is positive and a decreasing indicating amount of change rate when said detected air-fuel ratio change rate is negative;

so as to compare a magnitude of said increasing indicating amount of change rate with an increasing change rate threshold serving as said imbalance determination threshold when said magnitude of said increasing indicating amount of change rate is larger than a magnitude of said decreasing indicating amount of change rate, to determine that said air-fuel ratio imbalance among cylinders state is occurring in which an air-fuel ratio of one of said at least two or more of said cylinders deviates toward leaner side with respect to said stoichiometric air-fuel ratio when said magnitude of said increasing indicating amount of change rate is larger than said increasing change rate threshold; and so as to compare said magnitude of said decreasing indicating amount of change rate with a decreasing change rate threshold serving as said imbalance determination threshold when said magnitude of said decreasing indicating amount of change rate is larger than said magnitude of said increasing indicating amount of change rate, to determine that said air-fuel ratio imbalance among cylinders state is occurring in which an air-fuel ratio of one of said at least two or more of said cylinders deviates toward richer side with respect to said stoichiometric air-fuel ratio when said magnitude of said decreasing indicating amount of change rate is larger than said decreasing change rate threshold.

9. The air-fuel ratio imbalance among cylinders determining apparatus according to claim 2, wherein, said imbalance determining portion is configured;

so as to obtain said indicating amount of air-fuel ratio change rate, discriminating between an increasing indicating amount of change rate when said detected air-fuel ratio change rate is positive and a decreasing indicating amount of change rate when said detected air-fuel ratio change rate is negative;

so as to compare a magnitude of said increasing indicating amount of change rate with an increasing change rate threshold serving as said imbalance determination threshold, and to compare said magnitude of said decreasing indicating amount of change rate with a decreasing change rate threshold serving as said imbalance determination threshold; and so as to determine that said air-fuel ratio imbalance among cylinders state is occurring, when said magnitude of said increasing indicating amount of change rate is larger than said increasing change rate threshold and said magnitude of said decreasing indicating amount of change rate is larger than said decreasing change rate threshold.

10. The air-fuel ratio imbalance among cylinders determining apparatus according to claim 9, wherein, said imbalance determining portion is configured;

when said magnitude of said increasing indicating amount of change rate is larger than said increasing change rate threshold and said magnitude of said decreasing indicating amount of change rate is larger than said decreasing change rate threshold;

so as to determine that said air-fuel ratio imbalance among cylinders state is occurring in which an air-fuel ratio of one of said at least two or more of said cylinders deviates toward leaner side with respect to said stoichiometric air-fuel ratio when said magnitude of said increasing indicating amount of change rate is larger than said magnitude of said decreasing indicating amount of change rate; and so as to determine that said air-fuel ratio imbalance among cylinders state is occurring in which an air-fuel ratio of one of said at least two or more of said cylinders deviates toward richer side with respect to said stoichiometric air-fuel ratio when said magnitude of said decreasing indicating amount of change rate is larger than said magnitude of said increasing indicating amount of change rate.

11. The air-fuel ratio imbalance among cylinders determining apparatus according to anyone of claims 8 to 10, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period;

so as to obtain, as said increasing indicating amount of change rate, an average of magnitudes of change rates, each having a positive value, among a plurality of said detected air-fuel ratio change rates obtained in a data obtaining period longer than said sampling period; and so as to obtain, as said decreasing indicating amount of change rate, an average of magnitudes of change rates, each having a negative value, among a plurality of said detected air-fuel ratio change rates.

12. The air-fuel ratio imbalance among cylinders determining apparatus according to claim 11, wherein, said data obtaining period is set at a period which is a natural number times longer than said unit combustion cycle period.

13. The air-fuel ratio imbalance among cylinders determining apparatus according to anyone of claims 8 to 10, wherein, said imbalance determining portion is configured;

so as to obtain said output of said air-fuel ratio sensor every time a constant sampling period elapses, so as to obtain, as said detected air-fuel ratio change rate, a difference between air-fuel ratios, each being represented by each of said outputs of said air-fuel ratio sensor that are obtained consecutively before and after said sampling period; and so as to obtain, as said increasing indicating amount of change rate, a detected air-fuel ratio change rate whose magnitude is the largest among a plurality of said detected air-fuel ratio change rates having positive values, said detected air-fuel ratio change rates being obtained in a data obtaining period longer than said sampling period; and so as to obtain, as said decreasing indicating amount of change rate, a detected air-fuel ratio change rate whose magnitude is the largest among a plurality of said detected air-fuel ratio change rates having negative values.

14. The air-fuel ratio imbalance among cylinders determining apparatus according to anyone of claims 8 to 10, wherein, said imbalance determining portion is configured;

so as to obtain said output of said air-fuel ratio sensor every time a constant sampling period elapses shorter than said unit combustion cycle period;

so as to obtain, as said detected air-fuel ratio change rate, a difference between air-fuel ratios, each being represented by each of said outputs of said air-fuel ratio sensor that are obtained consecutively before and after said sampling period;

so as to select, as a maximum value of increasing change rate, a detected air-fuel ratio change rate whose magnitude is the largest among change rates, each having a positive value, in a plurality of said detected air-fuel ratio change rates obtained in said unit combustion cycle period, to obtain, as said increasing indicating amount of change rate, an average of said maximum values of increasing change rate, each being selected for each of a plurality of said unit combustion cycle periods; and so as to select, as a maximum value of decreasing change rate, a detected air-fuel ratio change rate whose magnitude is the largest among change rates, each having a negative value, in a plurality of said detected air-fuel ratio change rates obtained in said unit combustion cycle period, to obtain, as said decreasing indicating amount of change rate, an average of said maximum values of decreasing change rate, each being selected for each of a plurality of said unit combustion cycle periods.

15. The air-fuel ratio imbalance among cylinders determining apparatus according to claim 2, wherein, said imbalance determining portion is configured;

so as to obtain, as said indicating amount of air-fuel ratio change rate, an increasing indicating amount of change rate which corresponds to a magnitude of said detected air-fuel ratio change rate when said detected air-fuel ratio change rate is positive;

so as to obtain, as said imbalance determination threshold, a decreasing indicating amount of change rate which corresponds to a magnitude of said detected air-fuel ratio change rate when said detected air-fuel ratio change rate is negative; and so as to make a comparison between said magnitude of said indicating amount of air-fuel ratio change rate and said imbalance determination threshold by determining whether or not an absolute value of a difference between said increasing indicating amount of change rate and said decreasing indicating amount of change rate is larger than a predetermined threshold.

16. The air-fuel ratio imbalance among cylinders determining apparatus according to claim 2, wherein, said imbalance determining portion is configured;

so as to obtain, as said indicating amount of air-fuel ratio change rate, a decreasing indicating amount of change rate which corresponds to a magnitude of said detected air-fuel ratio change rate when said detected air-fuel ratio change rate is negative;

so as to obtain, as said imbalance determination threshold, an increasing indicating amount of change rate which corresponds to a magnitude of said detected air-fuel ratio change rate when said detected air-fuel ratio change rate is positive; and so as to make a comparison between said magnitude of said indicating amount of air-fuel ratio change rate and said imbalance determination threshold by determining whether or not an absolute value of a difference between said decreasing indicating amount of change rate and said increasing indicating amount of change rate is larger than a predetermined threshold.

17. The air-fuel ratio imbalance among cylinders determining apparatus according to claim 15 or claim 16, wherein, said imbalance determining portion is configured;

so as to determine that said air-fuel ratio imbalance among cylinders state is occurring in which an air-fuel ratio of one of said at least two or more of said cylinders deviates toward richer side with respect to said stoichiometric air-fuel ratio when said decreasing indicating amount of change rate is larger than said increasing indicating amount of change rate; and so as to determine that said air-fuel ratio imbalance among cylinders state is occurring in which an air-fuel ratio of one of said at least two or more of said cylinders deviates toward leaner side with respect to said stoichiometric air-fuel ratio when said increasing indicating amount of change rate is larger than said decreasing indicating amount of change rate.

18. The air-fuel ratio imbalance among cylinders determining apparatus according to claim 15 or claim 16, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period; and so as to obtain, as said increasing indicating amount of change rate, a value corresponding to a detected air-fuel ratio change rate whose magnitude is the largest among said change rates, each having a positive value, in a plurality of said detected air-fuel ratio change rates obtained in said unit combustion cycle period, and so as to obtain, as said decreasing indicating amount of change rate, a value corresponding to a detected air-fuel ratio change rate whose magnitude is the largest among said change rates, each having a negative value, in a plurality of said detected air-fuel ratio change rates.

19. The air-fuel ratio imbalance among cylinders determining apparatus according to claim 2 or claim 3, wherein, said imbalance determining portion is configured;

so as to obtain said output of said air-fuel ratio sensor every time a constant sampling period elapses, to obtain, as said detected air-fuel ratio change rate, a difference between air-fuel ratios, each being represented by each of said outputs of said air-fuel ratio sensor that are obtained consecutively before and after said sampling period;

so as to use, as data for obtaining said indicating amount of air-fuel ratio change rate, said detected air-fuel ratio change rate whose magnitude is larger than or equal to a predetermined effective determination threshold; and so as not to use, as data for obtaining said indicating amount of air-fuel ratio change rate, said detected air-fuel ratio change rate whose magnitude is smaller than said predetermined effective determination threshold.

20. The air-fuel ratio imbalance among cylinders determining apparatus according to claim 2, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period;

so as to detect, as a lean peak time point, a time point at which said detected air-fuel ratio change rate changes from a positive value to a negative value; and so as not to use, as data for obtaining said indicating amount of air-fuel ratio change rate, said detected air-fuel ratio change rate which is obtained within a predetermined time period before or after said lean peak time point.

21. The air-fuel ratio imbalance among cylinders determining apparatus according to claim 2, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period;

so as to detect, as a rich peak time point, a time point at which said detected air-fuel ratio change rate changes from a negative value to a positive value; and so as not to use, as data for obtaining said indicating amount of air-fuel ratio change rate, said detected air-fuel ratio change rate which is obtained within a predetermined time period before or after said rich peak time point.

22. The air-fuel ratio imbalance among cylinders determining apparatus according to claim 2, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period; and so as to detect, as a lean peak time point, a time point at which said detected air-fuel ratio change rate changes from a positive value to a negative value; and so as not to use, as data for obtaining said indicating amount of air-fuel ratio change rate, said detected air-fuel ratio change rate obtained between two of said lean peak time points that are consecutively obtained, when a lean-peak-to-lean-peak time which is a time between said two of said lean peak time points is shorter than a predetermined time threshold.

23. The air-fuel ratio imbalance among cylinders determining apparatus according to claim 2, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period; and so as to detect, as a rich peak time point, a time point at which said detected air-fuel ratio change rate changes from a negative value to a positive value; and so as not to use, as data for obtaining said indicating amount of air-fuel ratio change rate, said detected air-fuel ratio change rate obtained between two of said rich peak time points that are consecutively obtained, when a rich-peak-to-rich-peak time which is a time between said two of said rich peak time points is shorter than a predetermined time threshold.

24. The air-fuel ratio imbalance among cylinders determining apparatus according to anyone of claims 1, 2, and 3, wherein, said imbalance determining portion is configured;

so as to perform said determination as to whether or not said air-fuel ratio imbalance among cylinders state is occurring when an intake air-flow rate which is an amount of air introduced into said engine per unit time is larger than a predetermined first air-flow rate threshold, and so as not to perform said determination as to whether or not said air-fuel ratio imbalance among cylinders state is occurring when said intake air-flow rate is smaller than said first air-flow rate threshold.

25. The air-fuel ratio imbalance among cylinders determining apparatus according to claim 1, wherein, said imbalance determining portion is configured;

so as to obtain said output of said air-fuel ratio sensor every time a constant sampling period elapses;

so as to obtain, as said detected air-fuel ratio change rate, a difference between air-fuel ratios, each being represented by each of said outputs of said air-fuel ratio sensor that are obtained consecutively before and after said sampling period; and so as to obtain, as one of said indicating amount of air-fuel ratio change rates, the number of effective data representing the number of data of said detected air-fuel ratio change rate whose magnitude is equal to or larger than a predetermined effective determination threshold among a plurality of said detected air-fuel ratio change rates obtained in a data obtaining period longer than said sampling period;

so as to obtain, as another of said indicating amount of air-fuel ratio change rates, the number of ineffective data representing the number of data of said detected air-fuel ratio change rate whose magnitude is smaller than said effective determination threshold among a plurality of said detected air-fuel ratio change rates obtained in said data obtaining period;

and so as to determine whether or not said air-fuel ratio imbalance among cylinders state is occurring based on the number of effective data and the number of ineffective data.

26. The air-fuel ratio imbalance among cylinders determining apparatus according to claim 25, wherein, said imbalance determining portion is configured;

so as to determine that said air-fuel ratio imbalance among cylinders state is occurring, when the number of effective data is larger than a threshold of the number of data which varies based on the number of total data which is a sum of the number of effective data and the number of ineffective data.

* * * * *